United States Patent
Jacobs

(10) Patent No.: US 11,016,588 B2
(45) Date of Patent: May 25, 2021

(54) METHOD AND DEVICE AND SYSTEM WITH DUAL MOUSE SUPPORT

(71) Applicant: INVENTRANS BVBA, Bilzen (BE)

(72) Inventor: Lambert Jacobs, Bilzen (BE)

(73) Assignee: INVENTRANS BV, Bilzen (BE)

( * ) Notice: Subject to any disclaimer, the term of this patent is extended or adjusted under 35 U.S.C. 154(b) by 0 days.

(21) Appl. No.: 16/374,305

(22) Filed: Apr. 3, 2019

(65) Prior Publication Data
US 2020/0233501 A1    Jul. 23, 2020

(30) Foreign Application Priority Data

Jan. 20, 2019    (BE) .................................. 2019/5035

(51) Int. Cl.
| | |
|---|---|
| *G06F 3/0354* | (2013.01) |
| *G06F 3/038* | (2013.01) |
| *G06F 3/0481* | (2013.01) |
| *G06F 3/0484* | (2013.01) |
| *G06F 3/0485* | (2013.01) |

(52) U.S. Cl.
CPC .......... *G06F 3/038* (2013.01); *G06F 3/03543* (2013.01); *G06F 3/0481* (2013.01); *G06F 3/0485* (2013.01); *G06F 3/04845* (2013.01); *G06F 2203/0382* (2013.01); *G06F 2203/04804* (2013.01)

(58) Field of Classification Search
CPC .... G06F 3/038; G06F 3/04845; G06F 3/0485; G06F 3/03543; G06F 3/0481; G06F 2203/04804; G06F 2203/0382
See application file for complete search history.

(56) References Cited

U.S. PATENT DOCUMENTS

| | | | | |
|---|---|---|---|---|
| 5,617,114 A | * | 4/1997 | Bier ..................... | G06F 3/04845 345/634 |
| 5,666,499 A | * | 9/1997 | Baudel ................. | G06F 3/0481 345/157 |

(Continued)

FOREIGN PATENT DOCUMENTS

| | | |
|---|---|---|
| EP | 0538745 A2 | 4/1993 |
| EP | 0635780 A1 | 1/1995 |

OTHER PUBLICATIONS

Bier et al., "A Taxonomy of See-Through Tools," Human Factors in Computing Systems, Apr. 24-28, 1994, pp. 358-364.

(Continued)

*Primary Examiner* — Ryan A Lubit
(74) *Attorney, Agent, or Firm* — Workman Nydegger

(57) ABSTRACT

A computer-implemented method for a computer device with two pointer devices and/or a mouse filter driver and/or a hub configured to convert certain messages from the pointer devices into movement sequences. The method includes the steps of: (b) allowing the operating system to display the native mouse cursor; (d) providing a message processor to process raw input messages from the pointer devices; (e) maintaining a first and second position according to movements of the first and second pointer device; (f) adjusting a position of the native mouse cursor according to movements of the first or second pointer device which was moved or operated most recently; and g) detecting and converting the movement sequences into a corresponding command.

14 Claims, 74 Drawing Sheets

(56) References Cited

U.S. PATENT DOCUMENTS

| | | | | |
|---|---|---|---|---|
| 5,805,163 A | * | 9/1998 | Bagnas | G06F 3/0481 |
| | | | | 715/768 |
| 2002/0163502 A1 | | 11/2002 | Kamper et al. | |
| 2006/0066571 A1 | * | 3/2006 | Fairs | G06F 3/038 |
| | | | | 345/157 |
| 2012/0272179 A1 | * | 10/2012 | Stafford | G06F 3/038 |
| | | | | 715/781 |
| 2014/0075372 A1 | * | 3/2014 | Wu | G06F 9/451 |
| | | | | 715/781 |
| 2014/0247217 A1 | * | 9/2014 | Liu | G06F 3/03547 |
| | | | | 345/163 |
| 2015/0009141 A1 | * | 1/2015 | Cheng | G06F 3/0346 |
| | | | | 345/158 |
| 2015/0012880 A1 | * | 1/2015 | Kurokawa | G06F 3/0481 |
| | | | | 715/798 |
| 2016/0209920 A1 | * | 7/2016 | Mastandrea | G06F 3/03547 |

OTHER PUBLICATIONS

Belgian Search Report from BE Application No. 201705895, dated Apr. 26, 2018.
International Search Report from PCT Application No. PCT/EP2018/075838, dated Mar. 18, 2019.
Search Report from corresponding BE Application No. BE201905035, dated Oct. 3, 2019.
Search Report from corresponding BE Application No. BE201905219, dated Nov. 8, 2019.
Search Report from corresponding BE Application No. BE201905219, dated Dec. 19, 2019.

* cited by examiner

```
//Pseudo-code exemplary position update routine:

get deviceHandle,dx,dy;
//------------------------------------------
Begin
   If (deviceHandle=LHandle)
   Then Begin
      xL:=xL+dx; yL:=yL+dy; //update Pos2
      SetCursorPos(xR,yR); //overrule native position
   End
   Else If (deviceHandle=RHandle)
   Then Begin
      xR:=xR+dx; yR:=yR+dy; //update Pos1
      SetCursorPos(xR,yR); //overrule native position
   End;
End;
//------------------------------------------
```

— i.e. stay at "right" position
— i.e. follow "right" mouse device

FIG 5(g)

```
//Pseudo-code exemplary object repositioning routine:
//e.g. based on a timer Begin
   Rectangle.Left:=xL;
   Rectangle.Top:=yL;
End;
```

— i.e. follow "left" mouse device

FIG 5(h)

```
//Pseudo-code object repositioning routine:
//e.g. based on a timer

Begin
  RectangleL.Left:=xL;
  RectangleL.Top  :=yL;
  RectangleR.Left:=xR;
  RectangleR.Top  :=yR;
End;
```

FIG 6(c)

```
//Pseudo-code exemplary position update routine:

get deviceHandle,dx,dy;
//---------------------------------------------
Begin
  If (deviceHandle=LHandle)
  Then Begin
    xL:=xL+dx; yL:=yL+dy; //update Pos2
    SetCursorPos(xL,yL);  //overrule native position
  End
  Else If (deviceHandle=RHandle)
  Then Begin
    xR:=xR+dx; yR:=yR+dy; //update Pos1
    SetCursorPos(xR,yR);  //overrule native position
  End;
End;
//---------------------------------------------
``` i.e. follow most recent event

FIG 7(e)

```
Pseudo-code position update routine:

get deviceHandle,dx,dy;
//------------------------------------------------
If (inputMode=RightHanded)
Then Begin
   If (deviceHandle=LHandle)
   Then Begin
      xL:=xL+dx; yL:=yL+dy;  //update Pos2
      SetCursorPos(xL,yL);   //overrule native position
   End
   Else If (deviceHandle=RHandle)
   Then Begin
      xR:=xR+dx; yR:=yR+dy;  //update Pos1
      SetCursorPos(xL,yL);   //overrule native position
   End;
End;
//------------------------------------------------
``` i.e. follow "left" mouse, or stay at "left" position

FIG 9(c)

```
Pseudo-code position update routine:

get deviceHandle,dx,dy;
//-----------------------------------------------
If (inputMode=BothHanded)
Then Begin
   If (deviceHandle=LHandle)
   Then Begin
      xL:=xL+dx; yL:=yL+dy; //update Pos2
      SetCursorPos(xL,yL); //overrule native position
   End
   Else If (deviceHandle=RHandle)
   Then Begin
      xR:=xR+dx; yR:=yR+dy; //update Pos1
      SetCursorPos(xR,yR); //overrule native position
   End;
End;
//-----------------------------------------------
If (inputMode=RightHanded)
Then Begin
   If (deviceHandle=LHandle)
   Then Begin
      xL:=xL+dx; yL:=yL+dy; //update Pos2
      SetCursorPos(xR,yR); //overrule native position
   End
   Else If (deviceHandle=RHandle)
   Then Begin
      xR:=xR+dx; yR:=yR+dy; //update Pos1
      SetCursorPos(xR,yR); //overrule native position
   End;
End;
//-----------------------------------------------
If (inputMode=LeftHanded)
Then Begin
   If (deviceHandle=LHandle)
   Then Begin
      xL:=xL+dx; yL:=yL+dy; //update Pos2
      SetCursorPos(xL,yL); //overrule native position
   End
   Else If (deviceHandle=RHandle)
   Then Begin
      xR:=xR+dx; yR:=yR+dy; //update Pos1
      SetCursorPos(xL,yL); //overrule native position
   End;
End;
//-----------------------------------------------
```

(a) i.e. follow most recent event (b) i.e. follow "right" mouse, or stay at "right" position (c) i.e. follow "left" mouse, or stay at "left" position

FIG 13

```
//Pseudo-code improved position update routine
//(for bothHanded inputmode)

get deviceHandle, dx, dy, button info;
If a button of M1 is pressed then M1pressed:=TRUE;
If a button of M2 is pressed then M2pressed:=TRUE;
//------------------------------------------
If (inputMode=BothHanded)
Then Begin
  If (deviceHandle=LHandle)
  Then Begin
    If M1pressed
    Then Begin
      SetCursorPos(xR,yR);   //stay at, or follow Pos1
    End
    Else Begin
      xL:=xL+dx; yL:=yL+dy; //update Pos2
      SetCursorPos(xL,yL);   //overrule native position
    End;
  End
  Else If (deviceHandle=RHandle)
  Then Begin
    If M2pressed
    Then Begin
      SetCursorPos(xL,yL);   //stay at, or follow Pos2
    End
    Else Begin
      xR:=xR+dx; yR:=yR+dy; //update Pos1
      SetCursorPos(xR,yR);   //overrule native position
    End;
  End;
End;
//------------------------------------------
```

FIG 18(a)

```
//Pseudo-code improved position update routine
//(for bothHanded inputmode)

get deviceHandle, dx, dy, button info;
If a button of M1 is pressed then M1pressed:=TRUE;
If a button of M2 is pressed then M2pressed:=TRUE;
//------------------------------------------------
If (inputMode=BothHanded)
Then Begin
  If (deviceHandle=LHandle)
  Then Begin
    xL:=xL+dx; yL:=yL+dy;  //update Pos2
    If M1pressed
    Then Begin
      SetCursorPos(xR,yR);   //stay at, or follow Pos1
    End
    Else Begin
      SetCursorPos(xL,yL);   //overrule native position
    End;
  End
  Else If (deviceHandle=RHandle)
  Then Begin
    xR:=xR+dx; yR:=yR+dy;  //update Pos1
    If M2pressed
    Then Begin
      SetCursorPos(xL,yL);   //stay at, or follow Pos2
    End
    Else Begin
      SetCursorPos(xR,yR);   //overrule native position
    End;
  End;
End;
//------------------------------------------------
```

FIG 18(b)

```
//Pseudo-code improved position update routine
//(for Lefthanded, RightHanded, BothHanded input mode)

get deviceHandle, dx, dy, button info;
If a button of M1 is pressed then M1pressed:=TRUE;
If a button of M2 is pressed then M2pressed:=TRUE;
//-------------------------------------------
If (inputMode=LeftHanded)
Then Begin
  If (deviceHandle=LHandle)
  Then Begin
    xL:=xL+dx; yL:=yL+dy; //update Pos2
    SetCursorPos(xL,yL);  //overrule native position
  End
  Else If (deviceHandle=RHandle)
  Then Begin
    xR:=xR+dx; yR:=yR+dy; //update Pos1
    SetCursorPos(xL,yL);  //overrule native position
  End;
End
//-------------------------------------------
Else If (inputMode=RightHanded)
Then Begin
  If (deviceHandle=LHandle)
  Then Begin
    xL:=xL+dx; yL:=yL+dy; //update Pos2
    SetCursorPos(xR,yR);  //overrule native position
  End
  Else If (deviceHandle=RHandle)
  Then Begin
    xR:=xR+dx; yR:=yR+dy; //update Pos1
    SetCursorPos(xR,yR);  //overrule native position
  End;
End
//-------------------------------------------
Else If (inputMode=BothHanded)
Then Begin
  If (deviceHandle=LHandle)
  Then Begin
    If M1pressed
    Then SetCursorPos(xR,yR) //stay at, or follow Pos1
    Else Begin
      xL:=xL+dx; yL:=yL+dy; //update Pos2
      SetCursorPos(xL,yL);  //overrule native position
    End;
  End
  Else If (deviceHandle=RHandle)
  Then Begin
    If M2pressed
    Then SetCursorPos(xL,yL) //stay at, or follow Pos2
    Else Begin
      xR:=xR+dx; yR:=yR+dy; //update Pos1
      SetCursorPos(xR,yR);  //overrule native position
    End;
  End;
End;
//-------------------------------------------
```

FIG 18(c)

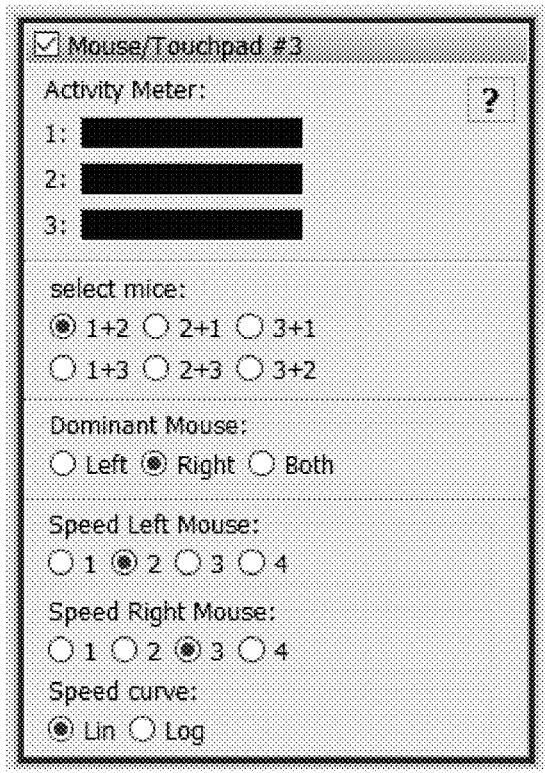

FIG 31(a)

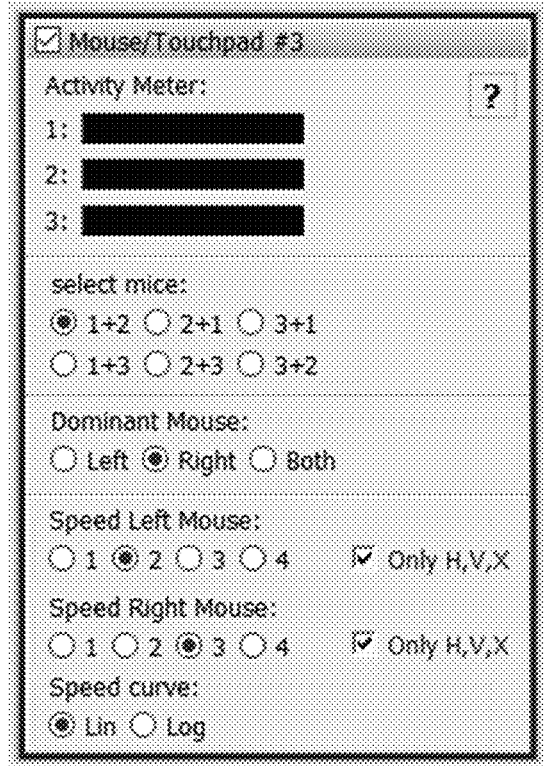

FIG 31(b)

```
//Pseudo-code, exemplary portion from "position update routine"

//----------------------------------------------------
If bMovOnlyHVX
Then Begin
  If (dx=0)or(dy=0)or(dx=dy)
  Then //do nothing, is already Hor/Vert/Diagonal
  Else Begin
    //make Horizontal/Vertical/Diagonal
    rico:=abs(dy)/abs(dx);
    If      (rico<0.5) Then dy:=0 //make horizontal
    Else If (rico>2.0) Then dx:=0 //make vertical
    Else Begin
      //make diagonal, take larger of dX,dY
      If abs(dx)>abs(dy)
      Then dy:=sign(dy)*abs(dx)
      Else dx:=sign(dx)*abs(dy);
    End;
  End;
End;
//----------------------------------------------------
```

FIG 31(c)

```
//Pseudo-code, exemplary "displacement-transformation"
// as may be used in the "position update routine"

//--------------------------------------------
CONST
   MAXTAN=0.5;

If bTransformSmallAngleToHorizontal
Then Begin
   If (dx=0)or(dy=0)
   Then Begin
      //do not transform slow movements/small displacements
   End
   Else Begin
      If abs(dy/dx) < MAXTAN Then dy:=0;
   End;
End;
//--------------------------------------------
```

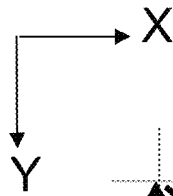
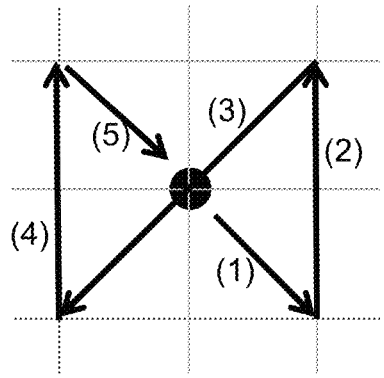
mov(dx=+1,dy=+1)+
mov(dx=0,dy=-2)+
mov(dx=-2,dy=+2)+
mov(dx=0,dy=-2)+
mov(dx=1,dy=+1)
FIG 47(a)
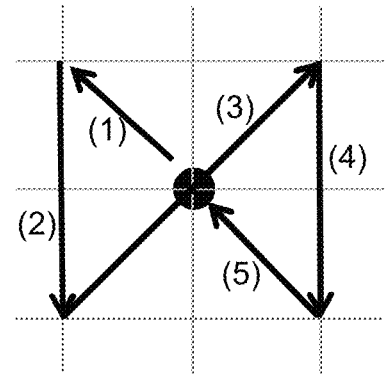
mov(dx=-1,dy=-1)+
mov(dx=0,dy=+2)+
mov(dx=+2,dy=-2)+
mov(dx=0,dy=+2)+
mov(dx=-1,dy=-1)
FIG 47(b)
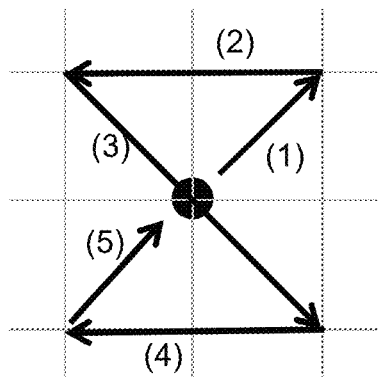
mov(dx=+1,dy=-1)+
mov(dx=-2,dy=0)+
mov(dx=+2,dy=+2)+
mov(dx=-2,dy=0)+
mov(dx=+1,dy=-1)
FIG 47(c)
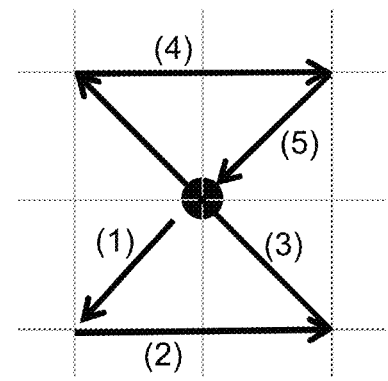
mov(dx=-1,dy=+1)+
mov(dx=+2,dy=0)+
mov(dx=-2,dy=-2)+
mov(dx=+2,dy=0)+
mov(dx=-1,dy=+1)
FIG 47(d)

mov(dx=+1,dy=+1)+
mov(dx=0,dy=-2)+
mov(dx=-2,dy=0)+
mov(dx=0,dy=+2)+
mov(dx=+1,dy=-1)

mov(dx=-1,dy=+1)+
mov(dx=0,dy=-2)+
mov(dx=+2,dy=0)+
mov(dx=0,dy=+2)+
mov(dx=-1,dy=-1)

mov(dx=+1,dy=+1)+
mov(dx=0,dy=-2)+
mov(dx=-2,dy=0)+
mov(dx=-1,dy=+1)+
mov(dx=+1,dy=+1)+
mov(dx=+1,dy=-1)

mov(dx=-1,dy=+1)+
mov(dx=-1,dy=-1)+
mov(dx=+1,dy=-1)+
mov(dx=+2,dy=0)+
mov(dx=0,dy=+2)+
mov(dx=-1,dy=-1)

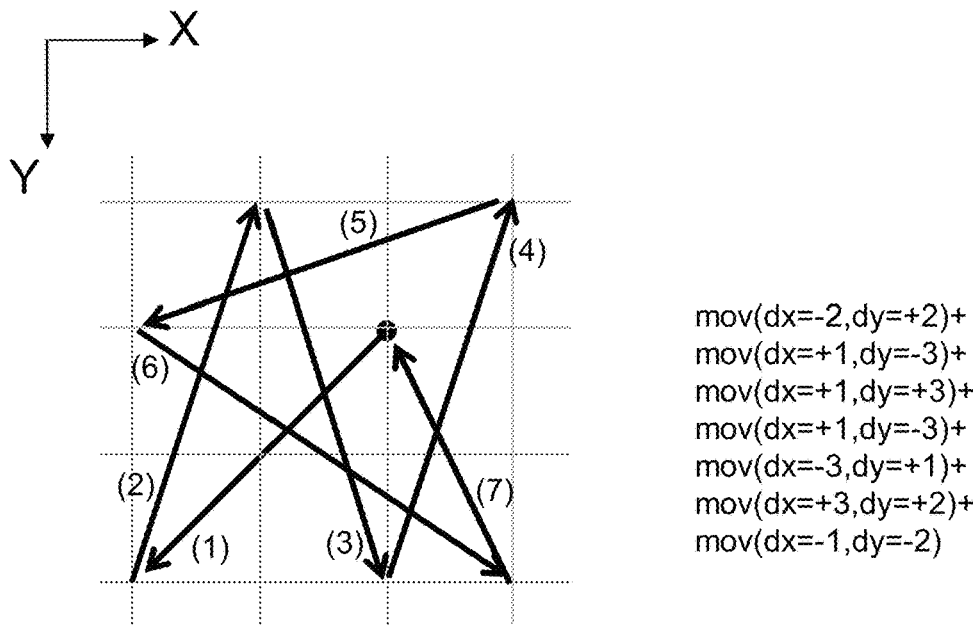

mov(dx=-2,dy=+2)+
mov(dx=+1,dy=-3)+
mov(dx=+1,dy=+3)+
mov(dx=+1,dy=-3)+
mov(dx=-3,dy=+1)+
mov(dx=+3,dy=+2)+
mov(dx=-1,dy=-2)

FIG 47(i)

```
//Pseudo-code for detection "scroll-sequence"+
// transmit scroll command from the overlay application:
//---------------------------------------------
If (inputMode=BothHanded)
Then Begin
  ...
  If (deviceHandle=LHandle)AND(scroll_up_seq_detectedL)
  Then Begin
    //set cursor at left position,
    SetCursorPos(xL,yL);
    //and send "scroll-command" to O/S
    Mouse_Event(MOUSEEVENTF_WHEEL, 0, 0, dwheel, 0);
  End
  Else If (deviceHandle=RHandle)AND(scroll_up_seq_detectedR)
  Then Begin
    //set cursor at right position,
    SetCursorPos(xR,yR);
    //and send "scroll-command" to O/S
    Mouse_Event(MOUSEEVENTF_WHEEL, 0, 0, dwheel, 0);
  End;
  ...
End;
//---------------------------------------------
```

FIG 48

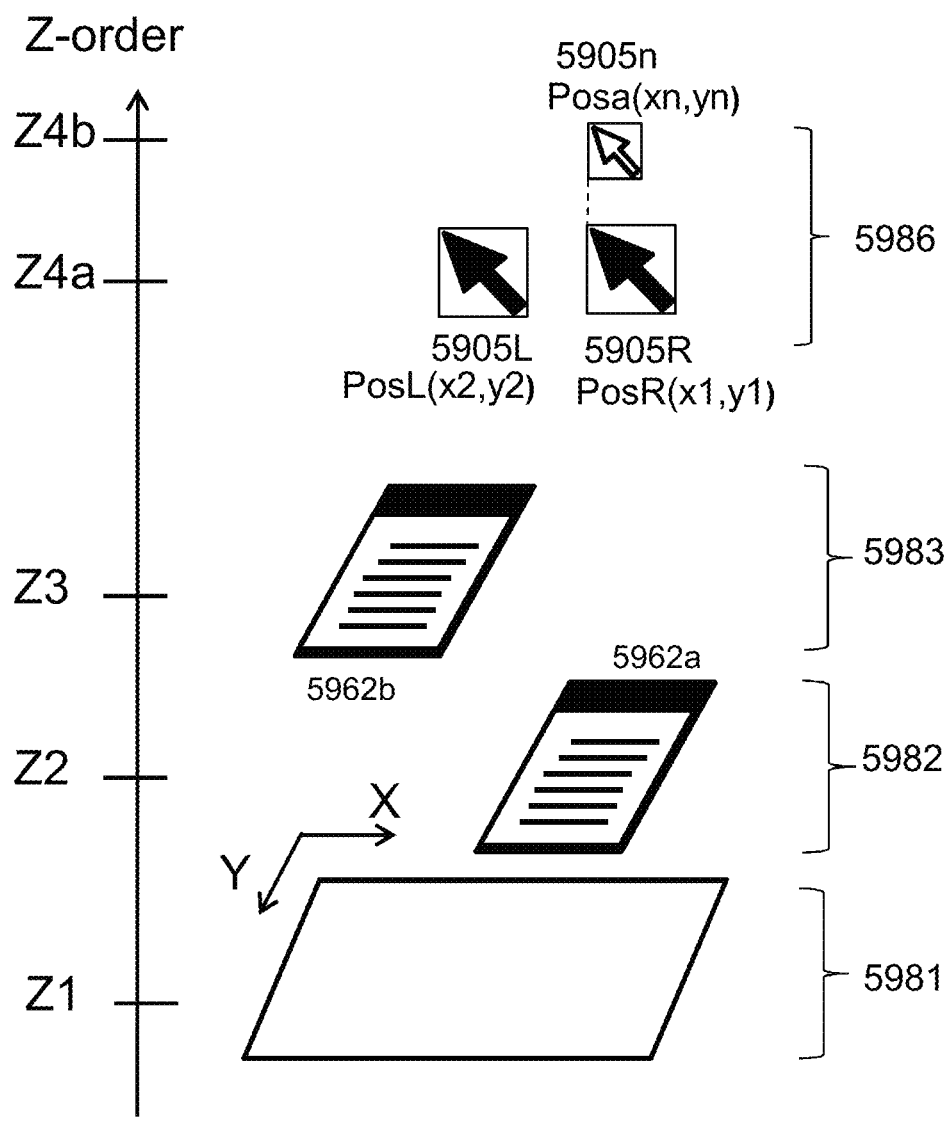
FIG 59(c)
 
5995a   5995p
FIG 59(d)
 
5995p   5995a
FIG 59(e)

METHOD AND DEVICE AND SYSTEM WITH DUAL MOUSE SUPPORT

FIELD OF THE INVENTION

The present invention relates in general to the field of computers with a graphical user interface and multiple pointer devices. More specifically, the present invention relates to a computer application (e.g. an overlay application), a mouse filter driver, a pointer device (e.g. a mouse), a hub, a computer device, and a computer system for dual mouse support, and to an operating system with two mouse cursors.

BACKGROUND OF THE INVENTION

FIG. 1 shows a schematic block diagram of a classical computer system 100 comprising a computer device 101 (e.g. a desktop computer) having a keyboard input connected to a keyboard device 102, and having a mouse input connected to a mouse device 103, and having a video output connected to a display or monitor or screen 104. The computer device 101 of FIG. 1 comprises one or more Central Processing Units (CPU) running an operating system O/S with a Graphical User Interface GUI, such as for example Windows 7 or Windows 10 from Microsoft Corporation, or macOS 10.12 Sierra or macOS 10.13 High Sierra from Apple Inc., or Linux. In the example of FIG. 1, the computer 101 is also running two applications: a PDF document viewer 107a (e-g- Acrobat Reader) shown on the left side of the screen 104, and a text editor 107b (e-g- Microsoft Word) shown on the right side of the screen 104.

Such a system 100 can for example be used by a translator or a proofreader for simultaneously viewing a source document, for example a granted European patent document having English, French and German claims, and a translation of the claims into another language (e.g. Dutch or Spanish or Italian). Although the translation itself would typically be performed using a CAT tool (Computer Aided Translation), the step of final proofreading is preferably performed by comparing the original PDF document and the final text document, or if the final document is also converted into a PDF document, by comparing the two PDF documents.

When proofreading (or verifying and/or correcting the translation), the translator or proofreader needs to constantly shift his focus back and forth between the visual representations of the two documents 107a, 107b, and needs to constantly re-acquire the current context in each of these documents, which is time consuming and mentally demanding. This cognitive burden can be lowered for example by physically pointing to the words of the source text using a finger of the non-dominant hand, and by pointing to corresponding words of the target text using the mouse cursor 105, which can be moved on the screen by physically moving the mouse device 103 held in the dominant hand, as shown in FIG. 1 for a right-handed person. A left-handed person would typically move the mouse with his left hand, and point to the screen with his right hand.

But this process is not ideal, inter alia because the arm cannot always rest on the table, especially with larger screen sizes, or with screens mounted above the table. Furthermore, when a translation error is found, and a correction needs to be made, both hands are typically brought to the keyboard 102 for typing, so that the context is lost again and needs to be re-acquired after the correction is made. It would be advantageous if the computer system 100 would provide a mechanism that allows a user to easily switch focus between two reading locations on the screen 104, which locations can easily and intuitively be moved.

FIG. 2 illustrates another problem. When reading a document, a user typically uses the mouse cursor to point to the words he is currently reading. When the person wants to highlight or underline some words or add comments, the mouse cursor typically needs to be moved to the top of the screen, where the user needs to click in order to select a highlighting colour, or a typewriter tool, or a comment box, etc., but by doing so, the context of where he was reading is lost, and the context needs to be re-acquired, which is time consuming. It would be advantageous if the computer system 200 would provide a mechanism that allows a user to easily switch focus between a reading location and a working location, which locations can easily and intuitively be moved.

FIG. 3 illustrates another problem. When writing or reviewing certain texts (for example claims of a patent application), it may be desirable to compare two different portions of a single text document, for example a first portion containing product claims and a second portion containing method claims. In practice, the user will sometimes wants to change both parts of the text portions, which is relatively easy for the lower text portion of the example shown in FIG. 3, because that is where the mouse cursor 305 is situated, but is not easy for the upper text portion, where the finger is situated. The user may swap the position of the finger and the mouse cursor, but that is not easy in practice without re-acquiring the context at both locations, which is time consuming. It would be advantageous if the computer system 300 would provide a mechanism that allows a user to easily switch between two different locations on screen, for reading and/or for editing, which locations can easily and intuitively be moved.

FIG. 4 illustrates another problem. When transcribing (converting) an audio fragment (i.e. converting spoken text into a written document), a user may use an audio player application (e.g. VLC Media Player) to play an audio fragment using a start/stop button, and a text editor application for typing the corresponding text information. Using known computers, the user would typically move the mouse cursor to the audio player, click on the audio player window 417 to activate the audio player application, click on the start button, allow the audio player to play for a few seconds, click on the start/pause button to pause the audio player, move the mouse cursor to the text editor, click the text editor window to activate the text editor application, optionally click again to reposition the mouse cursor in the text document, type the corresponding text using the keyboard, move the mouse cursor 405 back to the audio player, and repeat the same steps again and again until the audio fragment is completely transcribed. Moving the mouse cursor 405 back and forth between the start/stop button of the audio player 417 and the current position in the text editor 407 is time consuming, especially since the mouse cursor needs to be positioned accurately in order not to click on the wrong button, for example a rewind button, because an accidental click on this button would cost even more time, because the user would have to relocate the audio fragment. It would be advantageous if the computer system 400 would provide a mechanism that allows the user to work at two different screen locations using both hands, especially if one of these locations has a substantially fixed position on the screen.

SUMMARY OF THE INVENTION

It is an object of embodiments of the present invention to provide a computer-implemented method, a computer program product, a mouse filter driver, a mouse, a hub, a computer device and a computer system for providing dual mouse support, as well as an operating system with two mouse cursors.

It is an object of embodiments of the present invention to provide a mechanism to enhance or extend the functionality of a computer device running an operating system (O/S) with a graphical user interface (GUI) so as to support two pointer devices instead of only one.

It is a particular object of such embodiments that the mechanism functions correctly when the first and second mouse devices are operated separately (moving, scrolling, clicking).

It is a particular object of such embodiments that the mechanism functions correctly when both mouse devices are moved simultaneously.

It is a particular object of such embodiments that the mechanism functions correctly when one mouse device is scrolled and the other mouse device is simultaneously moved.

It is a particular object of such embodiments that the mechanism functions correctly when the first and second mouse device are scrolled (substantially) simultaneously.

It is a particular object of such embodiments that the mechanism functions correctly when one mouse device is clicked and the other mouse device is simultaneously moved.

It is a particular object of such embodiments that the mechanism functions correctly when clicking or dragging is done with one mouse device and the other mouse device is simultaneously scrolled or clicked.

It is an object of embodiments of the present invention to provide a computer-implemented method for enhancing or extending the functionality of an O/S and a GUI, for example an existing O/S and GUI that provides a single native mouse cursor or mouse pointer and maintains a single native cursor position, so as to maintain two pointer positions or screen positions, and optionally to display two visible objects at these two pointer positions, which objects are individually movable by means of two pointer devices.

It is an object of embodiments of the present invention to provide a computer-implemented method for enhancing or extending the functionality of an O/S and GUI, for example an existing O/S and GUI that provides a single native mouse cursor or mouse pointer and maintains a single native cursor position, so as to show at least two visible objects and to maintain at least two object positions, which objects are individually movable by means of at least two pointer devices.

It is an object of particular embodiments of the present invention to provide such a computer-implemented method, wherein one of the visible objects is the native mouse cursor or mouse pointer provided by the O/S and GUI.

It is an object of particular embodiments of the present invention to provide such a computer-implemented method which responds differently to movements of the at least two pointer devices.

It is an object of particular embodiments of the present invention to provide such a computer-implemented method which responds differently to movements of the at least two pointer devices, and/or to button presses and button releases, and button clicks of one or both of the pointer devices, and/or to scrollwheel movements of one or both pointer devices.

It is an object of particular embodiments of the present invention to provide such a computer-implemented method for enhancing the functionality of the Windows operating system from Microsoft Corporation, headquartered in Redmond, Wash., e.g. Windows 7 or Windows 10 or later versions of Windows.

It is an object of particular embodiments of the present invention to provide such a computer-implemented method for enhancing the functionality of the macOS from Apple Inc. headquartered in Cupertino, Calif., US, e.g. macOS Sierra or macOS High Sierra or later.

It is an object of particular embodiments of the present invention to provide such a computer-implemented method for enhancing the functionality of other Operating Systems, such as e.g. Linux.

It is an object of particular embodiments of the present invention to provide such a computer-implemented method, wherein the dual mouse functionality is provided by a graphical overlay application, and preferably without the overlay application running in elevated mode.

It is also an object of embodiments of the present invention to provide a special pointer device (e.g. a special mouse), which allows a user to scroll using two such pointer devices simultaneously, or to move one such pointer device and to simultaneously scroll the other, or to move one such pointer device and simultaneously click the other, e.g. on a computer running a special overlay application.

It is also an object of embodiments of the present invention to provide a special hub, which allows a user to simultaneously scroll using two classical pointer devices (e.g. two HID-compatible mice), or to move one such pointer device and simultaneously scroll the other, or to move one such pointer device and simultaneously click the other, e.g. on a computer running a special overlay application.

It is also an object of embodiments of the present invention to provide a computer program product in the form of a mouse-filter driver, which allows a user to simultaneously scroll using two classical pointer devices (e.g. two HID-compatible mice), or to move one such pointer device and simultaneously scroll the other, or to move one such pointer device and simultaneously click with the other, e.g. on a computer miming a special overlay application.

It is also an object of embodiments of the present invention to provide an operating system that (inherently) provides two visible mouse cursors, related to two pointer devices, and wherein the two pointer devices may be moved and scrolled simultaneously, and wherein one pointer device may be scrolled while the other is moved, and wherein either pointer device can be clicked or dragged, but not simultaneously.

It is also an object of embodiments of the present invention to provide a computer system which comprises a computer device having an overlay application, and at least one of the above mentioned special hub, or the special mouse filter driver, or two special pointer devices, which allows a user to simultaneously scroll two pointer devices, or to move one such pointer device and simultaneously scroll the other, or to move one such pointer device and simultaneously click the other.

It is also an object of embodiments of the present invention to provide a computer system further comprising at least one display device, and a keyboard device.

These and other objects are accomplished by a computer-implemented method for providing an overlay application, and a computer program product, and a mouse filter driver, and a computer device, and a computer system having the characteristics of the independent claims.

According to a first aspect, the present invention provides a computer-implemented method for supporting two pointer devices in a computer device to which a first pointer device and a second pointer device are connected, and which executes an operating system with a graphical user interface, wherein the operating system provides a native mouse cursor, the method comprising the steps of: b) allowing or configuring the operating system with the graphical user interface to provide the native mouse cursor as a visible object; d) providing a message handler for processing raw input messages, and configuring the operating system to transmit raw input messages originating from the first and the second second pointer device to this message handler; d) maintaining and/or modifying a first position in accordance with movements of the first pointer device, and adjusting a second position in accordance with movements of the second pointer device; f) adjusting a position of the native mouse cursor in accordance with movements of the first or the second pointer device, whichever was moved or operated most recently; g) detecting whether the raw input messages constitute or comprise a movement sequence according to a predefined format, and upon detection of such a movement sequence: determining which pointer device caused this movement sequence; and moving the native mouse cursor to the maintained or adjusted position associated with the pointer device which caused the movement sequence.

It is an advantage of this method that it allows the application that carries out this method to work with two pointer devices, even on a computer with an O/S that actually supports only one native mouse cursor.

This method can be carried out, for example, by an overlay application, but also by a user application that is not an overlay application.

It is an advantage to use (fake) movement messages, because this does not require changes to the existing operating system, and because, even if they are sent to the wrong underlying application, they do not cause any significant negative effects for most applications (as opposed to unintentional clicking or unintentional scrolling).

It is noted that it is not strictly necessary that the application itself shows visual objects, but it is sufficient that the application is capable of causing the native mouse cursor to jump between two positions (by analogy with FIG. 10, but without a black arrow).

It is a big advantage that the native mouse cursor is shown and, for example, not a fixed bitmap, because the mouse cursor can assume different shapes, depending on the position, e.g. depending on the underlying application.

The expression "movement sequence according to a predefined format" (or according to a predefined structure) may refer to a predefined movement sequence with fixed displacement values, or to a parameterizable movement sequence (e.g. with a number of fixed movements, with at least one variable movement, for passing on a parameter), or a movement sequence containing a predefined subsequence. Movement sequences with predefined values may, for example, be used for a left-button-press message, right-button-press message, left-button-release message, right-button-release message, scroll-up message and a scroll-down message. Parameterizable movement sequences can be used, for example, to pass on a movement message, or a scroll-up message or a scroll-down message.

The group or collection of "predetermined movement sequences" may include, for example, one or more of the following movement sequences: a "left-button-pressed sequence" associated with a left-button-pressed message and a left-button-pressed command; a "left-button-released sequence" associated with a left-button-released message and a left-button-released command; a "right-button-pressed sequence" associated with a right-button-pressed message and a right-button-pressed command; a "right-button-released sequence" associated with a right-button-released message and a right-button-released command, a "scroll-up sequence" associated with a scroll-up message and a scroll-up command; and a "scroll-down sequence" associated with a scroll-down message and a scroll-down command.

In an embodiment, the sequences with the double displacement values are also checked during the detection, thus, for example, eight sequences or twelve sequences.

In an embodiment, the method further comprises the step of: a) providing a graphical overlay window.

This embodiment is aimed at the method performed by an overlay application.

It is an advantage of this method that it extends the functionality of a computer with an O/S that actually has only one native mouse cursor to a computer with two pointing devices (e.g. two mice), which the user can move and/or operate individually.

It is a big advantage that this can work with existing desktop applications (without any modification), and with existing mouse device drivers (without any modification).

In an embodiment, in step a) a graphical overlay window is provided as a substantially screen-filling window mainly consisting of fully transparent pixels.

In an embodiment, the method further comprises the step of: c) configuring the graphical overlay window in click-through mode.

In an embodiment, in step a), a graphical overlay window is provided comprising at least one visible object; and step f) further comprising the adjustment of a position of said visible object at the other position from the first and second position than the position taken by the native mouse cursor.

In this embodiment, the user can see at least two movable objects, e.g. the native mouse cursor, and a bitmap with a black arrow (e.g. as shown in FIG. 8 or FIG. 9 or FIG. 10).

In an embodiment, in step a) a graphical overlay window is provided comprising at least a first visible object and a second visible object; and step f) further comprises adjusting a position of the first visible object based on the first position, and adjusting a position of the second visible object based on the second position.

In this embodiment the user can, for example, see three movable objects: the native mouse cursor, and two bitmaps having a black arrow (e.g. as shown in FIG. 8 or FIG. 9 or FIG. 10). This has as an advantage that the two bitmaps are always visible, no matter where the native mouse cursor is located.

In an embodiment, each of the movement sequences comprises a predetermined series of two to twenty movements, or a predetermined series of three to ten movements.

It is an advantage of a relatively long series that the risk of such a series being caused by the user coincidentally when moving the mouse, is virtually impossible, especially when the series comprises one or more back and forth movements or criss-cross movements (e.g. as shown in FIG. 47).

In an embodiment, each of the predetermined movement sequences comprises a predetermined sequence of at least two or at least three movements different from the null displacement.

In an embodiment, each of the parameterizable movement sequences comprises a series of two to twenty movements, or a series of three to ten movements. In a preferred embodiment, at least two or at least three or at least four of these movements are predetermined movements.

In an embodiment, a cumulative displacement of the (e.g. predetermined or parameterizable) movement sequences is a null displacement.

It is an advantage of such (a) series that scrolling or clicking of a pointer device by the user does not cause a shift or drift of the first or second maintained position (assuming that the physical pointer device is not moved). This is particularly important for applications as shown for example in FIG. 4(a), where one pointer device is held stationary.

Preferably, a cumulative displacement of the parameterizable movement sequences (if used) is also a null displacement.

In an embodiment, each of the predetermined movement sequences comprises a null displacement as last movement.

This offers the advantage that the overlay application can work more efficiently because it does not have to check whether one of the movement sequences occurred for every incoming movement message.

Preferably, the last movement of the parameterizable movement sequences (if used) is also a null displacement.

In an embodiment, step e) comprises adjusting the first position and the second position based on the raw input messages.

This is not strictly necessary, however, and the position can for example also be determined by retrieving the native cursor position from the operating system.

In an embodiment, step e) comprises receiving an input message, and if the received input message is related to the first pointer device, updating the first position; and if the received input message is related to the second pointer device, updating the second position; and step g) comprises: detecting whether a movement sequence with the predefined structure (e.g. a predefined movement sequence) occurs in the partial stream of received input messages from each pointer device individually.

In an embodiment, step e) comprises: receiving an input message, and if the input message is a movement message, obtaining displacement values (dx, dy) related to the movement message.

In an embodiment, the graphical overlay window is configured as a substantially screen-filling window mainly consisting (e.g. for at least 90%) of fully transparent pixels.

In this embodiment, the overlay window does not explicitly need to be configured in click-through mode.

In an embodiment, the graphical overlay window is configured as a semi-transparent window that has an alpha-blending value a in the range from 1% to 99%, or in other words, with an alpha transparency value (T) in the range from 1% to 99%, or from 1% to 90%, or from 1% to 60%, or from 1% to 50%. The lower the alpha transparency value (T), typically the more visible or more distinguishable the first and second visible object (e.g. an arrow or a hand) with respect to the underlying applications.

In an embodiment, the first and second pointer device are HID-compatible pointer devices.

In an embodiment, the operating system is Windows 7 or Windows 10 or a later Windows version from Microsoft Corporation.

In an embodiment, the operating system is mac OS Sierra or mac OS High Sierra or a later mac OS version from Apple Inc.

In an embodiment, the operating system is Linux.

According to a second aspect, the present invention also provides a computer program product containing executable instructions which perform a method according to the first aspect, when being executed on a computer device to which a first and a second pointer device is connected.

According to a third aspect, the present invention also provides a computer-implemented method for filtering messages originating from at least two pointer devices, the method comprising the following steps: a) receiving a message originating from one of the pointer devices; b) checking whether the received message is a movement message, and if so, sending the movement message [e.g. to the operating system or to a computer port]; c) checking whether the received message is a button-pressed message, and if so, sending a first (e.g. predefined) movement sequence; d) checking whether the received message is a button-released message, and if so, sending a second (e.g. predetermined) movement sequence.

This method can, for example, be performed in a mouse filter driver in the computer device (see FIG. 45 and FIG. 46), or can be performed, for example, in a hub (see FIG. 54). In the case of a mouse filter driver, the individual movement messages or sequences are transmitted to the operating system, e.g. by the mouse filter driver. In the case of a hub, the individual movement messages or movement sequences are, for example, transmitted from the hub to a port of the computer device, e.g. an interface or a USB port.

In an embodiment, the method further comprises the steps of: e) checking whether the received message is a scroll-up message, and if so, sending a third (e.g. predefined or parameterizable) movement sequence; and f) checking whether the received message is a scroll-down message, and if so, sending a fourth (e.g. predefined or parameterizable) movement sequence.

In an embodiment, step a) further comprises determining from which pointer device the message originates, and determining a time of receipt of that message; and the method further comprises a step g) of checking whether only one pointer device was used during at least a pre-determined period ($\Delta T$), and if so, sending the message without conversion to a movement sequence.

It is noted that step b) and step g) can also be interchanged.

According to a fourth aspect, the present invention also provides a computer program product containing executable instructions which perform a method according to the third aspect, when being executed by a computer device to which a first and a second pointer device is connected, and which comprises a graphical user interface which provides a native mouse cursor.

This computer program product can for example be a "mouse filter driver".

According to a fifth aspect, the present invention also provides a pointer device comprising: a movement detection mechanism for detecting a two-dimensional movement; at least one button which is pressable and releasable by a user; a button detection mechanism for detecting if said at least one button is being pressed or being released; a controller connected to said movement detection mechanism, and adapted for sending a movement message when a movement is detected; wherein the controller is further adapted for sending a first (e.g. predefined) movement sequence, when it is detected that at least one button is pressed; and for sending a second (e.g. predefined) movement sequence when it is detected that at least one button is released.

This embodiment is directed to a "special mouse", as shown in FIG. 53.

In an embodiment, the pointer device further comprises at least one scrollwheel which is rotatable by a user; and a scrollwheel detection mechanism to detect if the at least one scrollwheel has rotated; and the controller being connected to the scrollwheel detection mechanism; wherein the controller is further configured for sending a third (e.g. predetermined or parameterizable) movement sequence when it is detected that the scrollwheel was rotated upwards;—and wherein the controller is further configured for sending a fourth (e.g. predetermined or parameterizable) movement sequence when it is detected that the scrollwheel was rotated downwards.

In an embodiment, each of the (e.g. predetermined) movement sequences consists of a predetermined series of two to twenty movements, or of a predetermined series of three to ten movements.

In an embodiment, each of the (e.g. parameterizable) movement sequences comprises a series of two to twenty movements, or a series of three to ten movements. In a preferred embodiment, at least two or at least three or at least four of these movements are predetermined movements.

Preferably the movements of the (e.g. predetermined) movement sequences are movements where the X-movement and the Y-movement are values in the range from −3 to +3, or are values in the range from −5 to +5, or are values in the range from −10 to +10.

In an embodiment, a cumulative displacement of the (e.g. predetermined) movement sequences is a null displacement.

Preferably, a cumulative displacement of the parameterizable movement sequences (if used) is also a null displacement.

In an embodiment, each of the (e.g. predetermined) movement sequences comprises a null movement (dx=0 and dy=0) as last movement.

Preferably, the last movement of the (e.g. parameterizable) movement sequences (if used) is also a null displacement.

According to a sixth aspect, the present invention also provides a hub comprising: a first interface to communicate with a first pointer device, a second interface to communicate with a second pointer device, and a third interface to communicate with a computer device; and a controller connected to the first interface for receiving first messages from the first pointer device, and connected to the second interface for receiving second messages from the second pointer device, and connected to the third interface for sending messages to the computer device; wherein the controller is adapted for performing a method according to the third aspect.

This hub thus performs a method as shown in FIG. 51 or FIG. 52. According to the method of FIG. 51, all button-pressed/released messages and all scroll up/down messages are converted to a corresponding (e.g. predefined) movement sequence. In the case of FIG. 52a and FIG. 52b, button messages and scroll messages are only converted to a movement sequence when two mice are used.

In an embodiment, each of the predetermined movement sequences consists of a predetermined series of two to twenty movements, or of a predetermined series of three to ten movements.

In an embodiment, each of the parameterizable movement sequences comprises a series of two to twenty movements, or a series of three to ten movements. In a preferred embodiment, at least two or at least three or at least four of these movements are predetermined movements.

Preferably the movements of the (e.g. predetermined) movement sequences are movements where the X-movement and the Y-movement are values in the range from −3 to +3, or are values in the range from −5 to +5, or are values in the range from −10 to +10.

In an embodiment, a cumulative displacement of the (e.g. predetermined) movement sequences is a null displacement.

Preferably, a cumulative displacement of the (e.g. parameterizable) movement sequences (if used) is also a null displacement.

In an embodiment, each of the predetermined movement sequences comprises a null movement (dx=0 and dy=0) as last movement.

Preferably, the last movement of the (e.g. parameterizable) movement sequences (if used) is also a null displacement.

In an embodiment, the predetermined period ($\Delta T$) is a period from 20 ms to 1000 ms, preferably from 20 to 500 ms, or from 25 to 400 ms, or from 50 to 250 ms, e.g. approximately equal to 100 ms, or approximately equal to 150 ms, or approximately equal to 200 ms.

According to a seventh aspect, the present invention also provides a computer device comprising: an operating system with a graphical user interface providing a (e.g. only one) native mouse cursor; and a computer program product according to the second aspect.

In an embodiment, the computer device further comprises a computer program product according to the fourth aspect.

According to an eighth aspect, the present invention also provides a computer system, comprising: a computer device according to the seventh aspect, and a first and a second pointer device operatively connected to the computer device.

In an embodiment, the first and the second pointer device are pointer devices according to the fifth aspect.

In an embodiment, the computer device of this computer system comprises at least a first USB port for direct connection with the first pointer device, and a second USB port for direct connection with the second pointer device.

In an embodiment, the computer system further comprises a hub according to the sixth aspect, operatively connected between the computer device and the first and second pointer device.

Preferably, the computer system further comprises one or two display devices.

Preferably, the computer system further comprises a keyboard.

According to a ninth aspect, the present invention also provides a computer-implemented method for execution in a computer device connected to at least a first and a second pointer device, the method comprising the steps of: b) providing a first and a second visible mouse cursor, and maintaining a first and a second position (e.g. pointer position); repeatedly performing the following steps: c) receiving an input message originating from the first and/or the second pointer device; d) adjusting the first and the second position (e.g. pointer position) in accordance with movements of the first and the second pointer device; e) adjusting the position of the first and the second second pointer device based on which pointer device was moved or operated last; f) further processing of the input message, e.g. by sending or not sending a corresponding command or event to a visual component or to an application window located under the first or second mouse cursor.

This method can, for example, be performed in an operating system which displays two mouse cursors (e.g. an active mouse cursor and a passive mouse cursor), for supporting two pointer devices.

In an embodiment, step (e) comprises at least one of the following modes: e1) if the first pointer device was last moved or operated, positioning the first mouse cursor at the first pointing position and positioning the second mouse cursor at the second pointing position; and if the second pointer device was last moved or operated, positioning the first mouse cursor at the second pointing position and positioning the second mouse cursor at the first pointing position; e2) positioning the first mouse cursor at the first pointing position, and positioning the second mouse cursor at the second pointing position; e3) positioning the first mouse cursor at the second pointing position; and positioning the second mouse cursor at the first pointing position.

The modes of step e1), e2) and e3) are referred to as the "both handed mode", the "right handed mode" and the "left handed mode" respectively. The operating system may provide the possibility (e.g. via the taskbar) to allow a user to change quickly and easily between these modes, e.g. in a manner as shown in FIG. 31(a), by allowing the user to select the dominant hand.

In an embodiment, step f) comprises the following: g) checking whether the received message is a button-pressed message, and if so, sending a button-pressed command or a button-pressed event from the position of the first mouse cursor to an underlying component or application; h) checking whether the received message is a button-released message, and if so, sending a button-released command or a button-released event from the position of the first mouse cursor to an underlying component or application; i) checking whether the received message is a scroll-up message, and if so, sending a scroll-up command or a scroll-up event from the position of the first mouse cursor to an underlying component or application; j) checking whether the received message is a scroll-down message, and if so, sending a scroll-down command or a scroll-down event from the position of the first mouse cursor to an underlying component or application.

In an embodiment, step g) en h) further comprise: adjusting one or more state variables as an indication of whether one or more buttons of the first and/or the second pointer device are pressed; and where first in step f) it is determined whether a button of the first or the second pointer device is pressed, based on these state variables, and it is determined whether the message originated from the pointer device of which the button is pressed; and thereafer, if an outcome of this test is true, the message is further processed according to steps g) to j); and if an outcome of this test is false, the message is discarded (in the sense that no command or event is sent to an underlying component or underlying application), and optionally an error message is shown.

In an embodiment, step g) en h) further comprise: adjusting one or more state variables as an indication of whether one or more buttons of the first and/or the second pointer device are pressed; and where first in step f) it is determined whether a button of the first or the second pointer device is pressed, based on these state variables, and it is determined whether the received message is a button-released message, and it is determined whether the message originated from the pointer device of which the button is pressed; and thereafer, if an outcome of this test is true, the message is further processed according to steps g) to j); and if an outcome of this test is false, the message is discarded (in the sense that no command or event is sent to an underlying component or underlying application), and optionally an error message is shown.

In an embodiment, step d) further comprises determining a first (e.g. visual) component and/or a first application window located at the first pointer position, and determining a second (e.g. visual) component and/or a second application window located at the second pointer position;—and where in step f), when processing the input message, the first and the second component and/or the first and the second application window are taken into account.

In a variant it is determined which component or application is situated at the cursor positions rather than the pointer positions.

In an embodiment, in step f), in case the second pointer position is located above the same component and/or above the same application window as the first pointer position (or stated differently: if the first pointer position and the second pointer position are located above the same component and/or above the same application window), an error message is displayed in at least one of the following cases: * upon receipt of a button-press message originating from the first pointer device if a button of the second pointer device was already pressed; * upon receipt of a button-released message originating from the second pointer device if a button of the first pointer device was already pressed; * upon receipt of a scroll-up message or a scroll-down message originating from the first pointer device if a button of the second pointer device was already pressed; * upon receipt of a scroll-up message or a scroll-down message from the second pointer device if a button of the first pointer device was already pressed.

In an embodiment, in step f), if the first and the second mouse cursor are located above different (e.g. visual) components or application windows, * upon receipt of a scroll-up message originating from the first pointer device, a scroll-up command or a scroll-up event is sent to the underlying component or application; even if a button of the second pointer device is already pressed; and * upon receipt of a scroll-down message originating from the second pointer device, a scroll-down command or a scroll-down event is sent to the underlying component or application; even if a button of the first pointer device is already pressed.

According to a 10th aspect, the present invention also provides a computer program product containing executable instructions which perform a method according to the nineth aspect, when being executed by at least one processor of a computer device to which a first and a second pointer device is connected, e.g. directly or via a hub.

The computer program product may e.g. be stored on a local storage medium (e.g. a CD-ROM, or a DVD-ROM, or a flash drive or a hard disk or a USB-stick), or may be stored and downloaded via a network.

According to an 11th aspect, the present invention also provides a computer device comprising: a computer program product according to the 10th aspect.

According to a 12th aspect, the present invention also provides a computer device, comprising: at least one processor performing a method according to the 9th aspect.

According to a 13th aspect, the present invention also provides a computer system, comprising: a computer device according to the 11th or 12th aspect, and a first and a second pointer device operatively connected to the computer device.

According to a 14th aspect, the present invention also provides a computer system according to 13th aspect, where the first and the second pointer device are HID-compatible mouse devices.

Particular and preferred aspects of the present invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 4(a) shows how an audio player can be started to play an audio fragment. FIG. 4(b) shows how the audio player is temporarily stopped, and text is being typed in a text document.

FIGS. 5(a) to 5(h) show a computer system according to an embodiment of the present invention, where a computer device is connected to a first and to a second pointer device, and is running an O/S and GUI providing a native mouse pointer/cursor (e-g- a white arrow), and is running an overlay application according to an embodiment of the present invention. The overlay application maintains a first pointer position in accordance with movements of the first pointer device (e.g. right mouse device), and maintains a second pointer position in accordance with movements of the second pointer device (e.g. left mouse device), and adjusts, e.g. overrides the position of the native mouse pointer/cursor in accordance with movements of the first pointer device (e.g. right mouse device). In addition, the overlay application provides a second visible object (e-g- a line or rectangle) which moves in accordance with movements of the second pointer device. (e.g. left mouse device). FIG. 5(a) shows movements of the first visible object in accordance with movements of the first pointer device. (e.g. right mouse device). FIG. 5(b) shows movements of the second visible object in accordance with movements of the second pointer device (e.g. left mouse device). FIG. 5(c) is a schematic representation of a so called "Z-order" of windows or image planes and a "cursor plane" as can be used in the computer system of FIG. 5(a). FIG. 5(d) is a high-level flowchart illustrating a computer implemented method according to an embodiment of the present invention, as can be used in the computer system of FIG. 5(a). FIG. 5(e) is a more detailed flowchart illustrating a computer implemented method according to an embodiment of the present invention, as can be used in the computer system of FIG. 5(a). FIG. 5(f) shows a simplified high-level block diagram of hardware and software components situated in the computer system of FIG. 5(a). FIG. 5(g) shows a few lines of pseudo-code illustrating a portion of a simplified message handler as may be used by the overlay application. FIG. 5(h) shows a few lines of pseudo-code illustrating a portion of a simplified object repositioning routine as may be used by the overlay application to reposition the second visible object.

FIGS. 6(a) to 6(c) show a computer system according to an embodiment of the present invention, where a computer device is connected to a first and to a second pointer device, and is running an O/S and GUI providing a native mouse pointer/cursor (e-g- a white arrow), and is running an overlay application according to an embodiment of the present invention. The overlay application maintains a first pointer position in accordance with movements of the first pointer device (e.g. right mouse device), and maintains a second pointer position in accordance with movements of the second pointer device (e.g. left mouse device), and adjusts, e.g. overrides the position of the native mouse pointer/cursor in accordance with movements of the first pointer device. In addition, the overlay application provides a second visible object (e-g- a line or rectangle) which moves in accordance with movements of the second pointer device, and provides a third visible object, which moves in accordance with movements of the first pointer device. FIG. 6(a) shows movements of the first and third visible object in accordance with movements of the first pointer device. (e.g. right mouse device). FIG. 6(b) shows movements of the second visible object in accordance with movements of the second pointer device. (e.g. left mouse device). FIG. 6(c) shows a few lines of pseudo-code illustrating a portion of a simplified position-update routine as may be used by the overlay application to reposition the second and the third visible object.

FIGS. 7(a) to 7(e) show a computer system according to an embodiment of the present invention, where a computer device is connected to a first and to a second pointer device, and is running an O/S and GUI providing a native mouse pointer/cursor (e-g- a white arrow), and is running an overlay application according to an embodiment of the present invention. The overlay application maintains a first pointer position in accordance with movements of the first pointer device (e.g. right mouse device), and maintains a second pointer position in accordance with movements of the second pointer device (e.g. left mouse device), and adapted, e-g- overrides the position of the native mouse pointer/cursor in accordance with movements of the pointer device which is most recently moved. In addition, the overlay application provides a second visible object (e-g- a line or rectangle) which moves in accordance with movements of the second pointer device (e.g. left mouse device), and provides a third visible object, which moves in accordance with movements of the first pointer device. (e.g. right mouse device). FIG. 7(a) shows movements of the first and third visible object in accordance with movements of the first pointer device (e.g. right mouse device). FIG. 7(b) shows movements of the first and second visible object in accordance with movements of the second pointer device. (e.g. left mouse device). FIG. 7(c) is a high-level flowchart illustrating a computer implemented method according to an embodiment of the present invention, as can be used in the computer system of FIG. 7(a). FIG. 7(d) is a more detailed flowchart illustrating a computer implemented method according to an embodiment of the present invention, as can be used in the computer system of FIG. 7(a). FIG. 7(e) shows a few lines of pseudo-code illustrating a portion of a simplified message handler as may be used by the overlay application.

FIG. 8(a) shows movements of the first visible object in accordance with movements of the first pointer device (e.g. right mouse device). FIG. 8(b) shows movements of the second visible object in accordance with movements of the second pointer device (e.g. left mouse device). FIG. 8(c) is a schematic representation of a so called "Z-order" of windows or image planes and a "cursor plane" as can be used in the computer system of FIG. 8(a).

FIGS. 9(a) to 9(c) show a computer system according to an embodiment of the present invention, and is a variant of the system shown in FIGS. 8(a) to 8(c). Where the embodiment of FIGS. 8(a) to 8(c) is especially useful for right-handed people, the embodiment of FIGS. 9(a) to 9(c) is especially useful for left-handed people. FIG. 9(a) shows movements of the second visible object (e-g- a black arrow) in accordance with movements of the first pointer device (e.g. right mouse device). FIG. 9(b) shows movements of the first visible object (e-g- the native mouse cursor/pointer, here in the form of a white arrow) in accordance with movements of the second pointer device (e.g. left mouse device). FIG. 9(c) shows a few lines of pseudo-code illustrating a portion of a simplified message handler as may be used by the overlay application which runs on the computer device 901.

FIG. 10(a) shows movements of the first visible object (e.g. the native mouse cursor/pointer) in accordance with movements of the first pointer device (the pointer device being moved), while the second visible object is located at the other maintained position. FIG. 10(b) shows movements of the first visible object in accordance with movements of the second pointer device (the pointer device being moved), while the second visible object (the black arrow) is located at the other maintained position.

FIG. 13 shows a few lines of pseudo-code illustrating a portion of a first message handler routine as can be used in overlay applications according to embodiments of the present invention.

FIG. 18(a) shows a few lines of pseudo-code illustrating a portion of a second message handler routine as can be used in overlay applications according embodiments of the present invention.

FIG. 18(b) shows a variant of the routine of FIG. 18(a), as can be used in overlay applications according embodiments of the present invention.

FIG. 18(c) shows a more complete version of the routine of FIG. 18(a), as can be used in overlay applications according embodiments of the present invention.

FIG. 30 and FIG. 31(a) show an enlarged view of a portion of FIG. 29.

FIG. 31(b) is a variant of the portion of FIG. 31(a), where a feature is added to force cursor movements to be only horizontal (East/West) or vertical (North/South) or diagonal (North-East, North-West, South-East, South-West).

FIG. 31(c) shows a few lines of pseudo-code which can be used in the position update routine for achieving this effect.

FIG. 47(a) to FIG. 47(i) show a few exemplary movement sequences which may be used in embodiments of the present invention, e.g. in the computer system of FIG. 45 and FIG. 46.

FIG. 48 shows an exemplary implementation, in pseudo-code, of a strongly simplified example, how the overlay application, after detection of a scroll-up sequence caused by a scroll-up message originating from the left- or right pointer device, positions the native mouse cursor on the left- or right position, and then sends a scroll-command to the O/S.

FIG. 55(a) to FIG. 57(b) illustrate a computer system having an operating system that inherently supports two mouse devices, and that shows two mouse cursors, including a first mouse cursor (also referred to herein as "active mouse cursor") and a second mouse cursor (also referred to herein as "passive mouse cursor").

FIG. 55(a) shows a computer system according to an embodiment of the present invention, where a computer device is connected to a first and to a second pointer device, and is miming an O/S and GUI providing two mouse cursors which follow movements of the respectively pointer devices; and wherein the O/S and GUI support separate or substantially simultaneous scrollwheel-movements of both pointer devices; and which allows clicking and dragging with each of the pointer devices, but only one at the time. In this embodiment the behavior of the two mouse cursors is provided by the operating system itself (or by certain modules thereof), without the need for an overlay application and/or a special mouse device driver and/or a special hub and/or a special pointer device.

FIG. 55(a) shows movements of the first mouse cursor (active mouse cursor) in accordance with movements of the first pointer device (e.g. right mouse device). The second mouse cursor (passive mouse cursor) is situated at the second position.

FIG. 56 shows a high-level flow-diagram of an exemplary computer implemented method which can be performed by a special operating system (or certain modules thereof) which runs on the computer device of FIG. 55(a), according to an embodiment of the present invention.

FIG. 57b is a variant of FIG. 57a.

FIG. 59(a) and FIG. 59(b) show a computer system with a special operating system having two mouse cursors, according to an embodiment of the present invention. In FIG. 59(a) the first pointer device is moved. In FIG. 59(b) the second pointer device is moved.

FIG. 59(c) is a schematic representation of a so called "Z-order" of windows or image planes and a "cursor plane" as can be used in the computer system of FIG. 59(a). In FIG. 59(a) and FIG. 59(b) three bitmaps are used, including only one native mouse cursor.

FIG. 59(d) and FIG. 59(e) show two bitmaps which can also be used.

Figure 1:
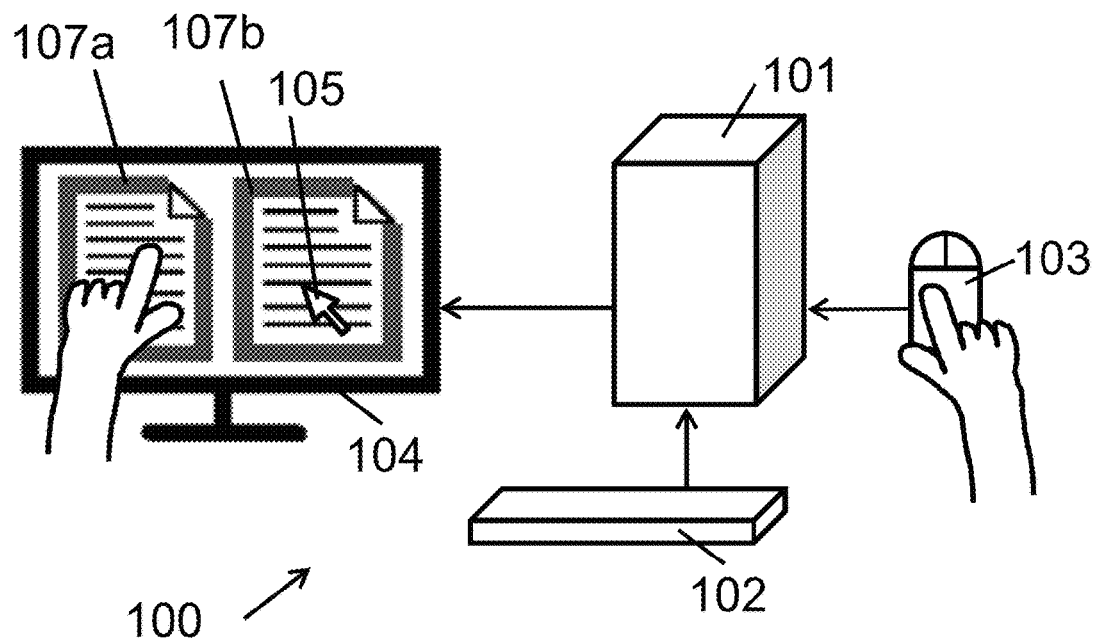
FIG. 1 shows an example of how a translator or proofreader can compare an original document and a translation thereof, using a classical computer system.

It is noted that the timing diagrams shown herein are high-level timing diagrams, and many details are omitted, which are not relevant for understanding the principles of the present invention.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions may not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", as used in the claims, should not be interpreted as being restricted to the means listed thereafter; it does not exclude other elements or steps. It is thus to be interpreted as specifying the presence of the stated features, values, steps or components referred to, but does not preclude the presence or addition of one or more other features, values, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single previously disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, procedures and techniques have not been described in detail, so as not to obscure the present invention.

In this document the term "alpha-blending" or "mixing" (of images or bitmaps) are used as synonyms. In the context of graphical overlay, there is an upper image (having a higher Z-order) and a lower or underlying image (having a lower Z-order). The mixing can be done in hardware and/or software, and is based on a parameter called "alpha-blending value" a, which refers to the level of mixing the two images, where $\alpha=0\%$ means that the original image (with the lower Z-order) is not mixed with the overlay image (or that the overlay image is fully transparent), and where $\alpha=100\%$ means that the resulting pixel value is that of the overlay image (or that the overlay image is fully opaque except for fully transparent pixels). The alpha-blending value may be expressed on a scale from 0 to 255, where $\alpha=255$ corresponds to $\alpha=100\%$ and $\alpha=0$ corresponds to $\alpha=0\%$. Alpha-blending can for example be used to fade-in or fade out a graphical image. In the context of the present invention there may also be a second parameter involved in the mixing, referred to as "TransparentColorValue". If a pixel of the overlay image has this predefined value, this pixel is treated as "fully transparent". Fully transparent pixels are typically used at the circumference of a bitmap, for example for showing a rectangular image with rounded edges. "Alpha-blending" and "fully transparent pixels" are both well known in the art.

In this document, the terms "word processor" or "text editor" should not be interpreted too narrow, because many so-called word processors (such as e-g- Microsoft Word) also have drawing capabilities. Likewise, the term "spreadsheet" or "worksheet" should not be interpreted too narrow, because many so-called worksheet applications, e-g- Microsoft Excel, also have graphical capabilities.

The expression "the overlay window is configured in click-through mode" or "the overlay window is configured in pass-through mode" means that the overlay window is configured in such a way that events from input devices (such as e-g- a mouse, a keyboard, a trackball, a touchpad, a stylus, a joystick, etc-) are sent by the operating system to one or more underlying application windows or to objects thereof, despite the higher Z-order of the overlay application, and despite the native mouse cursor being located over the area defined by the overlay window. The message being "passed on to lower windows" applies for example to events caused by a button press, and to a button release, and to a button click, and to a scroll event of a mouse wheel, and to movements of the pointer device. In the context of the present invention, the overlay application typically comprises one window configured in click-through mode, and optionally but preferably also contains a second, mainly opaque window with user interface elements, not configured in click-through mode.

In this document, the expression "the window is configured in non-click-through mode" means that the window is "not configured in click-through mode".

In this document, the term "work area" refers to a portion of the pixel area of a screen, namely the area that will typically be occupied by an application in case it is be maximized. In a Microsoft Windows environment, the "work area" means the entire pixel area or the area of the desktop minus the so called "taskbar", which is typically located at the bottom of the screen.

In this document the terms "mouse pointer" and "mouse cursor" are used as synonyms, and refer to a symbol or graphical image on a computer monitor or other display device that echoes movements of a pointing device, e-g- a mouse, touchpad, or stylus pen. This pointer or cursor can assume different shapes, such as for example an "arrow" or a "crosshair" (looking like a roman number "I") or as a "hand" etc- In this document, the terms "display" and "monitor" and "screen" are used as synonyms.

In this document, the term "line" or "bar" or "line segment" are used as synonyms. They refer to an elongated, for example a rectangular object, optionally with rounded edges.

In this document the expression "the mouse cursor or pointer follows movements of the pointer device" means that the position of the cursor or pointer is adjusted in accordance with movements of said pointer device".

In this document the terms "first maintained position" and "position related to movements of the first pointer device" mean the same. This position is also referred to herein by Pos1 or the coordinates (x1,y1) or the coordinates (xR,yR).

In this document the "first pointer device" usually refers to the pointer device to be controlled by the right hand of a user, unless explicitly mentioned otherwise.

In this document the terms "second maintained position" and "position related to movements of the second pointer device" mean the same. This position is also referred to herein by Pos2 or the coordinates (x2,y2) or the coordinates (xL,yL).

In this document the "second pointer device" usually refers to the pointer device to be controlled by the left hand of a user, unless explicitly mentioned otherwise.

In this document, the expression "shifting focus between two documents" means shifting focus between two locations on the screen, for example between a first window associated with a first application (e-g- a PDF viewer) showing a portion of a first document, and a second window associated with a second application (e-g- a text editor) showing a portion of a second document, unless explicitly mentioned otherwise.

In this document, the terms "host" means a "computer device", unless explicitly mentioned otherwise.

In this document, the terms "signal" and "message" sent by a pointer device mean the same.

In this document the term "underlining" or "highlighting" of a text fragment means seemingly or virtually underlining or highlighting said text fragment by means of an overlaid object.

In this document, the term "movement sequence" refers to a sequence or series of at least two or at least three movement messages or displacement messages (e.g. as shown in FIG. 47), or to a corresponding data structure. These are also referred to herein as "false" movements, because they do not correspond to actual movements of the pointer devices.

In this document, the expression "button message" refers to a button-pressed message and/or a button-released message, without specifying which button is concerned (e.g. a left button of a mouse, or a right button of a mouse) and without specifying whether a button-press or a button-release is concerned.

When referring to "scroll message", a "scroll-up message" or a "scroll-down message" may be meant, or both, but it is not always necessary to make this distinction in the description. Likewise, instead of "scroll-up command" or "scroll-down command", sometimes the term "scroll command" is used.

By a "null displacement", a displacement is meant with dx=0 and dy=0. By a "null displacement message", a displacement message is meant with dx=0 en dy=0.

In certain embodiments of the present invention a "first/second position" is maintained related to movements of a first/second pointer device (e.g. a first/second mouse). This first/second position is also referred to as "first/second pointer position". These correspond with a first/second display position.

If there is only one mouse cursor (e.g. the native mouse cursor provided by the O/S), this cursor may assume either the first or the second position (or pointer position). This position is also referred to herein as the "cursor position". If there are two mouse cursors, then there is a first and a second cursor position.

As described in the background section and as illustrated in FIG. 1 to FIG. 4(b), there are many occasions when a computer user would want that the computer system had a mechanism that allows the user to read and/or write and/or scroll and/or click at two different locations on a screen, whereas typically today, in all major operating systems for personal computers with a graphical user interface, only a single visible object known as "mouse pointer" or "mouse cursor" is supported.

Even though the present invention is not limited to "Windows compatible" computers, running a version of the "Windows" operating system from Microsoft Corporation (Redmond, USA), the present invention will be explained primarily with such computers in mind, in order to simplify the description. But the principles of the present invention will also work for other computers with an operating system O/S and a graphical user interface GUI that provides only a single mouse pointer, such as for example Mac OS from Apple Inc. or Linux.

Even though the present invention is not limited to working with two "mouse devices" as pointer devices, the present invention will be explained with two mouse devices in mind, in order to simplify the description. But the principles of the present invention will also work with other pointer devices, such as for example a touchpad or a trackball or a stylus or the like.

The problems a translator or proofreader or writer or transcriber is confronted with in the cases illustrated in FIG. 1 to FIG. 4(b), are related to a feature (or shortcoming) of operating systems with a GUI that maintains only a single mouse cursor or mouse pointer. From a commercial point of view, one might think that there is a simple solution to these problems, namely to connect a second pointer device to the computer device and hope that a second mouse cursor will somehow appear that follows movements of the second pointer device. Unfortunately, classical operating systems for personal computers such as e-g-Windows and macOS do not work that way, because they maintain only a single cursor position, and although multiple pointer devices can be physically connected to the computer device, all signals coming from these pointer devices are routed to said single cursor position. For example, when two USB-mouse devices are connected to a laptop computer running Windows 7 or Windows 10, the Windows native mouse cursor can be moved e-g- to the left by moving any of these mouse devices to the left. No second mouse cursor will automatically appear.

In contrast, the present invention provides a computer system that supports two pointer devices and provides two or at least two visible objects, which are individually movable by said two pointer devices, for example a first mouse device and a second mouse device, or only one visible object (namely the native mouse cursor) which selectively assumes one of the two maintained positions.

While it would be technically possible to develop a new operating system with inherent support for multiple pointer devices and multiple cursors, such solution is not a realistic option, at least for third parties. The inventors of the present invention therefore tried to find a solution based on an existing operating system O/S with a graphical user interface GUI that provides a single native mouse cursor, and to extend or enhance its functionality, ideally in such a way that most or all existing applications can benefit without modification of these applications.

As will be explained in more detail further, the present invention proposes to solve the problem partially in a "graphical overlay application" (see e.g. FIG. 5*f*, FIG. 11, FIG. 12, FIG. 23*a*, FIG. 24, FIG. 25, FIG. 45, FIG. 46, FIG. 53, FIG. 54) and partially in the driver-layer (see e.g. FIG. 5*f*, FIG. 11, FIG. 12, FIG. 45, FIG. 46) and/or in a special pointer device (see e.g. FIG. 23*a*, FIG. 24, FIG. 53) and/or in a special hub (see e.g. FIG. 25, FIG. 54). An underlying principle of the present invention is that the overlay application maintains two positions, one for each pointer device, and that the overlay application causes the native mouse cursor of the O/S to assume one of these two positions. This offers the major benefit that the look and feel of this mouse cursor remains under control of the O/S and GUI and the other applications most of the time, (except when the mouse cursor hovers over a user-interface window of the overlay application). Thus, the solution provided by the present invention allows the mouse pointer to change shape depending on the context of the application underneath the overlay application, e-g- into "an arrow pointer" or an "I-beam pointer" or an "hour glass pointer" etc- This advantage should not be underestimated, because the shape of the mouse cursor often provides visual clues (or hints) to the user, which hints would otherwise be lost.

Referring now to the Figures.

FIG. 1 to FIG. 4(*b*) are already described in the background section, and illustrate several practical examples when a single user (in particular a professional user) would want to use a personal computer with two pointer devices, one controllable by his/her dominant hand, the other controllable by his/her non-dominant hand.

In order to quantify the requirements of a potential solution with two pointer devices, it is assumed that the user of FIG. 1 to FIG. 4(*b*) is right-handed, and that the computer device of FIG. 1 to FIG. 4(*b*) would be connected to two pointer devices: a "right mouse device" for the right hand, and a "left mouse device" for the left hand, then:
  (1) the user of FIG. 1 and FIG. 2 and FIG. 3 would want to move and/or click and/or scroll the right mouse device, and would want to move the left mouse device, but would not necessarily need to click and/or scroll the left mouse device;
  (2) alternatively the user of FIG. 1 may want to move and/or click and/or scroll the right mouse device, and may want to move and/or drag (i-e- press and move and release) and/or scroll the left mouse device;
  (3) the user of FIGS. 4(*a*) and 4(*b*) would want to move and/or click and/or scroll the right mouse device, and would want to move and/or click the left mouse device, but would not necessarily need to scroll the left mouse device.

FIGS. 5(*a*) to 5(*h*) show a computer system 500 according to an embodiment of the present invention, comprising a computer device 501 and two pointer devices 503R, 503L and a display 504 and optionally a keyboard 502. The computer device 501 is connected to a first pointer device 503R and to a second pointer device 503L, and is running an O/S and GUI (e-g- Windows 10 from Microsoft) providing a native mouse pointer/cursor 505 (shown here in the form of a white arrow), and is running an overlay application according to an embodiment of the present invention, and is optionally running one or more other applications, such as e-g- a text editor, a PDF document viewer, a web-browser, etc- The overlay application maintains two positions Pos1, Pos2 in accordance with movements of the first and second pointer device respectively, and repeatedly overrides the position of the native mouse pointer/cursor 505 so as to correspond with movements of the first pointer device 503R. The overlay application allows the native mouse pointer/cursor 505 of the O/S and GUI to be shown as a first visible object rather than hiding it. In addition, the overlay application provides a second visible object 506L which moves in accordance with movements of the second pointer device 503L.

FIG. 5(*a*) shows movements of the first visible object 505, being the native mouse cursor provided by the O/S and GUI, in accordance with movements of the first pointer device 503R. The second visible object 506L shows the second maintained position Pos2, but is stationary in FIG. 5(*a*), because in this example the second mouse pointer 503L is not moved.

FIG. 5(*b*) shows movements of the second visible object 506L provided by the overlay application, in accordance with movements of the second pointer device 503L. The first visible object 505 shows the first maintained position Post, but is stationary in FIG. 5(*b*), because in this example the first mouse pointer 503R is not moved.

FIG. 5(*c*) is a schematic representation of a so called "Z-order" of five windows or image planes 581-585 and a "cursor plane" 586 as may be used in the computer system 500 of FIG. 5(*a*) and FIG. 5(*b*).

The plane 581 may be a background plane (in the case of Windows known as the "desktop"), the image plane 582 may be the visual representation of a window associated with a text editor application for example, the image plane 583 may be the visual representation of a window associated with a PDF viewer application for example, the image plane 584 may be the visual representation of a window associated with the graphical overlay application according to the present invention, the cursor plane 586 is the image plane associated with the native mouse cursor provided by the O/S and GUI, the shape of which may be modified by an underlying application. The graphical overlay application of the present invention may also have an optional user-interface window 585, an example of which will be described in FIG. 28 to FIG. 31. The user-interface window 585 is not configured in click-through mode, but is configured in non-click-through mode, meaning that its visible components (e-g- buttons, radio buttons, checkboxes, etc-) are capable of receiving (inter alia) mouse clicks.

The window 584 of the overlay application may have a size equal to the visible screen, or equal to the area of the desktop plane 581, or equal to the area of the so called work area (i-e- the area of the screen minus the area occupied by the so called "taskbar)", or another suitable size. The window 584 comprises at least one visible object 506L, for example in the form of a rectangular object. The object 506L may be opaque or semi-transparent. The object 506L may have monochrome pixels, for example red or blue pixels, or may have a bitmap with a color gradient, etc- The other pixels 594 of the window 584 may be fully transparent pixels. Alternatively the window 584 may be configured as a semi-transparent window, for example having an alpha-transparency in the range from 1% to 99%, for example in the range from 5% to 95%. In this case the pixels of the window 584 may have a color, for example a monochrome color, but the window 584 may also comprise a so called "perforated bitmap" or a "texture bitmap" or a "perforated texture bitmap". These aspects are described in more detail in patent application BE2017/5891 filed on 04-dec-2017 by the same applicant, with title "METHOD, DEVICE AND COMPUTER PROGRAM FOR OVERLAYING A GRAPHICAL IMAGE", and in patent application PCT/EP2018/075836 with the same title, filed on 24 Dec. 2018, both of which documents are incorporated herein by reference in their entirety, and to which documents is further referred to herein as the co-pending "perforated bitmap application(s)". In case of conflict between the present application and the co-pending application(s), the present document prevails. The present invention can be seen as a variant of the patent application BE2017/5895 filed on 04-dec-2017, and of the patent application PCT/EP2018/075838 filed on 24 Dec. 2018, with title "METHOD AND DEVICE AND SYSTEM FOR PROVIDING DUAL MOUSE SUPPORT", both of which documents are also incorporated herein by reference in their entirety.

In the example of FIG. 5(*c*) the graphical overlay application has two windows:
a window 584 which is configured in click-through mode and is mainly transparent or semi-transparent (e-g-having an alpha-transparency in the range from 5% to 95%),
and another window 585 (also referred to as user-interface window) which is preferably not configured in click-through mode and which is mainly opaque.

FIG. 5(*d*) shows a high level flowchart of a computer implemented method 570 according to an embodiment of the present invention, for providing a first and a second visible object 505, 506L separately movable by a first pointer device 503R and a second pointer device 503L respectively.

The method can be implemented in an overlay application 551 (see FIG. 5*f*) which can run on the computer device 501 (see FIG. 5*a*), which computer device 501 also comprises an operating system O/S with a graphical user interface GUI providing a single native mouse cursor 505. The computer device 501 is connected to the first and the second pointer device 503R, 503L. The method maintains two positions Pos1 and Pos2 (see also FIG. 5*f*). The method illustrated in FIG. 5*d* comprises the following steps:

a) configuring, 571 the operating system O/S with graphical user interface GUI to provide said native mouse cursor 505 as the first visible object, e-g- by allowing the O/S to show said mouse cursor or by not explicitly hiding said mouse cursor;

b) providing 572 a graphical overlay window 584 comprising the second visible object 506L;

c) configuring 573 the graphical overlay window 584 in click-through mode;

e) adjusting a position of the native mouse cursor 505 in accordance with movements of the first pointer device 503R, and adjusting a position of the second visible object 506L in accordance with movements of the second pointer device 503L.

In an embodiment, the position of the first visible object 505 is updated at the same rate as the position of the second visible object 506L.

In another embodiment, the position of the first visible object 505 is updated at a different rate than the position of the second visible object 506L. For example, the position of the native mouse cursor may be updated in a message handler routine (see for example FIG. 5*g*), and the position of the second visible object may for example be updated based on a timer interrupt.

FIG. 5(*f*) shows a more detailed example of a computer implemented method according to an embodiment of the present invention, which can be seen as a special case of the method shown in FIG. 5(*d*). The method of FIG. 5(*e*) further comprises step d):

d) configuring 574 the operating system O/S to send raw input messages;

In case the O/S is a Microsoft Windows variant, this step may comprise registering the application with the O/S for receiving raw input data, e-g- in the form of input messages known as WM_INPUT messages, for example using the WinAPI function RegisterRawInputDevices( ). It is noted that by default applications do not receive raw input messages.

And wherein step e) comprises: repeatedly performing:
f) receiving 575 a raw input message;
g) determining if the received raw input message is related to a movement from the first or second pointer device 503R, 503L, and if the outcome of this test is true, obtaining displacement information dx, dy related to said displacement, and updating the corresponding first or second position Pos1, Pos2; and if the outcome of this test is false, skipping step h);
h) adjusting 577 the position of the native mouse cursor 505 based on the first maintained position Pos1, or the second maintained position Pos2, or the position Pos1 or Pos2 associated with the pointer device being most recently asserted. In the example of FIG. 5(*a*) and FIG. 5(*b*) the position of the native mouse cursor 505 is always updated in accordance with movements of the first pointer device 503R, but as will be explained further, this position may also be updated otherwise.

And wherein step e) further comprises:
i) repeatedly adjusting 578 a position of the second visible object 506L) in accordance with the second position (Pos2). This step i) may be performed asynchronously with respect to steps f) to h), for performance reasons. Alternatively, step i) may be performed after each execution of step h).

Step g) in combination with step h) is also referred to herein as the "position update routine", it is part of the message handler routine. Step i) is also referred to herein as "object repositioning routine".

FIG. 5(*f*) shows a simplified high-level block diagram of hardware and software components situated in the computer system 500, comprising a computer device 501 with a special overlay application according to an embodiment of the present invention, and two classical pointer devices M1, M2.

The overlay application maintains two pointer positions: a first position Pos1 having coordinates (x1, y1) and a second position Pos2 having coordinates (x2, y2). A message handler 552 of the overlay application 551 will update the first and second position Pos1, Pos2 based on movements of the two pointer devices, e.g. as discussed further in FIG. 5(g).

The graphical overlay application of the system 500 repeatedly adjusts the position of the native mouse cursor 505 to the first maintained position Pos1, corresponding with movements of the right mouse device 503R, and repeatedly adjusts the position of the second visible object 506L to correspond with the second maintained position Pos2, corresponding with movements of the left mouse device 503L, or vice versa.

Figure 5A:
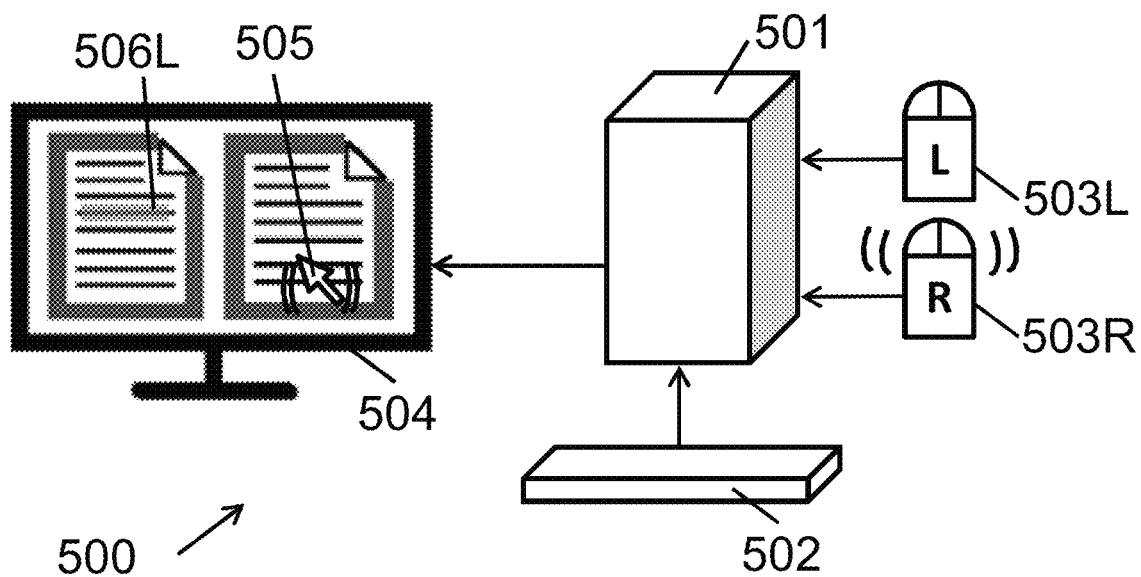
Figure 5B:
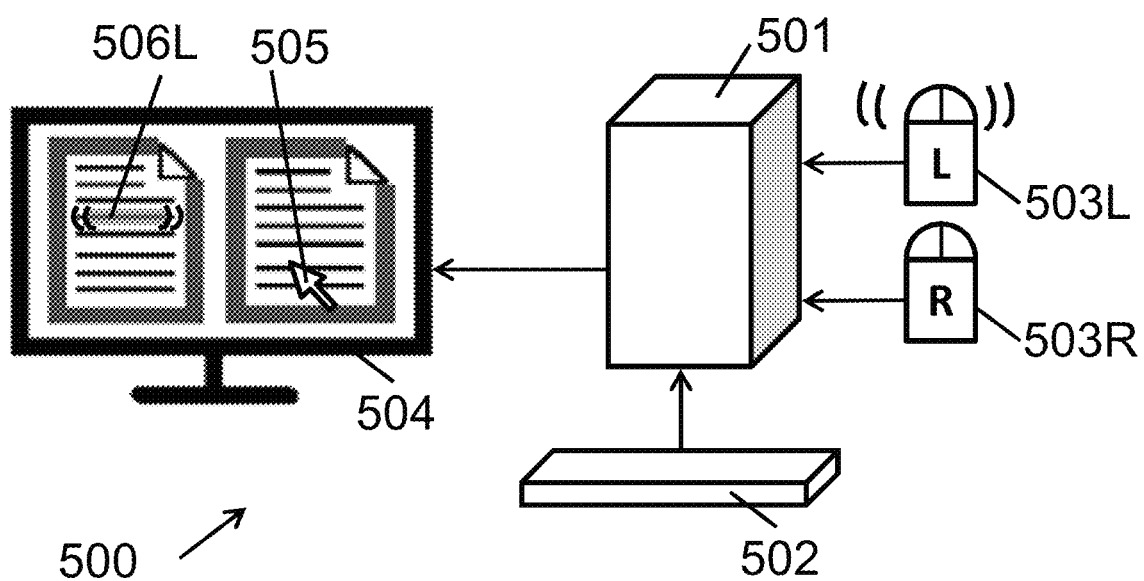

FIG. 5(g) shows a few lines of pseudo-code to illustrate a simplified version of an message handler routine as can be used in the overlay application 551 running in the computer device 501 of FIG. 5(a) and FIG. 5(b). The message handler 552 is triggered by incoming raw messages from input devices (such as e-g-keyboard and/or pointer devices) in a manner known per se in the art. The message handler can obtain or request further information related to each message, for example to get a device handle in order to determine which pointer device has sent the message, and/or to get a horizontal and vertical displacement dx, dy indicative of a movement in the horizontal and/or vertical direction, and/or to get a value indicative of how much a scrollwheel is scrolled, etc- As can be appreciated from the pseudo-code, if the message was sent by the left pointer device 503L, the second position Pos2 will be updated using the displacement values dx, dy, and the position of the native mouse cursor 505 will be set (or reset) to the first position Pos1 related to the right pointer device 503R. If the message was sent by the right pointer device 503R, the first position Pos1 will be updated using the displacement values dx, dy, and the position of the native mouse cursor 505 will be adjusted to move accordingly. Tests have shown that this routine also correctly handles simultaneous movements of the left and right pointer device 503L, 503R.

In the example shown in FIG. 5(g) the X and Y-coordinate of the first and second position Pos1, Pos2 are increased with the displacement values dx, dy as received from the pointer devices, but in practice the displacement values dx, dy may first be transformed linearly or non-linearly to make the movements more or less sensitive (see the radio buttons "Speed Left/Right Mouse" and the "speed curve" in FIG. 31a).

As will be further discussed in FIG. 31(b) and FIG. 31(c) other adjustments of the displacement values are possible. FIG. 5(h) shows a few lines of pseudo-code to illustrate a simplified version of a routine that updates the position of the second visible object 506L, in the example being a rectangle, but the present invention is not limited thereto. This routine may be based on a timer interrupt. In this way, the update of the position of the second visible object 506L can be handled outside of the message handler, which may be preferred for performance reasons. The period of the timer can be chosen for example in the range from 1 ms to 250 ms, preferably in the range from about 1 ms to about 100 ms, for example equal to about 1 ms or about 5 ms or about 10 ms or about 20 ms or about 25 ms or about 30 ms or about 35 ms or about 40 ms or about 50 ms or about 75 ms or about 100 ms. The value of this period is not critical. The smaller this time period value, the faster the response but the higher the CPU load. The higher this time period value, the slower the response but the lower the CPU load. The skilled person can easily find a suitable value by routine experimentation. Some embodiment may allow the end-user to select a preferred timer value.

FIG. 5(a) to FIG. 5(h) illustrate a first embodiment of the present invention, especially suitable for right-handed people. The O/S and GUI provide the native mouse cursor 505, but the overlay application repeatedly adjusts its position such that the position is defined by movements of the right mouse device 503R only. The right mouse device 503R can be moved, its buttons can be pressed or released or clicked, and its scrollwheel can be scrolled as in the prior art. In addition, the overlay application shows a second visible object 506L, in the example of FIG. 5(a) having the form of a line or rectangle, and the overlay application repeatedly adjusts its position such that the position is defined by movements of the left mouse device 503L only. This embodiment successfully addresses the problems illustrated in FIG. 1 to FIG. 3. The user can use his non-dominant hand to move the second object 506L to underline or highlight text he or she wants to read, and can use his dominant hand to edit a document, select text, select menus etc- using the native mouse cursor 505. Thus the overlay application enhances the O/S and GUI by providing one additional visible object 506L which is movable by the left pointer device 503L, while keeping most or all of the functionality of the native mouse cursor. The additional visible object 506L can for example be used for underlining or highlighting text fragments.

In an embodiment, the overlay application may be a dedicated application implementing only the specific behaviour illustrated in FIG. 5(a) and FIG. 5(b), where the native mouse cursor 505 is moved by the right pointer device, and a second visible object 506L having the form of a line is movable by the left pointer device, in which case the user-interface window 585 may be omitted.

Figure 28A:
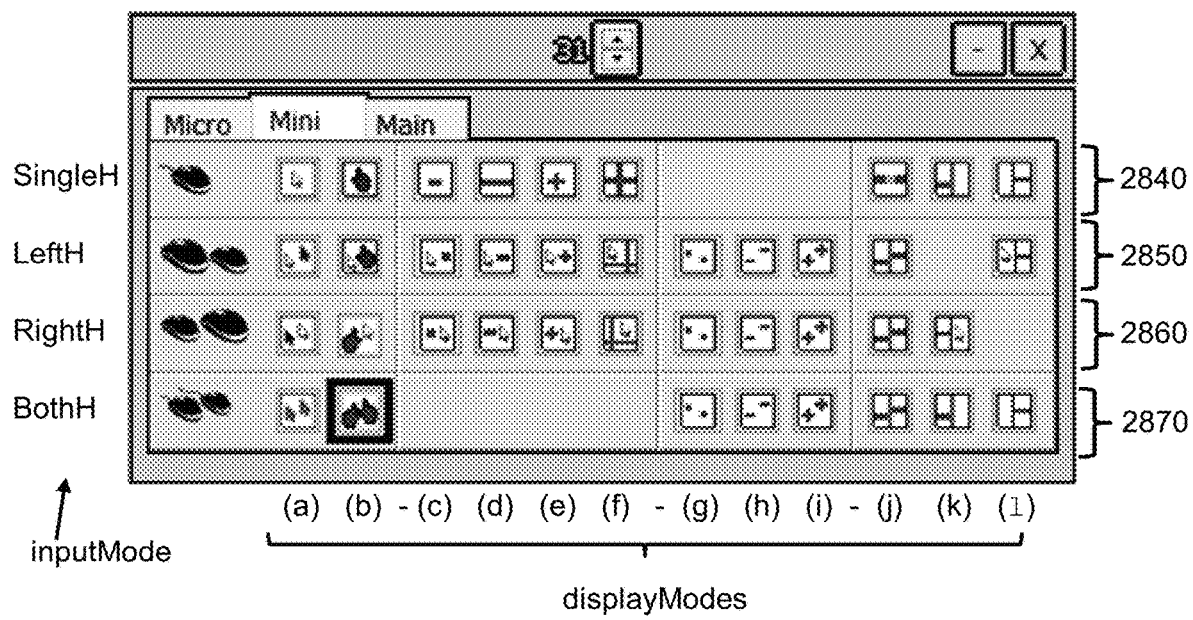
FIG. 28(a) shows an exemplary user-interface window, referred to herein as the "mini user interface" supporting a plurality of input modes and a plurality of display modes.

In another embodiment, the overlay application may implement several options, and a user can select a mode out of a plurality of modes. In this case a user interface window comes in handy, see for example the exemplary user interface of FIG. 28(a), e-g- mode 2860(d), and the exemplary user interface of FIG. 30, e-g- mode 3060(d). The "large right mouse" shown on the left side of FIG. 28(a) is a hint to the user that the right mouse is the dominant mouse for the modes 3060, meaning that the "right mouse device" controls the native mouse cursor 505. The "small left mouse" is a hint to the user that the left mouse device is the non-dominant mouse controlling the second visible object, in the case of mode 2860(d) being a line or rectangle.

Figure 5C:
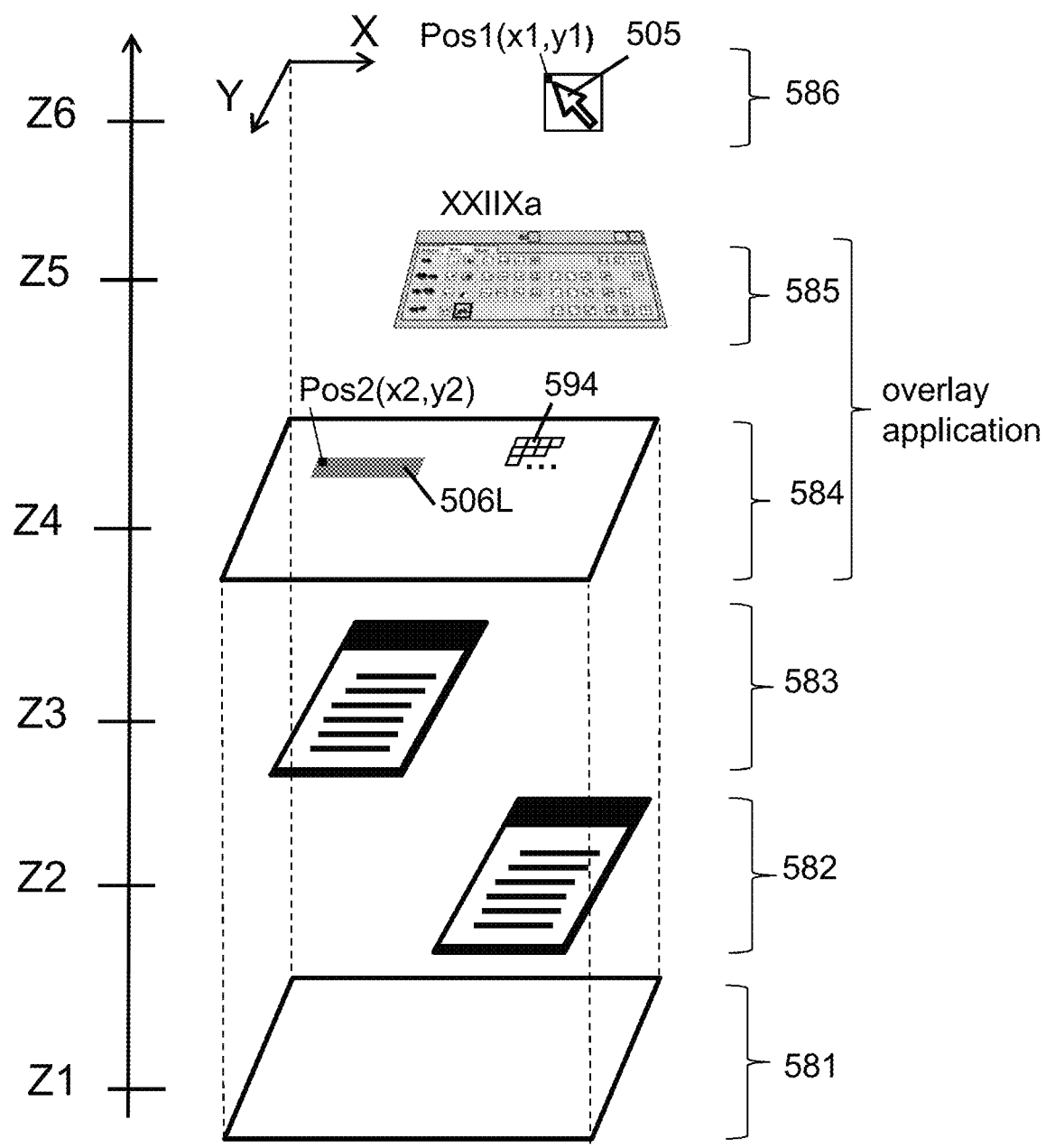
Figure 5D:
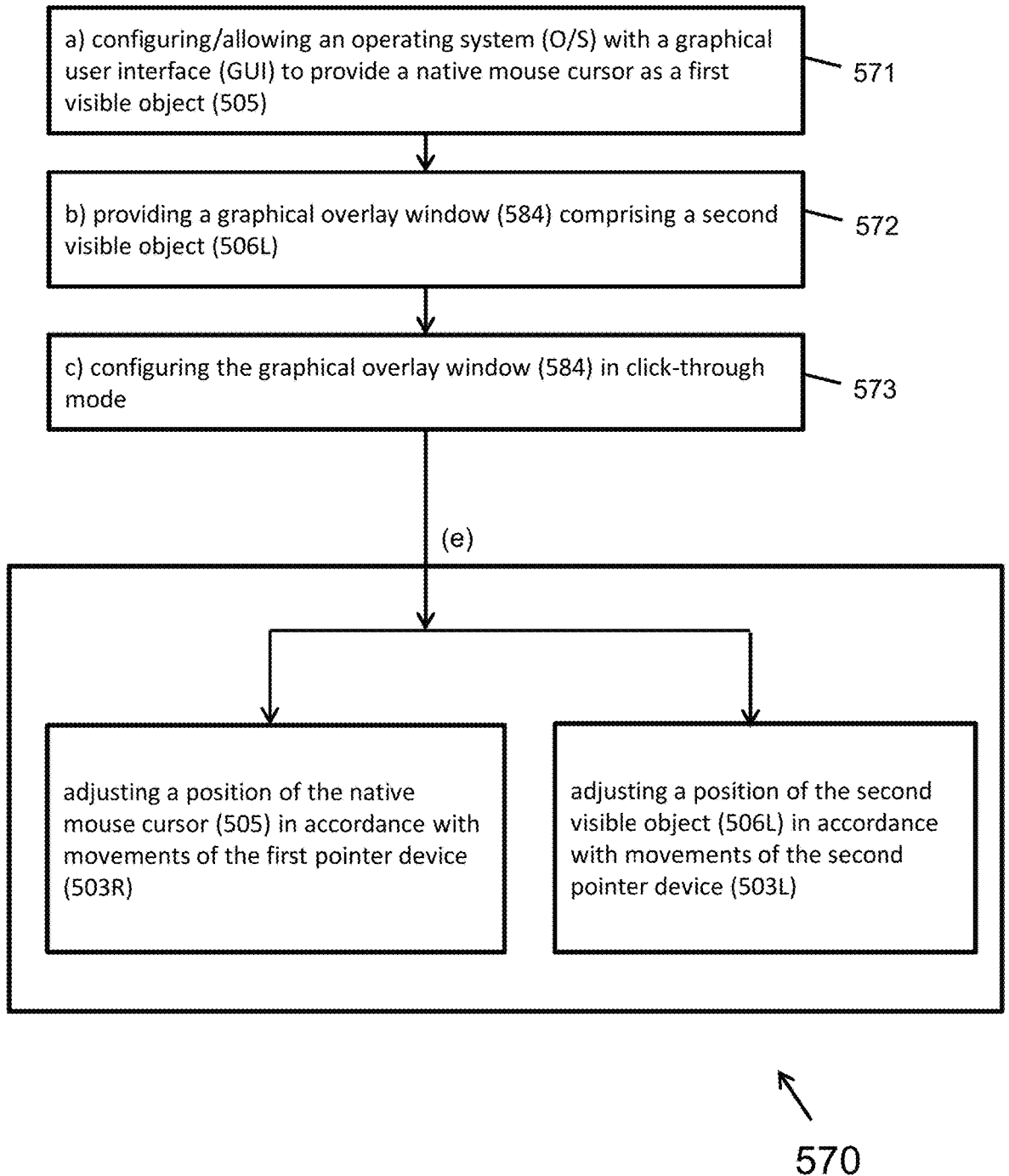
Figure 5E:
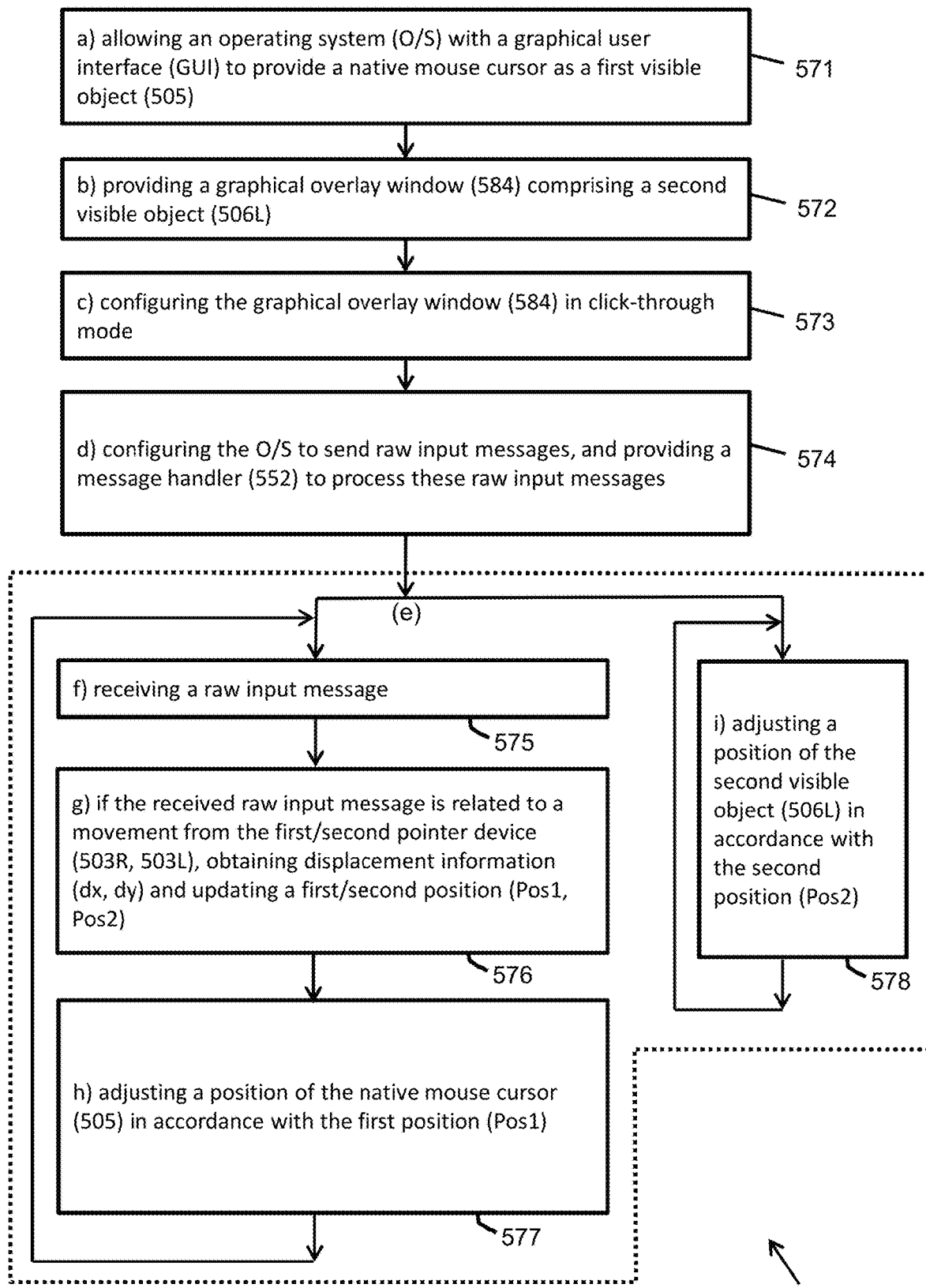
Figure 5F:
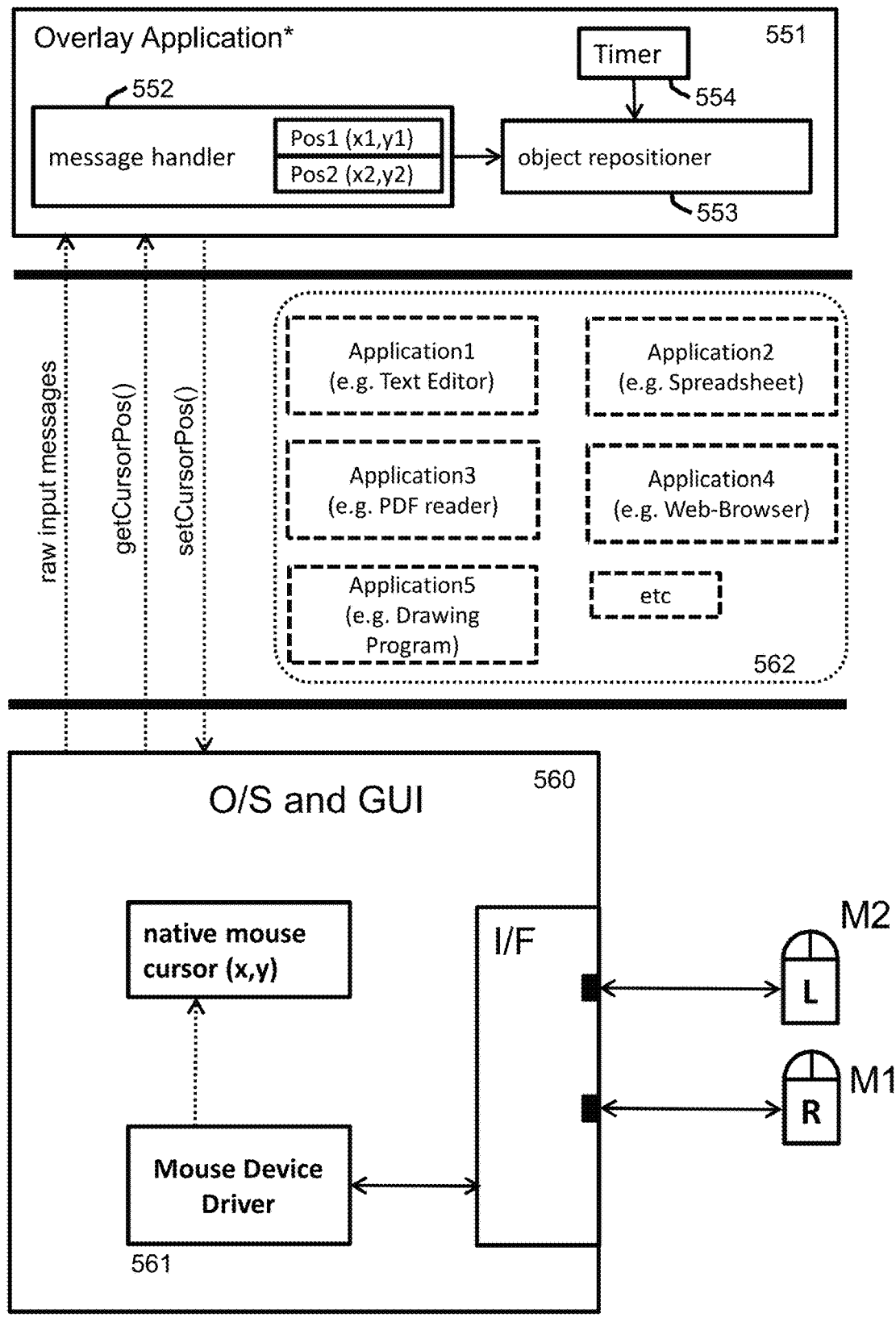
Figure 6A:
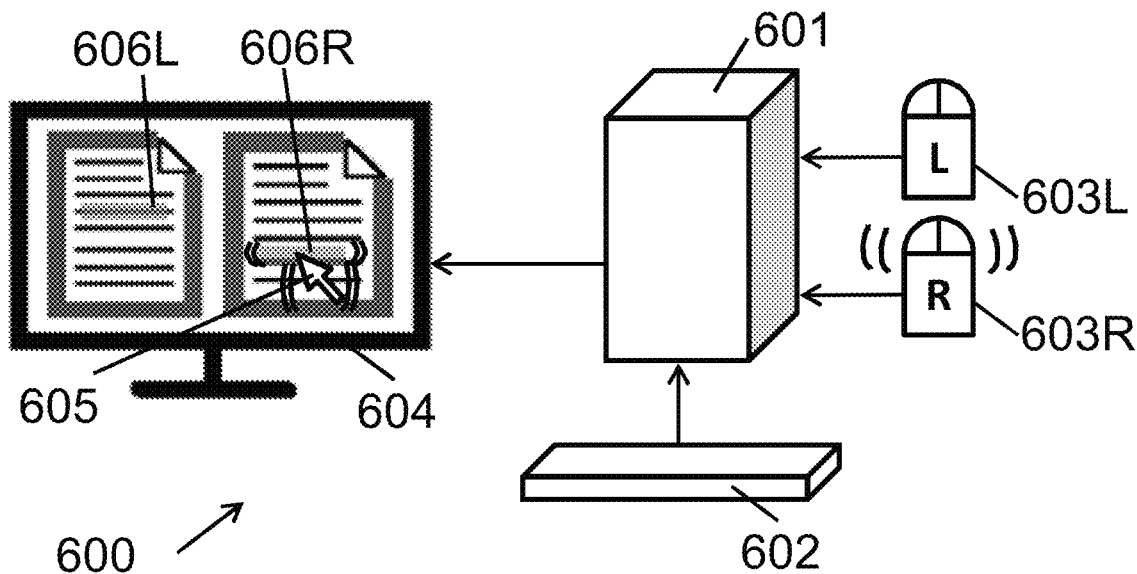
Figure 6B:
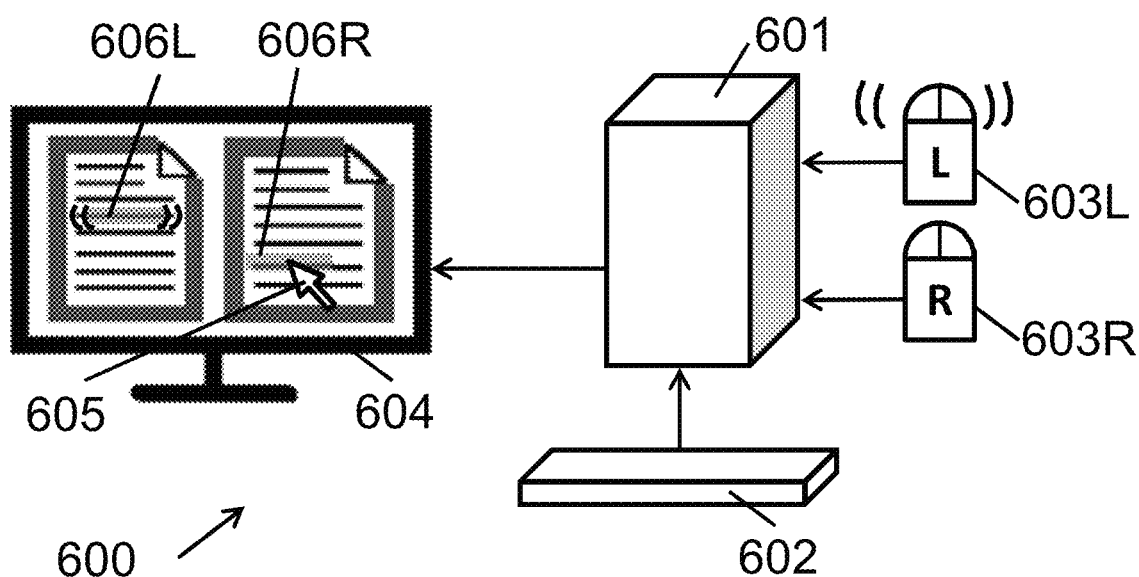

FIG. 6(a) to FIG. 6(c) shows a computer system 600 according to another embodiment of the present invention, which can be seen as a variant of the computer system 500 of FIGS. 5(a) to 5(h), where a computer device 601 is connected to a first and second pointer device 603R, 603L, and is running an O/S and GUI (e-g- Windows 10) providing a native mouse pointer 605 (e-g- having the shape of a white arrow), and is running an overlay application according to an embodiment of the present invention. The overlay application maintains a first and a second position Pos1, Pos2 in accordance with movements of the first and second pointer device 603R, 603L respectively, and adapted, e-g- overrides the position of the native mouse pointer 605 in accordance with movements of the first pointer device 603R. The overlay application provides a second visible object 606L which moves in accordance with movements of the second pointer device 603L, and also provides a third visible object 606R which moves in accordance with movements of the first pointer device 603R. In the example of FIGS. 6(a) to 6(c) the second and third object 606L and 606R are rectangles having the same size and color, but that is not absolutely required, and the two visible objects may have a different size and/or a different shape and/or a different color. Thus, the overlay application used in the computer system 600 of FIGS. 6(a) to 6(c) enhances the O/S and GUI by providing two additional visible objects 606L, 606R which are movable by the two pointer devices 603L, 603R, and which can be used for example for underlining or highlighting text fragments of classical applications running on said computer, for example: a text editor, a web-browser, a slideshow, a PowerPoint presentation, a PDF document viewer, etc- The objects 606L, 606R may be opaque or semi-transparent or may contain a "perforated bitmap" as described in the co-pending "perforated bitmap application(s)".

FIG. 6(a) shows movements of the first visible object 605 (the native mouse cursor) and movements of the third visible object 606R in accordance with movements of the first pointer device 603R (e.g. the right mouse).

FIG. 6(b) shows movements of the second visible object 606L in accordance with movements of the second pointer device 603L (e.g. the left mouse).

FIG. 6(c) shows an exemplary object reposition routine which may be used in the overlay application to move the two visible objects 606L, 606R, in pseudo-code. Simply stated, the coordinates of the object 606L (referred to as rectangleL) are updated according to the second position Pos2 with coordinates xL,yL associated with the second mouse device 603L, and the coordinates of the object 606R (referred to as rectangleR) are updated according to the first position Pos1 with coordinates xR,yR associated with the first mouse device 603R. These steps are performed repeatedly, for example based on a timer.

Figure 37:
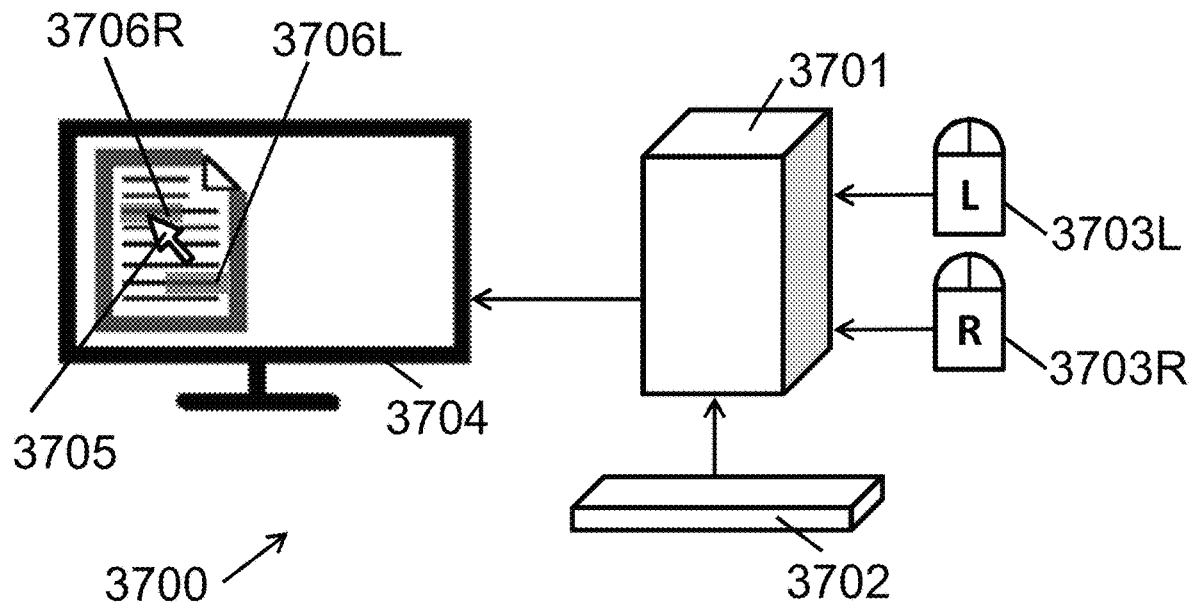
FIG. 37 shows a computer system according to an embodiment of the present invention, where the computer device is running an O/S and GUI and an exemplary application (e-g- a text editor), and is running an overlay application according to an embodiment of the present invention. The overlay application is configured to reposition the native mouse cursor and to show two movable lines, in accordance with movements of the pointer devices.

It is pointed out that, in FIG. 6(a) and FIG. 6(b), the first visible object 606R is shown on the right side of the screen 604, and the second visible object 606L is shown on the left side of the screen 604, but that is not absolutely required, and both objects can be moved anywhere on the screen, as shown for example in FIG. 37. In practice however, a user will typically find it more intuitive to position the object related to the left pointer device on the left side of the screen. In other embodiments, the movement of the second and optionally further objects 3906R, 3906L is restricted, as shown for example in FIG. 39, which will be discussed later, but even then the movement of the native mouse cursor 3905 is preferably not restricted.

The computer system 600 of FIGS. 6(a) to 6(c) can be used for example by proofreaders for seemingly underlining text portions in two documents shown side by side on the screen 604 without actually modifying the content of the documents itself. It is a major advantage that text fragments can be seemingly underlined in two different documents simultaneously. This may drastically lower the cognitive burden of the user when switching focus back and forth between the two documents. It is a major advantage that the text fragments can be underlined independently (in contrast to for example text editors allowing only synchronous navigation through two text documents), not only because sentences in one language may be longer or shorter than sentences in another language, but also because the two documents may have a different formatting, e-g- a different layout and/or a different font and/or a different line spacing, etc- It is an advantage that the "second mouse and second object" can be used in combination with almost any underlying application, e-g- a text editor, a PDF document reader, a worksheet, a web-browser, a PowerPoint application, etc- without having to modify any of these applications. For example, the object 606L can be moved over a PDF document, and the object 606R can be moved over a text-document, and vice-versa. In the example of FIG. 6(a) and FIG. 6(b), the native mouse cursor 605 moves along with the object 606R.

The user can use the native mouse cursor 605 to click and/or drag and/or select menu options anywhere on the screen, for example in the text document to select text which can then be deleted or replaced by other text using the keyboard 602, or in the taskbar (not explicitly shown) to open new applications in the same way as can be done without the graphical overlay application.

In the exemplary user-interface of FIG. 28(a), the behaviour of FIG. 6(a) and FIG. 6(b) may correspond with mode 2860(h). (the word "may" is used, because several variations are possible, for example for the message handler, as will become clear further).

FIGS. 7(a) to 7(e) show a computer system 700 according to another embodiment of the present invention, which can be seen as a variant of the computer system 600 of FIGS. 6(a) to 6(c), where a computer device 701 is connected to a first pointer device 703R and a second pointer device 703L, and is running an O/S and GUI providing a native mouse pointer or mouse cursor 705 (e-g- a white arrow), and is running an overlay application according to an embodiment of the present invention, which provides a second and a third visible object 706L, 706R.

Figure 7A:
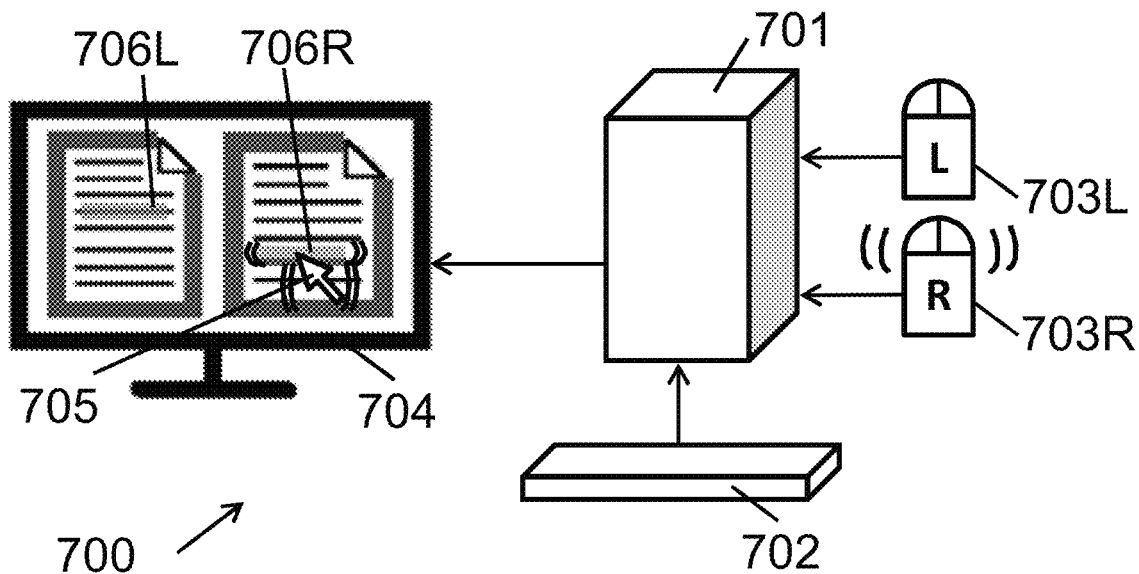
Figure 7B:
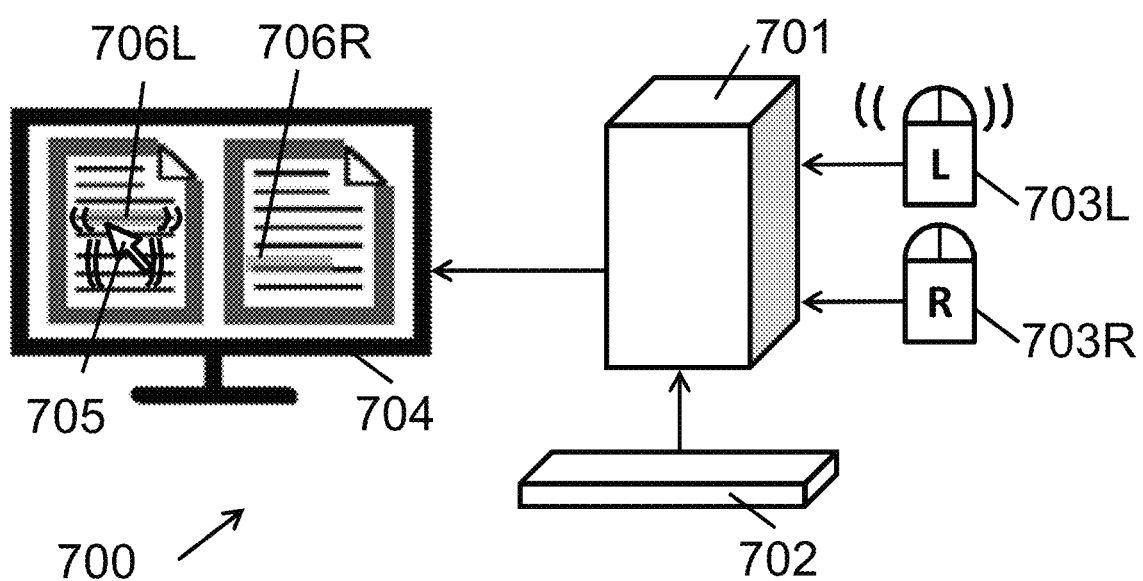

The overlay application maintains a first and a second pointer position Pos1, Pos2 in accordance with movements of the first and second pointer device 703R, 703L respectively, and adapted, e-g- overrides the position of the native mouse pointer/cursor 705 in accordance with movements of the pointer device which is most recently moved. Thus, if the right pointer device 703R is being moved and the left pointer device 703L is stationary, as illustrated in FIG. 7(a), the native mouse cursor 705 follows movements of the right pointer device 703R, and the buttons and/or the scrollwheel of the right pointer device 703R can be used. If at another moment in time the left pointer device 703L is being moved and the right pointer device 703R is stationary, as illustrated in FIG. 7(b), the native mouse cursor 705 follows movements of the left pointer device 703L, and the buttons and/or the scrollwheel of the left pointer device 703L can be used. As can be understood from FIG. 7(a) and FIG. 7(b) the native mouse cursor follows movements of the pointer device which is moved, until the moment that the other pointer device is moved, which causes the native mouse pointer to jump to the other maintained position. In this way, the user can use the native mouse pointer at two different locations of the screen, albeit at different moments in time. Or stated in other words, in this embodiment, the native mouse cursor 705 provided by the O/S and GUI is temporarily associated with one of the pointer devices 703L, 703R at any moment in time, thus the native mouse pointer 705 is "shared in time" between the two pointer devices.

Figure 7C:
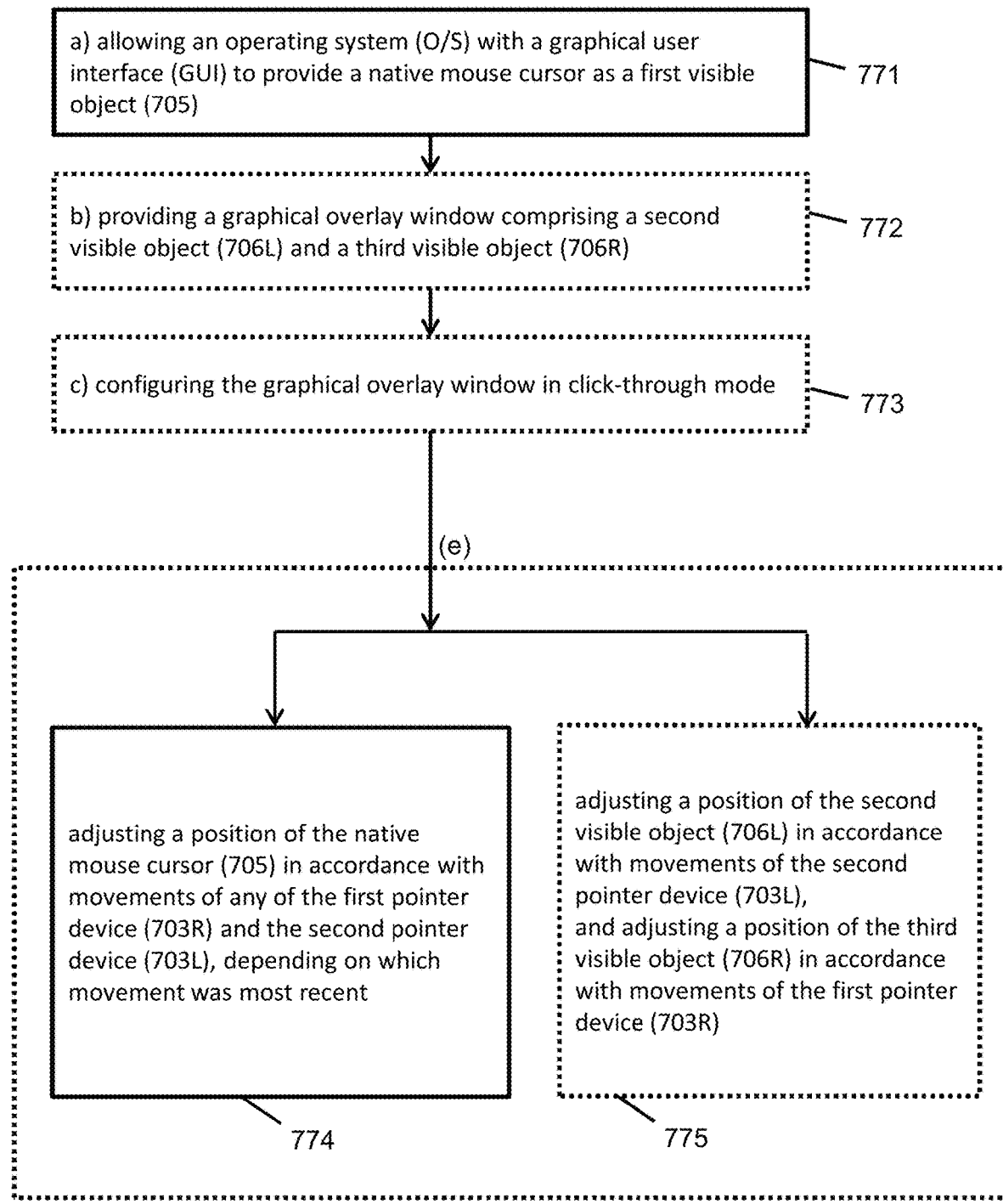
Figure 7D:
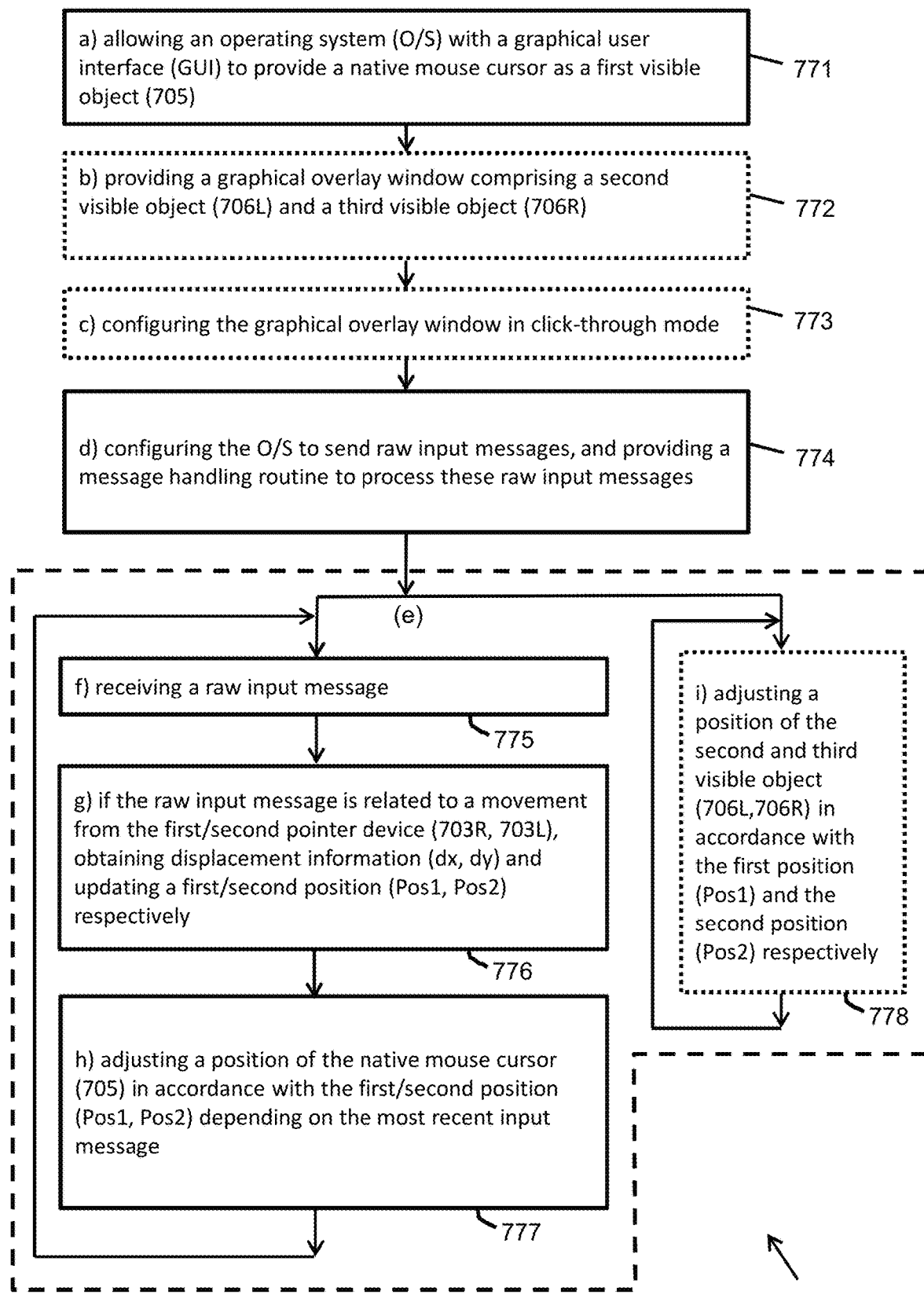

FIG. 7(c) is a high-level flowchart illustrating a computer implemented method according to an embodiment of the present invention, as can be used in the computer system of FIG. 7(a).

FIG. 7(c) shows a computer implemented method for providing a first visible object 705 and a second visible object 706L and a third visible object 706R. The third visible object 706R is movable by a first pointer device 703R. The second visible object 706L is separately movable by a second pointer device 703L.

The first visible object 705 is selectively movable by any of the first pointer device 703R and the second pointer device 703L whichever is most recently moved and/or asserted. In FIG. 7(a) the first pointer device 703R is being moved, and the native mouse cursor 705 and the third visible object 703R both move in accordance with movements of the right pointer device, or more particularly, in accordance with a first position Pos1. In FIG. 7(*b*) the second pointer device 703L is being moved, and the native mouse cursor 705 and the second visible object 706L both move in accordance with movements of the left pointer device 703L. It can be understood that the native mouse cursor 705 moves gradually as long a only one pointer device is being moved, but typically suddenly jumps from Pos1 to Pos2 or vice versa when the other pointer device is being moved.

FIG. 7(*c*) shows a flowchart illustrating a computer implemented method comprising the following steps:

a) configuring, e-g- allowing an operating system O/S with a graphical user interface GUI to provide a native mouse cursor 705 as a first visible object;

b) providing a graphical overlay window comprising a second visible object 706L and a third visible object 706R;

c) configuring the graphical overlay window in click-through mode;

d) adjusting (774) a position of the native mouse cursor 705 in accordance with movements of any of the first pointer device 703R and the second pointer device 703L, whichever movement was most recent, and e) adjusting (775) a position of the second visible object 706L in accordance with movements of the second pointer device 703L, and adjusting a position of the third visible object 706R in accordance with movements of the first pointer device 703R.

In a variant of the embodiment shown in FIG. 7(*a*) to FIG. 7(*c*), no two horizontal lines are shown, but only the native mouse cursor 705 is displayed, and its position is changed as described above. In this case, the steps 772 and 775 can be omitted (hence the dotted line display).

In a further variant of this embodiment, also step c) is omitted. Such method can e.g. be performed by a customized application (e.g. one of the applications 562 of FIG. 5*f*) which has provisions for supporting two mice, without having to use the overlay application 551. This variant can also be performed by a module which may be added to the operating system, to provide an enhanced operating system which is actually based on a single native mouse cursor which can jump. In this case, also step 771 can be omitted, since this is already provided by the operating system.

FIG. 7(*d*) is a more detailed flowchart illustrating a computer implemented method 770 according to an embodiment of the present invention, as can be used in the computer system of FIG. 7(*a*). The method 770 comprises the following steps:

a) configuring 771, e-g- allowing an operating system O/S with a graphical user interface GUI to provide a native mouse cursor 705 as a first visible object;

b) providing 772 a graphical overlay window comprising a second visible object 706L and a third visible object 706R;

c) configuring 773 the graphical overlay window in click-through mode;

d) configuring 774 the O/S to send raw input messages, and providing a message handler to process these raw input messages;

e) repeatedly performing the following steps:

f) receiving 775 a raw input message;

g) if the received raw input message is related to a movement from the first/second pointer device 703R, 703L, obtaining 776 displacement information dx, dy and updating a first and second position Pos1, Pos2 respectively;

h) adjusting 777 a position of the native mouse cursor 705 in accordance with the first or second position Pos1, Pos2 depending on the most recent input message;

and repeatedly performing the following step:

i) adjusting 778 a position of the second and third visible object 706L,706R in accordance with the first position Pos1 and the second position Pos2 respectively.

In a variant of the embodiment, which can for example be performed in an overlay application. where no two horizontal lines are shown, but wherein only the native mouse cursor 705 is displayed and changing its position, a portion of step 772 can be omitted, as well as step 778.

In a further variant of these embodiments, which can for example be performed in a module added to the operating system, steps 772 and 773 and 778 can be omitted completely. The steps 771 and 774 and 775 are in principle already present in the operating system, but might be implemented in another way (e.g. a more efficient manner) in the operating system itself. This module may for example show a second cursor plane (e.g. with a second white arrow or with a second black or blue or red arrow), and having a Z-order higher than that of the applications, e.g. like the cursor plane 586 of FIG. 5*c*.

FIG. 7(*e*) shows an exemplary position-update routine, (as part of the message handler routine), in pseudo-code, which can be used to update the position of the two horizontal lines. As can be seen, the coordinates (xR,yR) and (xL,yL) of the first and second position Pos1, Pos2 are updated in accordance with movements of the first and second pointer device 703R, 703L respectively (albeit indirectly, by making use of a device handle which the O/S assigns to each pointer device), and the position of the native mouse cursor 705 is adjusted depending on the most recent movement message.

An advantage of this embodiment is that a user can use two mouse devices for simultaneously showing two visible objects, e-g- two lines or two rectangles for underlining or highlighting text fragments at two different locations of the screen, and in addition the user can also click or scroll the mouse device which is most recently moved. This can for example be used for scrolling the respective documents up/down when proofreading.

Figure 34:
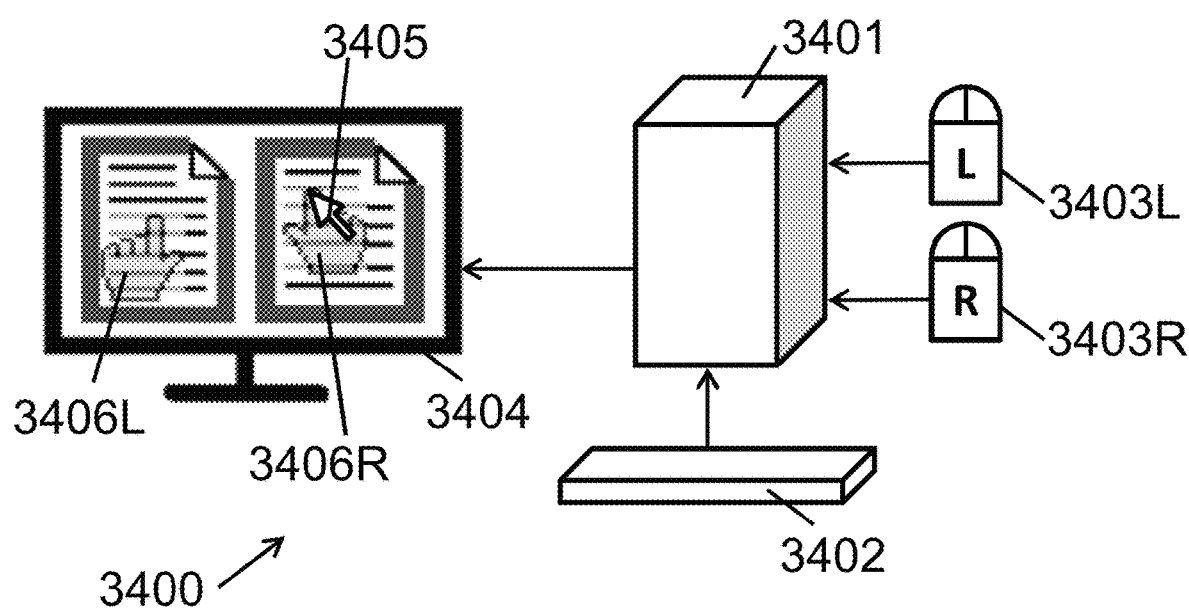
FIG. 34 shows another variant of the computer system of FIG. 32, where the overlay application is configured to reposition the native mouse cursor and to show two visible objects, one object containing an image of a left hand, and the other object containing an image of a right hand, which images move in accordance with movements of the pointer devices.

FIGS. 8(*a*) to 8(*c*) show another computer system 800 according to an embodiment of the present invention, which can be seen as a variant of the computer system 500 of FIGS. 5(*a*) to 5(*h*), where the second visible object 806 has the shape of a black arrow, but of course the invention is not limited thereto, and an arrow of another color can also be used, but the drawing is not limited to an arrow, and also other shapes can be used, see for example FIG. 34 where two bitmaps with an image of a hand are used.

As illustrated in FIG. 8(*c*) the overlay application used in the computer system 800 of FIGS. 8(*a*) to 8(*c*) comprises a click-through window 884 similar to the window 584 of FIG. 5(*c*), but where the rectangular object 506L is replaced by a visual object (e-g- an "image component") containing a suitable bitmap. The image component 806L may contain a bitmap containing pixels representing a black arrow surrounded by fully transparent pixels 895 (only a few of which are shown), which is suitable in case the other pixels 894 of the window 884 are also fully transparent pixels. In case the window 884 is configured as a semi-transparent window and the pixels 894 have a certain color (e-g- lightgray), then the black arrow is preferably surrounded by semi-transparent pixels 895 having that same color (e-g- lightgray). In case the window 884 is configured as a semi-transparent perforated bitmap or a semi-transparent perforated texture bitmap as described in more detail in the co-pending "perforated bitmap application(s)", the black arrow is preferably also surrounded by the same or similar perforated bitmap. In the latter case the object reposition routine should preferably locate the movable object 806L such that the perforated background of the movable image is aligned with the perforated bitmap of the window 884, which in case of a 2×2 checkerboard patterned bitmap may be implemented by positioning the movable object 806L, for example only at locations with even X and even Y coordinates, or only at locations with odd X and odd Y coordinates, depending on where or how the pattern of the pixels 894 is located.

Figure 8A:
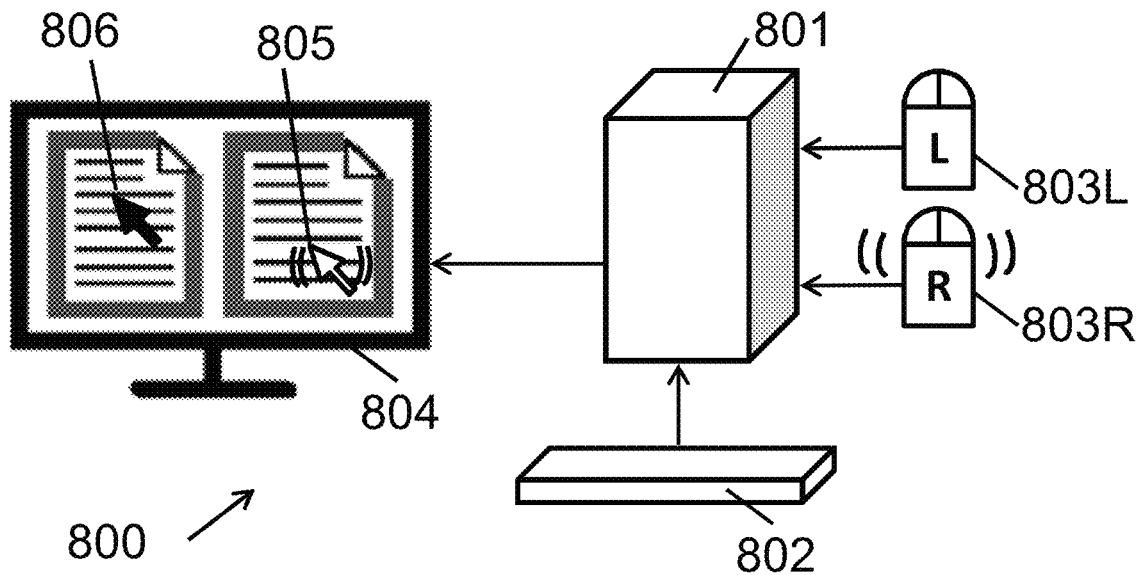
FIGS. 8(a) to 8(c) show a computer system according to an embodiment of the present invention, where a computer device is connected to a first and to a second pointer device, and is running an O/S and GUI providing a native mouse pointer/cursor (e-g- a white arrow), and is running an overlay application according to an embodiment of the present invention. The overlay application maintains a first pointer position in accordance with movements of the first pointer device (e.g. right mouse device), and maintains a second pointer position in accordance with movements of the second pointer device (e.g. left mouse device), and adjusts, e.g. overrides the position of the native mouse pointer/cursor in accordance with movements of the first pointer device (e.g. right mouse device). In addition, the overlay application provides a second visible object (e-g- a black arrow) which moves in accordance with movements of the second pointer device (e.g. left mouse device).

FIG. 8(a) shows movements of the first visible object 805 in accordance with movements of the first pointer device 803R.

Figure 8B:
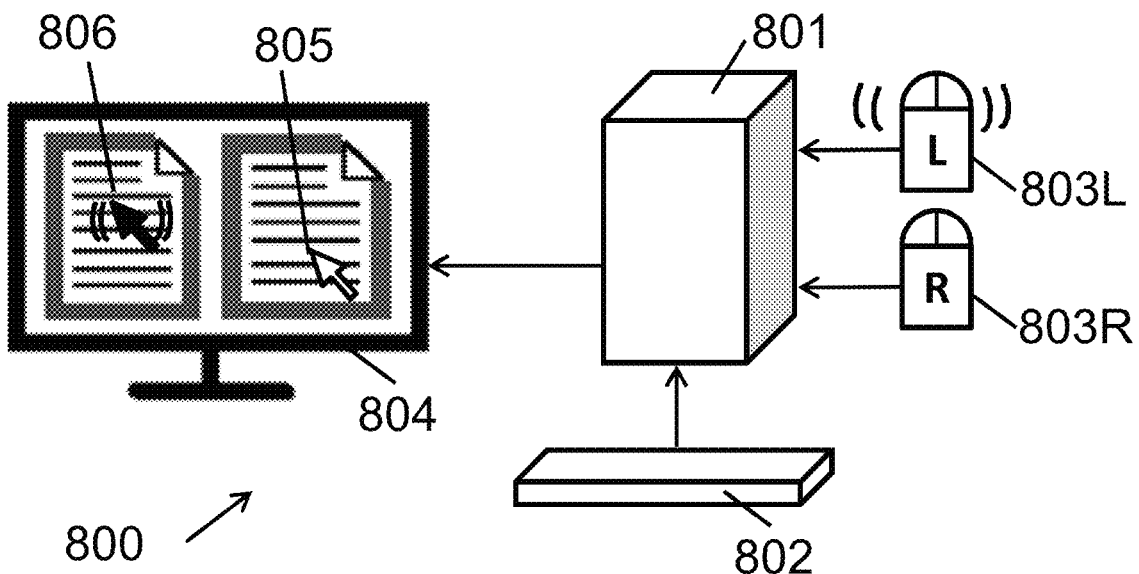

FIG. 8(b) shows movements of the second visible object 806 in accordance with movements of the second pointer device 803L. For reasons which will become clear further, in some embodiments of the present invention, the left mouse device 803L should only be moved, but not clicked or scrolled in the system 800. For that reason, the representation of the second visible object 806 in the form of an arrow may be confusing to a user, and a line or a rectangle or a square may be preferred as a visual indication of the second position, because it is intuitively clear that a line or square should not be clicked. In the system 800 the native mouse cursor 805 follows movements of the right mouse device 803R, and is therefore probably better suited for right handed people.

Figure 8C:
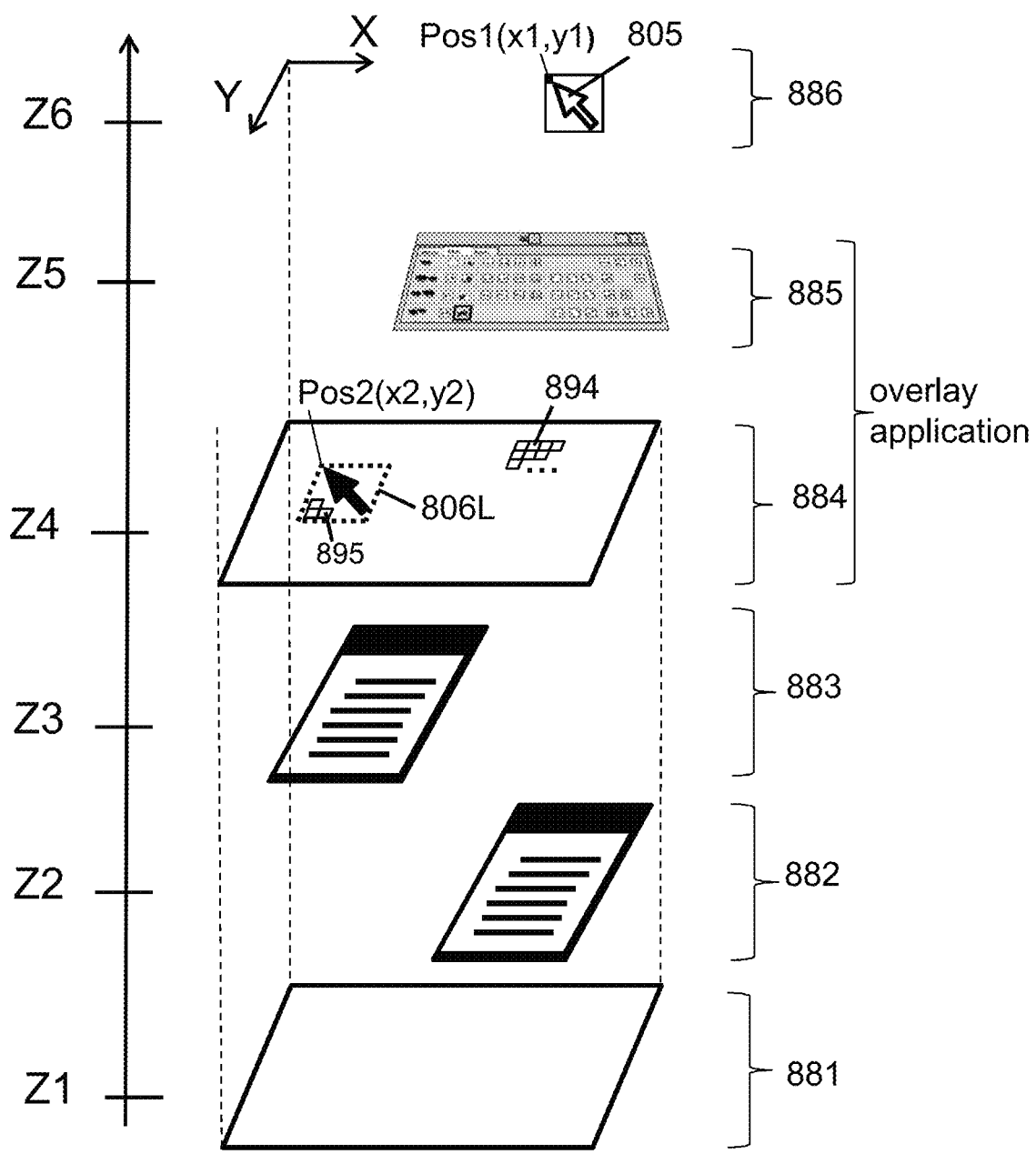
Figure 9A:
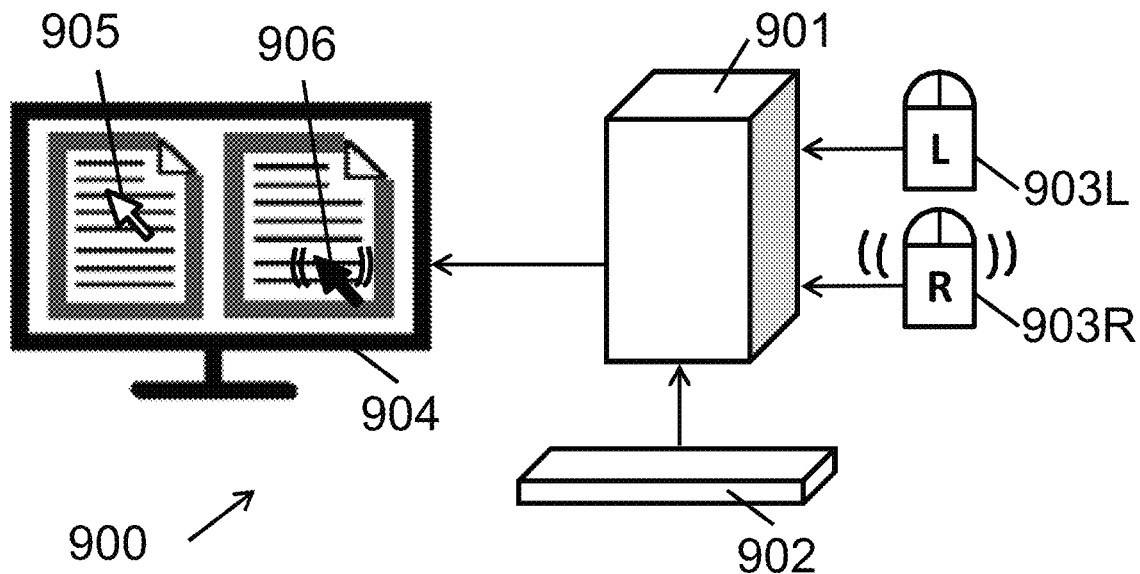
Figure 9B:
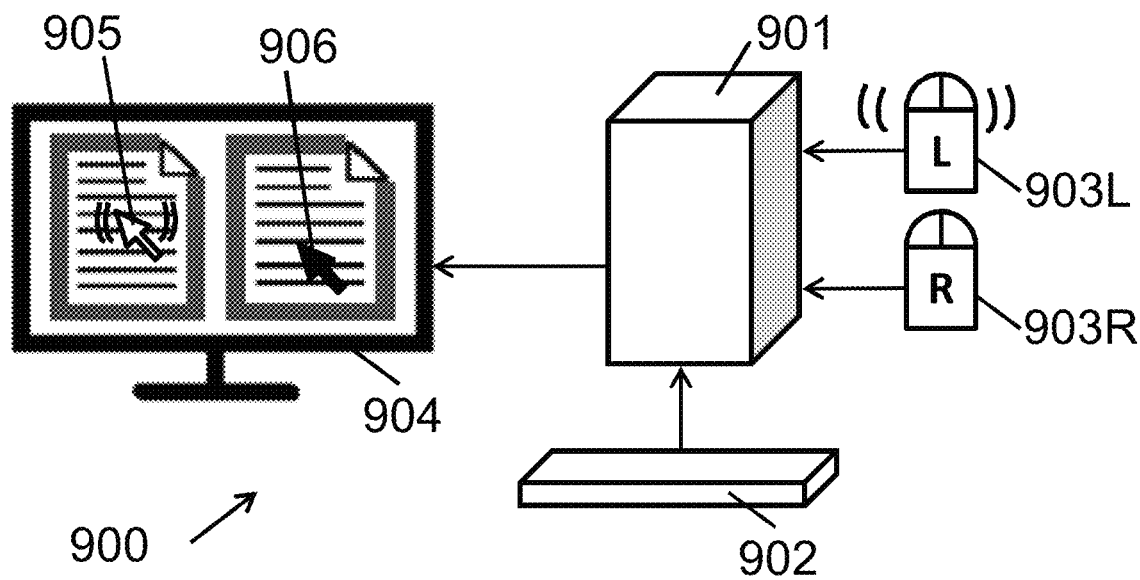

FIGS. 9(a) to 9(c) shows a computer system 900 according to an embodiment of the present invention which can be seen as a variant of the computer system 800 shown in FIGS. 8(a) to 8(c) where the native mouse cursor 905 follows movements of the left mouse device 903L. The embodiment of FIGS. 9(a) to 9(c) is therefore probably better suited for left-handed people. In this embodiment the black arrow 906 can be moved by the right pointer device 903R, but in some embodiments of the present invention, should not be clicked or scrolled.

FIG. 9(a) shows that the position of the black arrow 906 is adjusted in accordance with movements of the right pointer device 903R.

FIG. 9(b) shows that the position of the native mouse cursor 905 is adjusted in accordance with movements of the left pointer device 903L. Both arrows are visible on the screen at all times.

FIG. 9(c) shows an exemplary position update routine as part of a message handler routine, in pseudo-code, which can be used to obtain this behaviour. As can be seen, the first and second position Pos1, Pos2 are updated in accordance with movements of the first and second pointer device 903R, 903L respectively. In case the left pointer device 903L was moved, the position of the native mouse cursor 905 is adjusted accordingly. In case the left pointer device 903L was moved, the position of the native mouse cursor 905 is adjusted accordingly. In case the right pointer device 903R was moved, the position of the native mouse cursor 905 is forced back to the second position Pos2 maintained by the overlay application. Thus, the two arrows 905, 906 are individually movable by the two pointer devices.

Figure 10A:
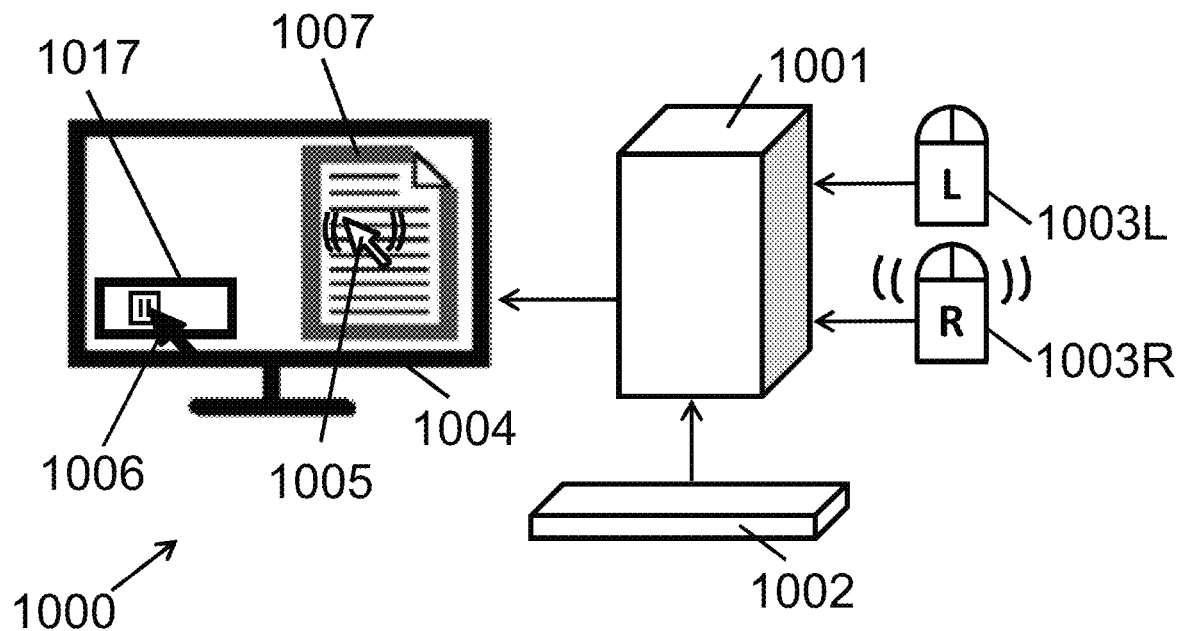
FIGS. 10(a) and 10(b) show a computer system according to an embodiment of the present invention, where a computer device is connected to a first and to a second pointer device, and is running an O/S and GUI providing a native mouse pointer/cursor (e-g- a white arrow), and is running an overlay application according to an embodiment of the present invention. The overlay application maintains a first pointer position in accordance with movements of the first pointer device (e.g. right mouse device), and maintains a second pointer position in accordance with movements of the second pointer device (e.g. left mouse device), and adapted, e-g- overrides the position of the native mouse pointer/cursor in accordance with movements of the pointer device which is most recently moved. In addition, the overlay application provides a second visible object (e-g- a black arrow) which assumes the other maintained position.
Figure 10B:
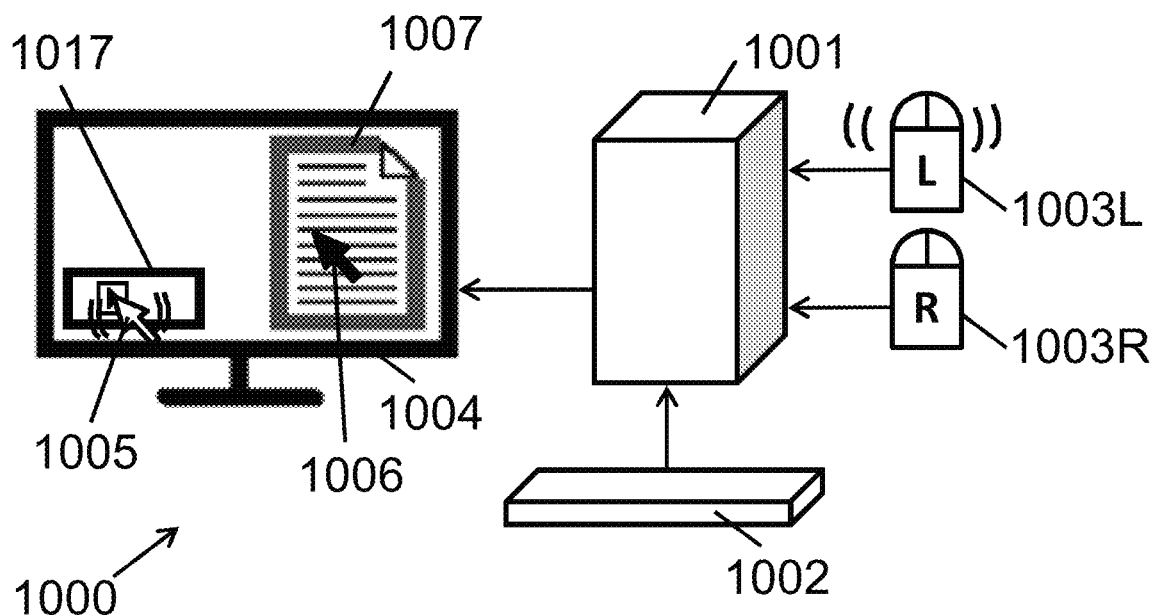

FIGS. 10(a) and 10(b) show a computer system 1000 according to another embodiment of the present invention, which can be seen as a variant of the computer system 700 of FIGS. 7(a) to 7(e) for aspects related to the positioning of the native mouse cursor 1005, and can be seen as a variant of the computer system 800 of FIGS. 8(a) to 8(c) and 900 of FIGS. 9(a) to 9(c) for aspects related to the shape of the second visible object 1006.

The computer system 1000 comprises a computer device 1001 connected to a first pointer device 1003R and to a second pointer device 1003L and connected to a display 1004. The computer device 1001 has at least one processor running an O/S and GUI providing a native mouse pointer/cursor 1005 (e-g- a white arrow), and running an overlay application according to an embodiment of the present invention. The overlay application maintains a first and a second pointer position Pos1, Pos2 in accordance with movements of the first and second pointer device 1003R, 1003L respectively, and adapted, e-g- overrides the position of the native mouse pointer/cursor 1005 in accordance with movements of the pointer device which is most recently moved.

FIG. 10(a) shows movements of the first visible object, being the native mouse pointer 1005, in accordance with movements of the first pointer device 1003R because this is the pointer device being moved, while the second visible object 1006 (e-g- a black arrow) assumes the other maintained position Pos2. In this situation, the user can press/release/click the buttons and/or move the scrollwheel of the first mouse pointer 1003R, for example to activate the text editor application, select text, add a comment, etc- FIG. 10(b) shows movements of the first visible object 1005 in accordance with movements of the second pointer device 1003L, which is the pointer device being moved, while the second visible object 1006 (e-g- a black arrow) assumes the other maintained position Pos1. In this situation, the user can press/release/click the buttons and/or move the scrollwheel of the second mouse pointer 1003L, for example to activate the audio player application 1017, to click on the play or pause button, etc- As can be appreciated from FIG. 10(a) and FIG. 10(b) the user can see both locations on the screen 1004, and work at two different locations on the screen, albeit not simultaneously, by merely moving the respective pointer device. The user can click on either mouse device or rotate the respective mousewheel after making sure that the native mouse cursor 1005 is at the desired maintained location Pos1 or Pos2, as visually indicated by the white arrow.

Figure 11:
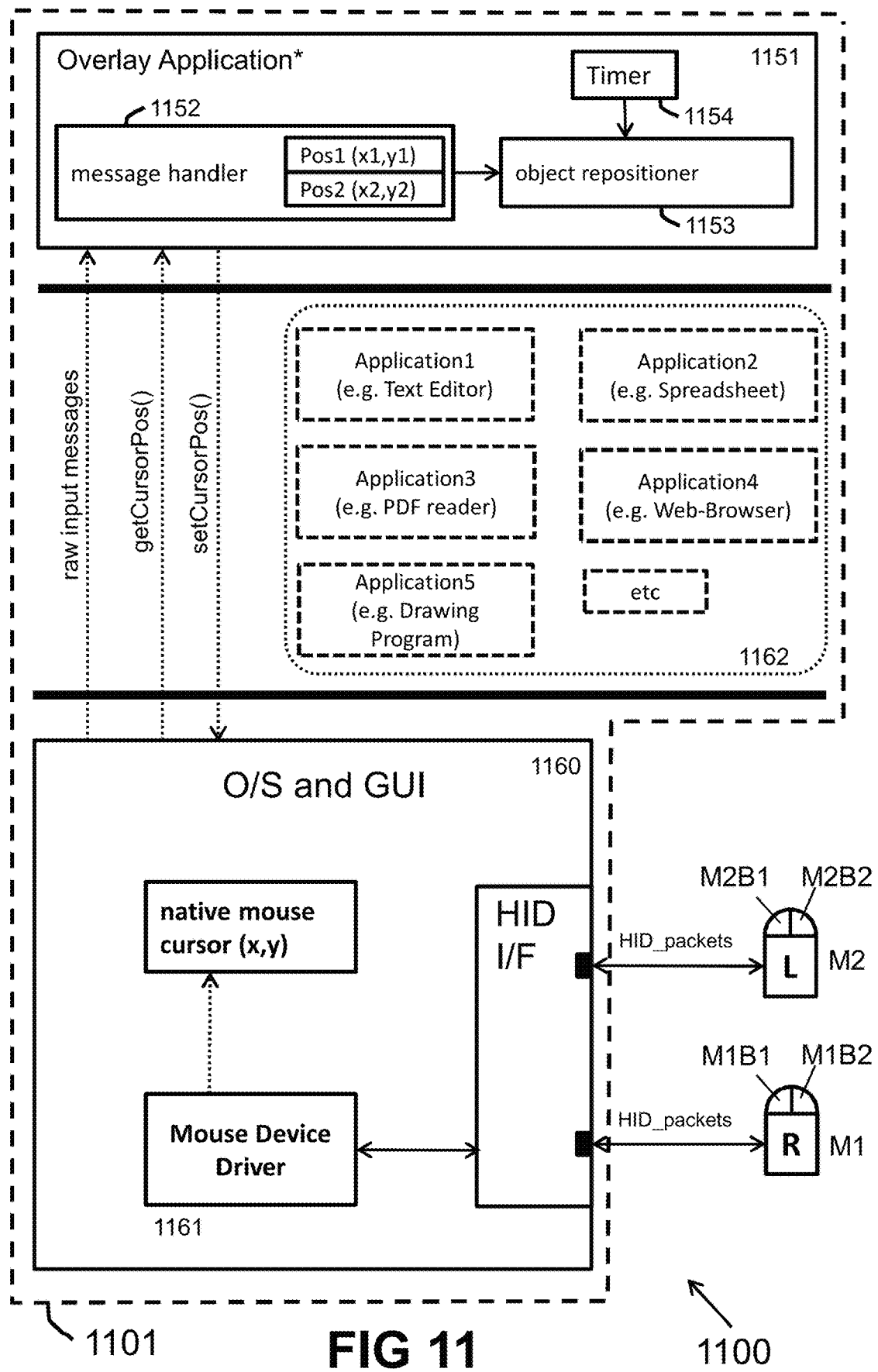
FIG. 11 shows a simplified high-level block diagram of hardware and software components situated in a computer system according to an embodiment of the present invention, the computer system comprising a computer device with a special overlay application according to an embodiment of the present invention, and two classical pointer devices directly connected to the computer device.

FIG. 11 shows a specific example of the simplified high-level block diagram of hardware and software components shown in FIG. 5(f) in case the pointer devices M1, M2 are HID compatible devices (abbreviation for "Human Interface Device"), and in case the computer device comprises a HID interface with at least two ports, as is typically the case inter alia for computer devices containing USB-interfaces. As is known in the art, such mouse devices send signals or messages to the computer device, e-g- in the form of HID packets, containing movement or displacement information dx, dy and/or information about a button being pressed or released, and/or information about a scrollwheel being rotated. In fact, the communication between the computer device and the mouse devices is bidirectional, but the overlay application does not have to deal with that part of the communication, which is therefore not discussed further.

As schematically indicated by the asterisk *, only the overlay application 1151 is new in FIG. 11, all other components (without asterisk) can be classical components, notably the pointer devices M1, M2, the operating system O/S and GUI 1160, the mouse device drivers 1161, and the other applications 1162. This again illustrates that the overlay application can be used to extend or enhance the functionality of an existing O/S and GUI which originally only provide a single native mouse cursor.

The mouse devices M1 and M2 can be wired mouse devices, or wireless mouse devices, or a combination of both.

Figure 12:
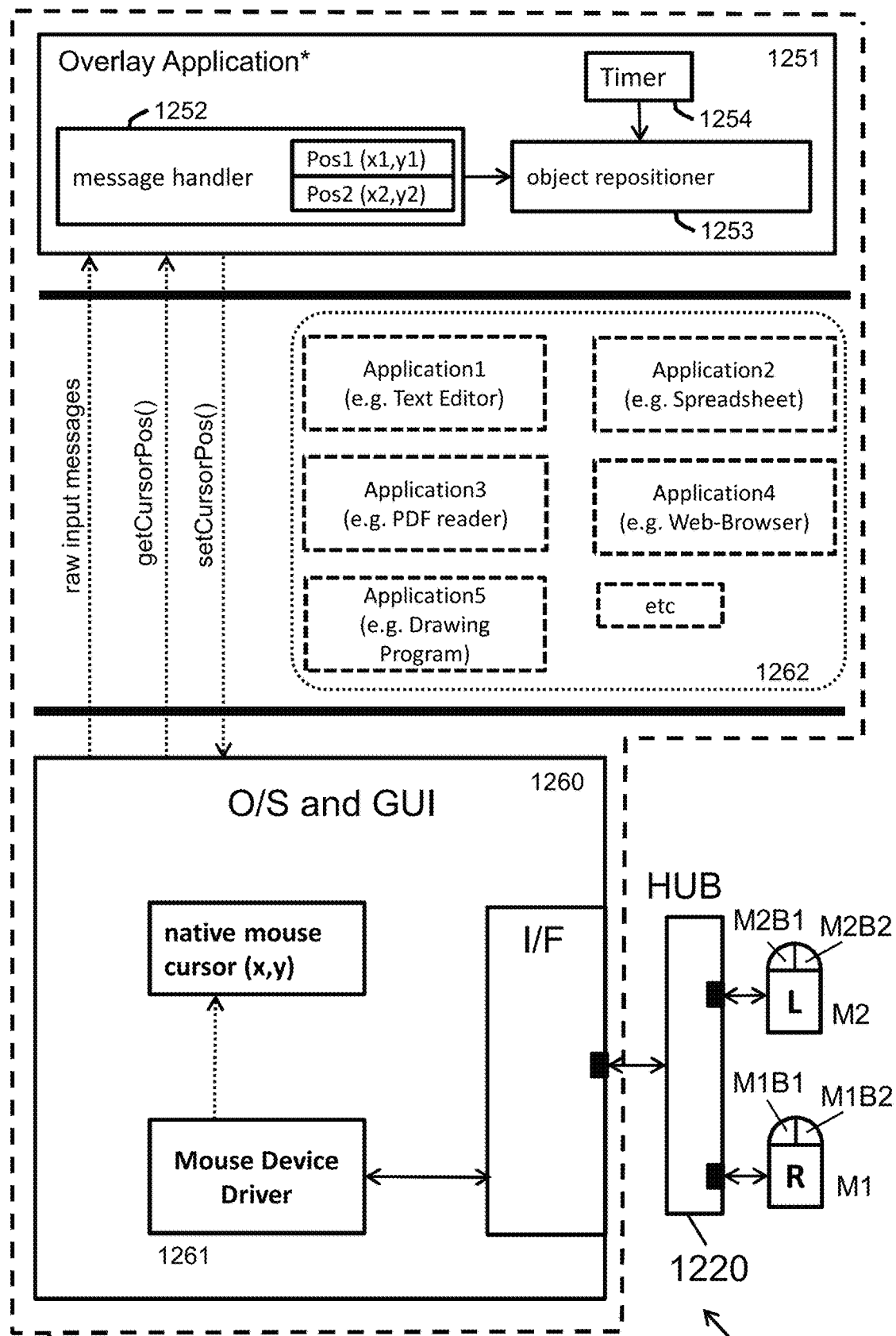
FIG. 12 shows a simplified high-level block diagram of hardware and software components situated in a computer system according to an embodiment of the present invention, the computer system comprising a computer device with a special overlay application according to an embodiment of the present invention, and two classical pointer devices connected to the computer device via a classical hub.

FIG. 12 shows a variant of the high-level block diagram of FIG. 11, where two classical pointer devices M1, M2 are connected to the computer device via a classical hub or adaptor or dongle 1220 instead of being connected directly to the computer device. The hub 1220 can be a wired hub, or a wireless hub. The interface may be a HID compatible interface, and the pointer devices may be HID compatible devices, but that is not absolutely required for the present invention to work.

FIG. 13 shows a few lines of pseudo-code illustrating a portion of a message handler capable of operating in one of three input modes, referred to herein as:

"BothHanded" (FIG. 13a) as explained in FIG. 7(c) where the native mouse cursor follows movements of the pointer device which is most recently moved, or "RightHanded" (FIG. 13b) as explained in FIG. 5(g) where the native mouse cursor follows movements of the right pointer device, and "LeftHanded" (FIG. 13c) as explained in FIG. 9(c) where the native mouse cursor follows movements of the left pointer device.

Some embodiments of an overlay application according to the present invention may implement (e-g-hardcode) only one of these input modes.

Other embodiments of an overlay application according to the present invention may implement two of these input modes, or all three of these input modes, and allow the user to select which input mode to use, for example explicitly, as shown in FIG. 31(a), by allowing a user to select a "Dominant mouse" in which case for example the display modes of group 2850 and 2870 (see e-g- FIG. 28) can be hidden, or implicitly by allowing the user to select any display mode of any group 2850 to 2870, in which case the application can change the corresponding input mode itself, if needed.

Figure 14A:
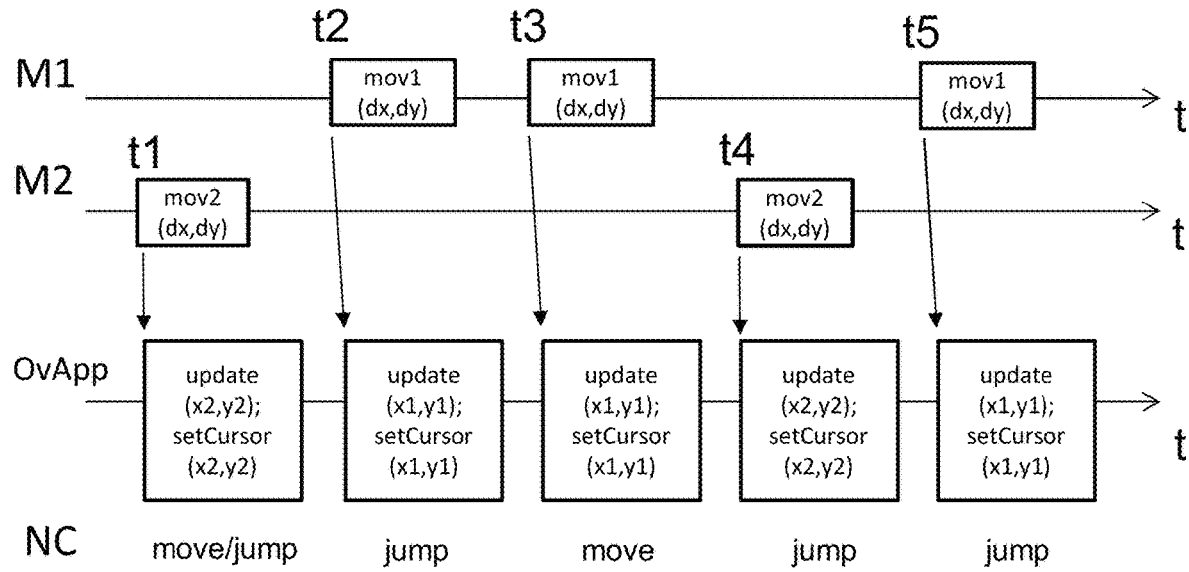
FIGS. 14(a) to 14(c) and FIG. 15 show exemplary sequences of signals or messages coming from two classical mouse devices, and show how these signals are satisfactorily handled by the first message handler process illustrated in FIG. 13.

FIG. 14(a) is a schematic representation of an exemplary sequence of signals or messages coming from two classical mouse devices M1, M2, and shows how these signals are correctly handled by the message handler process illustrated in FIG. 13, assumed to be configured in the "BothHanded" input mode. In reality there may be many more signals or messages exchanged between the computer device and the mouse devices, but these are not shown in order not to overload the drawings. Also, FIG. 14 only shows how the position of the native mouse cursor NC is updated, and does not explicitly mention how the position of the second and/or further visible object is updated, again, not to overload the drawings.

At time t1 mouse device M2 is moved and sends a movement message mov2 to the computer device, and in response the overlay application updates Pos2 and sets the position of the native mouse cursor NC to Pos2. Depending on where the native mouse cursor was located before t1, this may appear to the user as a small move or as a jump. At time t2 mouse device M1 is moved and sends a movement message mov1 to the computer device, and in response the overlay application updates Pos1 and sets the position of the native mouse cursor NC to Pos1, which will typically appear to the user as a "jump" from Pos2 to Pos1.

At time t2 mouse device M1 is moved and sends a movement message mov1 to the computer device, and in response the overlay application updates Pos1 and sets the position of the native mouse cursor NC to Pos1, which will typically appear to the user as a "jump" from Pos2 to Pos1.

At time t3 mouse device M1 is moved again and sends a movement message mov1 to the computer device, and in response the overlay application updates Pos1 and sets the position of the native mouse cursor NC to Pos1, which will typically appear to the user as a small move.

At time t4 mouse device M2 is moved and sends a movement message mov2 to the computer device, and in response the overlay application updates Pos2 and sets the position of the native mouse cursor NC to Pos2, which will typically appear to the user as a "jump" from Pos1 to Pos2.

At time t5 mouse device M1 is moved and sends a movement message mov1 to the computer device, and in response the overlay application updates Pos1 and sets the position of the native mouse cursor NC to Pos1, which will typically appear to the user as a "jump" from Pos2 to Pos1.

Figure 14B:
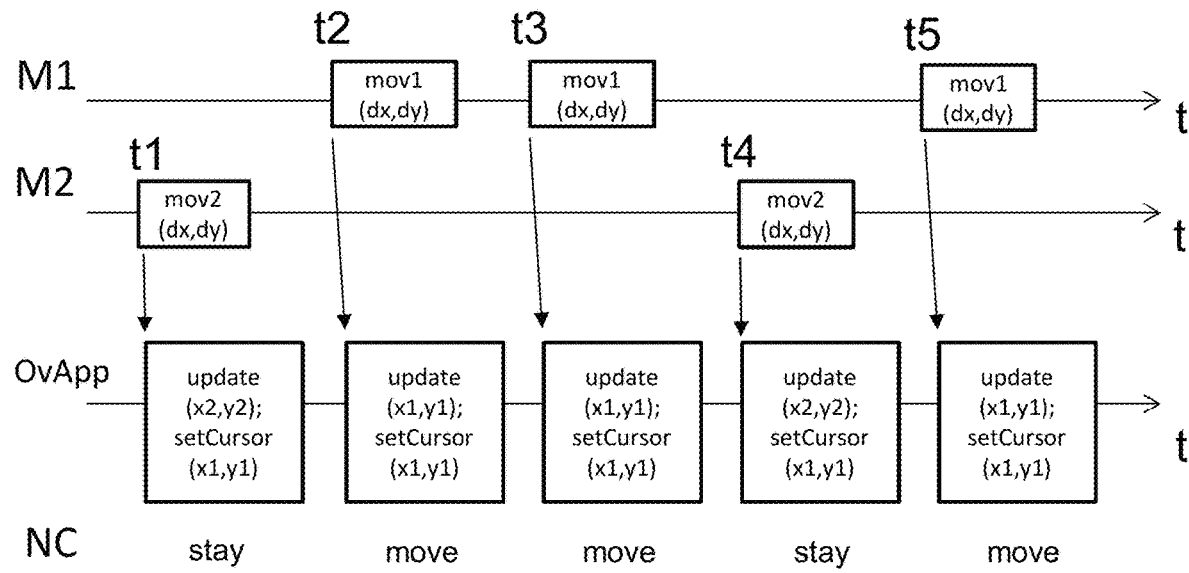

FIG. 14(b) shows the same sequence of signals or messages as in FIG. 14(a), and shows how an overlay-application having the message handler of FIG. 13 would update the position NC of the native mouse cursor, when configured in the input mode "RightH". As can be seen, when the right pointer device M1 is moved the first position Pos1 is updated, and when the second pointer device M2 is moved the second position Pos2 is updated, but in all of these cases the position of the native mouse cursor NC is set to the first position Pos1, associated with movements of the right pointer device M1.

Figure 14C:
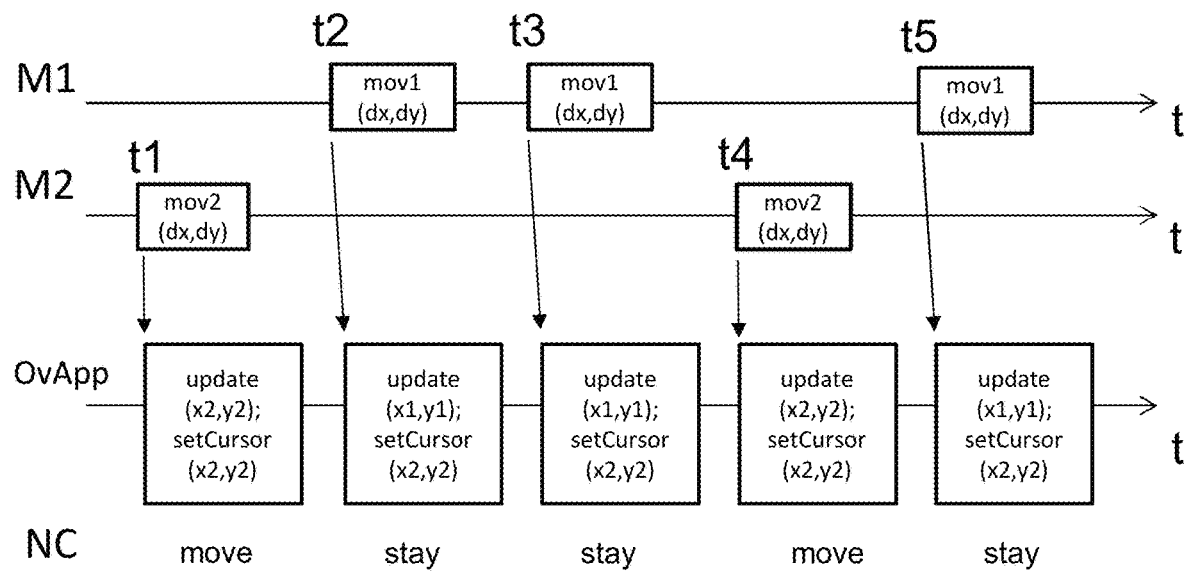

FIG. 14(c) shows the same sequence of signals or messages as in FIG. 14(a), and shows how an overlay-application having the message handler of FIG. 13 would update the position NC of the native mouse cursor, when configured in the input mode "LeftH". As can be seen, when the right pointer device M1 is moved the first position Pos1 is updated, and when the second pointer device M2 is moved the second position Pos2 is updated, but in all of these cases the position of the native mouse cursor NC is set to the second position Pos1, associated with movements of the left pointer device M2.

As can be appreciated from FIG. 14(a) to FIG. 14(c), movements of both mouse devices M1, M2 are handled correctly, even simultaneous movements of the two mouse devices M1, M2.

FIG. 15(a) is a schematic representation of another exemplary sequence of signals or messages coming from two classical mouse devices M1, M2, and shows how these signals are correctly handled by the message handler process illustrated in FIG. 13, assumed to be configured in the "BothHanded" input mode.

At time t1 mouse device M1 is moved and sends a movement message mov1 to the computer device, and in response the overlay application updates Pos1 and sets the position of the native mouse cursor NC to Pos1. Depending on where the native mouse cursor NC was located before t1, this may appear to the user as a small move or as a jump.

At time t2 mouse device M2 is moved and sends a movement message mov2 to the computer device, and in response the overlay application updates Pos2 and sets the position of the native mouse cursor NC to Pos2, which will typically appear to the user as a jump from Pos1 to Pos2.

At time t3 a button (e-g- a left button M2B1) of the second mouse device M2 is pressed and the mouse device M2 sends a button-press message press2 to the computer device. The message handler of the overlay application receives the message, but since it is not a movement message, step h) of FIG. 5(e) is skipped, and the overlay application does not update Pos1 or Pos2, but lets the O/S and GUI and/or the respective underlying application handle the button M2B1 being pressed.

At time t4 the button M2B1 of the second mouse device M2 is released and the second mouse device M2 sends a button-release message release2 to the computer device, and again the overlay application does not change any position, but lets the O/S and GUI and/or the respective underlying application handle the button being released. As is known in the art, under some conditions the O/S will consider the button press and button release as a so called "mouse click".

At time t5 mouse device M1 is moved and sends a movement message mov1 to the computer device, and in response the overlay application updates Pos1 and sets the position of the native mouse cursor NC to Pos1, which will typically appear to the user as a jump from Pos2 to Pos1.

Figure 15:
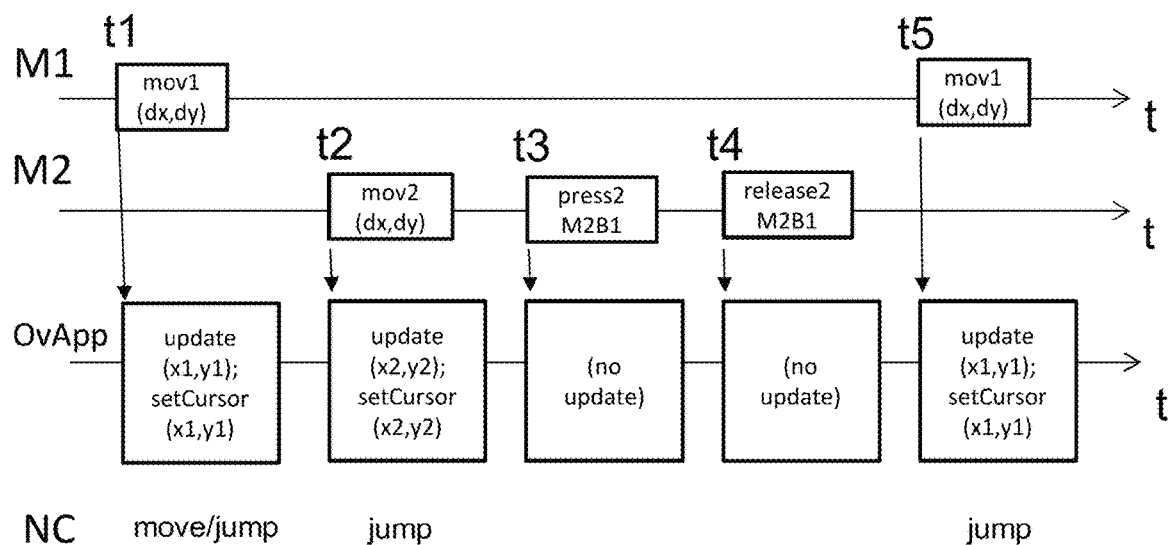

As can be appreciated from FIG. 15, the "click" on a button M2B1 of the second mouse M2, is handled correctly by the message handler of FIG. 13 configured in the BothHanded input mode, despite movements of the first mouse M1 before and after the click.

In a variant of FIG. 15 (not shown) the mouse M2 is moved after pressing the button M2B1 at time t3 and before releasing the button M2B1 at time t4. In this case the position update routine will update the position of the native mouse cursor, which has the effect of dragging. Also dragging operations work well with the message handler of FIG. 13.

Figure 16:
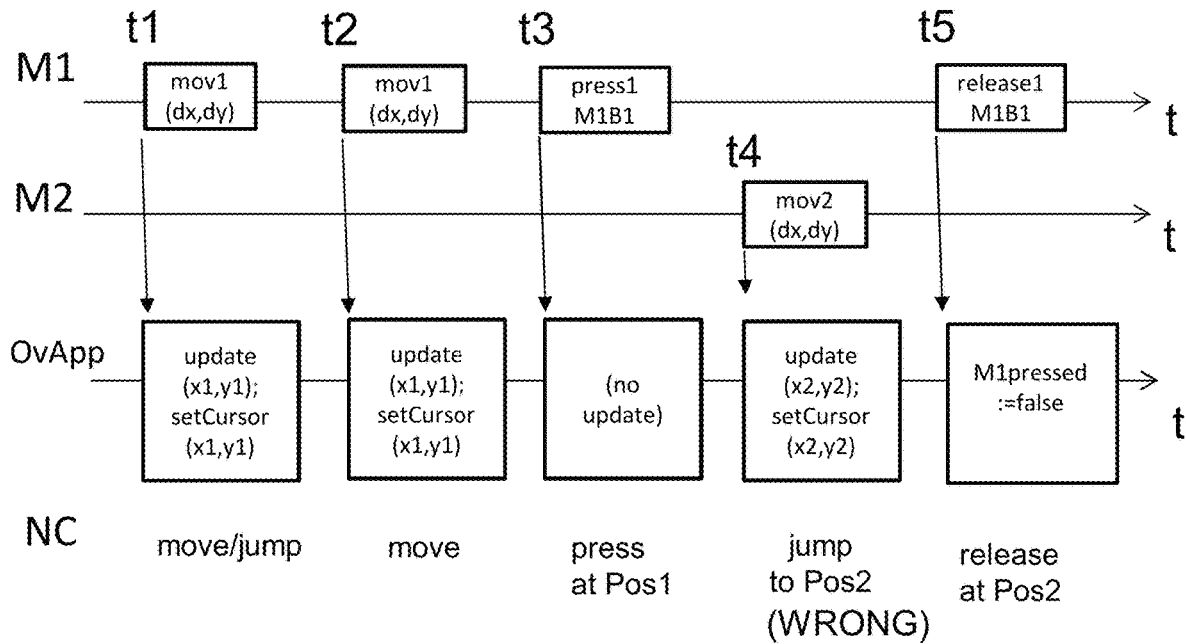
FIG. 16 and FIG. 17 show two exemplary sequences of signals or messages coming from two classical mouse devices, and show how these signals are unsatisfactorily handled by the message handler process illustrated in FIG. 13.

Tests with further sequences have shown however that the message handler of FIG. 13 does not always provide the expected behaviour. Closer investigation revealed inter alia that the exemplary sequence of signals or messages shown in FIG. 16 is unsatisfactorily handled.

At time t1 mouse M1 is moved and sends a movement message mov1 to the computer device, and in response the message handler updates the first position Pos1 and positions the native mouse cursor accordingly. Likewise at time t2.

At time t3 a button (e-g- a left button M1B1) of the first mouse device M1 is pressed and the mouse sends a button-press message press' to the computer device, for which the message handler of FIG. 13 takes no action.

At time t4 the second mouse device M2 is moved and sends a movement message mov2 to the computer device, and in response the message handler of FIG. 13 repositions the native mouse cursor NC to the second maintained position Pos2.

At time t5 the button M1B1 of the first mouse device M1 is released and the mouse device M1 sends a button-release message release1 to the computer device, but the O/S considers this release to take place at Pos2 which is usually different from Pos1, not resulting in the expected "click" behaviour of the first mouse M1, but in a "dragging"-behaviour. This is not the intended behaviour.

Figure 17:
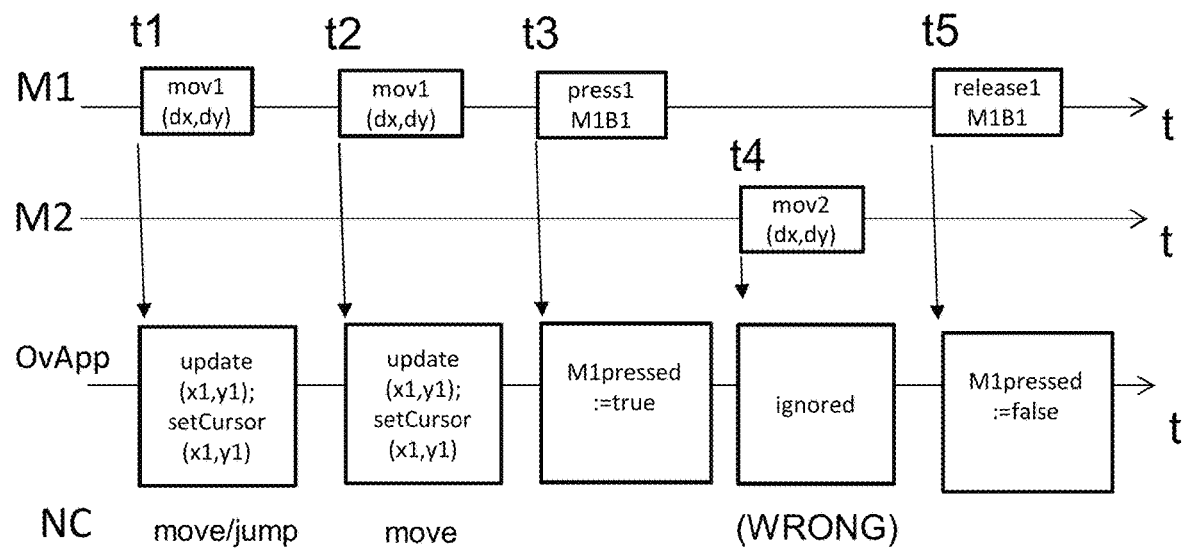

In first attempt to solve this problem, the message handler of FIG. 13 was modified by adding and maintaining two variables, a boolean variable M1pressed indicative of a button of the first mouse device M1 being pressed or released, and a variable M2pressed indicative of a button of the second mouse device M2 being pressed or released, and by not reacting on the movement signal mov2 sent by the second mouse M2 at t4 during the time a button of the first mouse M1 was pressed, as shown in FIG. 17, but for some reason this modified message handler did not provide the correct result either.

In a second attempt to solve this problem, the message handler of FIG. 13 was modified further, but instead of ignoring the "mov2" signal (as in FIG. 17), the message handler was changed to actively reposition the native mouse cursor NC to the same position Pos1 where the native mouse cursor was located at time t3 when the button was being pressed. Tests have shown that such message handler works for a "click" on a button of the first mouse M1, but does not work when the first mouse M1 is being "dragged". Rather than (at t4) freezing the position Pos1 to the same position as where the native mouse cursor NC was located when the button was pressed (at t3), the position of the native mouse cursor NC was allowed to move along with movements of the first mouse M1, even when a button of the same device M1 was being pressed.

FIG. 18(a) shows a few lines of pseudo-code, illustrating a portion of an improved message handler routine to implement this behaviour. (only a portion of the BothHanded input mode is shown).

FIG. 18(b) shows a variant of the routine of FIG. 18(a), as can be used in overlay applications according embodiments of the present invention. (again, only a portion of the BothHanded input mode is shown). The main differences with the routine of FIG. 18(a) is that the second position Pos2 is updated even if the a button of the first pointer device is pressed, and vice versa, that the first position Pos1 is updated even if the a button of the second pointer device is pressed. This routine will be discussed further when discussing FIG. 26(a) and FIG. 26(b).

FIG. 18(c) shows a more complete version of a position-update routine, as can be used in overlay applications according embodiments of the present invention. It can be seen as a combination of the code portions shown in FIG. 5(g) and in FIG. 9(c) and in FIG. 18(a).

Figure 19:
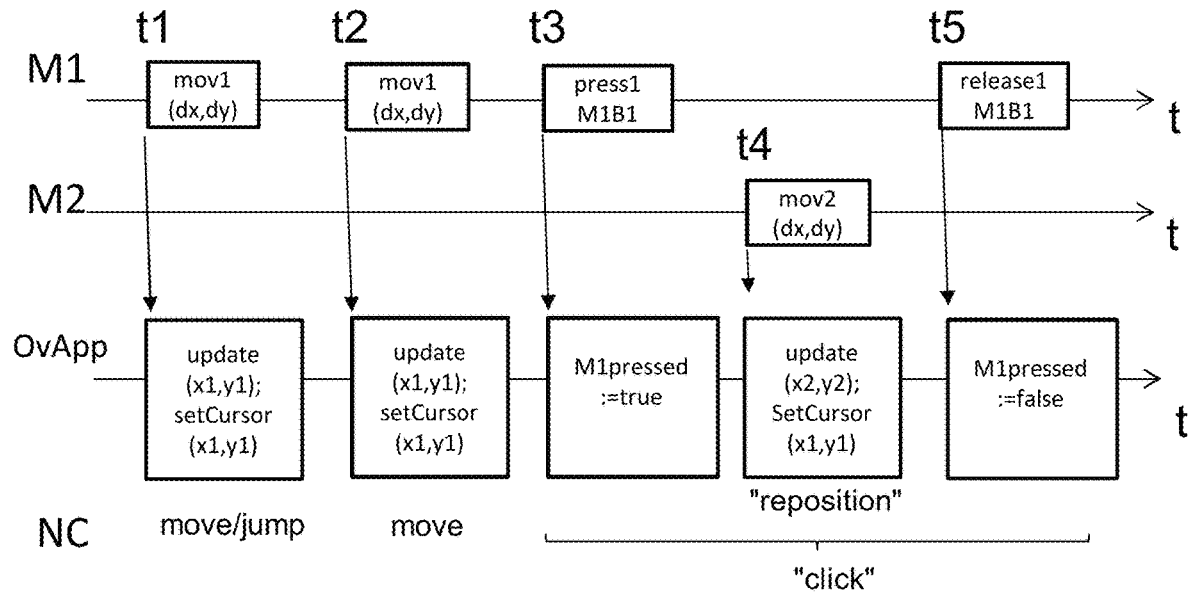
FIG. 19 and FIG. 20 show two exemplary sequences of signals or messages coming from two classical mouse devices, and show how these signals are satisfactorily handled by the second message handler process illustrated in FIG. 18(a).

FIG. 19 shows the same exemplary sequence of signals or messages of FIG. 16, but processed by the message handler of FIG. 18(a). As can be seen, in response to the movement signal mov2 of the second mouse M2 at time t4, the improved message handler of FIG. 18(a) does update the second position Pos2 in accordance with the movement signal mov2, but actively repositions the native mouse cursor to Pos1, so that at time t5, the button M1B1 of the first mouse device M1 is considered to be released at the same position Pos1 as where it was pressed. The O/S interprets this as a "click" of the button M1B1 of the mouse device M1, which is satisfactorily handled, despite the movement signal "mov2" of the second mouse M2 at time t4. It is noted that the update of Pos2 at t4 is not required for the correct interpretation of the click-command sent by the first pointer device M1, and may be omitted. But if omitted, the visible object(s) associated with the second position Pos2 will not move as long as a button of the first pointer device M1 is being pressed, even if the second pointer device is being moved. To allow such movements, the position Pos2 is preferably updated even if a button of the first pointer device is being pressed.

Figure 20:
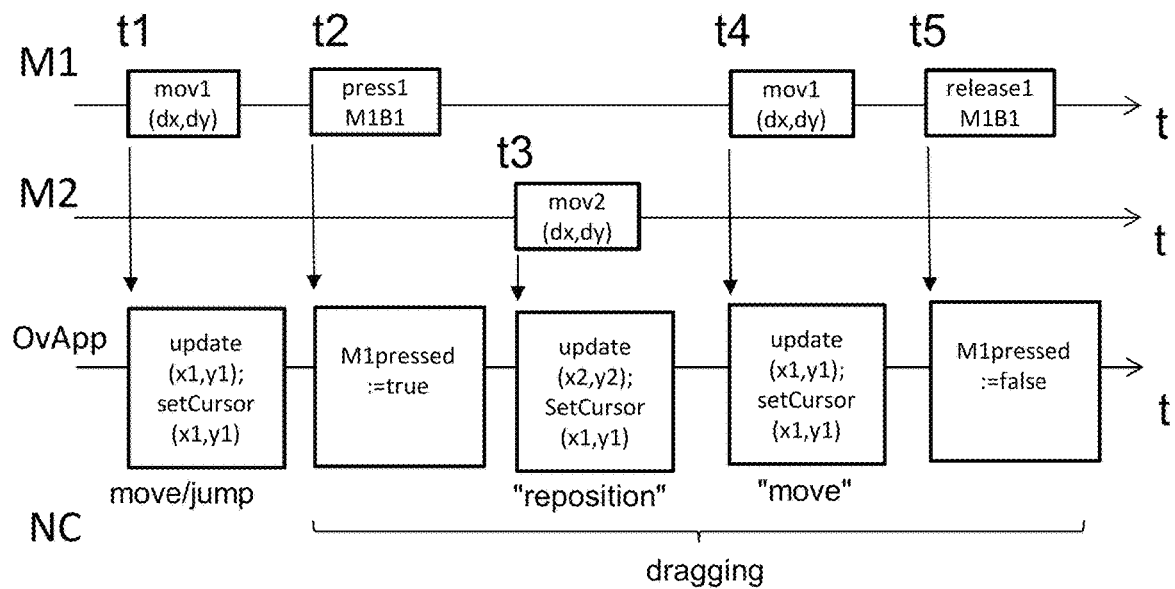

FIG. 20 shows a variant of the sequence of signals or messages of FIG. 19, showing that dragging of one mouse M1 works correctly even when the second mouse M2 is moved.

At time t1 the first mouse M1 is moved, the first mouse M1 sends a first movement message mov1 to the computer device, and in response the overlay application updates Pos1 and positions the native mouse cursor NC at Pos1.

At time t2 a button (e-g- a left button M1B1) of the first mouse M1 is pressed, the first mouse M1 sends a button-press message press1 to the computer device, and in response the message handler of the overlay application sets an internal variable M1pressed to TRUE.

At time t3 the second mouse M2 is moved, the second mouse M2 sends a second movement message mov2 to the computer device, and in response the message handler updates Pos2 and positions the native mouse cursor NC at Pos1.

At time t4 the first mouse M1 is moved, the first mouse M1 sends a first movement message mov1 to the computer device, and in response the overlay application updates Pos1 and positions the native mouse cursor NC at Pos1.

At time t5 the button M1B1 of the first mouse device M1 is released, causing the O/S and GUI to perform a "dragging operating", and in response the message handler sets the variable M1pressed to FALSE.

As can be appreciated from FIG. 20, dragging the first mouse M1 is satisfactorily handled by the message handler illustrated in FIG. 18(a) configured in the BothHanded input mode, even in combination with movements of the second mouse M2.

Figure 21:
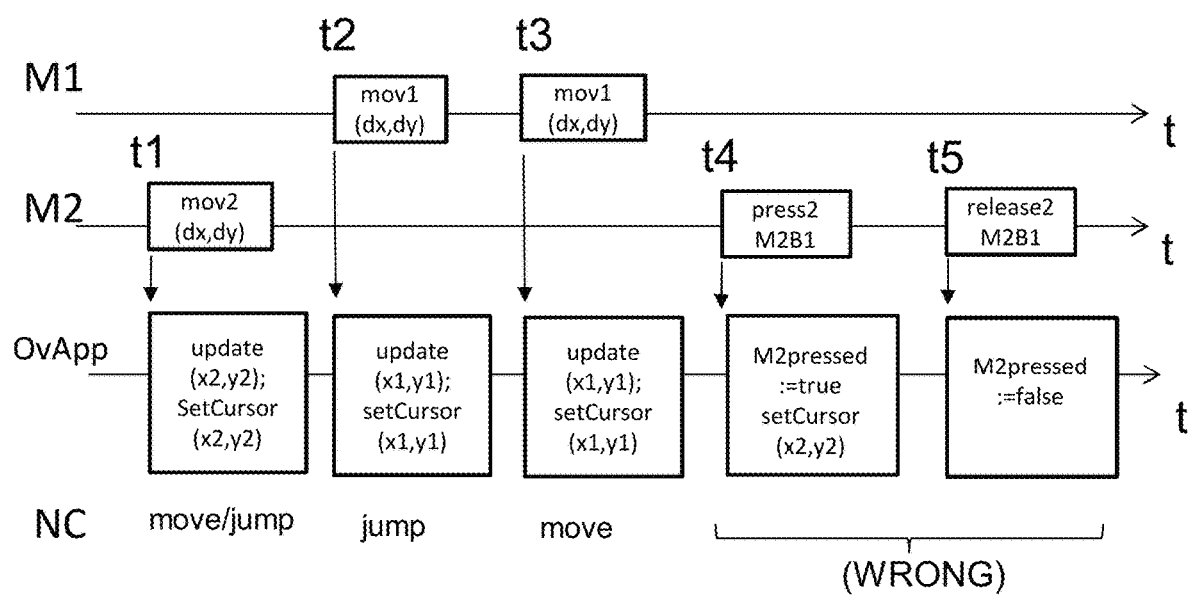
FIG. 21 shows an exemplary sequence of signals or messages coming from two classical mouse devices, and shows how these signals are unsatisfactorily handled by the second message handler process illustrated in FIG. 18(a).

Referring to FIG. 21, further tests were performed using the message handler of FIG. 18(a) in the BothHanded input mode, which revealed yet another fault-condition, illustrated by the exemplary sequence of signals or messages shown in FIG. 21, where:

At time t1 the second mouse M2 is moved, a movement-message mov2 is sent, the second position Pos2 is updated taking into account the displacement values dx, dy, and the native mouse cursor is set to Pos2.

At time t2 the first mouse M1 is moved, a movement-message mov1 is sent, the first position Pos1 is updated taking into account the displacement values dx, dy, and the native mouse cursor is set to Pos1.

At time t3 the first mouse M1 is moved again, another movement-message mov1 is sent, the first position Pos1 is updated, and the native mouse cursor NC is set to the updated position Pos1.

At time t4 a button (e-g- a left button M2B1) of the second mouse device M2 is pressed, a button-press message press2 is sent, and in response the message handler of FIG. 18(a) sets the value M2pressed to TRUE, and changes the position of the native mouse cursor NC to Pos2.

At time t5 the button M2B1 of the second mouse device M2 is released, a release-message release2 is sent to the computer device, and in response the message handler sets the variable M2pressed to FALSE.

Despite the fact that a button of the second mouse device M2 was pressed and released at the same physically location, the press and release messages of FIG. 21 are strangely enough mostly not interpreted as a click. While the inventors do not wish to be bound by any theory, analysis seems to indicate that this sequence goes wrong, because at the moment t4 at which the button M2B1 of the second mouse M2 is pressed, the native mouse position NC was still at the first position Pos1(x1,y1), and therefore the O/S and GUI will assume the "button-press" to take place at the location Pos1(x1,y1) instead of Pos2, and only some time later (than t4) the overlay application will reposition the native mouse cursor NC to the second position Pos2(x2,y2), but that is "too late". This problem is not known in the art, because there is only one cursor position.

No technical solution for this problem seems possible, because it is impossible for the overlay application to predict when a button of the mouse M2 will be pressed, and because the O/S and GUI will always be faster than the overlay application. Desiring to leave the mouse driver layer 561, 1161, 1261 of the O/S and GUI intact, the inventors surprisingly came up with another solution to address this problem.

Figure 22A:
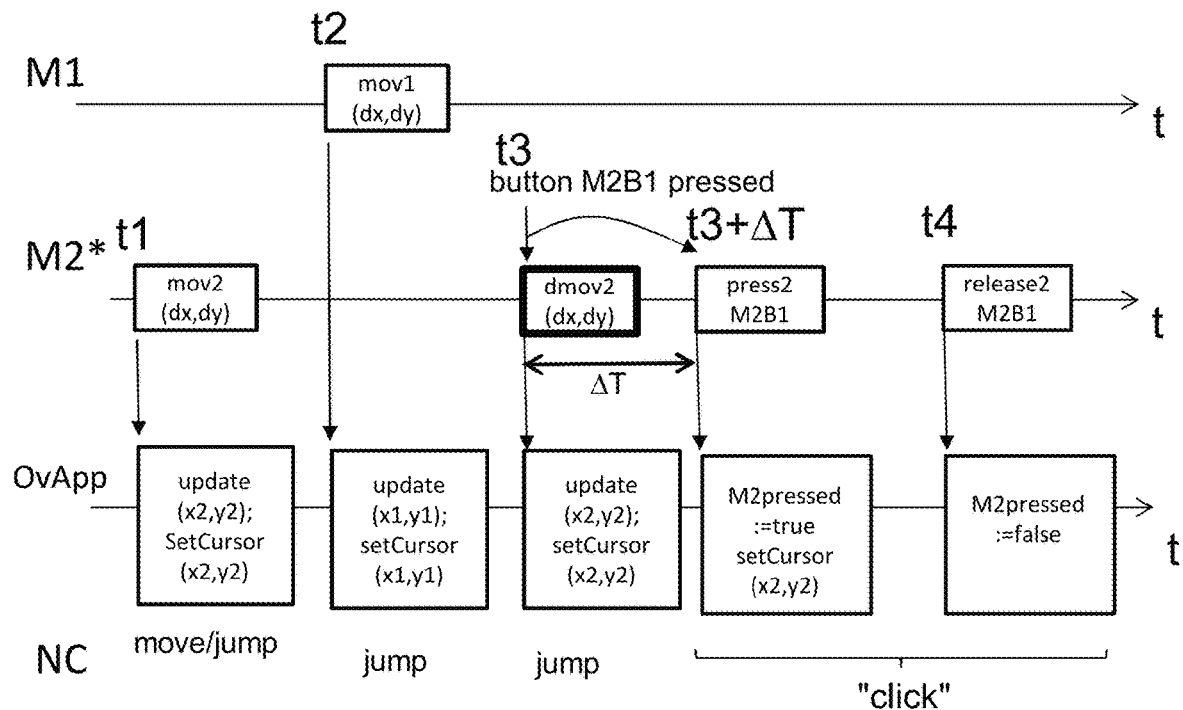
FIG. 22(a) and FIG. 22(b) show two exemplary sequences of signals coming from two special pointer devices according to an embodiment of the present invention, and show how these signals or messages are satisfactorily handled by the second message handler process illustrated in FIG. 18(a).

Referring to FIG. 22(a), the inventors decided to provide a special mouse device M2* which, upon a button thereof being pressed, sends a "dummy move" signal some time ΔT before sending an actual "button-press" signal. This effectively circumvents the problem of FIG. 21, because, as can be understood from FIG. 22(a):

At time t1 the second mouse M2* is moved, a (real) movement message mov2 is sent to the computer device, in response the overlay application updates the second position Pos2 and sets the native mouse cursor NC at position Pos2.

At time t2 the first mouse M1* is moved, a (real) movement message mov1 is sent to the computer device, in response the overlay application updates the first position Pos1 and sets the native mouse cursor NC at position Pos1.

At time t3 a button (e-g- a left button M2B1) of the special second mouse device M2* is pressed, causing the mouse device M2* to first send a dummy-movement message "dmov2" (preferably with small displacement values dx,dy), and to send some time ΔT later a button-press message press2. As shown, in response to the dummy-movement signal dmov2, the overlay application will set the native mouse cursor NC at the second position Pos2, well before the button-press message press2 is sent by the mouse device M2* at time t3+?T, such that the O/S and GUI will assume the "button press" takes place at position Pos2 (or more precise: very close to the original position Pos2, if dx and dy are small, but not exactly zero).

At time t4 the button M2B1 is released, and in response the message handler of the overlay application sets a variable M2pressed to FALSE.

It is noted that a dummy-movement message is not absolutely required when the button is released, only when a button is pressed, in this example at least. In practice it is safer, however, to also send a dummy movement message when a button is released, just in case the other pointer device would be moving in the meantime.

Figure 22B:
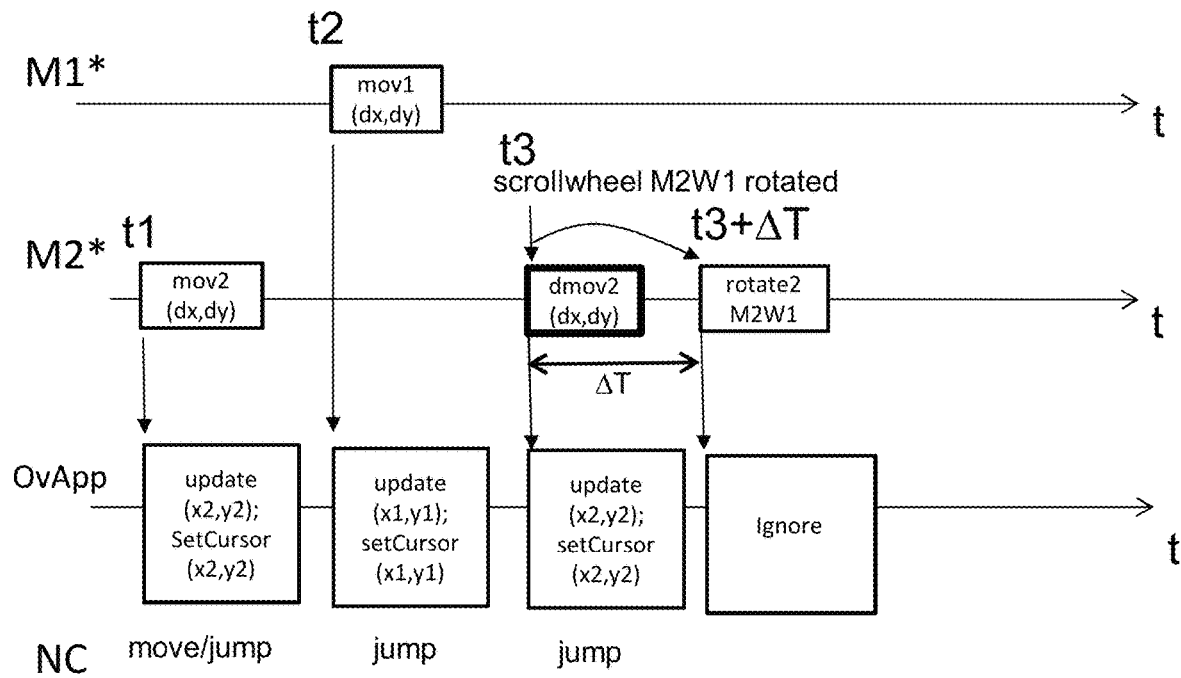

FIG. 22(b) shows a variant of the sequence of FIG. 22(a) where a scrollwheel of the second pointer device M2* is rotated instead of a button being pressed and released. In a similar manner as described in FIG. 22(a), the special pointer device M2* does not merely send a scrollwheel-rotation message, but first sends a dummy movement message dmov2, and only some time ΔT later the pointer device M2* sends the actual scrollwheel rotation message rotate2, in order to allow the overlay application to reposition the native mouse cursor NC before the actual scrollwheel rotation message arrives at the computer device, In FIG. 22(b) a scrollwheel of the pointer device M2* is physically being rotated at time t3, upon which the pointer device M2* sends a dummy movement message dmov2 to the computer device. In response the overlay application (configured in BothHanded input mode) will update the second position Pos2 and will set the native mouse cursor at Pos2.

At time t3+ΔT, the pointer device M2* sends a scroll-wheel-rotation message rotate2, which the overlay application can simply ignore, because this message will be handled by the O/S and GUI.

While the solution proposed in FIG. 22(a) and FIG. 22(b) requires a special mouse device, it is an advantage that this special mouse behaviour does not require a hardware modification, only a firmware modification of the mouse device.

It is also an advantage that the proposed solution is backwards compatible, in the sense that this "special mouse" with the "move-before-click" feature and/or with the "move-before-scroll" feature can also be used in classical computer systems, not having the special overlay application. The main difference with existing mouse devices is that the button-press signal and/or the scrollwheel-rotation-signal is slightly delayed, which is probably totally unacceptable in the gaming world, and already for that reason is not obvious, but this does not cause a significant problem for professional users such as translators, proofreaders, transcribers, technical writers, attorneys, etc- who are used to working with tools (e-g- CAT tools, local or on-line dictionaries, local or on-line databases, local or on-line Translation Memories, etc-) having relatively slow response times anyway (typically in the order of at least 500 ms).

There is some design freedom in the choice of the three parameters $\Delta T$, dx, dy.

In an embodiment, the delay $\Delta T$ is a value in the range from 1 ms to 250 ms or from 2 ms to 100 ms, and dx is a value in the range from −5 to +5, and dy is a value in the range from −5 to +5.

In an embodiment, the delay $\Delta T$ is a value in the range from 1 ms to 250 ms or from 2 ms to 100 ms, and dx is a value in the range from −2 to +2, and dy is a value in the range from −2 to +2.

In an embodiment, the delay $\Delta T$ is a value in the range from 1 ms to 250 ms or from 2 ms to 100 ms, and dx is a value in the range from −1 to +1, and dy is a value in the range from −1 to +1.

In an embodiment, the delay $\Delta T$ is a value in the range from 1 to 250 ms or from 2 ms to 100 ms, and dx=−1 and dy=−1.

In an embodiment, the delay $\Delta T$ is a value in the range from 1 to 250 ms or from 2 ms to 100 ms, and dx=−1 and dy=0.

In an embodiment, the delay $\Delta T$ is a value in the range from 1 to 250 ms or from 2 ms to 100 ms, and dx=−1 and dy=+1.

In an embodiment, the delay $\Delta T$ is a value in the range from 1 to 250 ms or from 2 ms to 100 ms, and dx=0 and dy=−1.

In an embodiment, the delay $\Delta T$ is a value in the range from 1 to 250 ms or from 2 ms to 100 ms, and dx=0 and dy=0.

In an embodiment, the delay $\Delta T$ is a value in the range from 1 to 250 ms or from 2 ms to 100 ms, and dx=0 and dy=+1.

In an embodiment, the delay $\Delta T$ is a value in the range from 1 to 250 ms or from 2 ms to 100 ms, and dx=+1 and dy=−1.

In an embodiment, the delay $\Delta T$ is a value in the range from 1 to 250 ms or from 2 ms to 100 ms, and dx=+1 and dy=0.

In an embodiment, the delay $\Delta T$ is a value in the range from 1 to 250 ms or from 2 ms to 100 ms, and dx=+1 and dy=+1.

In all of the above mentioned embodiments, the value of $\Delta T$ can for example be at least 1 ms, or at least 2 ms or at least 8 ms, or at least 16 ms, or at least 24 ms, or at least 32 ms, or at least 40 ms, or at least 48 ms, or at least 56 ms, or at least 64 ms, or at least 72 ms, or at least 80 ms, or at least 88 ms, or at least 96 ms, or at least 104 ms, or at least 120 ms, or at least 144 ms, or at least 160 ms, or at least 176 ms, or at least 192 ms.

In all of the above mentioned embodiments, the value of $\Delta T$ can for example be equal to about 8 ms or about 16 ms, or about 24 ms, or about 32 ms, or about 40 ms, or about 48 ms, or about 56 ms or about 64 ms, or about 72 ms, or about 80 ms, or about 88 ms, or about 96 ms, or about 104 ms, or about 112 ms, or about 120 ms, or about 128 ms, or about 136 ms, or about 144 ms, or about 152 ms, or about 160 ms, or about 168 ms, or about 176 ms, or about 184 ms, or about 192 ms, or about 200 ms, or about 208 ms, or about 216 ms, or about 224 ms, or about 232 ms, or about 240 ms, or about 248 ms.

On the one hand the value of $\Delta T$ should be sufficiently large to increase the likelihood that the computer device has sufficient time for the dummy-movement signal to be processed by the overlay application, before the button press signal arrives. On the other hand, the value of $\Delta T$ should be as small as possible to reduce the latency, and to reduce the risk that a real movement signal or a dummy movement signal from the other mouse device could intervene. The skilled person can find a suitable compromise.

In an embodiment, the dummy movement signal or message contains the displacement values dx=0 and dy=0. If this message is not filtered out by the O/S and GUI, such a message would be ideal, because it does not adjust the coordinates of the first and second position Pos1 or Pos2, yet it allows to signal to the overlay application to reposition the native mouse cursor (or stated in other words: it allows the overlay application to force a jump if needed). If the dummy-movement message has a zero-displacement (dx=0 and dy=0), the native mouse cursor NC does not shift or drift due to multiple dummy movement messages being sent, irrespective of how many times the button is clicked, and/or the scrollwheel is scrolled.

In another embodiment, the dummy movement message is not a single predefined message with dx=0 and dy=0, but subsequent dummy movement messages are different from the first dummy movement message, with dx and dy values chosen such that a cumulative horizontal displacement (e.g. as a result of repeated pressing and releasing) defined as $\Delta x = \Sigma dx$ and a cumulative vertical displacement defined as $\Delta y = \Sigma dy$ is smaller than a predefined maximum distance. Preferably the predefined maximum distance is less than 10 pixels, more preferably less than 4 pixels, or less than 3 pixels, or less than 2 pixels.

For example, the dummy movement messages may be selected alternatingly or periodically from a group consisting of two predefined dummy movement messages, containing a first message with (dx=+1, dy=0) and a second message with (dx=−1, dy=0), resulting in a tiny left/right movement, but other groups of two messages are also possible, for example:

the group consisting of two dummy movement messages containing a first message with (dx=0, dy=+1) and a second message with (dx=0, dy=−1), resulting in a tiny up/down movement, or the group consisting of two dummy movement messages containing a first message with (dx=+1, dy=+1) and a second message with (dx=−1, dy=−1), resulting in a tiny diagonal movement, or the group consisting of two dummy movement messages containing a first message with (dx=+1, dy=−1) and a second message with (dx=−1, dy=+1), resulting in a tiny diagonal movement, or the group consisting of three dummy movement messages containing a first message with (dx=+1, dy=0), and a second message with (dx=0, dy=+1), and a third message (dx=−1, dy=−1), or the group consisting of four dummy movement messages, containing a first message with (dx=+1,dy=0), a second message with (dx=0,dy=−1), a third message with (dx=−1, dy=0), and a fourth message with (dx=0,dy=+1), etc- In this way, the mouse position remains substantially stationary even after multiple clicks and/or scrollwheel rotations, and does not drift away from the original position unless the pointer device is physically moved.

A cumulative null displacement can however also be obtained in different ways, e.g. by sending a first dummy movement message with a predetermine displacement (e.g. with dx=+2, dy=−1) when a button is pressed, and by sending a second dummy movement message with the opposite displacement (e.g. with dx=−2, dy=+1).

Figure 23A:
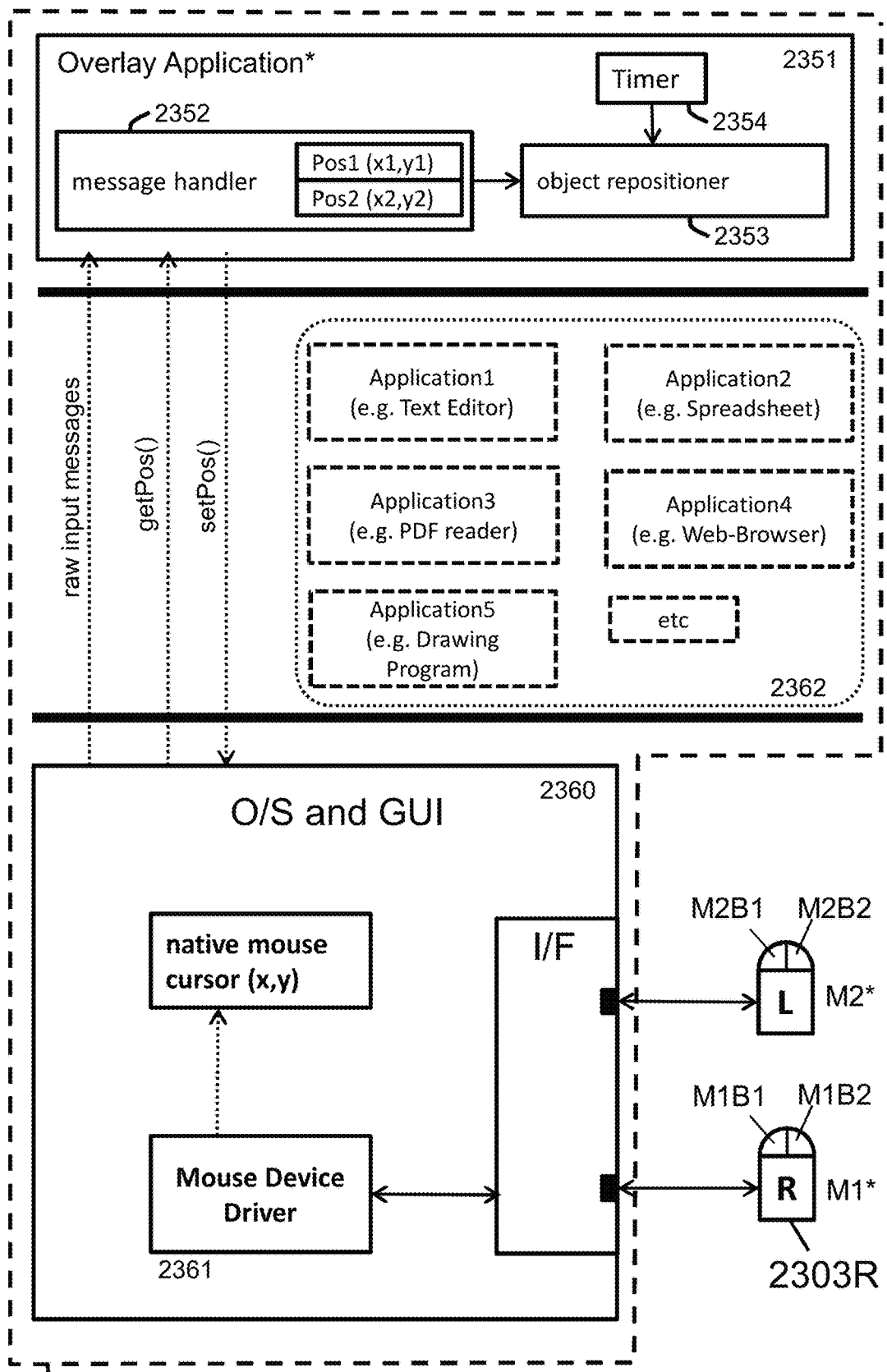
FIG. 23(a) shows a simplified high-level block diagram of hardware and software components situated in a computer system according to an embodiment of the present invention, the computer system comprising a computer device with a special overlay application according to an embodiment of the present invention, and comprising two special mouse devices according to an embodiment of the present invention.

FIG. 23(a) shows a simplified high-level block diagram of hardware and software components situated in an exemplary computer system according to an embodiment of the present invention, comprising a computer device 2301 with a special overlay application 2351 according to an embodiment of the present invention, and two special mouse devices M1*, M2* according to an embodiment of the present invention. The special mouse devices M1*, M2* have the above mentioned "move-before-click" feature illustrated in FIG. 22(a) and/or the above mentioned "move-before-scroll" feature illustrated in FIG. 22(b), meaning that these mouse devices M1*, M2*, upon detection of a button being pressed and/or a scrollwheel being rotated, first send a "dummy-movement message" and only some time ΔT later send a button-press message or a scrollwheel-rotation message.

As suggested by the asterisks, only the overlay application 2351 and the mouse devices M1*, M2* are special. All other components, in particular the O/S and GUI 2360, the device drivers 2361, the other applications 2362, etc- can be classical components.

The mouse devices M1* and M2* can be wired mouse devices, or wireless mouse devices, or a combination of both.

But the present invention is not limited to special mouse devices, and the proposed solution can also be applied to other pointer devices having at least one button and/or at least one scrollwheel.

Figure 23B:
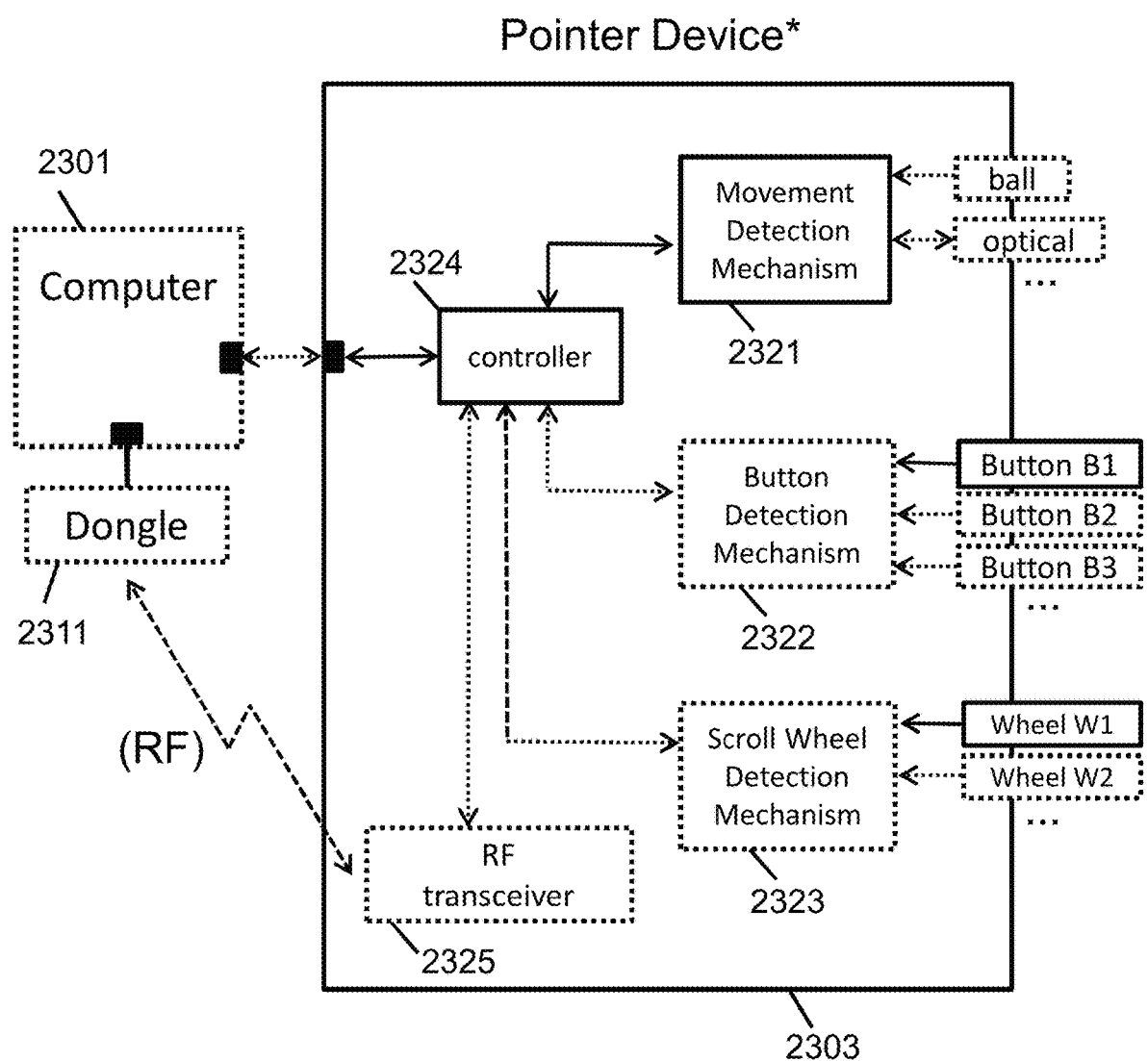
FIG. 23(b) shows an exemplary block-diagram of a special mouse device according to an embodiment of the present invention, as can be used in the system of FIG. 23(a).

FIG. 23(b) shows an exemplary block-diagram of a special pointer device according to an embodiment of the present invention, as can be used in the system of FIG. 23(a) or FIG. 24 (to be discussed next). The pointer device 2303 comprises at least:
a movement detection mechanism 2321 for detecting a two-dimensional movement;
a controller 2324 connected to said movement detection mechanism 2321;
at least one button B1 pressable and releasable by a user;
a button detection mechanism 2322 for detecting if said at least one button B1 is being pressed or being released;
the controller 2324 being connected to said button detection mechanism 2322;
the controller 2324 being adapted for (e-g- being programmed for):
  when a movement is detected, for sending a movement message mov2;
  when it is detected that the at least one button B1 is being pressed, for sending a dummy movement message dmov2, and for sending a button-press message press2 a predefined period ΔT after sending the dummy movement message dmov.

The movement message may comprise displacement parameters dx, dy related to said two-dimensional movement.

The pointer device 2303 may further comprise at least one scrollwheel W1 rotatable by a user, and a scrollwheel detection mechanism 2323 for detecting if the at least one scrollwheel W1 has rotated, and in which direction (e.g. up or down), and the controller 2324 may be connected to said scrollwheel detection mechanism 2323, and may be further adapted, when it is detected that the at least one scrollwheel has rotated, for sending a dummy movement message dmov, and for sending a scrollwheel-rotation message a predefined period ΔT after sending the dummy movement message dmov.

The pointer device 2303 may further comprise an RF transceiver 2325 connected to the controller 2324, and the controller 2324 may be further configured for sending messages to a computer device 2301, and for receiving messages from the computer device 2301 via said RF transceiver 2325, for example via a dongle 2311 connected to the computer device 2301.

The controller 2324 may be a programmable controller, e-g- a microprocessor.

Figure 24:
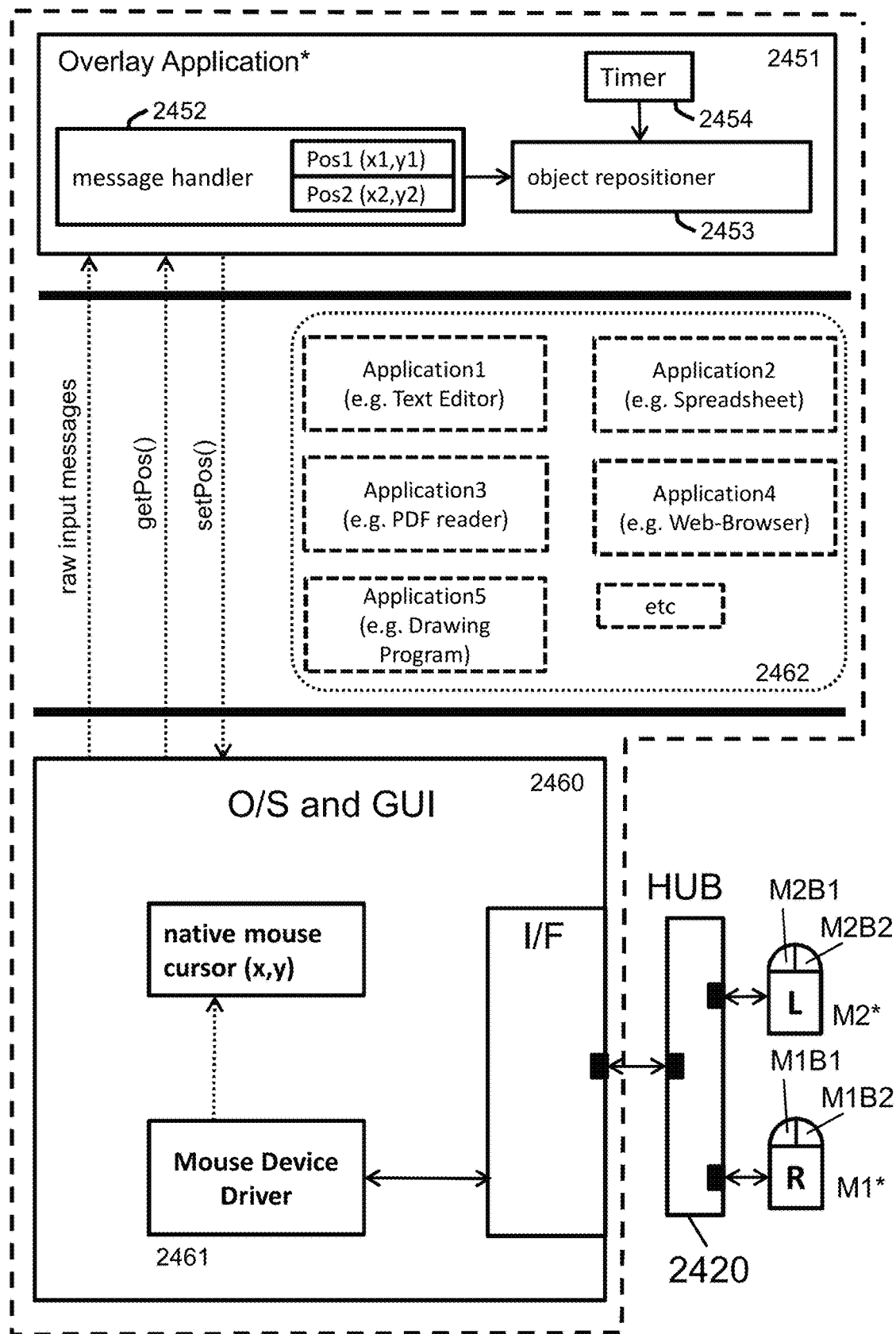
FIG. 24 shows a simplified high-level block diagram of hardware and software components situated in a computer system according to an embodiment of the present invention, the computer system comprising a computer device with a special overlay application according to an embodiment of the present invention, and comprising two special mouse devices according to an embodiment of the present invention, connected to the computer device via a classical hub.

FIG. 24 shows a variant of the high-level block diagram of FIG. 23(a), where the two "special" pointer devices M1*, M2* are connected to the computer device 2401 via a classical hub or adaptor or dongle 2420 instead of being connected directly to the computer device. The hub 2420 can be a wired hub, or a wireless hub. The main purpose of this drawing is to show that the mouse devices need not be directly connected to the computer.

Figure 25:
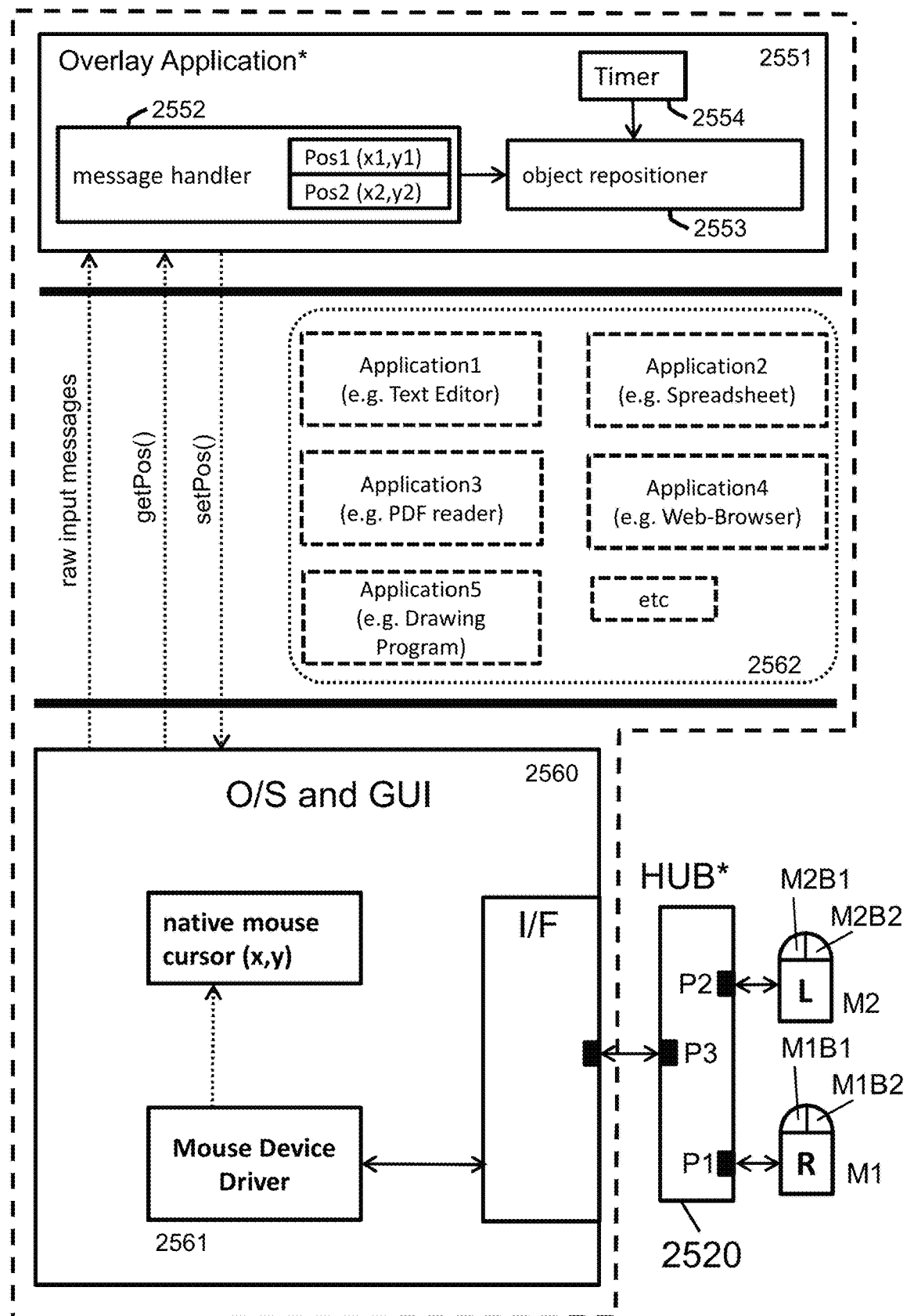
FIG. 25 shows a simplified high-level block diagram of hardware and software components situated in a computer system according to an embodiment of the present invention, the computer system comprising a computer device with a special overlay application according to an embodiment of the present invention, and comprising two classical mouse devices connected to the computer device via a special adaptor or hub or dongle according to an embodiment of the present invention.

FIG. 25 shows a variant of the high-level block diagram of FIG. 24, where the problem shown in FIG. 21 is solved in a special hub 2520 rather than in special pointer devices. Thus, the computer device 2501 of FIG. 25 preferably comprises a classical O/S and GUI 2560, classical applications 2562, classical device drivers 2561 e-g- mouse drivers, classical pointer devices M1, M2, but a special overlay application 2551 and a special hub or adaptor or dongle 2520.

The functionality of the special hub 2520 will be explained in more detail in FIG. 26(a) to FIG. 26(d). Exemplary hardware block-diagrams to implement this functionality will be described in FIG. 27(a) and FIG. 27(b).

As can be understood from FIG. 21 to FIG. 22(b), the hub H* should avoid that the computer device receives button-press-message from pointer device M2 which is preceded in time by a message from the other pointer device M1 (e-g- a movement message, a button-click message, a button-release message, a scrollwheel message), and vice versa. Since the messages from both pointer devices have to pass through the hub H*, the special hub is capable of preventing this situation.

In the exemplary sequence of FIG. 26(a), this situation is avoided as follows.

At time t1 the first pointer device M1 sends a movement-message mov1, and the hub H* transmits the movement-message to the computer device (also referred to as "host").

At time t2 a button M2B1 of the second pointer device M2 is pressed, and the pointer device M2 sends a button-press-message to the hub H*. The hub H* intercepts this message, and transmits a dummy movement message dmov2 to the host (preferably with small movement parameters as explained above), preferably formatted as if this dummy movement message was sent by the second pointer device M2.

Some time later, at time t2+ΔT the hub 2520 sends the button-press-message to the host, packaged or formatted as if this message came from the second pointer device M2.

Figure 26A:
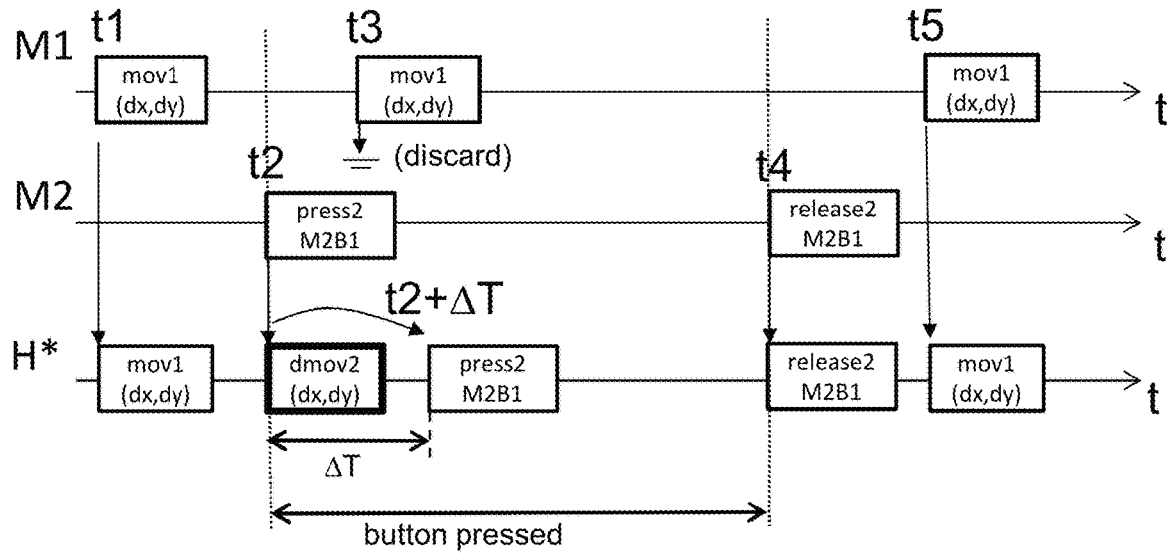
FIGS. 26(a) to 26(d) show exemplary sequences of signals or messages coming from the two classical pointer devices of FIG. 25, and shows how these signals or messages are handled by a message handler process illustrated in FIG. 18, after passing through the special adaptor or hub or dongle.

In the embodiment shown in FIG. 26a, the hub H* discards all messages sent by the other pointer device M1 until the button M2B1 of the pointer device M2 is released at time t5. Therefore, In the example shown, the movement message mov1 sent by the pointer device M1 at t3 is discarded.

At time t4 the second pointer device M2 sends a button-release message to the hub H*, and the hub H* transmits this message to the host.

At time t5 the first pointer device M1 sends a movement message to the hub H*, and the hub H* transmits this message to the host.

In other words, the special hub H* implementing the behaviour of FIG. 26(a) passes all messages coming from the pointer devices to the host, except when a button-press message is received from one of the pointer devices (in the example M2), in which case the hub H* temporarily behaves in a special manner, namely by first sending a dummy movement message, and some time ΔT later sending a button press message press2, and by discarding all messages from the other pointer device (in the example: M1) until a button-release message is received from the pointer device M2 which button M2B1 was pressed.

As explained above for the special pointer device (but not shown in FIG. 26a) it is also possible here to send a dummy movement message at t4 when releasing the button M2B1, and to transmit the actual button-released message only at t4+ΔT, e.g. in case the dummy movement message is not a null displacement.

Figure 26B:
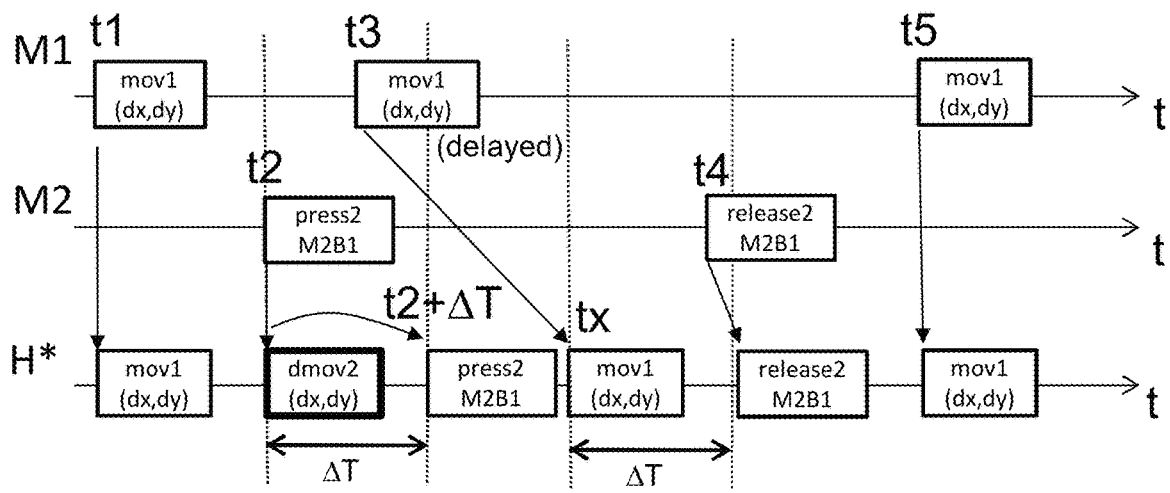

FIG. 26(b) shows the same sequence as FIG. 26(a), but handled differently by a variant of the special hub H*. In this embodiment, the hub does not discard the movement message mov1 sent at t3, but delays this message until after the button-press press2 message is sent to the host at t2+ΔT, in the example at tx=t2+ΔT+ε, where ε is preferably smaller than 33 ms, for example about 8 ms or about 16 ms or about 24 ms. As explained above, the special overlay application may optionally update Pos1, but needs some time to reposition the native mouse cursor to Pos2, otherwise the O/S may interpret the button being released at Pos1 rather than Pos2. Therefore, in this example, the button-release message sent by the second pointer device M2 at t4 also needs to be delayed until tx+ΔT. Of course, if t4 was already larger than tx, than the button-release message release2 can be simply forwarded to the host.

If the behaviour of the signals and how the overlay application will react to them illustrated in FIG. 26(b) is well understood, it can now also be appreciated that the position-update routine of FIG. 18(b), allowing the second object to be moved while a button of the first pointer device is pressed, would go wrong for the sequence shown in FIG. 26(b), in case the user releases the button M2B1 sooner than tx+ΔT. The routine shown in FIG. 18(a) does not suffer from this problem, because it discards the movement signal, in pretty much the same was as the hub of FIG. 26(a) does.

Thus, when the special hub H* (with the behavior as explained in FIG. 26a or FIG. 26b) is used, in the overlay application the position-update routine of FIG. 18(a) and that of FIG. 18(b) can both be used in the BothHanded input mode, because the hub takes care of the timing between the messages from different devices. But if the special hub is not used in the computer system, the position-update routine shown in FIG. 18(a) is "safer".

Figure 26C:
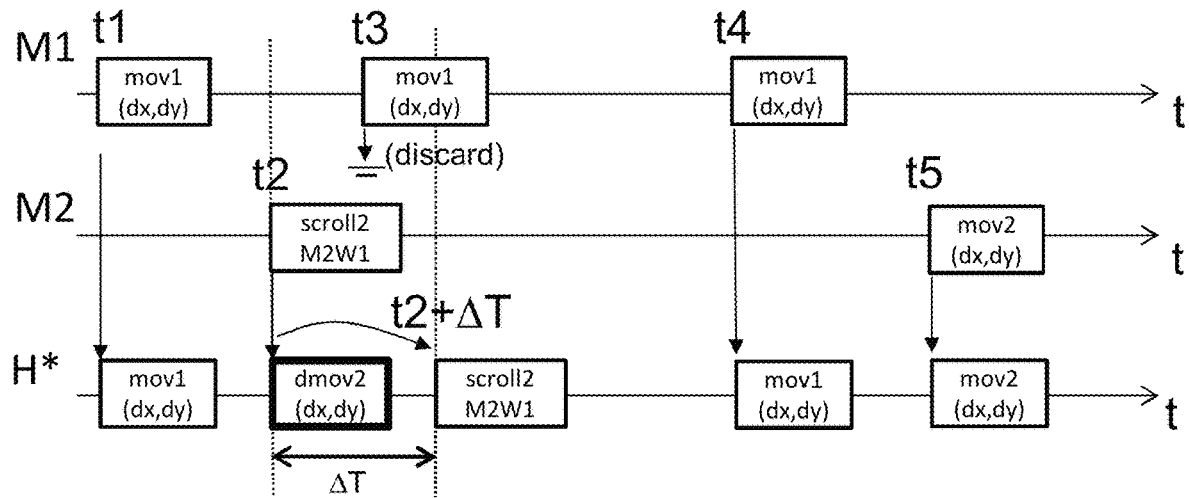

FIG. 26(c) shows an exemplary sequence to explain how the special hub H* having the behaviour specified in FIG. 26(a) may react in response to a scrollwheel-message.

At time t1 the first pointer device M1 sends a movement-message mov1, and the hub H* transmits the movement-message to the computer device (also referred to as "host").

At time t2 a scrollwheel M2W1 of the second pointer device M2 is rotated, and the pointer device M2 sends a scrollwheel-rotation message to the hub H*. The hub H* intercepts this message, and transmits a dummy-movement message dmov2 to the host (preferably with small movement parameters as explained above), preferably packaged or formatted as if this dummy-movement message was sent by the second pointer device M2.

Some time later, at time t2+?T the hub H* sends the scrollwheel-rotation message to the host, packaged or formatted as if this message came from the second pointer device M2.

In the embodiment shown in FIG. 27, the hub H* discards all messages sent by the other pointer device M1 to the hub H* arriving between t2 and t2+ΔT. Therefore, in the example shown, the movement message mov1 sent by the pointer device M1 at t3 is discarded.

At time t4 the first pointer device M1 sends a movement message mov1 to the hub H*, and the hub H* transmits this message to the host.

At time t5 the second pointer device M2 sends a movement message to the hub H*, and the hub H* transmits this message to the host.

Figure 26D:
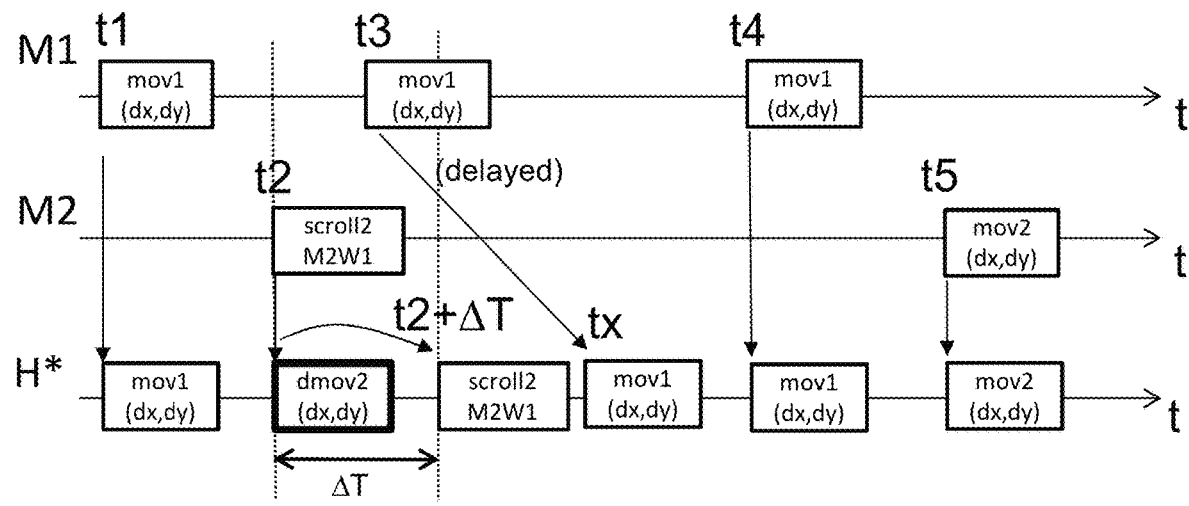

FIG. 26(d) shows the same sequence as FIG. 26(c), but handled differently by a variant of the special hub H*. In this embodiment, the hub H* does not discard the movement message mov1 sent at t3, but delays this message until after the scrollwheel-rotation message scroll2 is sent to the host at t2+ΔT, say at tx=t2+ΔT+ε. The movement message mov1 at t4 sent by the first pointer device M1, and the movement message mov2 sent by the second pointer device M2 are simply transmitted to the host.

Comparing the behaviour of the special hub H* as specified in FIG. 26(a) to FIG. 26(d) with the behaviour of the special pointer devices, as specified in FIG. 22(a) and FIG. 22(b), it can be seen that the special hub H* addresses the problem of FIG. 21 based on the same principle, namely by inserting a dummy-movement message some time ?T before forwarding the actual button-press message or scrollwheel-rotation message. Implementing this behaviour in a special hub rather than in special pointer devices provides the additional advantage that the hub H* can really prevent that the other pointer device sends an intermediate message to the host in between this dummy movement message and the actual button-press or scrollwheel-rotation message, and can therefore guarantee that the situation of FIG. 21 will not occur. That is not possible with the special pointer devices without the hub.

Or stated in other words, while the "move before click" and the "move before scroll" feature proposed in FIG. 22 decreases the risk that the computer device will misinterpret the messages, the risk is not completely eliminated, because one pointer device has no influence over the messages sent by the other pointer device. In contrast, a special hub H* having the characteristics described in FIG. 26(a) to FIG. 26(d) has full control over the messages which are sent to the computer device, and can filter and/or adapt the stream of messages to and from both pointer devices. In this way undesired combinations of conditions or undesired timing between the signals/messages can be avoided, or adjusted, such that the O/S and GUI and the special overlay application 2551 will function correctly.

"Smart hubs" which interpret and/or modify and/or insert and/or delay messages from multiple pointer devices for allowing dual mouse support on a computer device in general, let alone for facilitating dual mouse support provided by an overlay application running on a computer device having an O/S and GUI that provides only a single native mouse cursor, to reposition the native mouse cursor, in order to provide an O/S and GUI that virtually provides dual mouse support, do not exist in the prior art.

Figure 27A:
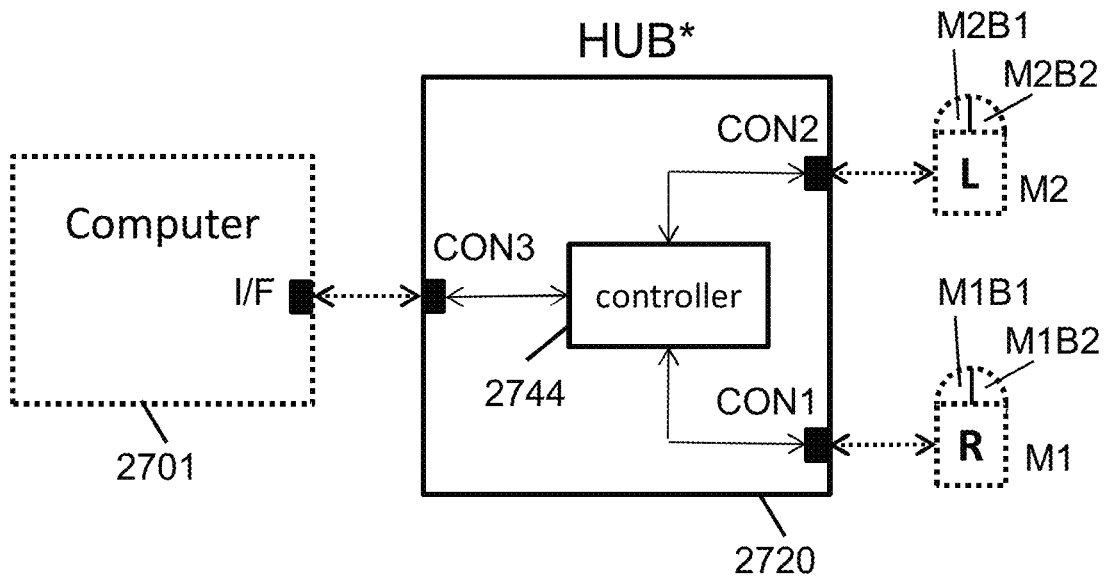
FIG. 27(a) shows an exemplary block-diagram of a hub (or dongle or adapter) according to an embodiment of the present invention, as can be used in the system of FIG. 25, having at least two physical connectors for connection with two classical wired pointer devices.

FIG. 27(a) shows an exemplary block-diagram of a hub or dongle or adapter according to an embodiment of the present invention, as can be used in the system of FIG. 25, having at least two physical connectors CON1, CON2 for connection with two classical wired pointer devices M1, M2, and at least one connector CON3 (optionally at the end of a cable) for connection with a computer device 2701.

Figure 27B:
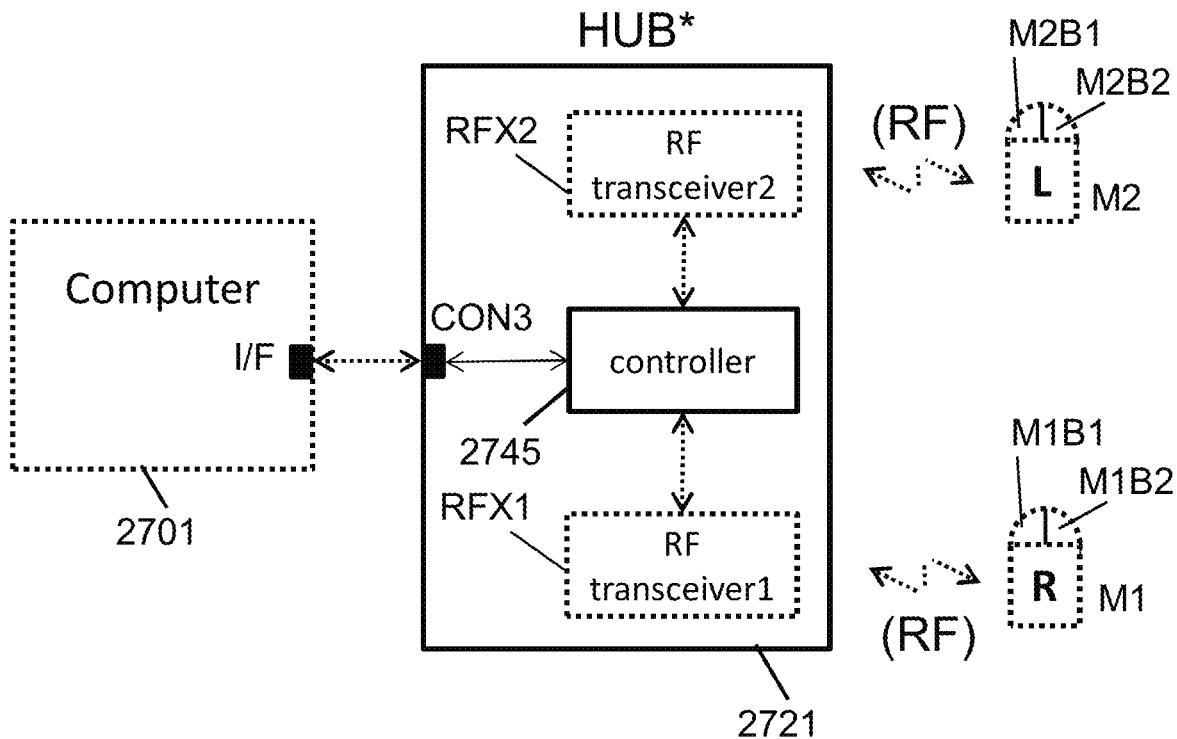
FIG. 27(b) shows an exemplary block-diagram of a wireless hub (or dongle or adapter) according to an embodiment of the present invention, as can be used in the system of FIG. 25, having one or two RF transceivers for operative connection with two classical wireless pointer devices.

FIG. 27(b) shows an exemplary block-diagram of a wireless hub (or dongle or adapter) according to an embodiment of the present invention, as can be used in the system of FIG. 25, having one or two RF transceivers for operative connection with two classical wireless pointer devices.

The hub 2720 of FIG. 27(a) comprises:
a first interface CON1 for communicating with a first pointer device M1;
a second interface CON2 for communicating with a second pointer device M2;
a third interface CON3 for communicating with a computer device 2701;
a controller 2744 being connected to said first interface for receiving first messages from the first pointer device M1, and being connected to said second interface for receiving second messages from the second pointer device M2, and being connected to said third interface for transmitting said first and second messages to said computer device (2701); and wherein the controller 2744 is adapted for sending a dummy movement message a predefined period ($\Delta T$) before sending a button-press message and/or a scrollwheel-rotation message.

More specifically, the controller 2744 may be adapted to behave as follows:
upon receipt of a first button-press message press1 from the first pointer device via the first interface, to send a first dummy movement message dmov1 to the computer device via the third interface, and a predefined period $\Delta T$ later to send the first button-press message press' to the computer device via the third interface;
upon receipt of a second button-press message press2 from the second pointer device via the second interface, to send a second dummy movement message dmov2 to the computer device via the third interface, and a predefined period $\Delta T$ later, to send the second button-press message press2 to the computer device via the third interface;
upon receipt of a first scrollwheel-rotation message from the first pointer device via the first interface, to send a first dummy movement message dmov1 to the computer device via the third interface, and a predefined period $\Delta T$ later, to send the first scrollwheel-rotation message to the computer device via the third interface;
upon receipt of a second scrollwheel-rotation message from the second pointer device via the second interface, to send a second dummy movement message dmov2 to the computer device via the third interface, and a predefined period $\Delta T$ later, to send the second scrollwheel-rotation message to the computer device via the third interface.

The hub 2721 of FIG. 27(b) comprises:
a first RF transceiver RFX1 for receiving messages from and transmitting messages to the first pointer device M1; and
a second RF transceiver RFX2 for receiving messages from and transmitting messages to the second pointer device M2, the second RF transceiver being the same as the first RF transceiver, or being a separate RF transceiver; and
a connector CON3 connectable to a computer device 2701;
a controller 2745 being connected to said first RF transceiver RFX1 for receiving first messages from the first pointer device M1, and being connected to said second RF transceiver RFX2 for receiving second messages from the second pointer device M2, and being connected to said connector CON3 for sending messages to (and typically also receiving messages from) the computer device 2701,
the controller 2745 being adapted for sending a dummy movement message a predefined period $\Delta T$ before sending a button-press message to the computer device and/or for sending a dummy movement message a predefined period ($\Delta T$) before sending a scrollwheel-rotation message to the computer device.

What is described above related to the parameters dx, dy, $\Delta T$ when discussing special pointer devices, is not repeated here, but is also applicable for the special hub.

The controller 2744, 2745 may be a programmable controller, e-g- a microprocessor.

Figure 28B:
FIG. 28(b) shows an exemplary pop-up menu as can be used in embodiments of the present invention.

FIG. 28(a) shows an exemplary user-interface window, referred to herein as the "mini user interface", as can be used in embodiments of the present invention for configuring the overlay application, e-g- to select an input mode and/or a display mode, and/or to select a size and/or a color of the second or further visible object, and/or to select a semi-transparency level of the click-through window using one or more pop-up menus, an example of which is shown in FIG. 28(b).

The user interface window, e-g- window 585 in FIG. 5c or window 885 in FIG. 8c, is preferably opaque and is not configured in click-through mode, and preferably has a Z-order higher than that of the click-through window 584, 884 in FIG. 5c and FIG. 8c. The pop-up menu of FIG. 28(b) may for example appear when clicking on a right button of the dominant pointer device when the native mouse cursor is positioned over one of the icons representing a specific display mode.

The overlay application may implement one or more input modes selected from the group consisting of: a Single Pointer mode (denoted as "SingleH" in FIG. 28a), a Dual Pointer Mode with the left Pointer device being the dominant pointer device (denoted as "LeftH" in FIG. 28a), a Dual Pointer Mode with the right Pointer device being the dominant pointer device (denoted as "RightH" in FIG. 28a), and a Dual Pointer Mode where both pointer devices are dominant (denoted as "BothH" in FIG. 28a).

In an embodiment of the present invention configurable in one of multiple input modes, a message handler of the overlay application may comprise the pseudo-code of FIG. 18(c). It is noted that testing whether a button of the dominant pointer device is pressed or not, is not required in case of the RightHanded and LeftHanded input mode, because in these cases the native mouse cursor does not jump from one to the other maintained position Pos1, Pos2. Thus for example, in the case of the RightHanded input mode, a button of the right pointer device may well be pressed and moved (e-g- when dragging or when selecting text in a text editor) while the left pointer device is also being moved, without causing a conflict (assuming that no button of the left pointer device is being pressed, and that the scrollwheel of the left pointer device is not being rotated).

It is noted in this respect that some embodiments of the special hub may implement the behaviour illustrated in FIG. 26(a) and FIG. 26(c), or as illustrated in FIG. 26(b) and FIG. 26(d), assuming that both pointer devices are allowed to be moved and/or clicked and/or scrolled.

Other embodiments of the special hub may unconditionally discard all button press messages and all button release messages and all scrollwheel rotation messages received via one of its input ports (e.g. the port where the pointer device for the non-dominant hand is connected), and only pass movement messages via this input port. Such embodiment may be especially useful in combination with a LeftHanded or RightHanded input mode. In this way it is guaranteed that such message sent by the non-dominant pointer device cannot reach the computer device, even if the user would accidentally click or scroll the non-dominant pointer device.

Some embodiments of the special hub are configurable, e-g- via dip switches or in software, for example via a command from the overlay application, or in any other way, to either (i) allow passage of all movement and press and release and scrollwheel-rotation messages from all pointer devices, or (ii) to allow passage of movement messages from all pointer devices, but to allow press- and release- and scrollwheel messages only from one single pointer device.

The overlay application may implement one or more display modes, for example as represented by the icons shown in FIG. 28(a).

First Group:

A first group 2840 of display modes works with the "Single Pointer" input mode, and offers the following display modes, which can be summarised as follows:

icon 2840(a) represents a mode with the single (native) mouse pointer provided by a classical O/S and GUI, icons 2840(b) to 2840(f) represent a mode with the single (native) mouse pointer, but in additional a second and/or third visible object in the form of (b) a hand; (c) a square or line segment or rectangle; (d) a line or rectangle which extends over the entire width of the overlay window; (e) a small cross; (f) a large cross formed by a horizontal line or rectangle which preferably extends over the entire width of the overlay window 584, 884 and by a vertical line or rectangle which preferably extends over the entire height of the overlay window 584, 884;

icon 2840(j) representing a mode with a horizontal line or bar similar to mode 2840(d), but with an additional visible object in the form of a small block e-g- a square or rectangle movable inside said line or bar;

icon 2840(k) represents a mode with a vertical line which splits the screen in a left part and a right part, this vertical line is preferably movable by "dragging" (after temporarily setting the overlay window 584, 884 in "non-click-through mode" as explained in more detail in the co-pending "perforated bitmap application(s)", and with a horizontal line on the left part of said vertical line, which horizontal line moves along with the mouse pointer when the mouse pointer is located on the left side of the vertical line, and which horizontal line freezes when the mouse pointer is located on the right side of the vertical line. This mode may be especially useful for right-handed translators or reviewers working with only a single mouse pointer;

icon 2840(l) represents a mode similar to mode 2840(k) but the horizontal line is located on the right side of the vertical line, and moves up/down when the native mouse pointer is located on the right side of the vertical line, and freezes when the mouse pointer is located on the left side of the vertical line. This mode may be especially useful for left-handed translators or reviewers working with only a single mouse pointer.

In all of the modes 2840(a)-(l) the native mouse cursor is visible on screen, and moves along with the at least second visible object in the form of a hand or a line or a cross or a block described above, except in the modes with the "frozen line" represented by icon 2840(k) and 2840(l), where the visible object only moves along with the pointer device under certain conditions.

Second Group:

A second group 2850 of display modes works with the "LeftHanded Dual Pointer" input mode, and offers the following display modes, which can be summarised as follows:

icon 2850(a) represents a mode with the single (native) mouse pointer provided by a classical O/S and GUI, and in addition a second visible object in the form of an arrow, e-g- a black arrow. The native mouse cursor is controlled by the left pointer device. Aspects of mode 2850(a) were also described in FIGS. 9(a) to 9(c);

icons 2850(b) to 2850(f) represent a mode with the single (native) mouse pointer controllable by the left pointer device, and with an additional second or further visible object in the form of (b) a hand; (c) a square; (d) a line or rectangle; (e) a small cross; (f) a large cross, controllable by the other pointer device, namely the right pointer device;

icon 2850(g) to icon 2850(i) represents a mode similar to mode 2850(c) to 2850(e), but the overlay application further shows an additional (g) square or (h) line or (h) small cross which moves along with the native mouse pointer, and thus is movable by the left pointer device;

icon 2850(j) represents a mode where the overlay application provides a vertical line that splits the screen in a left part and a right part, and with a first horizontal line located on the left side of the vertical line that moves in accordance with movements of the left pointer device, and with a second horizontal line located on the right side of the vertical line that moves in accordance with movements of the right pointer device. The native mouse cursor is movable over the entire screen, and moves along with the left pointer device. This mode may be especially useful for left-handed translators or reviewers comparing two texts;

icon 2850(l) represents a variant of the mode 2850(j) without showing the left horizontal line;

In all of the modes 2850(a)-(l) the native mouse cursor is visible on screen, and moves in accordance with movements of the left pointer device, which is why these modes are probably most suitable for left-handed people controlling the native mouse cursor with their dominant (left) hand, and moving a second visible object with their non-dominant (right) hand. The user should not click or scroll the non-dominant pointer device, only move it (e-g- to underline textual information on screen).

Third Group:

A third group 2860 of display modes works with the "RightHanded Dual Pointer" input mode, and offers display modes similar to the second group 2850 of display modes, except that the function of the left and right pointer device are swapped, and that in mode 2860(k) the left horizontal line is shown rather than the right horizontal line.

Aspects of mode 2860(a) were also described in FIGS. 8(a) to 8(c).

Aspects of mode 2860(d) were also described in FIGS. 5(a) to 5(h).

Aspects of mode 2860(h) were also described in FIGS. 6(a) to 6(c).

In all of the modes 2860(a)-(k) the native mouse cursor is visible on screen, and moves in accordance with movements of the right pointer device, which is why these modes are probably most suitable for right-handed people controlling the native mouse cursor with their dominant (right) hand, and moving a second visible object with their non-dominant (left) hand. The user should not click or scroll the non-dominant pointer device, only move it (e-g- to underline textual information on screen).

Fourth Group:

A fourth group 2870 of display modes works with the "BothHanded Dual Pointer" input mode, and offers display mode 2870(a) with two visible objects: the native mouse cursor, e-g- as a white arrow, and a second arrow (e-g- black arrow) already described in FIGS. 10(a) and 10(b), icon 2870(b) represents a mode similar to mode 2850(b) except that two bitmaps with a hand are shown, one movable with the left pointer device, the other movable with the right pointer device (e.g. as shown in FIG. 34);

icon 2870(g) to icon 2870(j) represents a mode similar to mode 2850(g) to 2850(j), except that the native mouse cursor will follow the position associated with the pointer device which is most recently moved, and/or a button of which is most recently pressed, and/or a scrollwheel of which is most recently rotated, as explained above. These modes are especially suitable for users who want to move and click and/or scroll both pointer devices, for example the transcribers of FIGS. 4(a) and 4(b), but for example also the translators or proofreaders of FIG. 1 desiring to scroll through and/or edit both documents using both pointer devices.

As described above (see e-g- FIG. 14 and FIG. 15 and FIG. 19 and FIG. 20), the modes of this fourth group 2870 work well even with classical pointer devices M1, M2 provided that the pointer device which is clicked and/or scrolled is the one which is most recently moved, which requires special attention of the user. A relatively simple solution would be to always first manually move a mouse before clicking it. But as explained above, these modes work even better when using special pointer devices (see e-g- FIG. 22) which automatically take care of the "move before clicking" and/or "move before scrolling", or with a special hub or adaptor or dongle described above, see e-g- and FIG. 26(a) to FIG. 26(d).

FIG. 28(b) shows an exemplary pop-up menu which can be invoked by clicking with a right button of the dominant pointer device on some of the display modes in the mini-interface window of FIG. 28(a). In the example shown, the menus allow to change the color, and the size of the second and/or further visible object(s), as well as to select a transparency level of the click-through overlay window 584 (FIG. 5c) or 884 (FIG. 8c).

Figure 29:
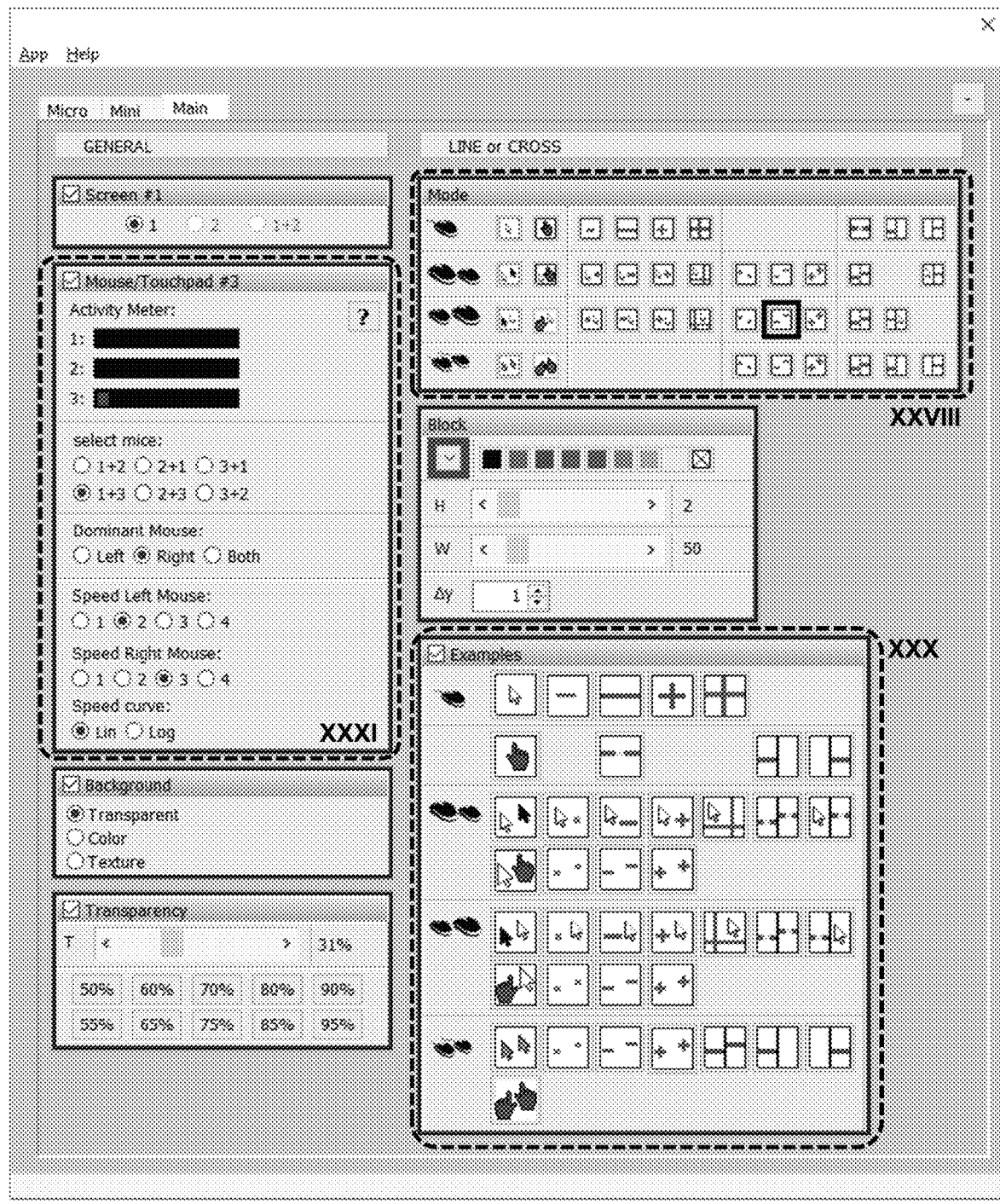
FIG. 29 shows an exemplary user-interface window, referred to herein as the "main user interface", as can be used in embodiments of the present invention, e-g- to select an input mode and/or a display mode, and/or to select a size and/or a color of the second or further visible object, and/or to select or tune a semi-transparency level, and/or to select a semi-transparent textured background.

FIG. 29 shows another exemplary user-interface window, referred to herein as the "main user interface", as can be used in embodiments of the present invention for configuring the overlay application.

The user interface (UI) window shown in FIG. 29 has a region with title "Mouse/Touchpad" for selecting the input mode (e-g- LeftHanded or RightHanded or BothHanded), and for selecting which pointer device (or rather, which "handle" assigned by the operating system to each pointer device) is to be considered the dominant pointer device (or handle thereof). The UI also comprises components such as e-g-radio-buttons for selecting relative speed of movement, etc- In FIG. 31(a) this region is shown in an enlarged view.

The interface window shown in FIG. 29 also has a region with title "Background", which allows the click-through overlay window 584, 884 comprising the at least one second visible object 506L, 806L to further contain a bitmap comprising pixels 594, 894 a majority of which are fully transparent pixels, or semi-transparent monochrome pixels, or a semi-transparent texture bitmap as described in more detail in the co-pending "perforated bitmap application(s)".

The exemplary user interface window shown in FIG. 29 also has a region with title "Transparency", which allows to select or choose an alpha-transparency level of the overlay window 584. For example, if the background pixels 584 and 884 are fully transparent pixels, the degree of transparency of the movable visible object can be modified in this way. The user may choose a compromise between on the one hand showing an object which is quite different from the background pixels, and on the other hand, which is sufficiently transparent to be able to read underlying textual information.

The exemplary user interface window shown in FIG. 29 also has a region with title "Transparency", which allows to select or choose an alpha-transparency level of the overlay window 584. Depending on the display mode being selected, the main window may show an additional region such as the region "block" where the user can select a color, height, width and vertical offset, for example.

Figure 30:
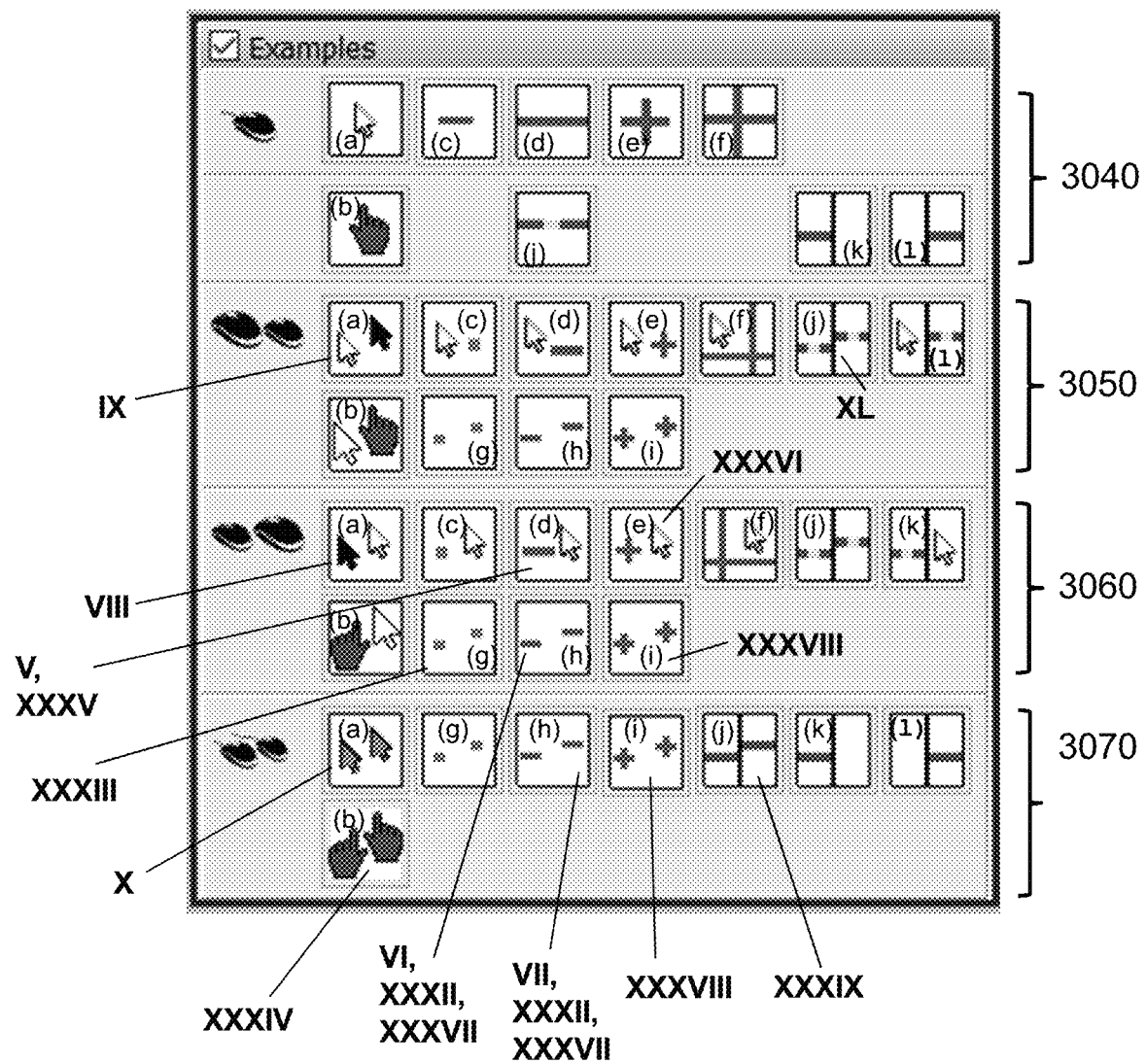

The interface window shown in FIG. 29 also has a region with title "Examples", for using the display modes with default settings, but default settings can also be implemented differently, of course. In FIG. 30 this region is shown in an enlarged view.

It is pointed out that embodiments of the present invention are by no means limited to this particular user-interface.

FIG. 30 is an enlarged view of a portion of FIG. 29. It gives a visual overview of various possible embodiments of the present invention, however, the invention is not limited thereto. These default modes largely correspond to the modes shown in the mini-interface of FIG. 28(a). Some of the modes are described in more detail in this document, as indicated by the roman numbers referring to the respective figures.

FIG. 31(a) is an enlarged view of a portion of FIG. 29. It illustrates for example how a user can select an input mode, e-g- LeftHanded; RightHanded; BothHanded.

It is noted for example that a touchpad of a laptop computer is also considered a pointer device, hence the indication "#3" in the title, meaning that the operating system of the computer device from which this screenshot was taken, found three input devices: two physical mouse devices and one touchpad.

It is noted that the present invention will also work for example with a laptop computer to which only a single physical mouse is connected, e-g- by using the touchpad as the non-dominant pointer device and the physical mouse as the dominant pointer device.

FIG. 31(b) is a variant of the portion of FIG. 31(a), where a feature is added to adjust the orientation of the displacement vector defined by the displacement values (dx, dy) into a preferred orientation selected from a first group of predefined directions consisting of the directions: North, West, South, East, or from a second group of predefined directions consisting of the directions: North, North-West, West, South-West, South, South-East, East, North-East. This transformation can be applied to movements of the dominant pointer device only, or to movements of the non-dominant pointer device only, or to both pointer devices.

Tests have shown that this feature can greatly help the user to better control movements of one or both the pointer devices, when performing certain tasks. For example, this feature may be particularly helpful to move the pointer device controlled by the non-dominant hand horizontally over a text line, e-g-when performing text based tasks such as reading a text document, proofreading a translation, pointing to individual words on a same line during a webinar or presentation, etc- FIG. 31(c) shows a few exemplary lines of pseudo-code which can be used in the position update routine for transforming the displacement values dx, dy to be located in an orientation of the second group of eight allowed orientations mentioned above (North, North-West, etc-). In the example of FIG. 31(c), if dx=0, it means the movement was already vertical, hence no modification is required;

if dy=0, it means the movement was already horizontal, hence no modification is required;

if dx=dy, it means the movement was already diagonal, hence no modification is required, otherwise, it is determined whether the angle of the displacement vector lies in the range from (−30° to +30°) or in the range from (150° to 210°), in which case the absolute value of the tangent of said angle is smaller than 0.5, in which case the movement is forced to be horizontal, and/or it is determined whether the angle of the displacement vector lies in the range from (60° to 120°) or in the range from (240° to 300°), in which case the absolute value of the tangent of said angle is larger than 2.0, in which case the movement is forced to be vertical, otherwise the movement is forced to be diagonal (oriented at +45° or 135° or 225° or 315°).

It is noted that no goniometric functions are used in this routine, thus keeping the implementation relatively simple and relatively fast, thereby keeping the CPU load relatively low. The careful reader will recognize that the amplitude of the displacement vector may slightly increase or decrease by the adjustment, in order to keep the transformation simple and fast. This effect is barely noticeable.

Tests have shown that the transformation of FIG. 31(c) does not influence slow movements of the pointer device, (for which dx and dy are very small). This feels to a user as if relatively slow movements can be performed in any direction, which is desirable to allow fine-tuning of a position on the screen. However, if the speed with which the pointer device is moved is increased, the amplitude of the displacement vector will become larger than a predefined threshold (in the example of FIG. 31c larger than 0), then the displacement is forced to be horizontal or vertical or diagonal. This behaviour is highly desirable to keep almost horizontal movements perfectly horizontal, which is difficult to achieve manually, especially at relatively high speed.

But of course, the present invention does not require this feature to be present (it can be enabled or disabled by a user). Furthermore, if present, the present invention is not limited to the specific routine or algorithm shown in FIG. 31(c), and other algorithms for reorienting the pointer movements are also contemplated, for example as described in the following variants.

Figures 31D, 31E:
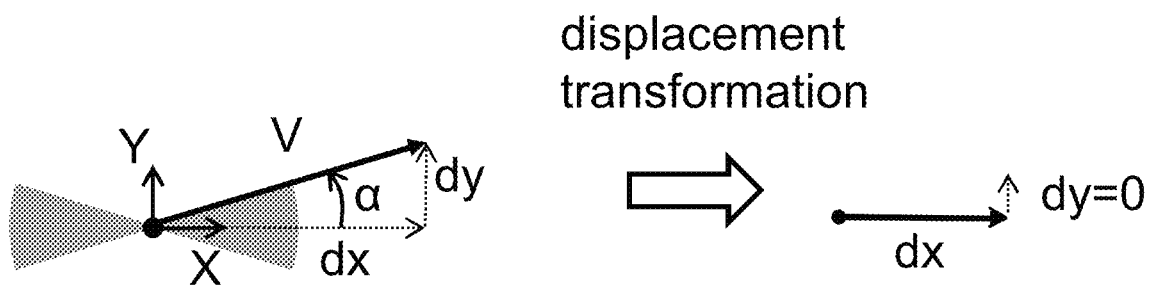
FIG. 31(d) and FIG. 31(e) illustrate a variant of the displacement transformation routine, where near-horizontal movements are transformed into pure horizontal movements.

FIG. 31(d) and FIG. 31(e) show a variant of the displacement transformation routine, where near-horizontal movements are transformed into pure horizontal movements.

More specifically, FIG. 31(d) shows a graphical representation of the displacement vector V corresponding to the physical movement of the pointer device, associated with the displacement values (dx, dy). The displacement vector V forms an angle α relative to the X-axis. If this angle lies in the segments indicated in gray color, meaning that the angle α lies in the range [−αmax . . . +αmax] or in the range [180°-αmax . . . 180°+αmax], then the displacement vector is transformed into a pure horizontal displacement, by setting the value for dy equal to zero. Rather than working with angles, this can be codified by calculating the absolute value of the tangent of the angle, which is abs(dy/dx), and testing whether this value is smaller than, or smaller or equal to a predefined constant. For example, αmax=30° corresponds to abs(dy/dx)<0.577, or as another example, testing whether abs(dy/dx)<0.5 corresponds to testing whether the angle α lies in the range from about [−26° to +26° ] or about [154° to 206° ], but of course, the present invention is not limited to only this range, and other ranges can be used as well.

FIG. 31(e) shows exemplary lines of pseudo-code implementing the "displacement transformation" described above, which may be used in the "position update routine" (see for example step g) of FIG. 5(e), when updating Pos1 and Pos2). But of course another angular range can be used, or in other words, the invention will also work with other values for MAXTAN (in FIG. 31e), for example values in the range from 0.2 to 0.75, for example smaller than 0.25=¼, or smaller than 0.33=⅓, or smaller than 0.5=½, or smaller than 0.66=⅔, or smaller than 0.75=¾. The skilled person having the benefit of the present invention can easily define other suitable ranges.

Figure 32:
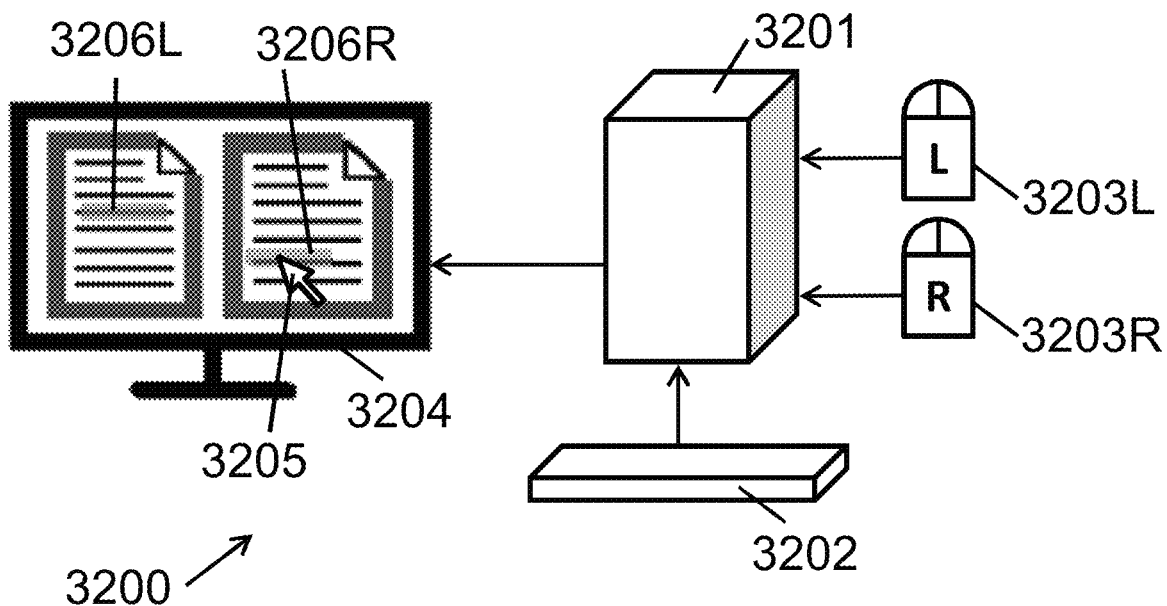
FIG. 32 shows a computer system according to an embodiment of the present invention, where the computer device is running an O/S and GUI and two applications (e-g- a PDF document viewer and a text editor), and is running an overlay application according to an embodiment of the present invention. The overlay application is configured to reposition the native mouse cursor and to show two movable lines, which move in accordance with movements of the pointer devices.

FIG. 32 shows a computer system 3200 according to an embodiment of the present invention, comprising a computer device 3201 according to an embodiment of the present invention, running an overlay application according to an embodiment of the present invention, and two pointer devices, e-g-mouse devices 3203L, 3203R connected to the computer device, and optionally a keyboard 3202. The mouse devices may be classical mouse devices, or may be special mouse devices with the "move-before-click" feature and/or the "move before scroll" feature as explained in FIG. 22(a) and FIG. 22(b). The mouse devices may be connected to the computer device directly (e-g- as shown in FIG. 11 and FIG. 23(a)), or via a classical hub or adaptor of dongle (e-g- as shown in FIG FIG. 12 and FIG. 24) or via a special hub (e-g- as shown in FIG. 25).

The overlay application used in the system of FIG. 32 allows the O/S and GUI (e-g- Windows 7 or Windows 10 from Microsoft Corporation, or mac OS Sierra or mac OS High Sierra from Apple Inc.) to show the native mouse cursor 3205, but adapted, e-g- overrides its position. The overlay application further provides a second visible object 3206L and a third visible object 3206R, in the example of FIG. 32 being two lines or rectangular regions. These rectangular regions may be opaque or semi-transparent. They may have a single color, or a color gradient, or may contain a perforated bitmap. The other pixels of the overlay window may be fully transparent pixels, or may all be semi-transparent pixels, or the overlay window may comprise a perforated bitmap or a texture bitmap as explained in the co-pending "perforated bitmap application(s)".

In case the overlay application is designed for (e-g-hardcoded) or configured in display mode 2860(h), thus in the RightHanded input mode, the object 3206L follows movements of the left pointer device 3203L (or rather the pointer device configured or indicated as the left pointer device) and the native mouse cursor 3205 and the object 3206R follow movements of the right pointer device 3203R (or rather the pointer device configured or indicated as the right pointer device).

In case the overlay application is designed for (e-g-hardcoded) or configured in display mode 2870(h), thus in the BothHanded input mode, the object 3206L follows movements of the left pointer device 3203L (or rather the pointer device configured or indicated as the left pointer device) and the object 3206R follows movements of the right pointer device 3203R (or rather the pointer device configured or indicated as the right pointer device), and the native mouse cursor 3205 will move and/or jump depending on which pointer device is most recently moved and/or clicked and/or scrolled.

Figure 3:
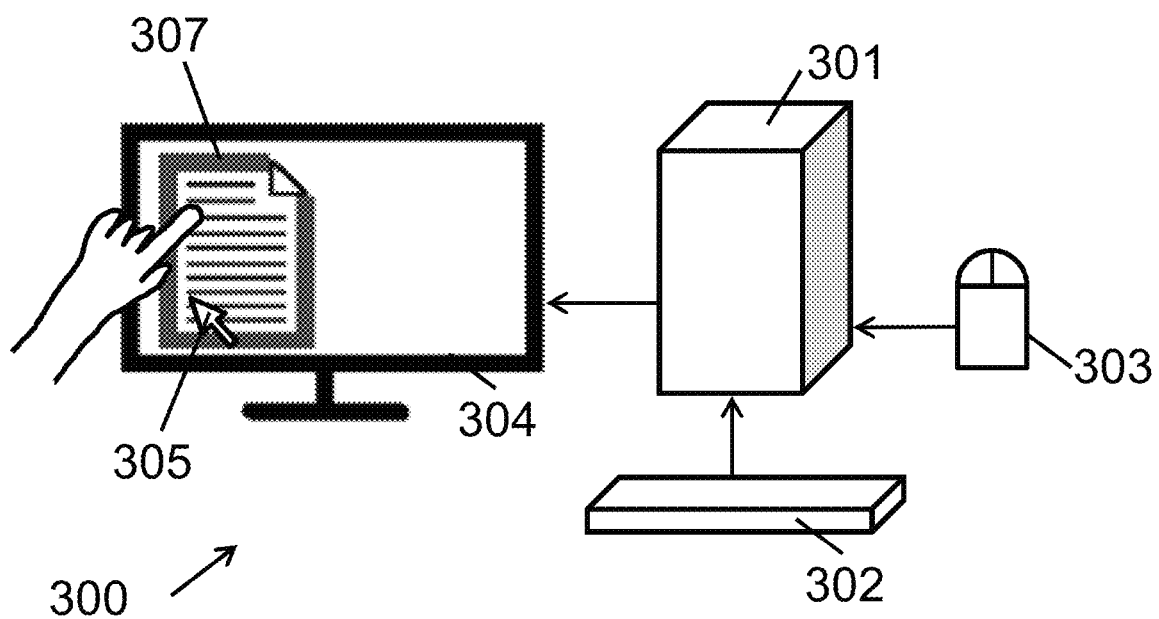
FIG. 3 shows an example of how a person reading or editing a single text document can use his finger to point at one position in the document, and use the mouse cursor to point at another location within that single document, using a classical computer system.
Figure 4A:
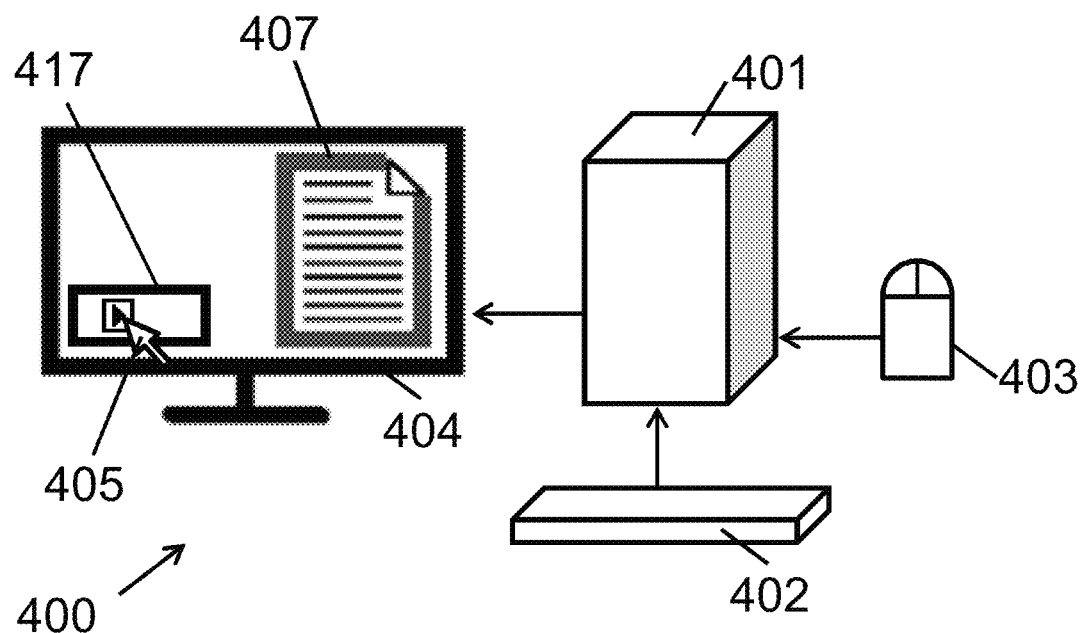
FIGS. 4(a) and 4(b) show an example of how a person can transcribe an audio file, using a classical computer system.
Figure 4B:
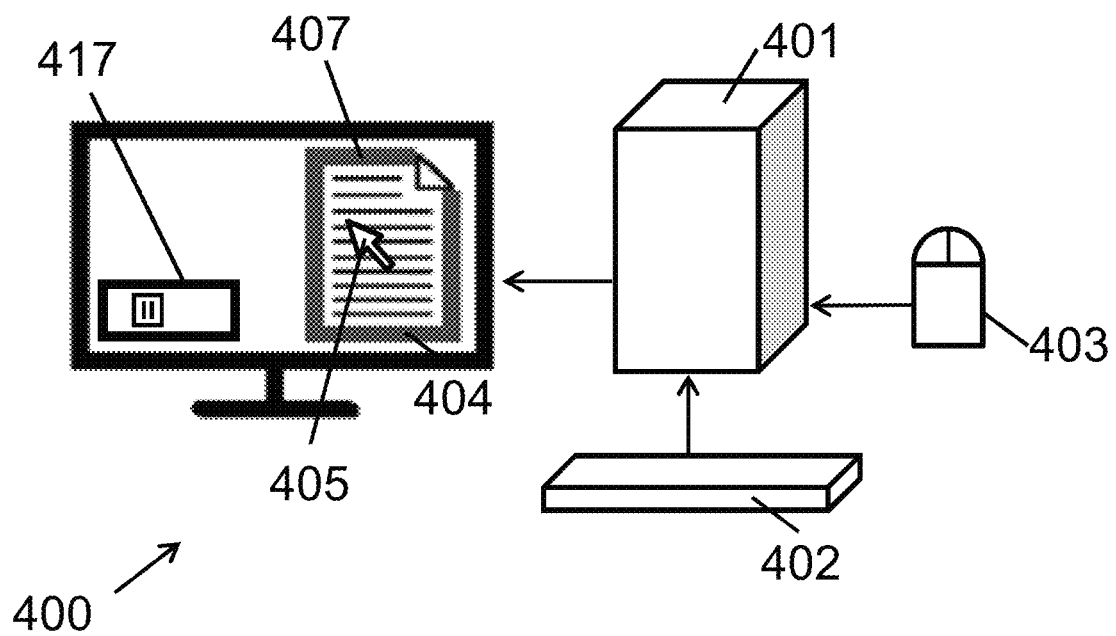

The embodiment illustrated in FIG. 32, and variants thereof, optionally using a wired or wireless hub or adaptor of dongle, and optionally using a movement transformation as explained in FIG. 31(b) and FIG. 31(c) may be especially useful for addressing the problem described in FIG. 1 and FIG. 3, where it is desired to underline two text fragments.

Figure 33:
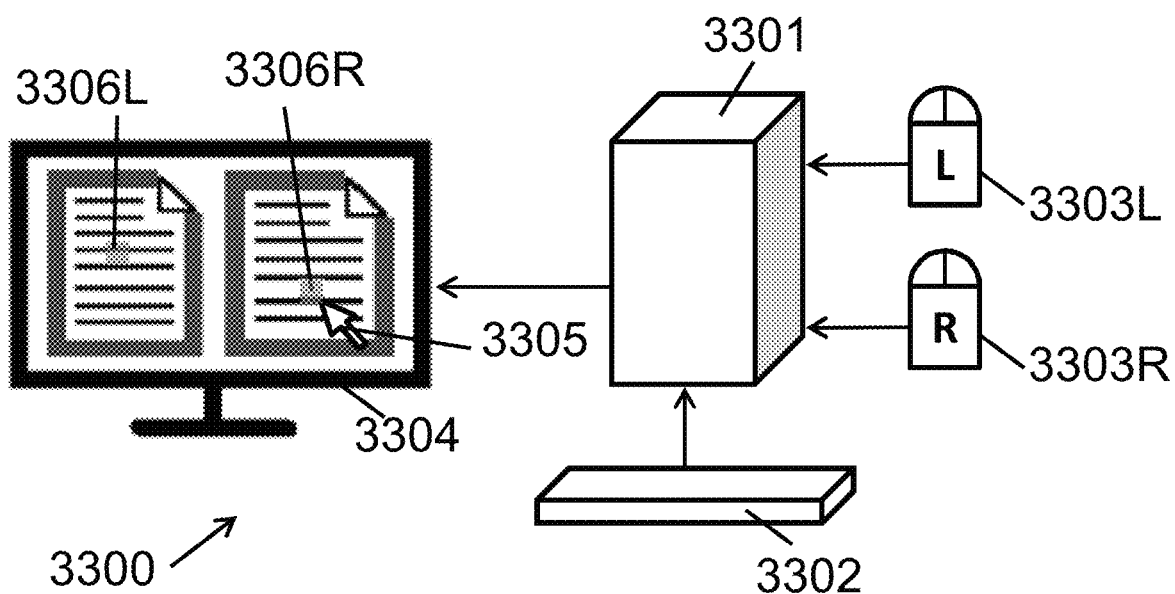
FIG. 33 shows a variant of the computer system of FIG. 32, where the overlay application is configured to reposition the native mouse cursor and to show two movable squares, which move in accordance with movements of the pointer devices.

FIG. 33 illustrates embodiments of the present invention implementing display mode 2850(g), 2860(g) and 2870(g), where the O/S and GUI show the native mouse cursor 3305, the shape of which can and typically will change depending on the context, and the overlay application additionally shows two visible and movable squares 3306L, 3306R. Display mode 2860(g) and 2870(g) seem to be especially suitable for any of the cases shown in FIG. 1 to FIGS. 4(a) and 4(b) for right-handed people, while display mode 2850(g) and 2870(g) seems to be especially suitable for similar problems as shown in FIG. 1 to FIG. 4(b) but for left-handed people.

FIG. 34 illustrates embodiments of the present invention implementing display mode 2870(b), where the O/S and GUI show the native mouse cursor 3405 (in the example a white arrow), and the overlay application additionally shows two visible objects, a second object 3406L being or containing a bitmap or image of a left hand, and a third object 3406R being or containing a bitmap or image of a right hand. Also this mode seems to be especially suitable for all the cases shown in FIG. 1 to FIG. 4(b), especially in combination with a movement transformation routine as explained in FIG. 31(b) and FIG. 31(c) to help the user easily make horizontal movements, and especially if the hands are semi-transparent. Preferably, in this case, the position of the bitmap containing the image of the hand is slightly offset relative to the position of the native mouse cursor 3405, such that the native mouse cursor is located at or near the tip of the respective forefingers. Tests have shown that the two hands may be extremely helpful when proofreading.

Figure 2:
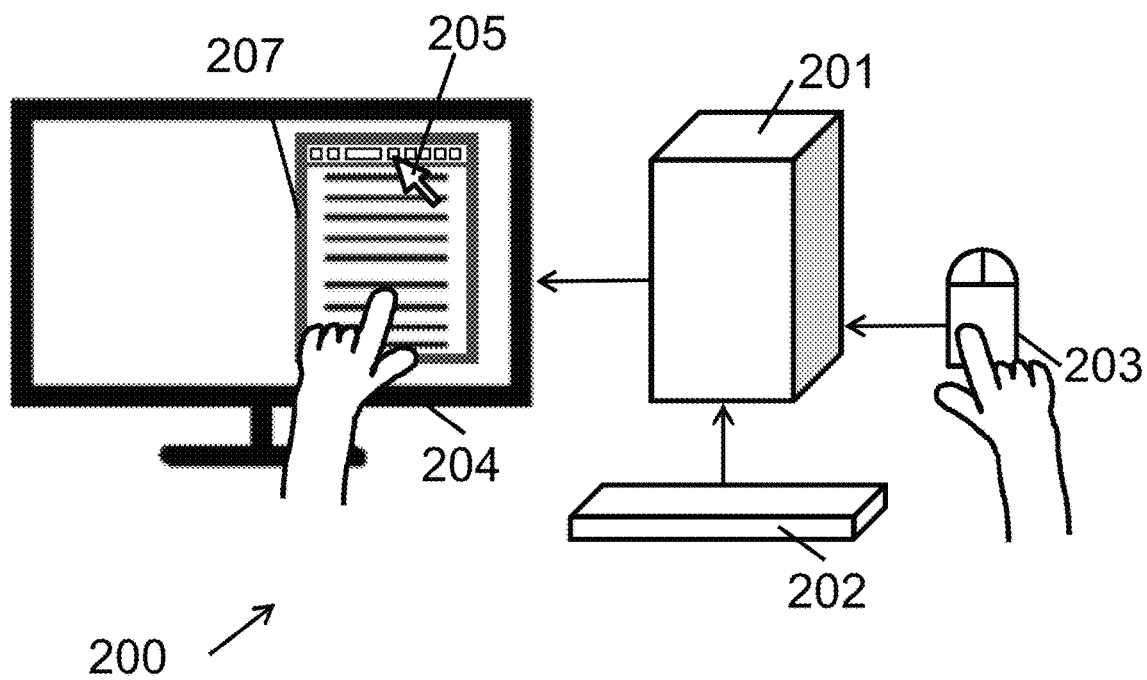
FIG. 2 shows an example of how a person reading and editing or amending or commenting an electronic text document can use his finger to "remember" the position where he is reading, when he moves the mouse cursor to the menu bar to select a tool or a color, or the like, using a classical computer system.

While the present invention can also be used with bitmaps other than a hand, it is noted that the shape of a hand, especially a hand with a stretched forefinger feels very natural and intuitive, and does not seem to distract the users attention, maybe because it looks very much like the real hand and finger shown in FIG. 1 to FIG. 3. That said, a triangular shape, or a polygonal shape, preferably having a tip at the top, can also be used.

Figure 35:
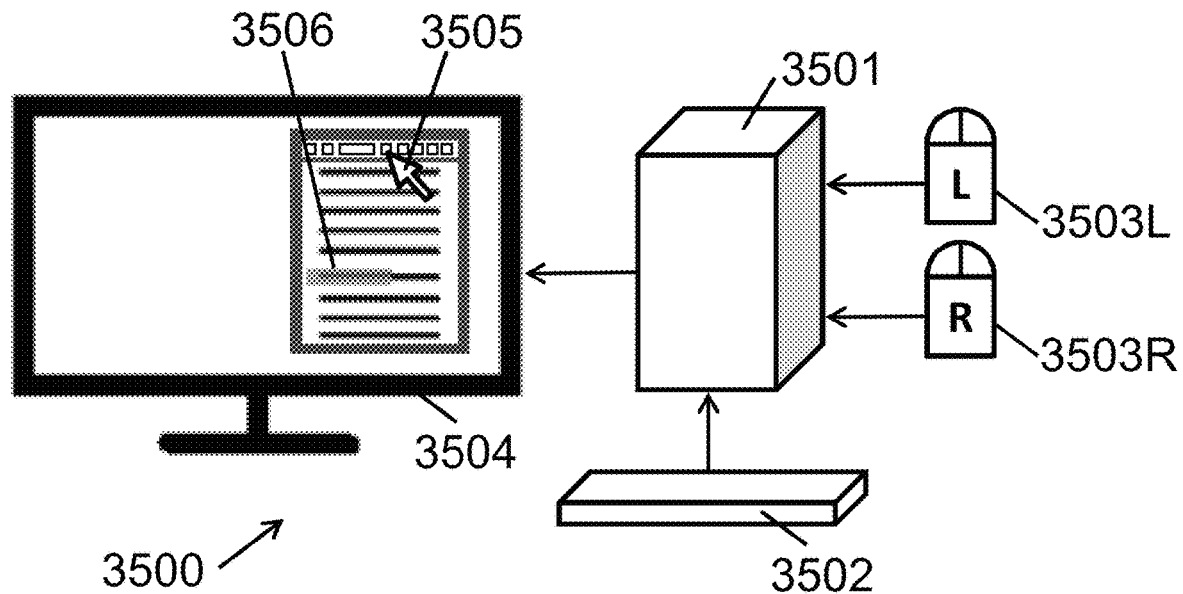
FIG. 35 shows a computer system according to an embodiment of the present invention, where the computer device is running an O/S and GUI and an exemplary application (e-g- a PDF document editor), and is running an overlay application according to an embodiment of the present invention. The overlay application is configured to reposition the native mouse cursor and to show a movable line, in accordance with movements of the pointer devices.

FIG. 35 illustrates embodiments of the present invention implementing display modes 2850(d) and 2860(d) showing the native mouse cursor 3505 as a first visible and movable object, and one line 3506 or rectangle as the second visible and movable object. These modes may be especially useful for addressing the problem shown in FIG. 2 and FIG. 3. It may be an advantage of this embodiment that there is no third object following the native mouse cursor, which could be slightly distracting or slightly annoying when selecting menus or colors or the like.

Figure 36:
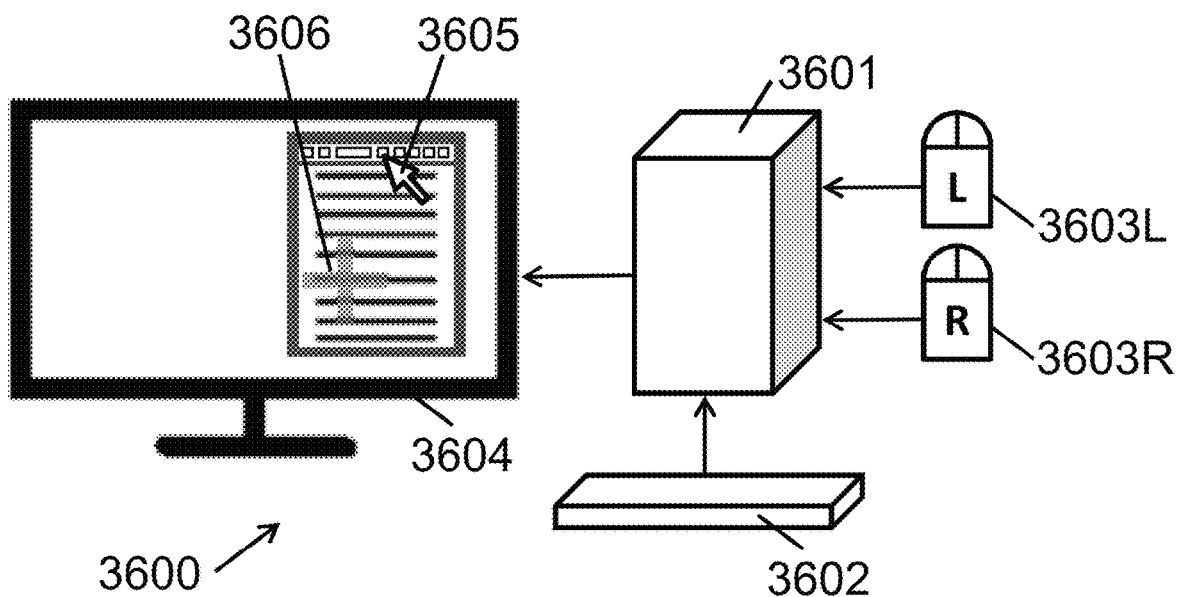
FIG. 36 shows a variant of the computer system of FIG. 35, where the overlay application is configured to reposition the native mouse cursor and to show a movable cross, in accordance with movements of the pointer devices.

FIG. 36 illustrates embodiments of the present invention implementing display modes 2850(e) and 2860(e) showing the native mouse cursor 3605 as a first visible and movable object and one small cross 3606 as a second visible and movable object. These modes may also be especially useful for addressing the problem shown in FIG. 2 and FIG. 3.

Display modes 2850(j) and 2860(j) showing a large cross which extending over the entire height and width of the overlay window, can be seen as a variant of the embodiment shown in FIG. 36. These modes may be especially useful when reading or extracting information from a spreadsheet with the non-dominant hand, while working with the native mouse cursor in another document, for example a text document. The large cross in overlay offers the advantage that a specific cell can be easily found, and that the row headers and column headers of a particular cell are extremely easy to find as well, as explained in more detail in the co-pending "perforated bitmap application(s)".

For completeness it is noted that the mode 2840(f) with a single mouse may be better suitable when editing a spreadsheet, because in this embodiment the native mouse cursor is located at the crossing of the large cross. That said, the skilled person having the benefit of the present disclosure can easily add a display mode where the cross of display mode 2840(f) is used as the third visible object, and another object, for example a line or a square or a hand is added as a second visible object.

FIG. 37 is a variant of FIG. 32 implementing the same modes, but used to (virtually) underline different portions of a single document.

Figure 38:
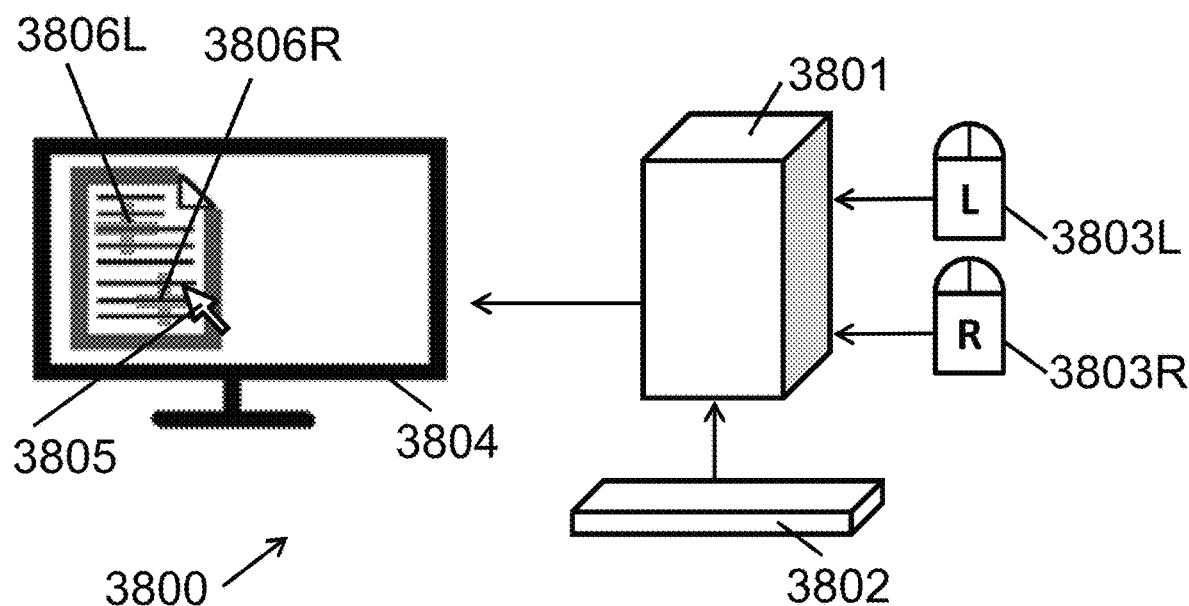
FIG. 38 shows a variant of the computer system of FIG. 37, where the overlay application is configured to reposition the native mouse cursor and to show two movable crosses, in accordance with movements of the pointer devices.

FIG. 38 illustrates embodiments of the present invention implementing display modes 2850(i) to 2870(i) showing the native mouse cursor and two small crosses 3806L, 3806R.

Figure 39:
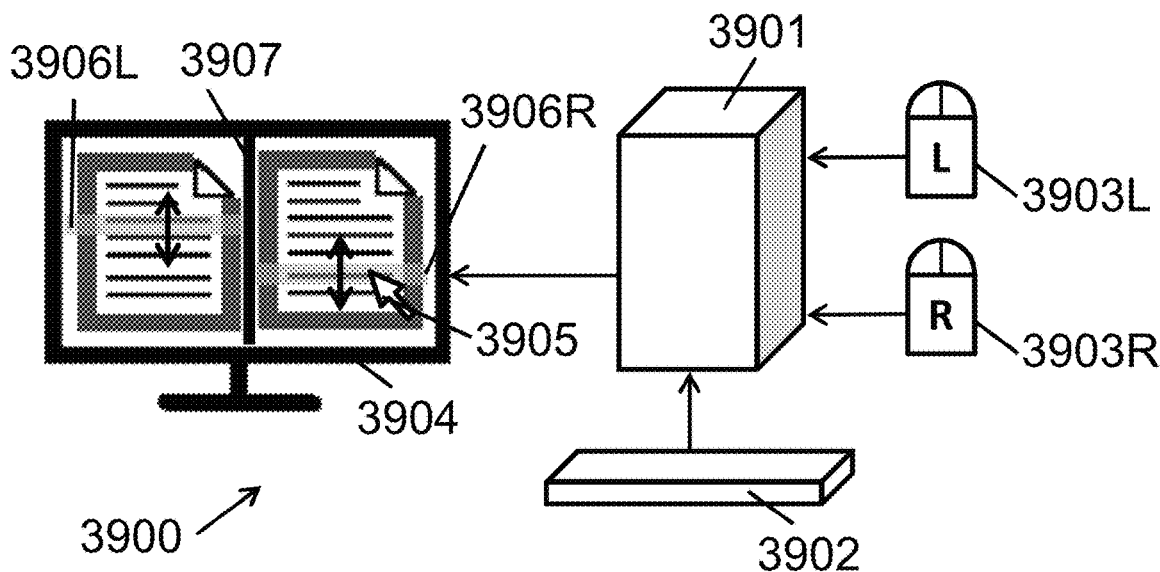
FIG. 39 shows a computer system according to an embodiment of the present invention, where the computer device is running an O/S and GUI and an exemplary application (e-g- a text editor), and is running an overlay application according to an embodiment of the present invention. The overlay application is configured to reposition the native mouse cursor and to show a vertical line to split the screen in a left part and a right part, and to show two horizontal lines which are movable vertically, in accordance with movements of the pointer devices.

FIG. 39 illustrates embodiments of the present invention wherein the overlay application is configured in any of the display modes 2850(j), 2860(j) and 2870(j). The horizontal line or bar 3906L located on the left side of the vertical line 3907 is automatically moved up/down when moving the left pointer device 3903L. The horizontal line or bar 3906R located on the right side of the vertical line 3907 is automatically moved up/down when moving the right pointer device 3903R. Depending on which input mode is selected or implemented, the native mouse cursor 3905 follows movements of the left pointer device 3903L (in the LeftHanded input mode), or the right pointer device 3903R (in the RightHanded input mode), or the pointer device which is most recently moved and/or clicked and/or scrolled (in the BothHanded input mode). An advantage of this embodiment for proofreaders is that the non-dominant hand does not require accurate positioning, since an entire text line can be underlined by merely moving the non-dominant pointer device up/down. Left and right movements of the non-dominant pointer device are not required. This is true especially for "easy texts" which can be read relatively fast, where it is not required or desirable to underline each word individually, in contrast to for example translations of claims, where each word needs to be carefully checked.

Figure 40:
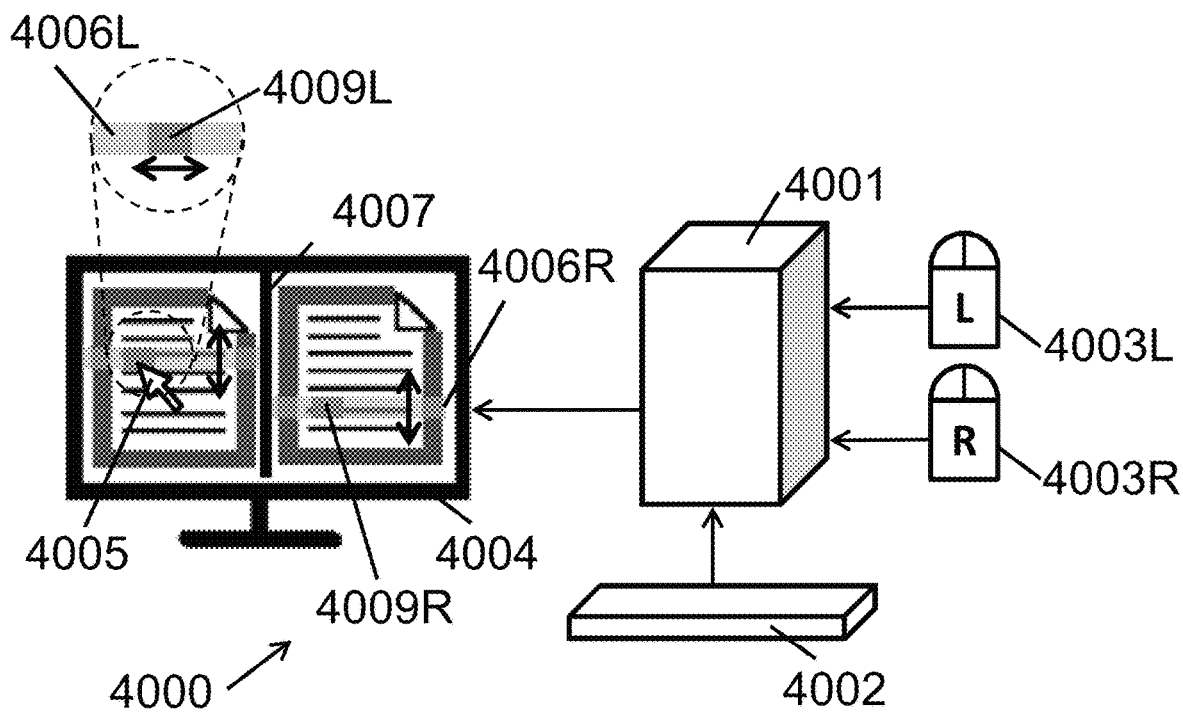
FIG. 40 shows a variant of the computer system of FIG. 39, where the overlay application additionally provides two squares or rectangles inside the horizontal lines, which squares are also movable horizontally, in accordance with movements of the pointer devices.

FIG. 40 illustrates a variant of the embodiments shown in FIG. 39, where, in addition to the horizontal line or bar on the left and right side of the vertical line 4007, the overlay application also shows two blocks or squares or rectangles 4009L, 4009R inside said horizontal line or bar 4006L, 4006R, which blocks move along with the lines in vertical direction (up/down), but are also movable in horizontal direction (left/right) in accordance with movements of the respective pointer devices 4003L, 4003R. The line or bar would typically have another color than the blocks or squares or rectangles inside the line or bar, so that they are clearly visible. In a particular embodiment or configuration, the lines have a monochrome color and the blocks are fully transparent, giving a visual impression of a bar with a "hole".

Figure 41:
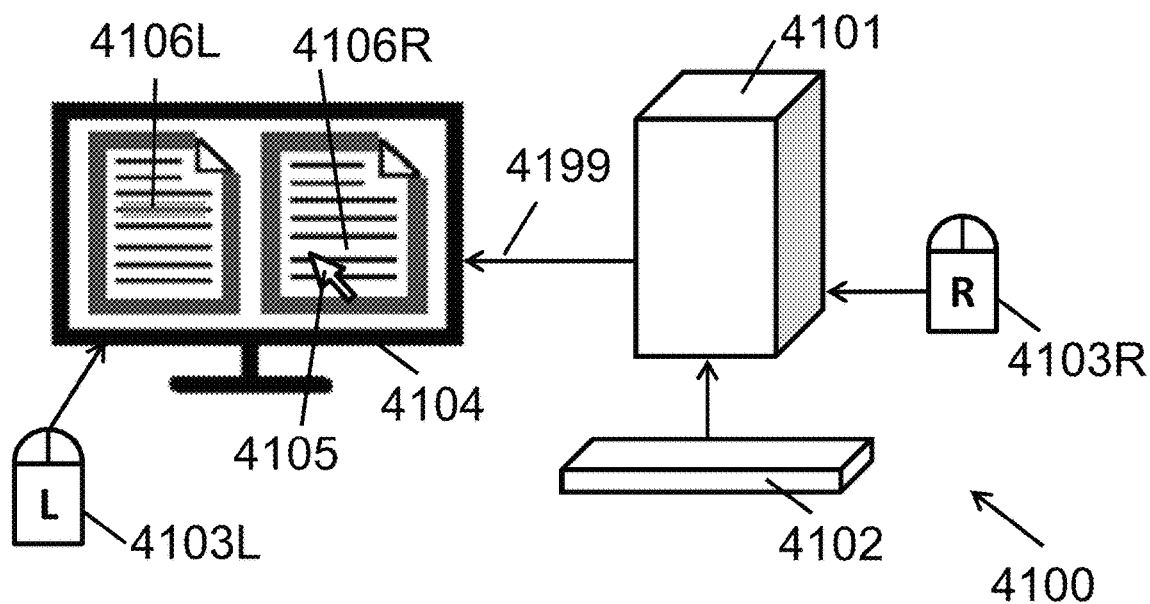
FIG. 41 shows a computer system according to an embodiment of the present invention comprising a special monitor or display according to an embodiment of the present invention, directly connectable to a pointer device, the special display or monitor being adapted for overlaying the image provided by the computer device with at least one visible object which is movable in accordance with movements of the pointer device connected to the display. The O/S and GUI of the computer device shows the native mouse cursor/pointer, which is movable by the pointer device that is connected to the computer.

The inventors also came to the idea to solve the problem illustrated in FIG. 1 to FIG. 3 in a completely different manner, namely, outside of the computer device, for example in a special display device 4104, as illustrated in FIG. 41.

FIG. 41 shows a computer system 4100 according to an embodiment of the present invention comprising a special monitor or display 4104 according to an embodiment of the present invention, and a computer device 4101, which may be a classical computer device. The computer system 4100 comprises at least two pointer devices, including a first pointer device 4103R connected to the classical computer device 4101, and a second pointer device 4103L connected to the special display 4104, in a wired or wireless manner, e.g. via a VGA-cable or a DVI-cable or a HDMI-cable 4199 over which uncompressed video is sent.

Stated in simple terms, the display device 4104 has a processor which is adapted for communicating with the pointer device 4103L and for maintaining a position xL, yL corresponding to movements of said pointer device 4103L, and is adapted for overlaying the graphical image received from the computer device 4101 with a locally generated visible object 4106L, for example having the shape of a square or a rectangle or a rectangle with rounded edges, or a circle or an arrow or a hand or a small cross or a large cross extending over the entire height and width of the display, or any other suitable shape, and for moving said object in accordance with movements of the pointer device 4103L by positioning said object 4106L at the maintained position xL, yL. In other words, in this embodiment the display device 4104 generates the object 4106L and shows it on the screen at a location which is movable by the left pointer device 4103L, while the computer device handles movements of the right pointer device 4103R as usual.

Figure 42:
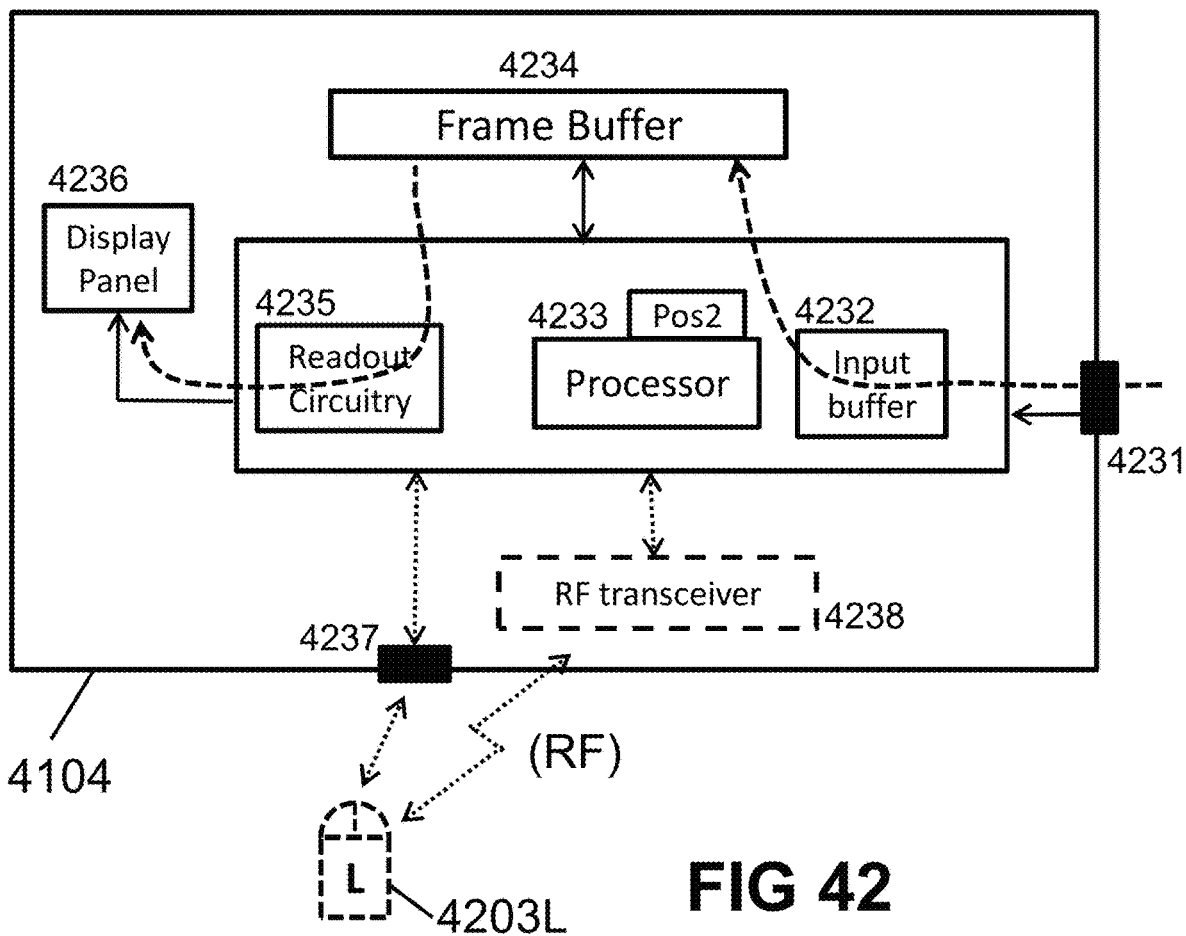
FIG. 42 shows an exemplary block-diagram of a display device used in the system of FIG. 41.

FIG. 42 shows an exemplary block-diagram of an embodiment of the display device 4104 as can be used in the computer system 4100 of FIG. 41. The display device 4104 comprises:

an input port 4231, e-g- a VGA port or a HDMI port or a DVI port or any other suitable port for receiving an uncompressed video signal comprising graphical image data originating from a computer device 4101 (hence not an MPEG2 or MPEG4 compressed video stream);
an interface or port for communicating with the pointer device 4203L, e-g- a physical connector 4237 such as a USB connector, or a wireless RF interface 4238;
a display panel 4236, e-g- an LCD panel for generating a visual image;
an input buffer 4232 for storing at least a portion of said graphical image data received at the input port 4231;
a frame buffer 4234 for storing at least a portion of the image data to be shown on said display panel 4236;
and a processor adapted for:
  communicating with the pointer device 4203L for receiving displacement values dx, dy related to movements of said pointer device;
  maintaining a position xL, yL based on said received displacement values dx, dy;
  generating image data of the visible object 4106L;
  generating the image data to be stored in the frame buffer 4234 by overlaying the graphical image data received at its input port with the generated image data of the visible object 4106L at said maintained position xL,yL.

In case of a VGA or other analog input, the incoming signal needs to be digitized by means of one or more ADC (analog-to-digital) convertors, in manners known per se in the art. Likewise, if the outgoing signal is analog, the digital signal leaving the output buffer needs to be converted into analog signals using one or more DAC (digital-to-analog) convertors, in manners known per se in the art. The display device may optionally comprise input signal conversion circuitry for converting analog signals to digital signals, and/or may optionally comprise output signal conversion circuitry for converting digital signals into analog output signals.

The pointer device 4203L may be a wired mouse device or a wireless mouse device. The pointer device 4203L may be a HID-compatible pointer device, e-g- a HID-compatible mouse device. The pointer device may be directly connected to the physical connector via wires, or via a classical hub (not shown).

The pointer device may be a wireless pointer device, e-g- a wireless mouse device, which communicates via a dongle connected to, e-g- inserted in the physical connector of the display.

The display may comprise an internal or external wireless RF transceiver 4238 for communicating with a wireless pointer device, e-g- via a Bluetooth protocol.

The generated visible object 4106L may have the shape of a square, or a square with rounded edges, or a rectangle, or a rectangle with rounded edges, or an elongated object, or an arrow or a hand, or any other suitable shape.

The object 4106L may consist of monochrome pixels, e-g- red or blue or black or yellow pixels, or any other suitable color. Alternatively the object may have exactly two color, for example an inner color and a peripheral color (e-g- black), for example for forming a larger contrast. But the visible objects may also contain more than two colors.

The object 4106L may be opaque, meaning that the user cannot see-through the object 4106L. In this case, the processor can generate the overlaid image by simply replacing some of the graphical image data from the computer by image date of the locally generated visible object, without having to mix data.

The object 4106L may be a semi-transparent monochrome object, e-g- having an alpha-transparency a in the range from 10% to 90%, e-g- about 25% or about 50% or about 75%. In this case the processor would alpha-blend or mix the graphical image data with the object data. In the case of 50% alpha-blending, the red, blue and green color components R1, G1, B1 of the graphical image data and the red, blue and green color components R2, G2, B2 of the pixels of the movable object can simply be averaged, which is an easy arithmetic operation, for example equivalent to the following calculation: R:=(R1 shr 1)+(R2 shr 1), and likewise for the other color components.

The object 4106L may be or may comprise a so called "perforated bitmap", as explained in the co-pending "perforated bitmap application(s)". This bitmap may comprise a first plurality of fully transparent pixels and a second plurality of monochrome pixels, the first plurality of pixels and the second plurality of pixels are interleaved, for example according to a chessboard pattern.

This perforated bitmap may be overlaid in an opaque manner, as follows: in case a graphical image pixel from the computer image is to be overlaid by a fully transparent pixel, the result of the overlay would be the original graphical image pixel. In case a graphical image pixel would be overlaid by a monochrome pixel, the result of the overlay would be the monochrome pixel of the movable object.

This perforated bitmap can be overlaid in a semi-transparent manner, as follows: In case a graphical image pixel is to be overlaid by a fully transparent pixel, the result of the overlay would be the original graphical image pixel. In case a graphical image pixel would be overlaid by a monochrome pixel, the result of the overlay would be the alpha-blending or mix of the graphical image pixel from the computer image and the monochrome pixel of the movable object.

It is also possible to make the object 4106L appear semi-transparent by time-multiplexing between the graphical image pixels (coming from the computer device), and the image pixels of the movable object (generated inside the display). For example by using/displaying the monochrome pixels of the object 4106L at a first moment in time (e·g· at even frame numbers) and by using/displaying the graphical image data at a second moment in time (e·g· at odd frame numbers). This would mean for example that half of the frames would effectively show the visible object 4106L, and half of the frames would not, creating the impression of being "semi-transparent" (time averaged).

Comparison of FIG. 41 with FIG. 5(*a*) and FIG. 5(*b*) learns that the images on the screen may look exactly the same or very similar (assuming the same color and/or semi-transparency level are used). Thus, the embodiment of FIG. 41 also addresses the problem described in FIG. 1 to FIG. 3, but the computer device 4101 does not require the special overlay application and/or the special mouse and/or the special hub described above, only the display device 4104 needs to be "special".

The computer system 4100 of FIG. 41 allows the user to move the left pointer device 4103L in order to move the position of the visible object 4106 on the screen, but of course clicking on that pointer device or scrolling the wheel thereof will not have the effect of selecting text or scrolling a document up or down. In other words, the embodiment of FIG. 41 does not solve the problem illustrated in FIG. 4.

In a variant of the display device shown in FIG. 42, the display device comprises at least two connectors for connecting to at least two pointer devices, and the processor 4233 would is adapted for maintaining two pointer positions Pos1, Pos2, and for generating two visible objects, for example two lines similar to FIG. 32, or two squares similar to FIG. 33 or two hands similar to FIG. 34, and for positioning these two objects at said two maintained locations. With a computer system comprising such a display device, a user could use for example two dedicated pointer devices for comparing two text documents (e·g·when proofreading a translation), and use a third pointer device connected to the computer 4101 for editing or correcting.

The display device 4104 may have a further connector for connection to a removable non-volatile memory device, such as a memory-card or a USB-stick or the like, which may contain a file and a bitmap of the one or more visible objects to be displayed.

Figure 43:
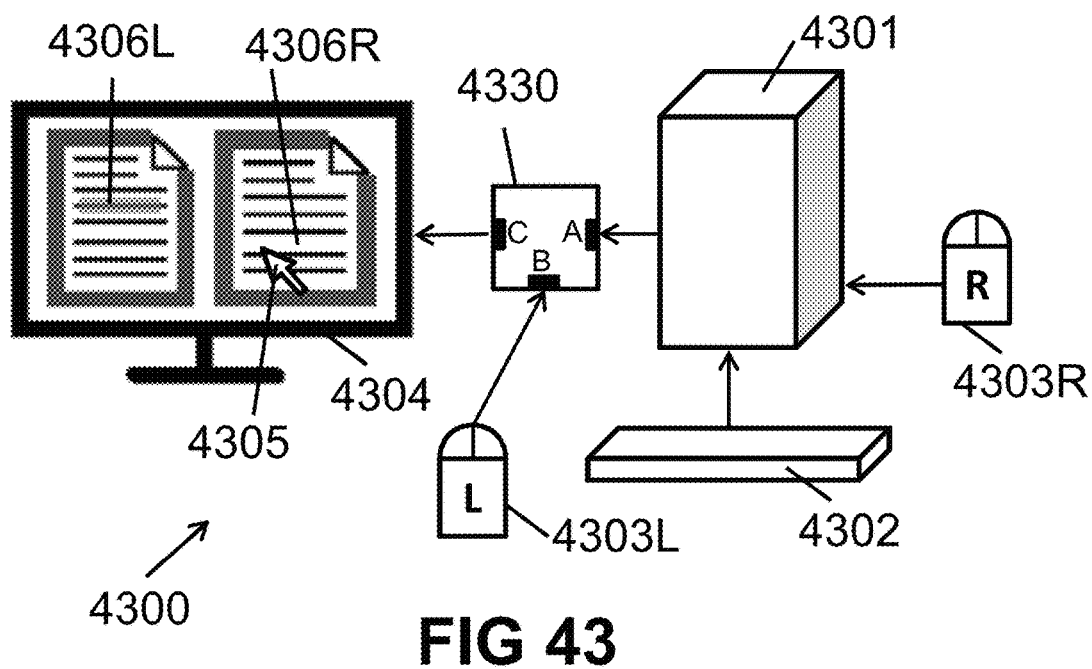
FIG. 43 shows a computer system according to an embodiment of the present invention comprising a video adapter device or video interface device according to an embodiment of the present invention, having an input port for receiving first graphical image data from a computer device, the computer device being connected to a first pointer device. The video adapter further comprises an output port for providing second graphical image data to a monitor or display, the video adapter further comprising a wired or wireless interface to a second pointer device, the video adapter being adapted for generating at least one visible object, and for overlaying the first graphical image data with said at least one visible object, and for moving said visible object in accordance with movements of said second pointer device connected to the video adapter.
Figure 44:
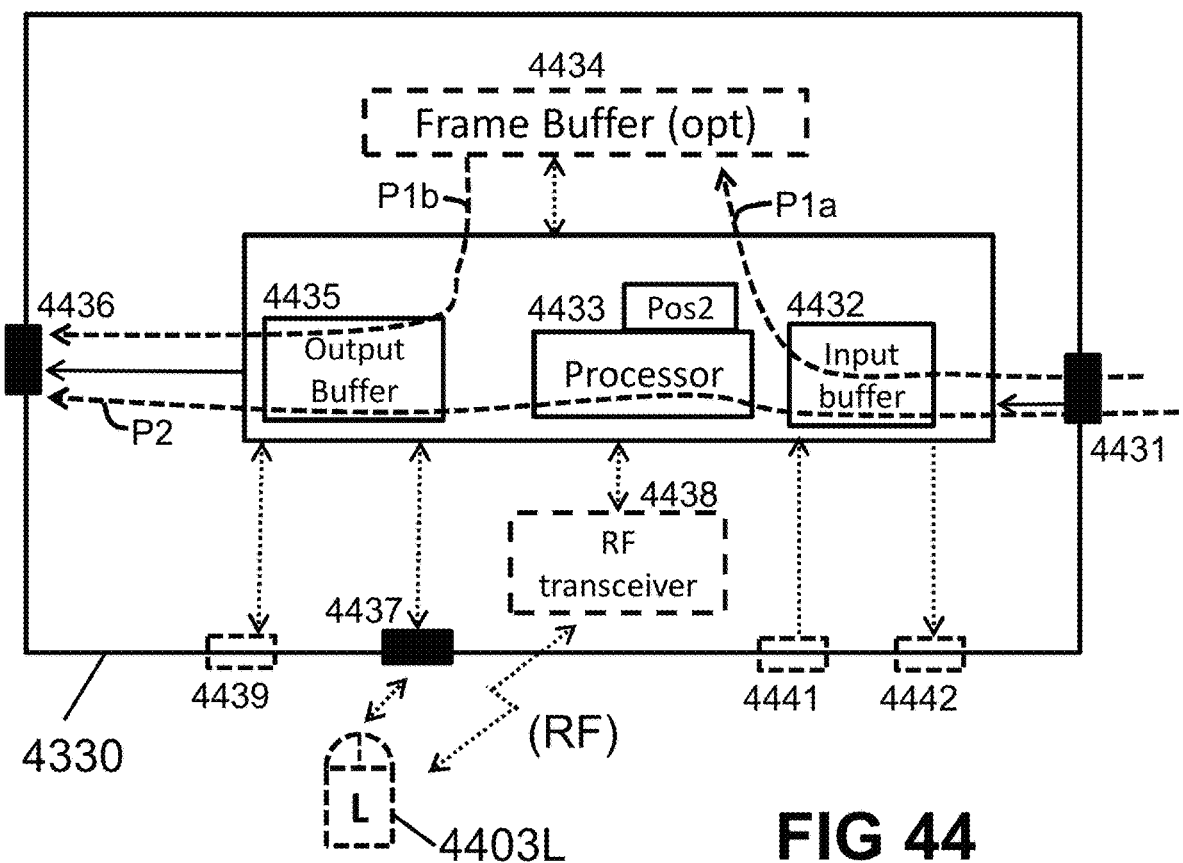
FIG. 44 shows an exemplary hardware block-diagram of the video adapter device of FIG. 43.

The inventors came to yet another idea to solve the problem illustrated in FIG. 1 to FIG. 3, also outside of the computer device 4301, namely by providing a special video adapter or video interface device 4330, connected between the computer device 4301 and the display device 4304, as illustrated in FIG. 43 and FIG. 44.

Many kinds of video adapters are known in the art, for example a video adapter for converting a HDMI signal into a VGA signal or vice versa. The video adapter may include one or more high-speed analog to digital converters ADC and/or one or more high speed digital-to-analog convertors DAC.

None of the existing video adapters maintains a position related to movements of a pointer device connected to said adapter, and none of these shows a visible object movable in accordance with these movements. Preferably, the video adapter 4330 according to embodiments of the present invention comprises a digital video input connector (e·g· a HDMI input connector) configured for receiving an uncompressed video signal (hence e.g. no MPEG2 or MPEG4 stream), and a digital video output connector (e·g· a HDMI output connector), in which case the incoming video or graphical image data is digital, and also the outgoing video or graphical image data is digital, and the DAC(s) and the ADC(s) can be omitted. But a video adapter with a VGA input connector is also possible.

FIG. 43 shows a computer system 4300 according to an embodiment of the present invention comprising a video adapter device 4330 according to an embodiment of the present invention.

In the context of the present invention, the "video adapter" is an electrical or electronic device in a single housing (e.g. a box) with a typical length from 4 to 14 cm, and a typical width from 4 to 12 cm, and a typical height from 1 to 4 cm, and thus not a laptop computer or desktop computer, and certainly not a computer system with multiple network servers. The device 4330 preferably does not have a separate power cable or power supply, but is preferably powered from the video input port A directly from the computer 4301.

Thus the video adapter 4330 has a video input port A, 4431 (for example a DVI or a HDMI port or a VGA port) for receiving an uncompressed video signal comprising first graphical image data from a computer device 4301. The computer device 4301 is connected to a first pointer device 4303R. The video adapter 4330 further comprises a video output port C, 4436 (for example a DVI or a HDMI port or a VGA port) for providing an uncompressed video signal with second graphical image data to a monitor or display 4304. The video adapter 4330 further comprises at least one interface (for example a physical connector such as a USB port, or an RF transceiver) for communicating with a second pointer device 4303L operatively connected to the video adapter. The video adapter 4330 is adapted for generating at least one visible object 4306L, for example having the shape of a square or a rectangle or a rectangle with rounded edges, or a circle or an arrow or a hand or a small cross or a large cross extending over the entire height and width of the display, or any other suitable shape, and for generating the second graphical image (to be sent to the display) by overlaying the first graphical image data (coming from the computer device) with said at least one visible object 4306L (generated internally), and for moving said at least one visible object 4306L in accordance with movements of said second pointer device 4303L.

The at least one visible object 4306L may have a monochrome color. The monochrome color may be predefined, for example red or green or blue or black or any other suitable color. Optionally the video adapter 4330 may have one or more buttons or switches 4441 for selecting the monochrome color from a number of predefined colors.

The video adapter is adapted for generating at least one visible object 4306L and for overlaying the at least one visible object with the incoming graphical image data, e·g· by alpha-blending or otherwise mixing or combining the first graphical image data from the computer with the image data of the movable object. The at least one visible object may be an opaque or a semi-transparent object, or may have a so called perforated bitmap, as described in more detail in the co-pending "perforated bitmap application(s)". It can be understood by comparing FIG. 41 and FIG. 43 that also the embodiment of FIG. 43 solves the problems described in FIG. 1 to FIG. 3.

FIG. 44 shows an exemplary hardware block diagram of a video adapter 4330 as can be used in the computer system 4300 of FIG. 43, but the invention is not limited thereto. The video adapter 4330 of FIG. 44 comprises the following components:

a video input port 4431, e.g. in the form of a VGA-connector or DVI-connector or HDMI-connector for receiving an uncompressed video signal comprising first graphical image data from a computer device;
a video output port 4436, e.g. in the form of a VGA-connector or DVI-connector or HDMI-connector for providing an uncompressed video signal comprising second graphical image data to a display device;
an input buffer 4432 for storing at least a portion of said first graphical image data received at the input port;
a processor 4433 connected to said input buffer 4432, and adapted for generating second graphical image data based on said first graphical image data;
a wired and/or a wireless interface 4437, 4438 for communicating with a wired or a wireless pointer device 4403L;
the processor 4433 being further adapted for:
communicating with said pointer device 4403L for receiving displacement information dx, dy related to movements of said pointer device 4403L;
updating a position Pos2 based on said received displacement information dx, dy;
generating a visible object 4306L;
generating said second graphical image data by overlaying the first graphical image data with said generated visible object 4306L at said position Pos2.

The video adapted may further comprise a frame buffer 4434 operatively connected to said processor 4433, adapted for storing at least a portion of the first graphical image data received from the input buffer 4432, and for storing at least a portion of the second graphical data to be transmitted to the output buffer 4435.

A frame buffer is however not absolutely required, e-g- in case the incoming video stream and the outgoing video stream has the same frame rate and resolution. In such embodiments the volatile memory (RAM) of the video adapter is preferably smaller than one frame-memory.

Optionally the video adapter 4330 may further comprise one or more buttons 4441, for example to allow the user to select a color and/or shape and/or size of the movable object 4306L.

Optionally the video adapter 4330 may further comprise one or more indicators, for example in the form of LEDs 4442 to provide information to the user.

The video adapter 4330 may comprise a memory device (not shown) comprising the input buffer and the output buffer and (if present also) the frame buffer.

However, the present invention is not limited to this specific embodiment, because other architectures may fulfil the same functionality. For example, if the clock-rate of the incoming video data and the outgoing video data is the same, the second graphical image can be generated in real-time, and the frame buffer may be omitted, and the generation of the visible object 4306L can in practice be implemented in real-time, together with the overlaying or alpha-blending operation. The person skilled in the art of designing video chips knows how this functionality can be implemented, but as far as is known, there is no known reason in the art for providing support for a pointing device on such chips.

The video interface device 4330 may have additional interfaces, for example an additional USB port 4439 for connection to for example a USB memory stick which may for example comprise a bitmap of the movable object, and/or may further comprise a texture bitmap to be overlaid with the incoming video data, for example in a manner as described in the co-pending "perforated bitmap application(s)".

In an embodiment, the video interface device 4330 has an embedded RF transceiver 4438 for communicating with a wireless mouse and/or for communicating with the personal computer device, for example for configuring the video adapter device 4330, and/or for selecting said size or color of the object, etc- But such transceiver may also be provided externally, e-g- as a dongle connected to the connector 4437 or 4439.

In a variant of the video adapter device shown in FIG. 43 and FIG. 44, the display adapter comprises at least two connectors for connecting to at least two pointer devices, and the processor 4433 is adapted for maintaining two pointer positions Pos1, Pos2, and for generating two visible objects, for example two lines similar to FIG. 32, or two squares similar to FIG. 33 or two hands similar to FIG. 34, and for positioning these two objects at said two maintained locations. With a computer system comprising such a video adapter, a user could use for example two dedicated pointer devices for comparing two text documents (e-g-when proof-reading a translation), and use a third pointer device connected to the computer 4301 for editing or correcting.

The video adapter unit 4330 may also be equipped to convert relatively bright image information into fairly dark image information and vice versa. In this regard, incoming pixel values (Rin, Gin, Bin) are converted to outgoing pixel values (Rout, Gout, Bout). This can for example be done as follows:

First values (Rin, Gin, Bin) are converted to YUV-values, e.g. using the formulas:

$$Y=0.299R+0.587G+0.114B; U=0.492(B-Y); V=0.877(R-Y),$$

or using the formulas:

$$Y:=(R+G+G+B)shr2; U:=(B-Y)\text{div } 2; V:=(R-Y),$$

or by means of formulas with slightly different coefficients.
after which the outgoing RGB values are calculated using one of the following functions:
a) YUV2RGB(255−Y, U, V, Rout,Gout,Bout), or
b) YUV2RGB(255−Y, U div 2, V div 2, Rout,Gout,Bout), or
c) YUV2RGB(255−Y, −U, −V, Rout,Gout,Bout), or
d) YUV2RGB(255−Y, −U div 2, −V div 2, Rout,Gout, Bout),
where the conversion of YUV values to RGB values can e.g. be calculated using the following formulas:

$$R=Y+1.140V; G=Y-0.395U-0.581V; B=Y+2.032U,$$

or using the formulas:

$$R:=Y+V; G:=Y-((U+V)\text{div } 2); B:=Y+(U+U),$$

or by means of formulas with slightly different coefficients.

Formulas (a) and (b) have as advantage that the original color values are substantially maintained, which is convenient for displaying documents where a certain color convention is used (e.g. black for claims, blue for advantages, etc).

Formulas (c) and (d) have as advantage that not only the intensity is inverted, but also the colours, which for some applications, (e.g. some email programs) is easier to read.

The formulas with floating-point operations obviously require more processing power. The formulas with integer operations can usually be executed faster, or on a less powerful processor. Tests have shown that the result of these four solutions are aesthetically pleasing, and may reduce eye strain, especially if the original images have a typical white background.

Tests have shown that the following set of formulas also give very good results:
a) Y:=(R+G+G+B) div 4;
b) Rout:=(256−Y)+A·(R−Y), limited to [0 ... 255];
c) Gout:=(256−Y)+B·(G−Y), limited to [0 ... 255];
d) Bout:=(256−Y)+C·(B−Y), limited to [0 ... 255];

where (R,G,B) are red, green and blue color values of incoming pixels, and (Rout, Gout, Bout) are red, green and blue color values of outgoing pixels, and wherein A, B, C are predefined constants.

Preferably, the constants A, B, C are equal.

Preferably, these constants are rational numbers in the range of −⅞ to +⅞.

In an embodiment, the values A, B and C are selected from the following set: −½, +½, −⅓, +⅓, −⅔, +⅔, −¼, +¼, −¾, +¾, −⅕, +⅕, −⅖, +⅖, −⅗, +⅗, −⅘, +⅘, −⅙, +⅙, −⅚, +⅚, −⅞, +⅞.

Several months after the solutions described above, and seeking whether it would be possible to solve the problem of FIG. 21 in software, without requiring special hardware (e.g. without a special mouse or a special hub), but without giving up the convenient jumping behavior of the native mouse cursor, the inventors came to the idea that the functionality of the "special hub" as described above, can also be implemented in a so-called "mouse filter driver" (herein sometimes abbreviated as MFD). Although this embodiment will not be described further, the present invention is also directed to this embodiment. This mouse filter driver is thus based on the principle of correctly positioning the native mouse cursor in advance, before sending a click or scroll message, by using a dummy movement message, and by delaying (postponing) the original message.

The inventors also came to another idea which will now be described with reference to FIG. 45 to FIG. 54.

Figure 45:
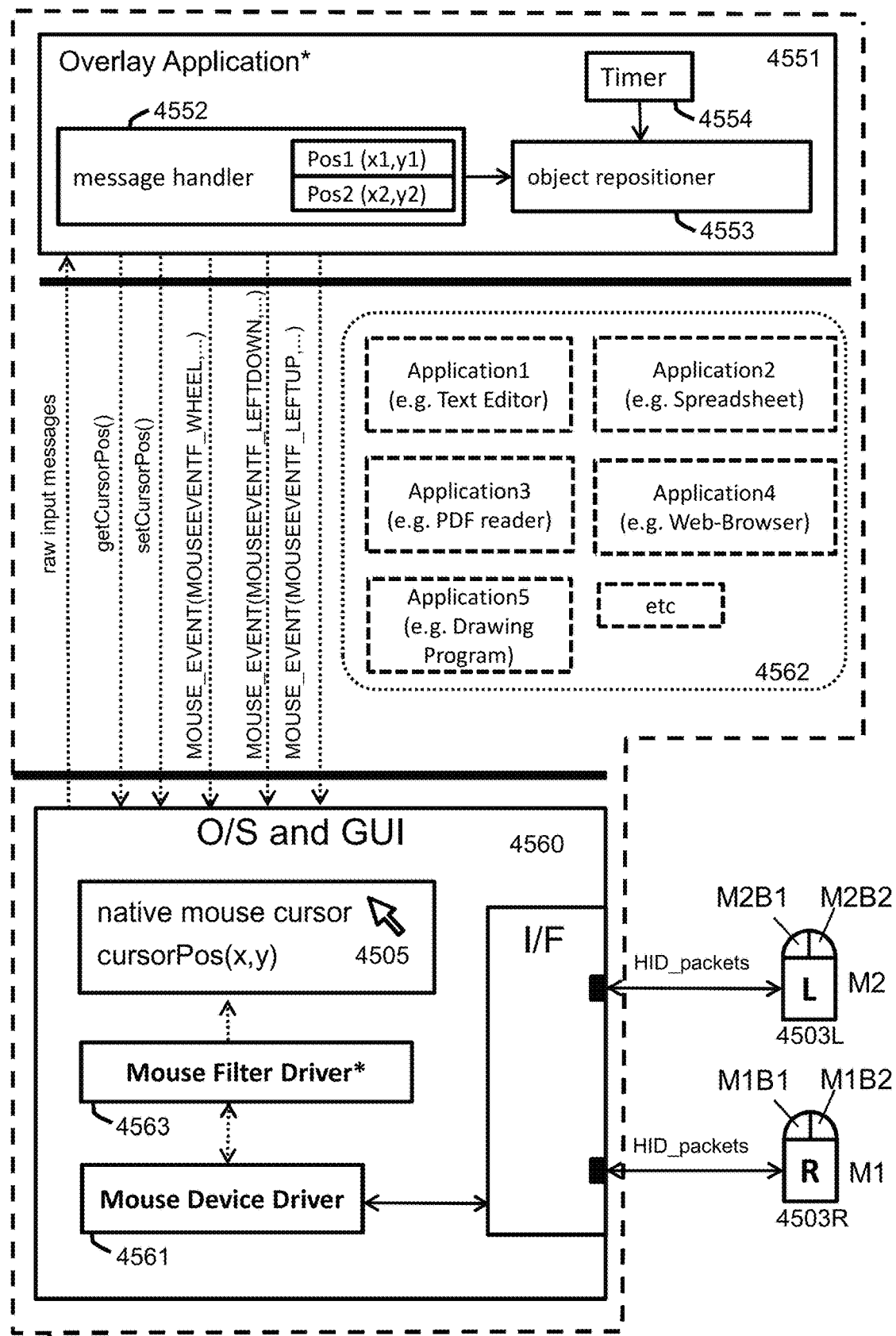
FIG. 45 shows a simplified high-level block diagram of hardware and software components situated in a computer system according to an embodiment of the present invention, the computer system comprising a computer device with an overlay application according to an embodiment of the present invention, and comprising a mouse filter driver according to an embodiment of the present invention. The computer system further comprises two classical mouse devices directly connected to the computer device.

FIG. 45 shows a computer system 4500 comprising a computer device 4501, which can be seen as a variant of the computer system 1100 of FIG. 11, to which a special mouse filter driver 4563 is added, which is adapted for:

i) detecting movement messages from the first and the second pointer device 4503R, 4503L, and upon detection of such a message, to send the movement message or a corresponding message to the operating system 4560; and ii) to detect at least one message from the group consisting of a button-pressed message, a button-released message, a scroll-up message and a scroll-down message originating from the first and/or the second pointer device 4503R, 4503L, and upon detection of such a message, to send a first, second, third or fourth (predefined, or parameterizable or at least partially predefined) movement sequence respectively to the operating system (O/S);

iii) and wherein the special overlay application 4551 is further adapted for:

detecting such movement sequences (or corresponding sequences of movement messages),
and after detection thereof, to first (re)position the native mouse cursor 705 to the position that corresponds to the maintained position for the mouse device that caused the respective sequence,
and shortly thereafter, preferably immediately thereafter, or even better in the same command, to transmit a button-press command, or a button-release command, or a scroll-up command or a scroll-down command from the overlay application 4551, from the correct position, to the operating system, which in turn will pass the command on to the correct underlying application (because the overlay application is configured in click-through mode, and/or is substantially fully transparent), more specifically to the application (or visual component) located below the left mouse position (Pos2) if the left mouse was operated (scrolled or clicked), or the application (or visual component) located below the right mouse position (Pos1) if the right mouse was operated (scrolled or clicked).

It is noted that the mouse filter driver 4563 does not need to know which is the first and second pointer device. In an embodiment in which more than two pointer devices are connected to the computer device 4501, the mouse filter driver converts all "scroll-up", "scroll-down", "button-press" and "button-release" messages from all mouse devices into a corresponding (e.g. predefined or parameterizable) movement sequence. The overlay application can decide which of these sequences originate from the first or second pointer device, e.g. as the right mouse and the left mouse.

As far as terminology is concerned, a "scroll-up message" and a "scroll-down message" are sometimes simply referred to by the term "scroll message", and a "scroll-up command" and a "scroll-down command" are sometimes simply referred to by the term "scroll command", without specifying which of the two (up or down). By "scroll-up message" is also meant a scroll message with one or more parameter(s) to cause an upward scroll. The person skilled in the art knows what is intended by this.

Similarly, in the explanation below the expressions "button-press message" and "button-release message" are used, without referring to which button it concerns.

Although the invention is mainly explained for a mouse with one scroll wheel that can be rotated up or down (scrolled), and with one push button that can be pressed or released, and four corresponding movement sequences, this principle can of course be extended to a pointer device with multiple scroll wheels (e.g. a horizontal scroll wheel) and/or multiple push buttons, e.g. a mouse with exactly one scroll wheel and exactly two push buttons (herein sometimes called left button and right button).

In a preferred embodiment, the mouse filter driver 4563 is adapted to recognize at least six or exactly six commands besides normal mouse movements (displacements): (1) scroll up, (2) scroll down, (3) left button pressed, (4) left button released, (5) right button pressed, (6) right button released, and to transmit one of six corresponding, e.g. predetermined or parameterizable or partially predetermined movement sequences. The "left button" is sometimes also referred to as "button1", and the right button as "button2", but the invention can easily be extended to implementations with more than two buttons and more than one scroll wheel.

Mouse Filter Driver:

Simply stated, the mouse filter driver 4563 should perform the following functions, or a subset hereof a) detect a movement message (also referred to as displacement message) originating from a mouse device, and upon detection, transmit the movement message (or a corresponding message or command) to the O/S, e.g. to an input buffer of the O/S, possibly in a different format and/or at a slightly shifted time (e.g. at the request of the O/S);

b) detect a button-pressed message originating from a mouse device, and upon detection, transmit a first predefined sequence of movement messages to the input buffer of the O/S instead of the button-pressed message;

c) detect a button-released message originating from a mouse device, and upon detection, transmit a second predefined set of movement messages to the input buffer of the O/S instead of the button-released message;

d) detect a scroll-up message from a mouse device, and upon detection, transmit a third predefined or parameterizable or partially predefined set of movement messages to the input buffer of the O/S, as a replacement of the scroll-up message;

e) detect a scroll-down message originating from a mouse device, and upon detection, transmit a fourth predefined or parameterizable or partially predefined set of movement messages to the input buffer of the O/S, instead of the scroll-down message.

It should be noted in this regard that the terms "third" and "fourth" etc. do not have an absolute meaning, but only serve to distinguish between the different sequences that are or can be used. Thus a different sequence is preferably used for pressing the left button (also called button1) and pressing the right button (also called button2), and for releasing the left button and releasing the right button, but in order not to unnecessarily complicate the description, abstraction is usually made.

In any case, if the pointer device has several buttons (a typical mouse has at least one left button and one right button), then further movement sequences (e.g. predefined or parameterizable) can be used, e.g. a seventh sequence, an eighth sequence, etc.)

If the pointer device has multiple scroll wheels (e.g. a horizontal scroll wheel and a vertical scroll wheel), then further movement sequences (e.g. predefined or parameterizable) can be used, e.g. a ninth sequence (for scroll-up of scroll wheel2), a tenth sequence (for scroll-down of scroll wheel2), etc.

What is important is that the mouse filter driver converts a certain message into a certain series of (false) movements, and that the overlay application can translate this back to the corresponding button operation or scroll wheel operation. To the best of our knowledge, such a translation stage is not used the prior art.

Figure 51:
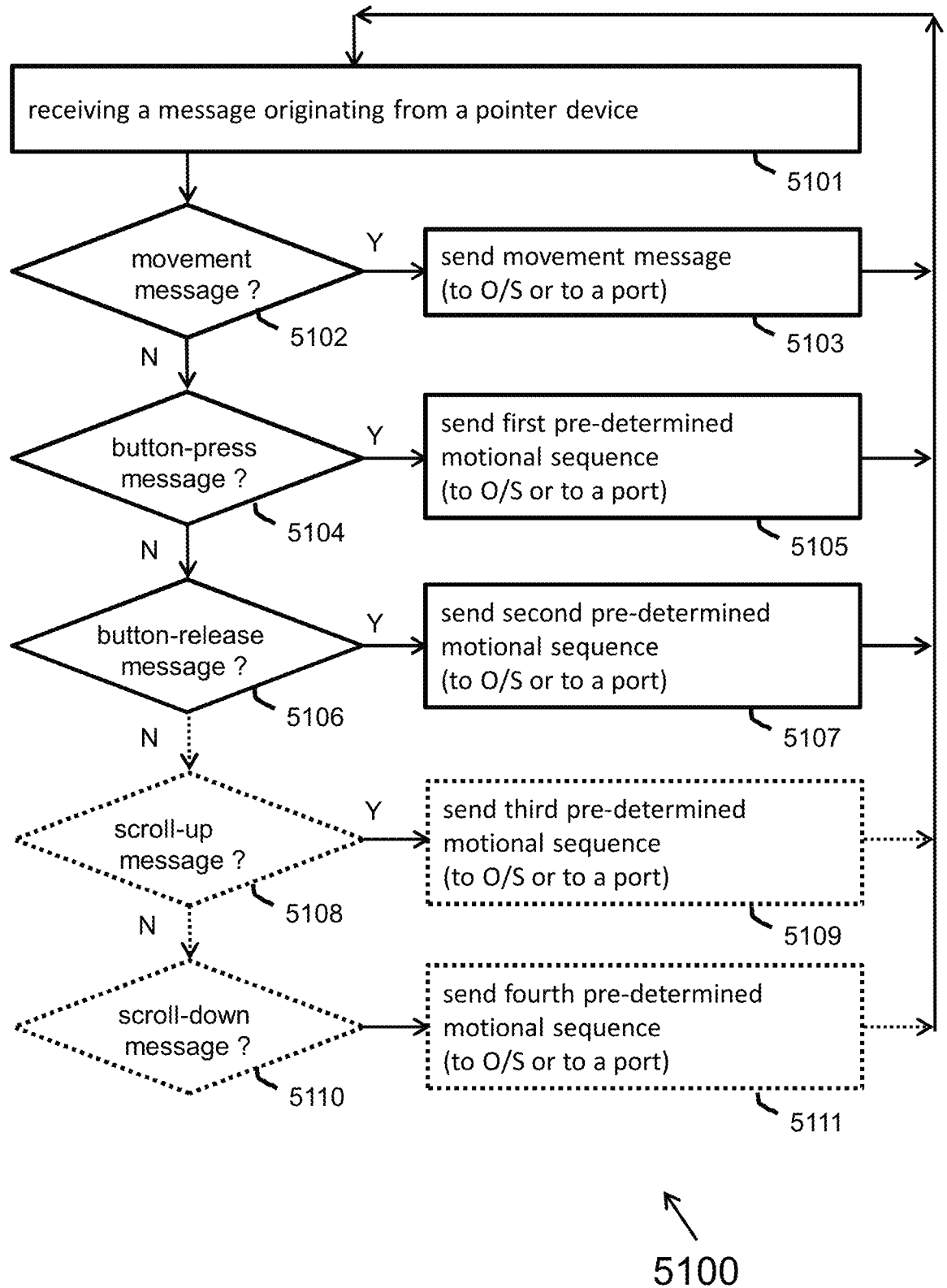
FIG. 51 shows a flow-diagram of an exemplary computer implemented method which can be performed by the mouse filter driver used in the system of FIG. 45 or FIG. 46.

FIG. 51 shows an example of a method 5100 which can be performed by such a mouse filter driver 4563.

In step 5101, a message originating from a pointer device is received (e.g. a message originating from a touchpad or mouse, e.g. via a hardware interface and a hardware abstraction layer and a mouse driver 4561);

In step 5102 it is checked whether this message is a movement message, and if so, then in step 5103 the movement message (or a corresponding data structure) is sent to the operating system O/S, otherwise, in step 5104 it is checked whether the received message was a button-pressed message, and if so, then in step 5105 a first (e.g. predetermined) movement sequence is sent to the operating system, otherwise, in step 5106 it is checked whether the received message was a button-released message, and if so, then in step 5107 a second (e.g. predetermined) movement sequence is sent to the operating system, otherwise, in step 5108 it is checked whether the received message was a scroll-up message, and if so, then in step 5109 a third (e.g. predetermined) movement sequence is sent to the operating system, otherwise, in step 5110 it is checked whether the received message was a scroll-down message, and if so, then in step 5111 a fourth (e.g. predetermined) movement sequence is sent to the operating system.

Steps 5108 to 5110 are optional. These are not necessary, for example, if the computer device would have two touchpads, or a touchpad and a stylus, but not a pointer device that can be scrolled.

As described above, step 5104 may comprise checking a left button-pressed message, and step 5106 may comprise checking a left button-released message, and the method may have additional steps (not shown in FIG. 51) for a right button-pressed message and a right button-released message.

Of course the order of the steps may be changed.

Preferably, the mouse filter driver 4563 gives the same device handle to the message or data structure transmitted to the operating system O/S. This allows the overlay application 4551 to determine which pointer device gave rise to the transmission of the movement message or the series of movement messages (i.e. the movement sequence).

Experiments have shown that some operating systems do not pass on the movement sequence itself, but double the individual displacement values, at least for some mice. The reason for this is not 100% clear, but this problem (or behaviour) can easily be addressed by testing in the overlay application 4551 whether the "normal" movement sequence occurs or the "double movement sequence" (i.e. a sequence in which each dx and dy value is double the original predetermined sequence).

It was also found that some operating systems seem to ignore the handle or pointer that was passed on by the mouse filter driver, and only look at the message content when it polls the different mouse drivers. The mouse-filter driver 4563 can easily solve also this problem (or behaviour) by transmitting the individual movement messages only when the mouse driver 4561 concerned, that gave rise to the sequence, is polled. A skilled person with experience in the field of device drivers, and more specifically mouse filter drivers, and who has the advantage of this disclosure, can implement such a device driver in a relatively simple way.

In a simple implementation, every "scroll-up" message, for example, results in the third predefined series of movement values, regardless of the value the scroll-wheel was rotated. In another implementation, the mouse filter driver 4563, may for example, transmit the same series to the operating system multiple times in succession. In yet another implementation, several different movement sequences may be used corresponding to different scroll wheel values. These different series can, for example, all start with the same subsequence, e.g. to facilitate recognition, etc.

It is a very large advantage that the proposed solution of converting button messages and scroll messages into specific movement sequences works with existing mouse device drivers, and that said mouse device drivers 4561 themselves do not need to be modified. (Unless otherwise stated, "mouse driver" means the same as "mouse device driver").

Preferably, the mouse filter driver 4563 is configured to run in kernel mode.

In certain embodiments of the present invention, the mouse filter driver 4563 has an active mode, in which it converts certain messages into movement sequences as explained above, and a passive mode, in which it forwards all messages (both movement messages as well as scroll messages and button-press and button-release messages) to the operating system unaltered. Such a mouse filter driver is configured to cooperate with an overlay application that is adapted to selectively activate (e.g. activate in dual-mouse mode) and deactivate the mouse filter driver (e.g. in single-mouse modes, or when the overlay application is closed).

In other embodiments of the present invention, the mouse filter driver is always active (see below).

Overlay Application:

Stated in simple terms, the special overlay application 4551, e.g. the message handler 4552 thereof, has to analyse the incoming message flow to check whether any of the (supported, for example predefined or parameterisable) movement sequences occurs, e.g. in the total message flow, or in partial message flows associated with the individual pointer devices. This can be implemented, for example, by one or more state machines (e.g. one for each individual pointer device, or one for the pointer device and one for the second pointer device), or for example by storing the last N movement messages in one or more buffers (e.g. one for the first pointer device, and one for the second pointer device), or for example by converting the last N movement messages to characters, and storing them in one or more text strings (e.g. one for the first pointer device, and one for the second pointer device), or by other suitable means.

FIG. 48 shows an exemplary implementation, in pseudo-code, of a strongly simplified example, how the overlay application, after detection of a scroll-up sequence, can (re)position the mouse cursor, and can transmit a scroll-up command itself to the operating system O/S. For example, (re)positioning the native mouse cursor in a Microsoft Windows10 environment can be implemented using the setCursorPos( ) function, and emulating a scroll movement or a button press or a button release can be implemented, for example, using the MOUSE_EVENT( ) function, with a first parameter MOUSEEVENTF_WHEEL for a scroll command, or MOUSEEVENTF_LEFTDOWN for a left button-release command, or MOUSEEVENTF_LEFTUP for a left button-release command, and MOUSEEVENTF_RIGHT-DOWN for a right button-release command, or MOUSEEVENTF_RIGHTUP for a right button-release command. As explained above, the value for "dwheel" may have a fixed value in some implementations (e.g. +120 for an upward scroll). In other implementations, this value may be coded in the (for example parameterizable) movement sequence, for example as one or more fictitious displacement values (dx, dy) (not shown).

Figure 46:
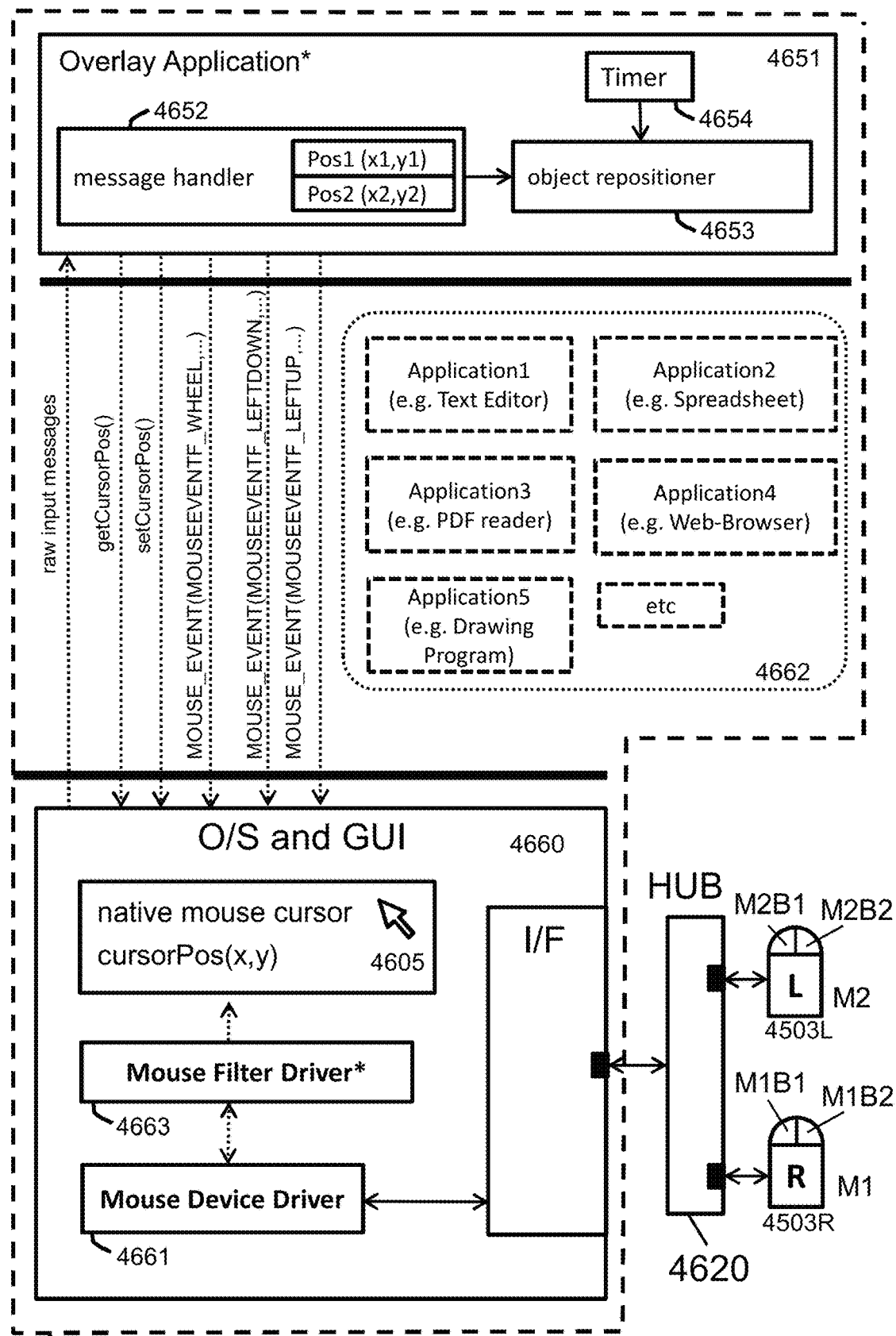
FIG. 46 shows a simplified high-level block diagram of hardware and software components situated in a computer system according to an embodiment of the present invention, the computer system comprising a computer device with an overlay application according to an embodiment of the present invention, and comprising a mouse filter driver according to an embodiment of the present invention. The computer system further comprises two classical mouse devices, which mouse devices are connected to the computer device via the hub.

FIG. 46 is a variant of FIG. 45, where the two mouse devices M1, M2 are not directly connected to the computer 4601, but via a classical hub 4620. The special mouse filter driver 4663 and the special overlay application 4651 can be identical to those of FIG. 45.

FIG. 47(a) to FIG. 47(i) show some exemplary movement sequences which can be used by the mouse filter driver 4563, 4663, and which can be detected by the overlay application 4551, 4651 of the computer devices 4500, 4600, but of course the invention is not limited hereto, and other suitable movement sequences can also be used.

Preferably, each predefined series of movement messages is chosen such that the starting point and the end point remain the same, so that the native mouse cursor seems to remain stationary after scrolling the mouse, and/or after pressing or releasing a push button, or after clicking or double-clicking of e.g. the left mouse button and/or the right mouse button or another mouse button.

Figure 47E:
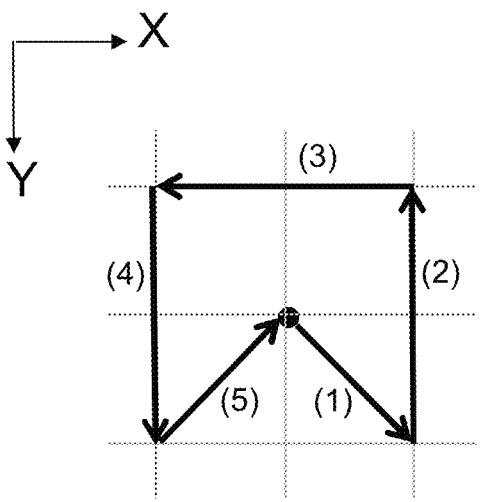
Figure 47F:
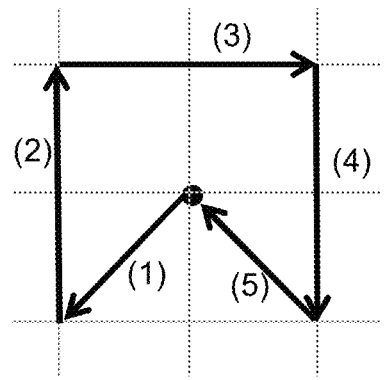
Figure 47G:
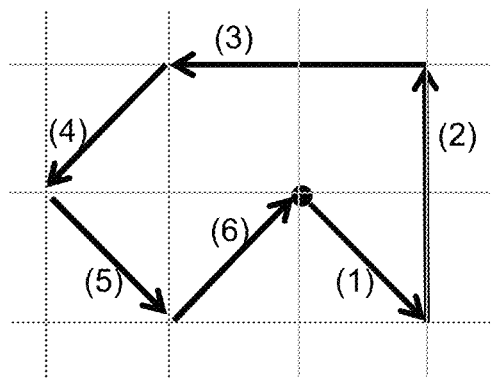
Figure 47H:
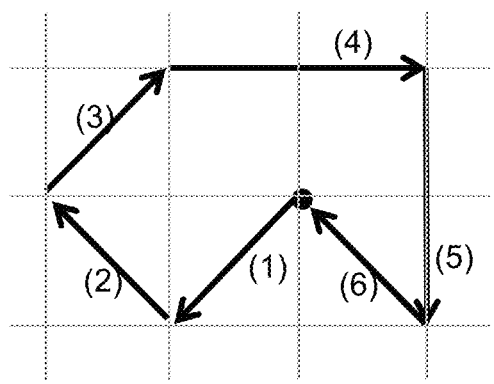

The exemplary sequences of FIG. 47(a) to (f) each consist of five consecutive displacements, the exemplary sequences of FIGS. 47(g) and (h) each consist of six consecutive displacements and the exemplary sequence of FIG. 47(i) consists of seven consecutive displacements, but sequences of less than five consecutive displacements or sequences of more than seven consecutive displacements can also be used.

Preferably, each sequence contains at least two or at least three displacements different from the null displacement, and preferably each series contains a maximum of 10 displacements.

In the examplary sequences of FIG. 47, no individual null displacements (i.e. displacements with dx=0 and dy=0) are used.

In preferred embodiments, each (e.g. predefined) movement sequence contains a null displacement (with dx=0 and dy=0) as the last individual movement. This displacement can easily be added to the examples of FIG. 47(a) to (f). This has as an advantage that that the overlay application 4551, 4651 (more specifically message handler 4552, 4652 thereof) does not have to check for each incoming movement message whether one of the (for example predetermined) movement messages occurs in one or more buffers or text strings, but only has to do this when a movement message having the value dx=0 and dy=0 arrives. This is much faster and much more efficient.

Preferably, the cumulative displacement of each (e.g. predetermined) movement sequence is zero in the X direction and the Y direction.

In the examples of FIG. 47, only relatively small displacement values are used (e.g. with dx values and dy values in the range from −2 to +2), but larger displacements can also be used (e.g. with dx values and dy values in the range from −5 to +5, or in the range from −7 to +7, or even in the range from −10 to +10, or even more). The more movements each sequence contains, and/or the more reciprocating movements, and/or the larger the displacement values, the more complex the sequence, and the smaller the risk that such a series will "accidently" occur as real mouse movements.

Since unwanted clicking (or dragging) can have more severe consequences than unwanted scrolling (which is annoying, but can easily be undone by the user by scrolling back), it is recommended that the sequence of the button-press message and the sequence of the button-release message be made at least as complex as the sequence for the scroll-up message and the scroll-down message (e.g. more movements and/or a larger range of dx and dy values and/or more criss-cross movements, and/or zig-zag movements and/or back and forth movements, rather than a smooth movement or a loop movement).

As mentioned above, in a simple implementation, the mouse-filter-driver may convert any scroll-up message to a single (for example predetermined) movement sequence, regardless of the scroll value that is given in the message.

In another embodiment, a value for scroll movements is included in the movement sequence, e.g. in a parameterizable sequence. This can e.g. be implemented by extending the third or fourth predefined series of displacements (e.g. one of the sequences of FIG. 47(a) to FIG. 47(h)) with two additional displacements, e.g. a displacement to the right (e.g. with dx=the scroll value divided by 120; and with dy=0), and an equally large displacement back to the left, and only then the optional null displacement described above. In this way, the cumulative displacement still remains zero in both directions X and Y, and the scroll value provided by the pointer device can be passed on to the message handler of the overlay application, which in turn can extract it from the sequence, and pass the value on to the operating system. Of course, a displacement upwards and the same displacement downwards will also result in a null displacement. Tests have shown that providing the scroll value for the intended desktop applications is not necessary, it is sufficient to indicate only to designate the direction (up or down), and thus to use two fixed sequences (without parameters).

Figure 49:
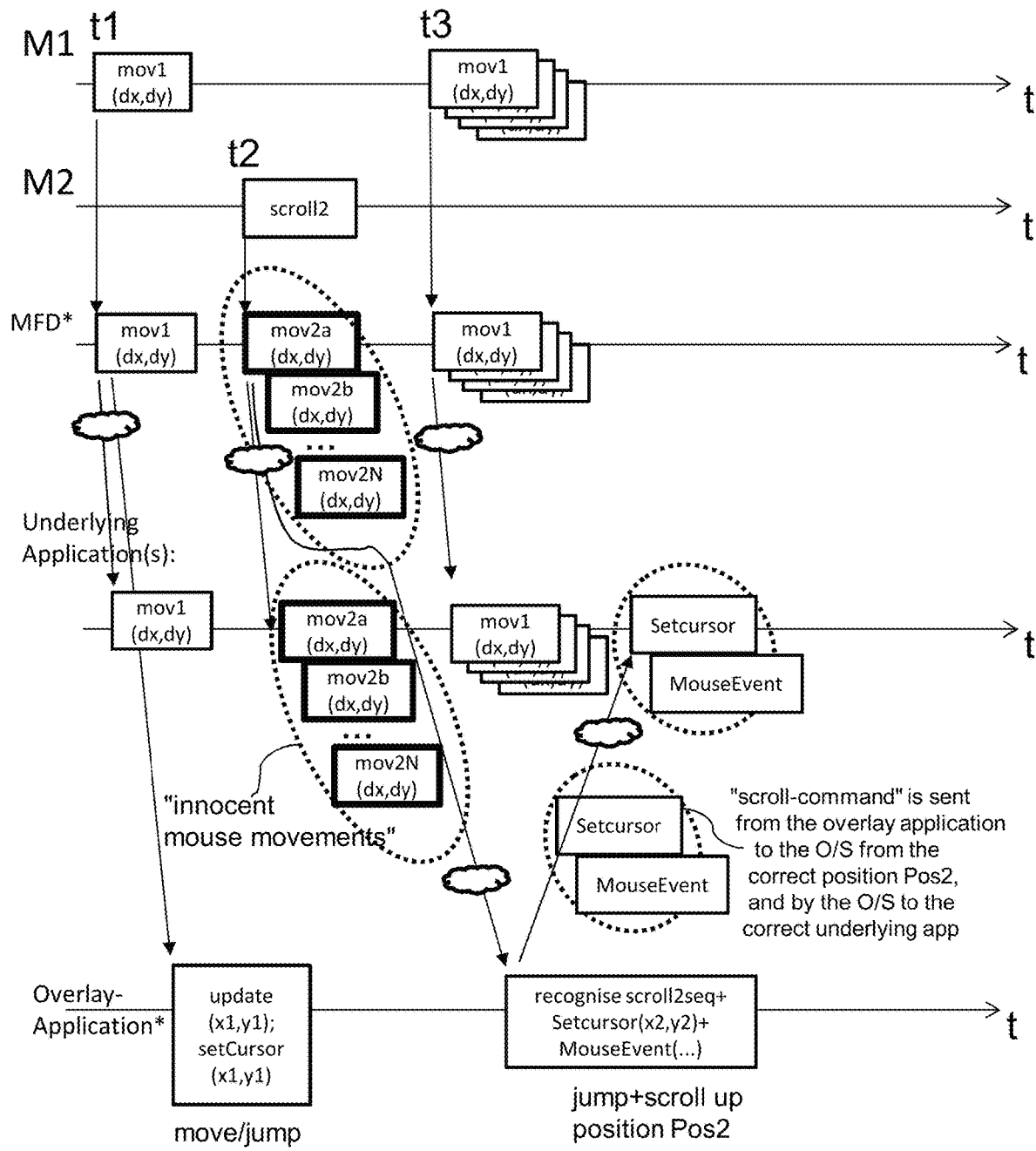
FIG. 49 shows, by means of an example, how the solution with the movement sequences works.

FIG. 49 shows in more detail and by means of an example how the solution with the movement sequences works. M1 represents the first mouse device (e.g. the right-hand mouse). M2 represents the second mouse device (e.g. the left-hand mouse). "MFD*" represents the special mouse filter driver 4563, 4663. As above, many details are omitted, and only the main principles of the invention are explained.

At a low level, the communication could be as follows: a pointer device is moved or operated (scroll wheel rotated or button pressed or button released), the pointer device transmits this via an interface (e.g. via a USB interface) to a HAL (hardware abstraction layer), the HAL transmits this to a mouse device driver 4501, 4601 (also called "mouse driver" for short), the mouse driver passes this on to the mouse filter driver 4563, 4663, and the mouse filter driver passes this on to the operating system (e.g. via the Windows API in the example of Windows), and the operating system passes this on to the corresponding application 4562, 4662.

More specifically, if the overlay application 4551, 4651 is configured in click-through mode, and/or if the native mouse cursor is located above transparent pixels, the message is passed to an underlying application.

Referring to the example of FIG. 49, this may have the following functional operation:

At time t1, the first mouse device M1 transmits a movement message to the USB port (represented by "mov1" with displacement values dx and dy), this message ends up with the mouse filter driver, which basically simply transmits the movement message to the operating system (symbolically represented by a small cloud), optionally after format change or the like.

As explained above (e.g. in FIG. 21) this message (or a copy or variant of it, e.g. a message with the double displacement) will sooner or later also arrive in the message handler 4552, 4652 of the overlay application 4551, 4651, where the message will be analysed to update the positions Pos1 and Pos2 and optionally adjust the position of the native mouse cursor 705 (e.g. as described above in FIG. 18*a* to FIG. 18*c*). At time t2, the second mouse device M2 transmits a scroll message scroll2 to the computer device 4501, 4601. The special mouse filter driver 4563, 4663 receives this scroll2 message, but does not pass it as such to the operating system, but instead transmits a series (false or fictitious) of movement commands mov2a to mov2N to the operating system, where N is the number of displacements of the predetermined series (e.g. N=5 for the series of FIG. 47*a*-47*f*, or N=6 after adding the null displacement). The operating system transmits these (or some of these) movement commands to the related underlying application as (real) displacements of the native mouse cursor. In the example that is the application which is located under the "first position" Pos1 (because the last movement was that of M1), which was actually not the intention, because the second mouse device M2 has transmitted the scroll message, not the first mouse device M1, and thus the scroll message should be transmitted from the second position Pos2. However, the (possibly wrong) underlying application (namely the application located at position Pos1) will process these (or some of these) displacement commands as innocent mouse movements, but will not execute a scroll command, which is one of the principles of the underlying invention.

A short while later (and the exact delay is of no importance) all these displacement messages also arrive at the message handler of the overlay application, which will initially interpret the individual mouse movements as real mouse movements originating from the second mouse device M2, but when all movement messages are processed, the overlay application (e.g. its message handler) will recognize the (e.g. predefined) movement sequence, and as a result will transmit a scroll command to the O/S from the overlay application, and indeed from the second maintained position Pos2, as explained in FIG. 48.

The operating system will then pass this scroll command (which is transmitted from the overlay application) on to the (correct) underlying application located "below" position Pos2, which application will execute this command by effectively scrolling at the position Pos2 related to the right-hand mouse, which was indeed the intention.

It is a major advantage that in this way it is possible to scroll simultaneously in two different documents (e.g. to scroll down in a PDF document on the left-hand side of the screen, and simultaneously, or almost simultaneously, scroll down or up in a text document on the right-hand side of the screen), without the user having to move the pointer devices, and without the underlying applications having to be effectively activated. This advantage should not be underestimated, because e.g. keyboard input is transmitted to the active application, which can remain active, while the user can still scroll in another document.

The attentive reader can determine, when comparing FIG. 49 with FIG. 21, that the scroll message of mouse M2 is correctly processed as a scroll command from the position Pos2, even though the native mouse cursor was located at Pos1 at the moment the mouse M2 was scrolled, without the user having to move the mouse M2 manually first, in order to cause the mouse cursor to jump to Pos2 before scrolling. This is a major advantage, because the user can now focus his attention on the task (e.g. reviewing a translation, or transcribing), and no longer has to keep wondering whether the mouse cursor is correctly located before scrolling or clicking. In other words, thanks to the solution with the movement sequences, the two pointer devices (e.g. two mice) can be moved and/or operated very intuitively and without thinking Tests have shown that even if the user is moving the other mouse in the meantime (in the example of FIG. 49: the right-hand mouse M1), even then the scroll command (transmitted by M2) still ends up at the correct underlying application located under Pos2.

This can be explained as follows. Suppose the user was moving the right-hand mouse M1 at time t3. This (real) movement message is simply forwarded by the mouse filter driver to the O/S, which in turn passes it on (optionally after adjustment, e.g. after doubling the dx and dy values) to an underlying application, namely the application where the native mouse cursor happens to be located at that moment (usually Pos1 when M1 is moving). But because this is just an innocent mouse movement, it doesn't really matter (for the intended applications) to which underlying application this message is transmitted. Since the native mouse position is set in the right place (in the example of FIG. 49, on Pos2, because mouse M2 was scrolled) just before transmitting the effective scroll command (from the overlay application), it doesn't really matter where the native mouse cursor is located at the moment the scroll sequence arrives at the overlay application.

FIG. 49 thus schematically shows how a scroll message (scroll2) originating from the mouse M2 is ultimately converted into a scroll command invoked from the second mouse position Pos2 from the overlay application, regardless of where the native mouse cursor is located when M2 was scrolled.

Similarly, a "button-pressed" message and a "button-released" message originating from the first or second mouse device M1, M2 will be converted by the mouse filter driver 4563, 4663 into a predetermined series of "innocent mouse movements" which the operating system may initially transmit to the "wrong" underlying application (without causing any damage there), but which series of movements will be recognized some time later by the overlay application, and ultimately will result in a button-pressed or button-released command which will be invoked from the correct position (namely the position related to the pointer device that was operated) from the overlay application, so that the command will still reach the correct underlying application, even if the native mouse cursor was not located at the position corresponding to the mouse of which the button was pressed.

Above, the basic principles are explained to scroll and/or click on buttons of two mice M1, M2 connected to a single computer, e.g. directly (FIG. 45) or indirectly via a classical hub (FIG. 46).

The mechanism with the predetermined (false) movement sequences also allows to correctly deal with certain "prohibited combinations", such as, for example, simultaneously pressing a button of two different mouse devices, and/or simultaneously dragging with one mouse and scrolling with the other, or simultaneously pressing the left- and right-hand buttons of a single mouse device.

Such prohibited combinations can either be completely accommodated in the mouse filter driver (and not in the overlay application), or completely in the overlay application (and not in the mouse filter driver), or partially in the mouse filter driver and partially in the overlay application.

In a preferred embodiment, as little intelligence as possible is put into the mouse filter driver and as much as possible into the overlay application.

In the preferred embodiments of the present invention, the message processing module 4552 and 4652 is further extended, at least for the selected left-hand and right-hand mouse device, to keep track of whether a button has already been pressed (or more specifically, whether the left-hand and/or right-hand button have/has been pressed) and, if that is the case, not to transmit an additional "button-pressed" command or scroll command to the operating system until the previously pressed button has been released. The button status can be maintained, for example, by four bits, or by using four boolean variables, or by other appropriate means. In this way, the special overlay application 4551, 4651 and/or the special mouse filter driver 4563, 4663 can ensure that the native mouse cursor can only be pressed and/or dragged and released in one location, even if the user would physically press a button simultaneously on each of two different mouse devices. An additional advantage of accommodating this in the overlay application is that the overlay application would also be able to show a visual text message or bitmap to the user to indicate that such action is forbidden.

Figure 50:
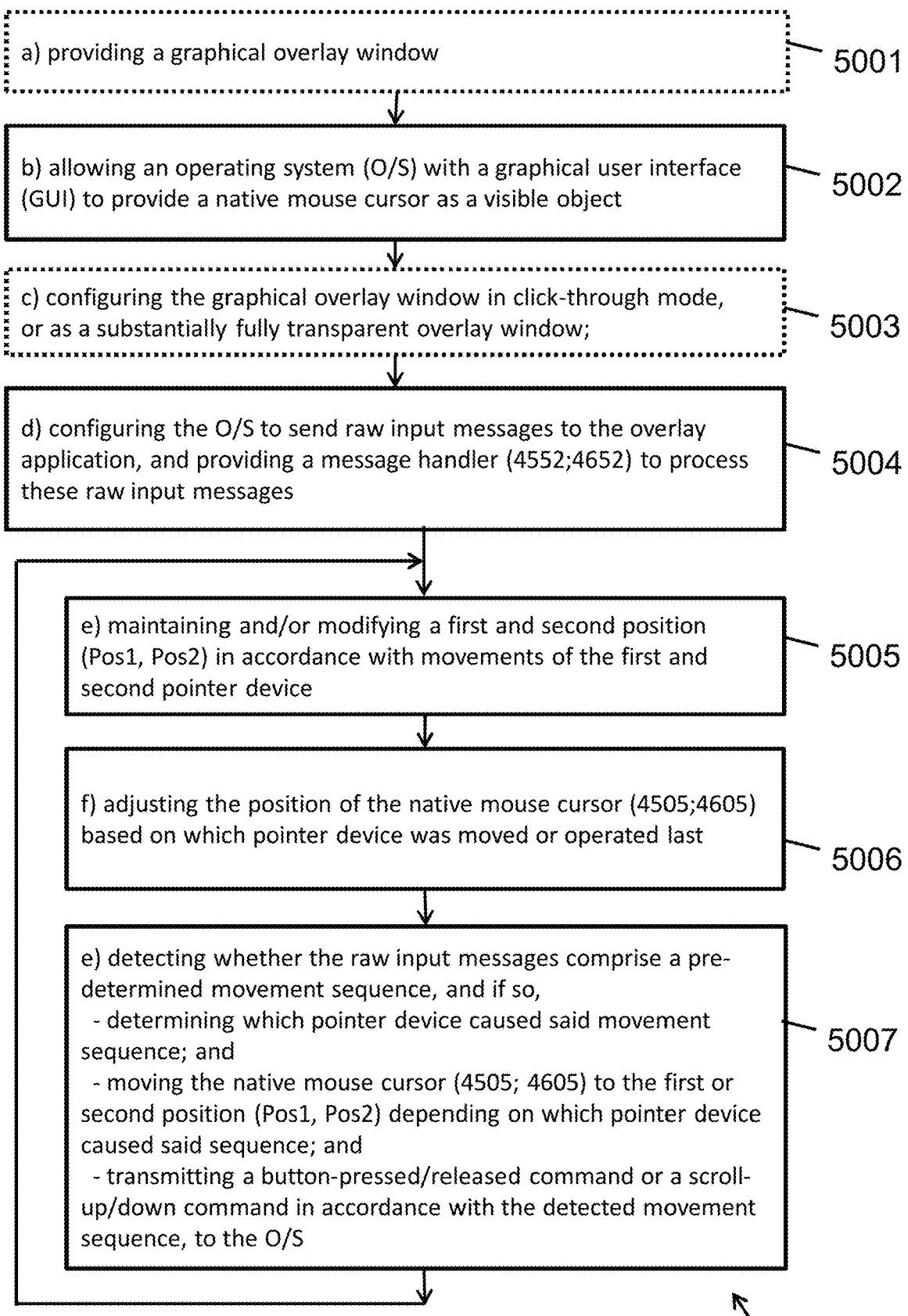
FIG. 50 shows a flow-diagram of an exemplary computer implemented method which can be performed by the overlay application used in the system of FIG. 45 or FIG. 46.

FIG. 50 shows a flow diagram of a computer-implemented method 5000 which can be performed by the special overlay application 4551, 4651 when performed on the computer device 4501, 4601 as shown in FIG. 45 and FIG. 46. At least one first pointer device M1, 4503R and a second pointer device M2, 4503L is connected to the computer system. Computer device 4501, 4601 also comprises an operating system 4560, 4660 with a graphical user interface GUI, which provides one (single) native mouse cursor.

The computer device 4501, 4601 of FIG. 45 and FIG. 46 further comprises a Mouse Filter Driver 4563, 4663 which (as shown in FIG. 51) is configured:

to receive movement messages from the first and the second pointer device 4503R, 4503L and, upon receipt of such a message, to transmit the movement message or a corresponding message (e.g. a message with the same meaning but in a different format) to the operating system;

to detect at least one message from the group consisting of a button-pressed message, a button-released message, a scroll-up message and a scroll-down message originating from the first and/or second pointer device 4503R, 4503L, and, upon detection of such a message, to transmit a corresponding movement sequence, (e.g. a respective first, second, third or fourth predefined movement sequence) to the operating system 4560, 4660.

The computer-implemented method 5000 carried out by the overlay application, comprises the following steps:

a) providing 5001 a graphical overlay window, optionally with one visible object, or with two visible objects, or with at least three visible objects.

b) allowing 5002 or configuring the operating system O/S with the graphical user interface GUI to provide the native mouse cursor as a visible object;

c) configuring 5003 the graphical overlay window in click-through mode (similar to windows 584 and 884), or configuring the graphical overlay window as a substantially screen-filling window consisting mainly or entirely of fully transparent pixels (excluding the optional moveable objects);

d) configuring 5004 the operating system 4560; 4660 to transmit raw input messages related to the first and second pointer device 4503R, 4503L, and providing a message handler 4552; 4652 to process these raw input messages;

e) adjusting 5005 a first position or pointer position Pos1 in accordance with movements of the first pointer device 4503R, and adjusting a second position or pointer position Pos2 in accordance with movements of the second pointer device 4503L, f) adjusting 5006 a position of the native mouse cursor 4505, 4605 in accordance with the first or second tracked or maintained position Pos1, Pos2 depending on which pointer device was most recently moved and/or operated;

g) detecting 5007 whether any of the (e.g. predefined) movement sequences occurs in the flow of raw messages, and when such sequence is detected, determining which of the pointer devices 4503R, 4503L caused the predetermined sequence; and moving the native mouse cursor 4505, 4605 to the first or second location Pos1, Pos2 depending on which pointer device caused the sequence; and transmitting a button-pressed command or a button-released command, or a scroll-up command or a scroll-down command from the overlay application 4551; 4651 to the operating system 4560; 4660, corresponding to the movement sequence detected.

Preferably, steps e) to g) are executed repeatedly.

In an embodiment, step a) provides an overlay window which (in addition to the native mouse cursor provided by the O/S) comprises at least one first visible object (e.g. in the form of an arrow), and step f) further comprises adjusting 5006 a position of said first visible object at the other position (Pos2; Pos1) than the position taken by the native mouse cursor. In this embodiment, the user can see and move two movable objects: the native mouse cursor, and another object, e.g. a bitmap with a black arrow as shown in FIG. 8 or FIG. 9 or FIG. 10.

In another embodiment, step (a) provides a graphical overlay window that comprises at least a first visible object (e.g. in the form of bitmap with an arrow or a hand) and a second visible object (e.g. also in the form of a bitmap with an arrow or a hand); and step (f) further comprises adjusting a position of that first visible object based on the first tracked or maintained position Pos1, and adjusting a position of the second visible object 706L based on the second tracked or maintained position Pos2.

In this embodiment, the user can see and move two movable objects, e.g. two hands as shown in FIG. 34, or two lines as shown in FIG. 37, or two crosses as shown in FIG. 38.

FIG. 51 is already discussed above.

Preliminary tests have shown that the mechanism with the mouse filter driver and the movement sequences allows inter alia to:
move both mice simultaneously,
keep one mouse stationary and scroll the other mouse (regardless of which mouse was last moved or operated),
hold one mouse stationary and click the other mouse (regardless of which mouse was moved or operated last),
move one mouse and click the other mouse simultaneously, keep both mice stationary, and to scroll both mice "simultaneously" (at least simultaneously for the user), move both mice, and scroll both mice "simultaneously" (at least simultaneously for the user), This may not be the behaviour that a typical gamer wishes, but is very handy and very advantageous for professional computer users who wish to use two mice, e.g. proofreaders when checking a translation; or transcribers who, for example, with the left-hand mouse (also referred to herein as "left mouse") activate and/or deactivate an audio player, and with the right-hand mouse (also referred to herein as "right mouse") and/or a keyboard and/or a speech recognition program enter or edit text in a word processor.

Summarized in FIG. 45 to FIG. 51, a solution is thus proposed in which a pointer device (e.g. a mouse) transmits a movement message, or a button-pressed message, or a button-released message, or a scroll-up message, or a scroll-down message, and in which a mouse-filter driver 4563, 4663 unconditionally converts the button-pressed/released messages and the scroll-up/down messages into a corresponding movement sequence which is converted back to corresponding commands by the overlay application 4551, 4651.

This solution allows the user to conveniently work with two mice. In this way, for example, a transcriber can start/stop an audio player with one mouse and edit a text with the other mouse, and a translator can scroll in a PDF document with source text and type the translation in a text editor with the other mouse, and a reviewer can scroll through the source document with one hand, and scroll through the target document with the other.

But the inventors were confronted with additional problems. Tests showed that the mechanism described above does not allow clicking in applications such as, for example, "Task Manager". Further investigation has shown that this problem seems to occur with applications miming in elevated mode.

A simple solution to this problem is to also run the overlay application in elevated mode (e.g. by running it "as Administrator"), but many of the envisioned computer users do not have Administrator rights.

The inventors therefore wanted to find another solution that would avoid running the overlay application in elevated mode.

They came to the idea of providing a modified mouse filter driver, which performs a method as suggested in the flow diagram of FIG. 52(*a*). Comparison with the flow diagram of FIG. 52(*a*) and FIG. 51 shows that steps 5202 to 5211 of FIG. 52 are identical to steps 5102 to 5111 of FIG. 51.

The main differences are thus in steps 5201, 5212 and 5213.

In step 5201, the mouse filter driver receives a new message from an pointer device, and determines from which pointer device this new message originates, and determines the time at which this new message was received, and remembers this information or part of this information, e.g. in RAM;

In step 5212, the mouse filter driver checks whether only one mouse was used for at least a predetermined period (e.g. 100 ms);
and if so, the mouse filter driver transmits the received message to the operating system in step 5213 without converting it to a movement sequence;
if not, the mouse filter driver performs one or more steps 5202 to 5211, checking in step 5202 whether the message is a displacement, and if so, the message is passed on to the operating system, and if not, then the message is converted into a corresponding (e.g. predefined) movement sequence in a similar way as explained in FIG. 51.

Of course further variations or refinements are possible. For example, step 5202 can be performed before step 5212, and the order of tests 5204, 5206, 5208, 5210 can be changed.

The predetermined period ΔT should be large enough for the overlay application to allow the native mouse cursor to jump. This predetermined period may be, for example, a period in the range from 20 to 500 ms, or from 20 to 250 ms, or from 40 to 200 ms, e.g. approximately 50 ms or 60 ms or 70 ms or 80 ms or 90 ms or 100 ms, or approximately 150 ms, or approximately 200 ms, or approximately 250 ms.

In other words, in the modified mouse filter driver, also referred to here as "conditional mouse filter driver", not every button-pressed/released message or scroll-up/down message is unconditionally converted into a movement sequence, but this conversion is only applied under certain circumstances, e.g. when the user was "recently" working with another pointer device. The conversion is no longer applied once the user is working with only one pointer device for more than a predetermined period of time. Checking this condition can be implemented in several ways, e.g. by checking whether the new message (received by the MFD) originates from the same pointer device as the previous message (received by the MFD), and if the time difference between this new message and the first message of this pointer device without intermediate messages from other pointer devices is greater than the predetermined period.

Variants of this are possible.

FIG. 52(*b*) shows a variant of the method of FIG. 52(*a*), wherein step 5201 further comprises maintaining whether at least one button of the pointer devices is pressed, (e.g. in a boolean variable), and
wherein the method comprises step 5214, in which it is tested whether at least one button is pressed and the (new) message originates from another mouse, and if so, then the message is ignored in step 5215, if not, the method continues with step 5212.

Steps 5202 up to and including 5211 of FIG. 52(*a*) are briefly represented by block 5220.

Step 5214 thus works as an extra filter in case at least one button is pressed.

If no button at all is pressed (which in the example of FIG. 45 means that none of the buttons M2B1, M2B2, M1B1, M1B2 is pressed), the message will be treated just as in FIG. 52(*a*).

Maintaining whether a button is pressed can also be implemented in another way, e.g. by means of a counter, which is incremented by one for each button-pressed message, and decremented by one for each button-released message. Testing whether at least one button is pressed can then be done by testing whether this counter has a value larger than zero. But the invention is not limited hereto, and other ways may also be used.

FIG. 52(*c*) shows, by way of an example, how a mouse filter driver (MFD) that performs the method of FIG. 52(*a*) or FIG. 52(*b*), processes messages coming from mouse M1 and mouse M2.

At time t1, mouse M1 transmits a movement message. This is simply passed on.

At time t2, mouse M1 transmits a movement message. This is simply passed on.

At time t3, mouse M2 transmits a movement message. This is simply passed on.

At time t4, mouse M1 transmits a scroll message. This is translated or converted by the MFD into a movement sequence, regardless of the time difference t4–t3 because the previous message originated from mouse M2.

At time t5, mouse M2 transmits a scroll message. This is translated by the MFD into a movement sequence, regardless of the time difference t5–t4 because the previous message originated from mouse M1.

At time t6, mouse M2 transmits another scroll message. This is simply passed on, because the mouse M2 has been active for longer than a predetermined time (e.g. more than 100 ms) and no messages from M1 came in between. It is therefore not necessary to use a movement sequence, because it can be assumed that the native mouse cursor is already in the correct position at time t6.

At time t7, mouse M2 transmits a button-pressed message (press). This is simply passed on, because the message comes from the same mouse M2, which has been active for longer than the predetermined period without intermediate messages from the other mouse M1.

At time t8, mouse M2 transmits a button-released message (release). This is simply passed on.

It is noted that in the period from t7 to t8 at least one button is pressed, but since mouse M1 does not transmit anything during this period, no messages need to be ignored.

At time t9, mouse M1 transmits a button-pressed message (press). This is converted by the MFD into a movement sequence, regardless of the time difference t9–t8 because the previous message originated from mouse M2. The variable that maintains whether a button is pressed is TRUE, or the counter is 1.

At time t10, mouse M2 transmits a movement message. This message is ignored because a button was pressed, and the message from M2 does not originate from the same mouse as the one of which the button was pressed.

At time t11, mouse M1 transmits a button-released message. This message is converted by the MFD into a movement sequence, because in the example of FIG. 52(*c*) the time difference t11–t9 is smaller than the predetermined period ΔT.

It is noted that if at time t7 an application was clicked on in elevated mode (e.g. Task Manager), that this clicking would work effectively, regardless of whether the overlay application is running in elevated mode or not. However, if at time t9 the Task Manager had been clicked, this would not work unless the overlay application was started as Administrator.

FIG. 52(*d*) shows on the basis of a second example how a mouse filter driver (MFD) which performs the operation of FIG. 52(*a*) or FIG. 52(*b*) processes messages from mouse M1 and mouse M2.

At time t1, mouse M2 transmits a movement message. This is simply passed on.

At time t2, mouse M2 transmits a scroll message. This is also simply passed on, because (in this example) the time difference t2–t1 is greater than the predetermined period ΔT.

At time t3, mouse M2 transmits a button-pressed message. This message is not converted into a movement sequence, but is simply passed on, because t3–t1 is greater than ΔT. At least one button is now pressed.

At time t4, mouse M1 transmits a scroll message. This message is ignored because at least one button is pressed. Since this message is ignored, and the native mouse cursor will not change its position, the time from the first message of T2 (at t1) can simply continue.

At time t5, mouse M2 transmits a button-released message. This is simply passed on because t5–t1 is greater than ΔT, and the message of t4 was ignored, at least in the method of FIG. 52*b*.

At time t6, mouse M1 transmits a button-pressed message. This message is converted into a movement sequence, because the previous message originated from another mouse (namely M2).

At time t7, mouse M2 transmits a movement message. This message is ignored because a button of mouse M1 is pressed.

At time t8, mouse M1 transmits a movement message. This is simply passed on, because in the example t8-t6 is greater than ΔT, and the message from t7 was ignored.

At time t9, mouse M2 transmits a scroll message. This message is ignored because a button of mouse M1 is still pressed.

At times t10 and t11, mouse M1 transmits another movement message. These are simply passed on, because t10–t6 and t11–t6 are greater than ΔT, and the message from t9 was ignored.

At time t12, mouse M2 transmits a scroll message. This message is ignored because a button of mouse M1 is still pressed.

At time t13, mouse M1 transmits a button-released message. This message is simply passed on by the MFD. From now on, no button is pressed anymore.

At time t14, mouse M2 transmits a scroll message. This message is converted into a movement sequence, regardless of the time difference t14–t13, because the previous message originated from the other mouse M1.

In a variant of this method, when a button-pressed message is transmitted "as such" to the O/S (thus not by a movement sequence), the button-released message "as such" is also transmitted to the O/S.

Figure 52A:
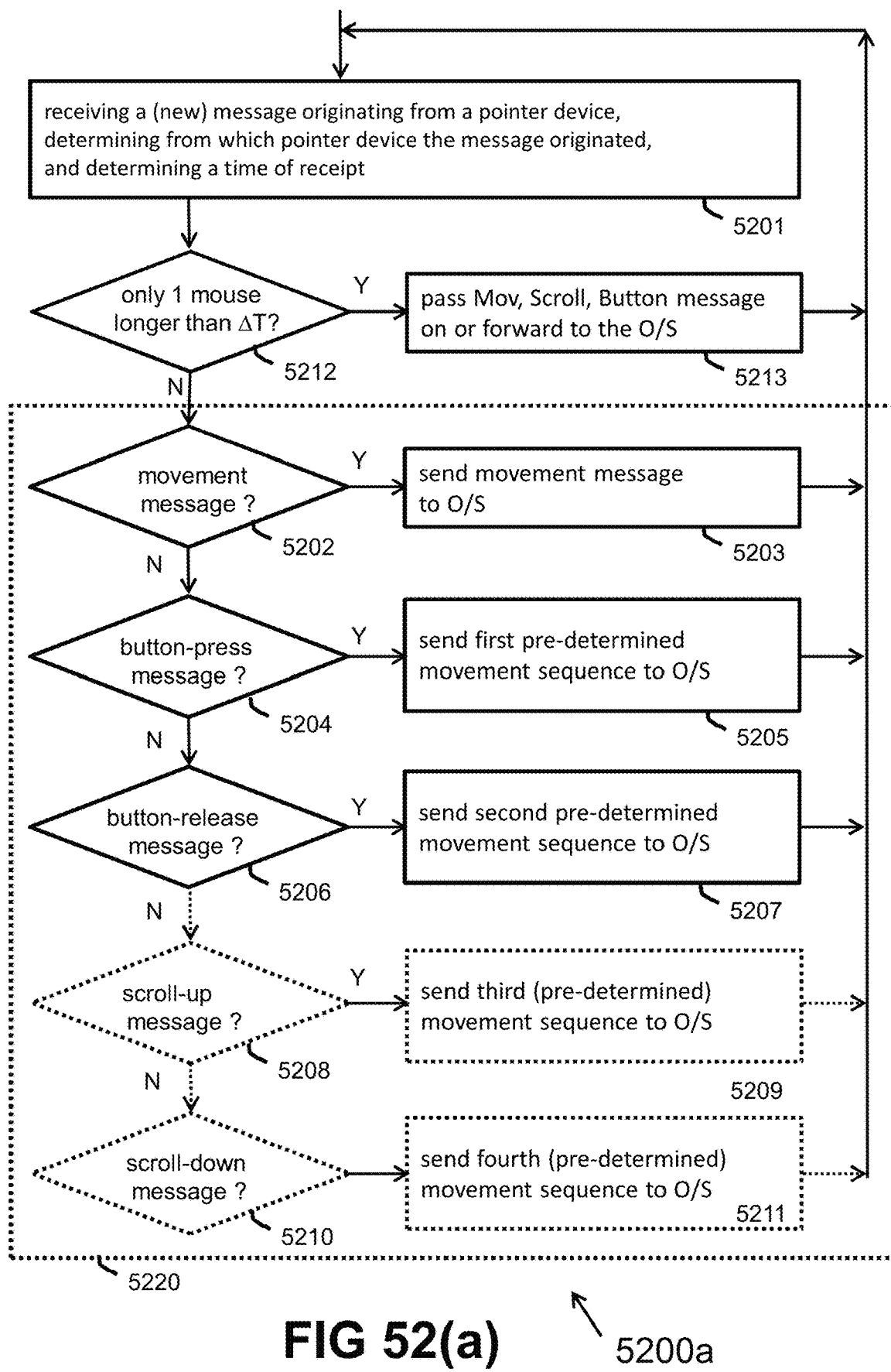
FIG. 52(a) shows a flow-diagram of another exemplary computer implemented method which can be operated by the mouse filter driver of FIG. 45 or FIG. 46, which can be seen as a variant of the method of FIG. 51.
Figure 52B:
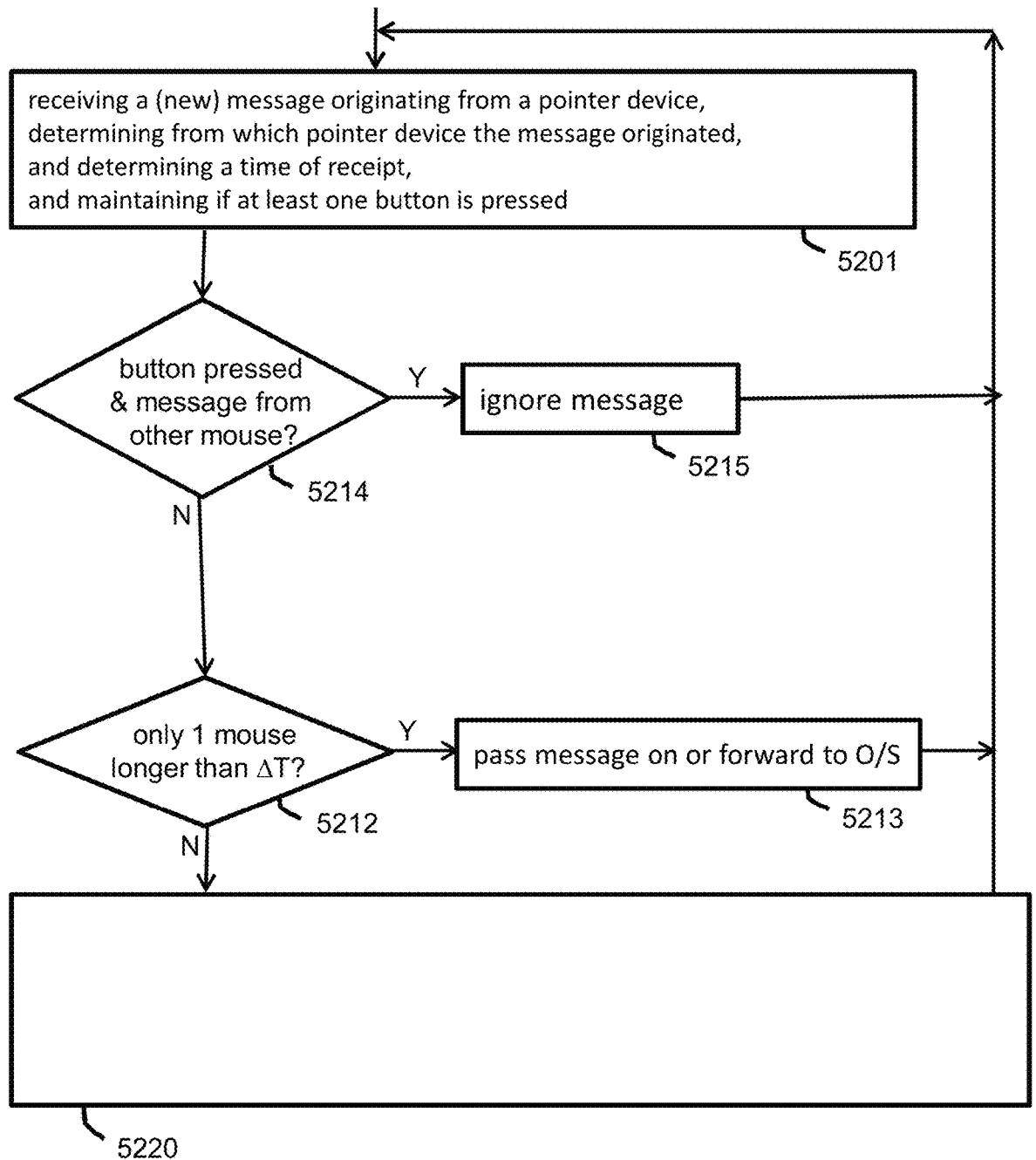
FIG. 52(b) shows a flow-diagram of a variant of the method of FIG. 51.
Figure 52C:
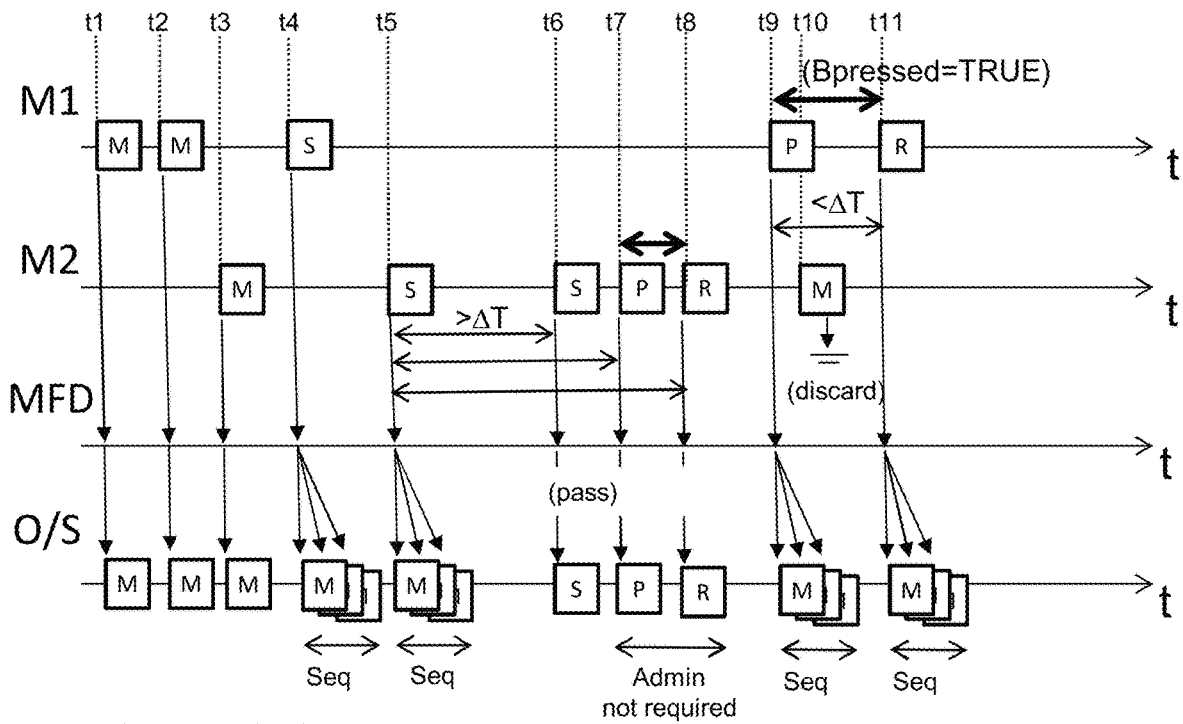
FIG. 52(c) and FIG. 52(d) show by means of a first and a second example how a mouse filter driver (MFD) which performs the method of FIG. 52(a) or FIG. 52(b), processes messages originating from two pointer devices.
Figure 52D:
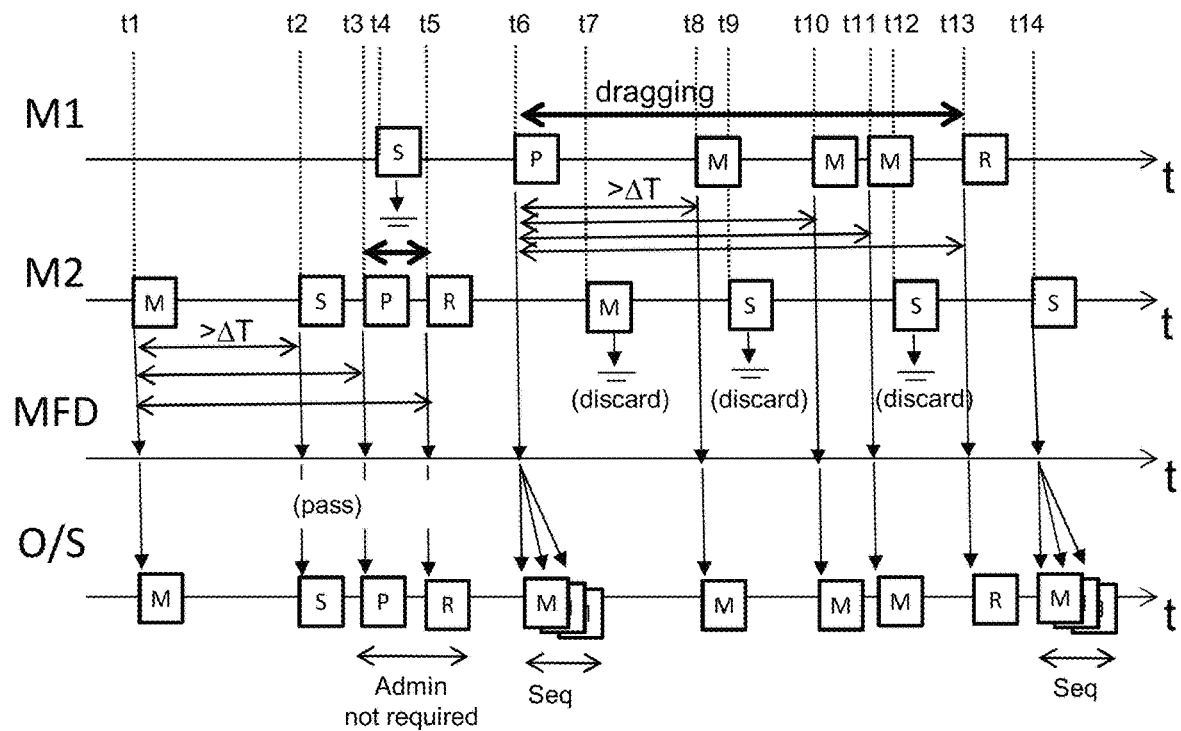
Figure 52E:
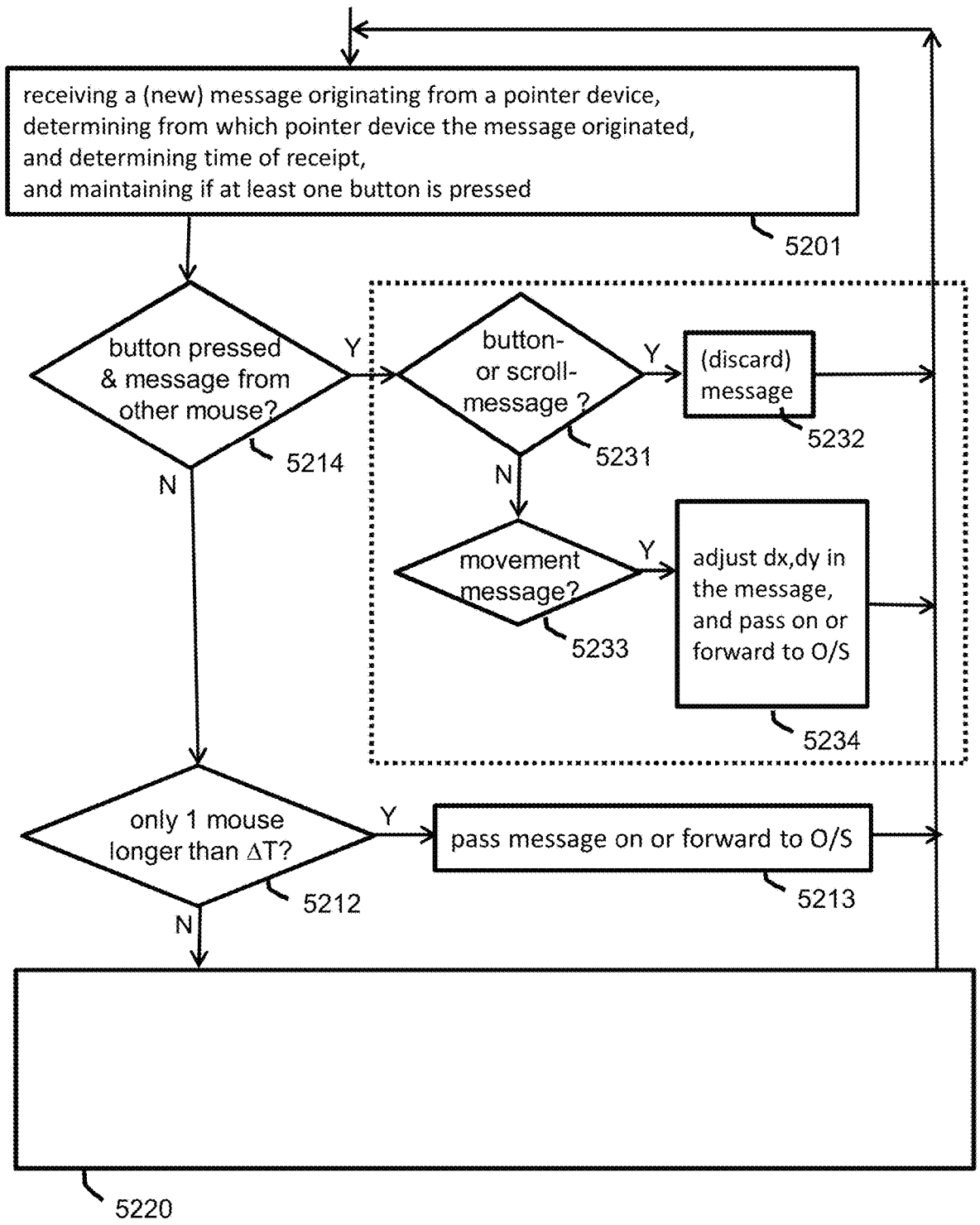
FIG. 52(e) shows a variant of the method of FIG. 52(b).

In a variant of this method, when a button-pressed message was converted into a movement sequence (e.g. at time t6 of FIG. 52*d*), the button-released message is also converted into a movement sequence. In the example of FIG. 52*d*, the button release at t13 would also be transmitted as a movement sequence. In this way, the button press and release can show a more consistent behavior, e.g. when clicking on applications in elevated mode.

Tests have shown that an overlay application with the "modified mouse filter driver" (which performs the method of FIG. 52*a* or FIG. 52*b*) works very well, and allows a computer user without Administrator rights to effectively click on an application running in elevated mode (such as Task Manager, for example), provided that the user does not move or operate the other pointer devices (e.g. the mouse in the non-dominant hand) for at least the predetermined period.

The tests show that the user may indeed need to click several times if he was moving both pointer devices initially, but if the user notices that "clicking does not work", then his/her spontaneous reaction is that he/she will only operate the pointer device of the dominant hand, after which the clicking will indeed work.

Further or other variants are possible.

In a variant (not shown) of FIG. 52(*b*), the message from the other mouse (e.g. movement message or scroll message or button message) is not simply ignored in step 5215, but a null shift message is transmitted to the O/S. This message will eventually arrive at the overlay application, which thereby is informed that a message from the other mouse has been ignored, upon which the overlay application can, for example, show a visual message on the screen at the position of this other mouse, (e.g. in the form of a red letter X, or a red circle with a dash, or the like), to indicate to the user that the related movement or click or scroll action from this mouse is prohibited.

FIG. 52(*e*) shows a different or further variant of FIG. 52(*b*), in which step 5214 also checks whether a button has been pressed, and whether the message originates from a pointer device (e.g. mouse) other than the one of which the button was pressed, but wherein (if the result of this test is true) the message is not simply ignored (as in FIG. 52*b*), but wherein in step 5231 it is further checked whether the message is a button message or a scroll message (e.g. a button-pressed release message or a button-released message or a scroll-up message or a scroll-down message), in which case the message is indeed ignored (in step 5232), but if the message is a movement message (checked in step 5233), the displacement values dx and dy in the message are adjusted, after which the message is transmitted to the operating system (step 5234).

Adjusting the displacement values may comprise scaling or limiting these values, for example, such that the dx values and dy values for example fall within a predetermined range, e.g. from −5 to +5, or from −4 to +4, or from −2 to +2, or from −1 to +1. Tests have shown that it can sometimes be useful that the position of the visible object related to the left-hand mouse can be moved, while with the right-hand mouse, for example, a certain text fragment is being selected in a text document (by dragging).

These tests show that when the displacement values dx, dy of the movements are greater than a certain value (in the tests a value of about 10 or 15), the selected text fragment can temporarily jump, which is confusing for the user. But when the displacement values dx, dy are scaled or limited to a predefined area, as in step 5234, the text fragment jumps less often. This is useful, for example, for users who wish to select a certain text fragment in a target text with the mouse in the dominant hand, whilst wishing to move the mouse in the non-dominant hand to underline a corresponding text fragment in the source document. (For the sake of completeness: the tests show that choosing the starting point between two lines of text is more sensitive than choosing a starting point which lies on a text line).

Further variants are possible.

For example, instead of simply ignoring a button message in step 5215 or 5232, for example, a button-pressed message from the other mouse device can be blocked, and the message handler shall later also block the corresponding button-released message. In this way, a more consistent behaviour can be achieved.

In a further or other variant, the movement of the other pointer device in step 5234 may, for example, be passed on to the operating system as a movement sequences, with or without scaling or limitation of displacement values. Such a movement sequence can be defined, for example, as a movement sequence composed of a subsequence according to one of the sequences shown in FIG. 47, followed by the displacement message with values (+dx, +dy), followed by an opposite displacement message with values (−dx, −dy), preferably followed by a null displacement (with dx=0, dy=0).

The overlay application will receive, and recognize this movement sequences, and can deduce which movement the other pointer device made, and can, for example, decide to update the position of the corresponding visible object, without causing the native mouse cursor to jump.

But the invention is not limited hereto, and other variants are possible.

Figure 53:
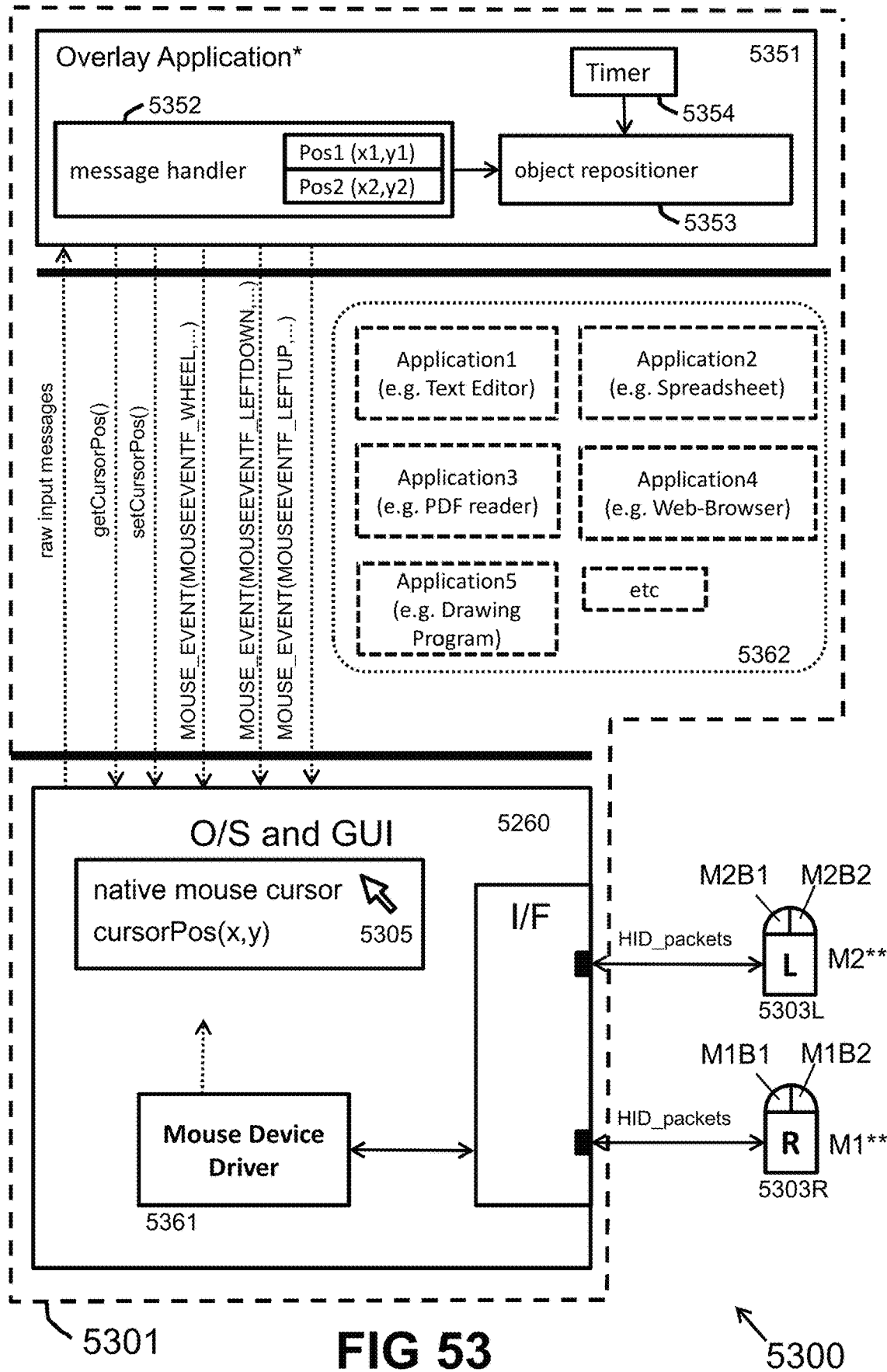
FIG. 53 shows a simplified high-level block diagram of hardware and software components situated in a computer system according to an embodiment of the present invention, which can be seen as a variant of the block diagram of FIG. 45 without mouse filter driver, but having two special mouse devices according to embodiments of the present invention, which mouse devices are directly connected to the computer device.
Figure 54:
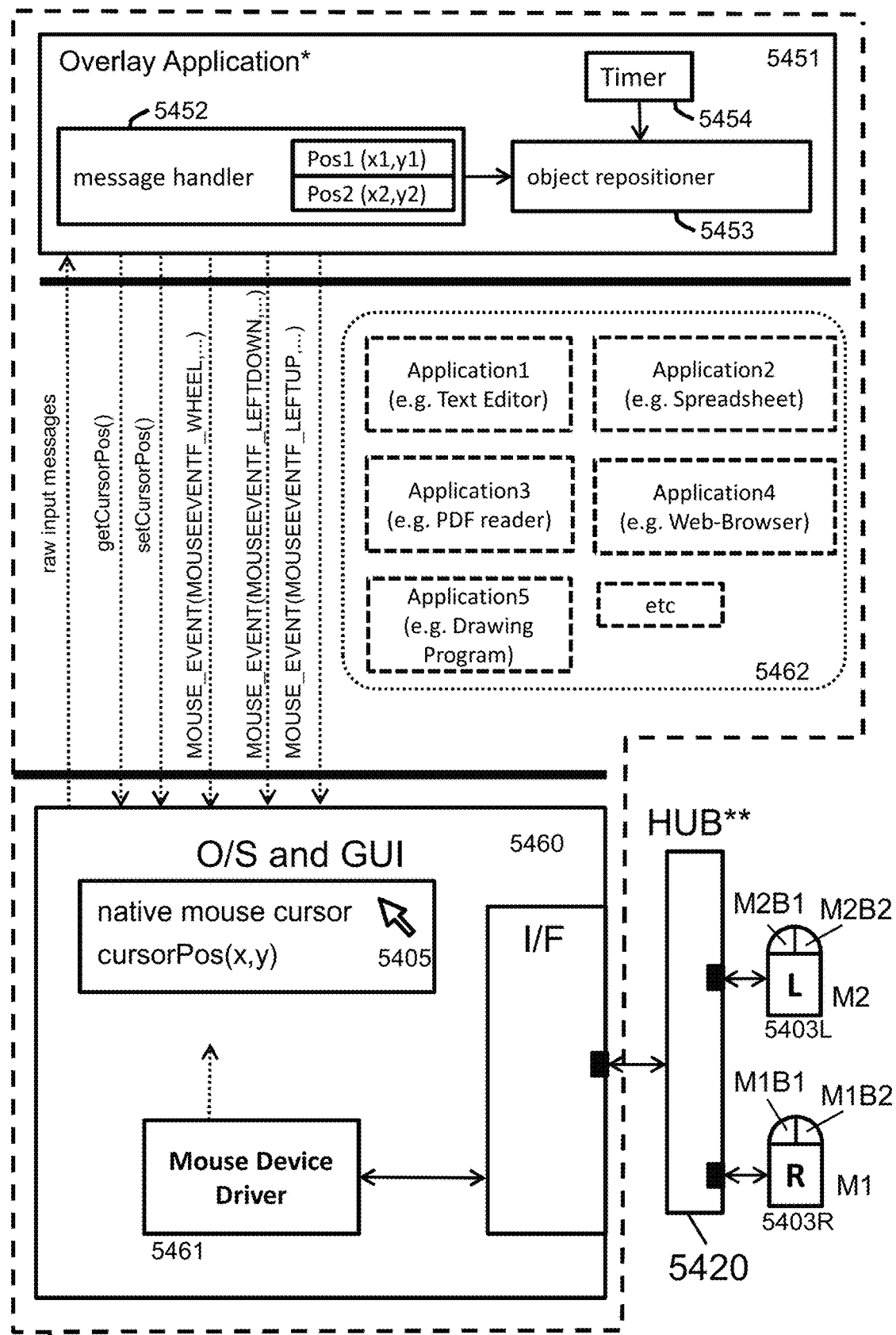
FIG. 54 shows a simplified high-level block diagram of hardware and software components situated in a computer system according to an embodiment of the present invention, which can be seen as a variant of the block diagram of FIG. 46 without mouse filter driver, but having a special hub according to an embodiment of the present invention, which hub connects the computer device with two classical pointer devices.

The inventors realise that the conversion to movement sequences can also be achieved without using a mouse filter driver, but by using special pointer devices (see FIG. 53) or a special hub (see FIG. 54).

FIG. 53 shows a computer system 5300, which can be seen as a variant of the computer system 4500 of FIG. 45, the main difference being that the computer system 5300 does not comprise a mouse filter driver 4563 as described above, but comprises two special pointer devices M1 and M2, e.g. a left-hand mouse 5303L and a right-hand mouse 5303R. These mice may have the same hardware configuration as shown in FIG. 23(*b*), but the 2324 controller will function differently. More specifically, the controller will be configured to transmit a movement message when the mouse is moved, to transmit a first (e.g. predefined) movement sequence when a left-hand button is pressed, and to transmit a second (e.g. predefined) movement sequence when a right-hand button is pressed, and to transmit a third (fixed or parameterizable) movement sequence when the scroll wheel is scrolled up, and a fourth (fixed or parameterizable) movement sequence when the scroll wheel is scrolled down, in a similar way as described in FIG. 45 to FIG. 51, but now from the pointer device itself Preferably, the overlay application runs in elevated mode in this case, otherwise the user cannot control certain applications which work in elevated mode (e.g. Task Manager) with such a mouse, but that is not absolutely necessary.

Optionally, the special mouse 5303L, 5303R is provided with two modes of operation, where the mode of operation can, for example, be set by the user, e.g. by means of a hardware switch, or a push button, or in software by means of a setup program, or in any other suitable way.

The two modes may comprise a classical mode wherein button and scroll messages are transmitted as such to the computer, and a special mode (also called "double-mouse mode") wherein the mouse will transmit the movement sequences described above.

FIG. 54 shows a computer system 5400, which can be seen as a variant of the computer system 4600 of FIG. 46, the main difference being that the computer system 5400 does not comprise a mouse filter driver 4663, but a special hub 5420.

In an embodiment, the hub is configured to execute a method similar to the method 5100 shown in FIG. 51 (in which all click messages and scroll messages from the pointer devices M1, M2 are unconditionally converted into movement sequences), with the difference that the messages or movement sequences are transmitted to an input port of the computer, e.g. a USB port.

In an embodiment, the hub 5420 is configured to perform a method similar to the method 5200 shown in FIG. 52, wherein not all click messages and scroll messages are converted into movement sequences, but only under certain conditions, as described above in step 5212 of FIG. 52.

Optionally, the special hub 5420 is provided with two operating modes, wherein the operating mode can be set by the user, for example by means of a hardware switch, or a push button, or in software by means of a setup program, or in any other suitable way.

The two modes may comprise a classical mode wherein commands from multiple mice are transmitted as such to the computer, and a special mode (also called "dual-mouse mode") wherein the hub is configured to perform the method 5100 of FIG. 51, or the method 5200 of FIG. 52.

The special hub 5420 may, for example, have the same hardware configuration as the hubs shown in FIG. 27(*a*) or FIG. 27(*b*), wherein the controller 2744 or 2745 is configured to perform the method of FIG. 51 or FIG. 52.

After the experience gained with the mouse filter driver, the inventors came to realise that it should be technically possible for manufacturers of existing operating systems to extend the existing operating system to a version showing two visible mouse pointers, which can be moved individually by two pointer devices, and wherein the two pointer devices may be moved simultaneously, and wherein the two pointer devices (from the user's point of view) may be scrolled simultaneously, and where one pointer device may be scrolled while the other is moved, and where each of the pointer devices may be clicked or dragged (separately), but not simultaneously, as e.g. shown in the following table:

TABLE 1 simultaneous actions with first and second pointer device

| | First pointer device | Second pointer device | Allowed? |
|---|---|---|---|
| (i) | move | move | yes |
| (ii) | move | scroll | yes |
| (iii) | scroll | scroll | yes |
| (iv) | click, drag | move | yes |
| (v) | click, drag | scroll | no |
| (vi) | click, drag | click, drag | no |

By excluding the two pointer devices from being clicked or dragged simultaneously, only one application can be "active" at any one time (as is now the case), and the operating system can continue to work substantially as it does now, with the difference that instead of one visible object which moves with a mouse (called "mouse cursor"), two mouse cursors are now displayed.

In certain embodiments, even though the operating system is showing two visible movable objects, in fact there is still only one "native mouse cursor" underneath. Said native mouse cursor can be displayed as a white arrow, but preferably the bitmap of this mouse cursor can change depending on where it is located (e.g. above a visible component).

The other mouse cursor may not be a real mouse cursor, but simply an image, e.g. a black arrow or a blue or red arrow, which is moved.

Since there is in fact still only one native mouse cursor, such an operating system can be made 100% backwards compatible with existing operating systems.

By changing the position of the active and passive mouse cursor (or by allowing the native mouse cursor to jump), the user can seemingly still work with two pointer devices, even though not all combinations are allowed (see Table 1, for example).

But the inventors went one step further, and realized that under certain circumstances it must also be possible to allow scenario (v) and (vi) anyway.

Both embodiments are described in more detail below.

Providing two mouse cursors through the operating system offers several advantages over an implementation with an overlay application and a mouse filter driver, including:
the two mouse cursors can both have a Z-order that is higher than the other applications (see FIG. 55*c*);
since the operating system has full control over which and when messages are transmitted as commands or events to underlying applications, the operating system does not need to incorporate any additional delay as described in FIG. 22 and FIG. 26 for example, and the operating system does not need to use (e.g. predefined) movement sequences to avoid certain "race conditions".

In other words, if the appropriate provisions are provided, a button-pressed message transmitted by the right-hand mouse will not lead to a button-pressed command at the position that follows movements of the left-hand mouse;
the operating system can handle certain tasks in kernel mode, which an overlay application cannot;
the operating system has access to more system resources, and has certain knowledge that a mouse filter driver, for example, does not have, such as user settings in terms of screen resolution and/or mouse speed. For example, the operating system can easily limit the movements of the mouse cursor at the edges of the screen.

Such an operating system could solve the problems described in FIG. 1 to FIG. 4 in an elegant way, without the need for a mouse filter driver, without the need for a special mouse or hub, and without an overlay application.

Since this need exists, but no such operating system exists, it can hardly be otherwise than that there is a prejudice that it is technically not possible to provide such functionality in a technically feasible manner. Perhaps the manufacturers of existing operating systems are focusing blindly on supporting mice of multiple users connected to a single computer via a network, forgetting that it would provide added value if as single user could use both hands. Or perhaps they are deterred by the idea that when two mice are connected to the same computer, all possible combinations of moving and clicking and dragging and scrolling must be supported (which is not necessary). Or possibly the manufacturers of existing operating systems think that using multiple mice is only useful for gamers, but not for professional users. However, the examples from FIG. 1 to FIG. 4 clearly show that there is indeed added value for such an operating system, e.g. for professional computer users such as translators, proofreaders, transcribers, technical writers, lawyers, etc. In any case, the fact is that (as far as the inventors are aware) such an operating system does not yet exist.

FIG. 55(*a*) and FIG. 55(*b*) show a block diagram of a computer system 5500 according to an embodiment of the present invention. The computer system 5500 shown in FIG.

55(a) comprises a computer device 5501 connected to a first and a second pointer device 5503R, 5503L, and connected to a pointer device 5504, and to a keyboard 5502.

The computer device 5501 comprises an operating system 5560 (see FIG. 55d) providing two visible objects 5505a, 5505p following the movements of the pointer devices 5503R, 5503L. As explained above (in FIG. 28a) it is possible (in a first user mode, e.g. called "right-handed mode") to let the active mouse cursor always follow movements of the first pointer device (e.g. right-hand mouse, analogous to the right-hand mouse mode described with FIG. 28a), and to let the passive mouse cursor always follow movements of the second pointer device (e.g. left-hand mouse). In this mode, the native mouse cursor will follow the movements of the first mouse, and will not jump. There is thus also no clicking or scrolling with the second pointer device. And should this pointer device be clicked or scrolled anyway, these messages can be blocked.

It is also possible to provide a second user mode, (e.g. "left-handed mode") wherein the active mouse cursor always follows movements of the second pointer device (e.g. left-hand mouse), (analogous to the LeftH mode described in FIG. 28a), and the passive mouse cursor always follows movements of the first pointer device. In this case it is not possible to click or scroll with the first pointer device. And should this pointer device be clicked or scrolled anyway, these messages can be blocked.

But the most interesting embodiment is of course the one in which the user can move and/or scroll and/or click and/or drag both pointer devices, in analogy with the TwoH mode described in FIG. 28a. The following section explains the two-handed mode in particular.

Figure 55A:
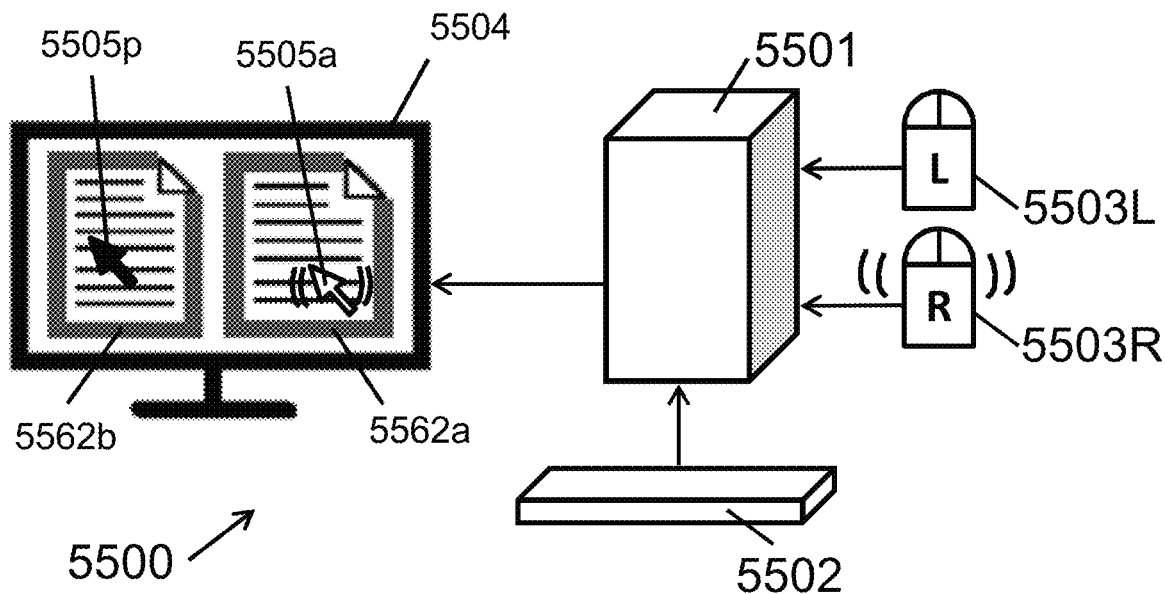

FIG. 55(a) shows movements of the first mouse cursor 5505a in accordance with movements of the first pointer device 5503R, e.g. a right-hand mouse.

Figure 55B:
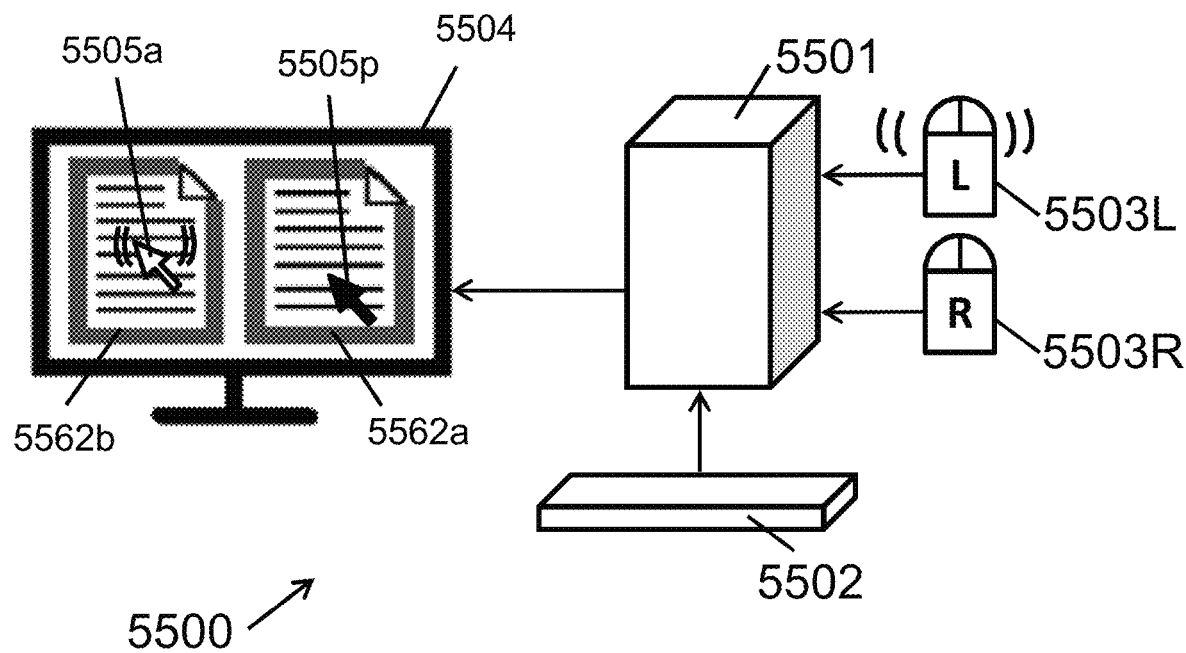
FIG. 55(b) shows movements of the first mouse cursor (active mouse cursor) in accordance with movements of the second pointer device (e.g. left mouse device). The second mouse cursor (passive mouse cursor) is situated at the first position.

FIG. 55(b) shows movements of the second mouse cursor 5506L in accordance with movements of the second pointer device 5503L, e.g. a left-hand mouse.

The left-hand mouse and right-hand mouse can be identical mice (in terms of hardware and/or firmware), or can be different mice, e.g. from different manufacturers.

In the example of FIG. 55(a) and FIG. 55(b), the shape and size of the first mouse cursor 5505a is the same as that of the second mouse cursor 5505p and only the colour is different, but that is not necessary. As already mentioned, the appearance of the first and/or the second mouse cursor can vary depending on which visual objects are situated below the respective mouse cursor. Thus, the mouse cursor 5505a can, for example, take the form of a bitmap with a "hand" when an underlying visual object can be dragged, or take the form of an "I" (cross-hair) for example when the respective mouse cursor is in a text field, or take the form of an east-west arrow when a visual object can be shifted left-right, etc. This is a very important advantage (compared to objects that cannot change shape), because it gives the user visual information regarding possible actions, and information about whether the cursor is positioned correctly (e.g. when the user wishes to reduce the width or height of an application window).

Figure 55C:
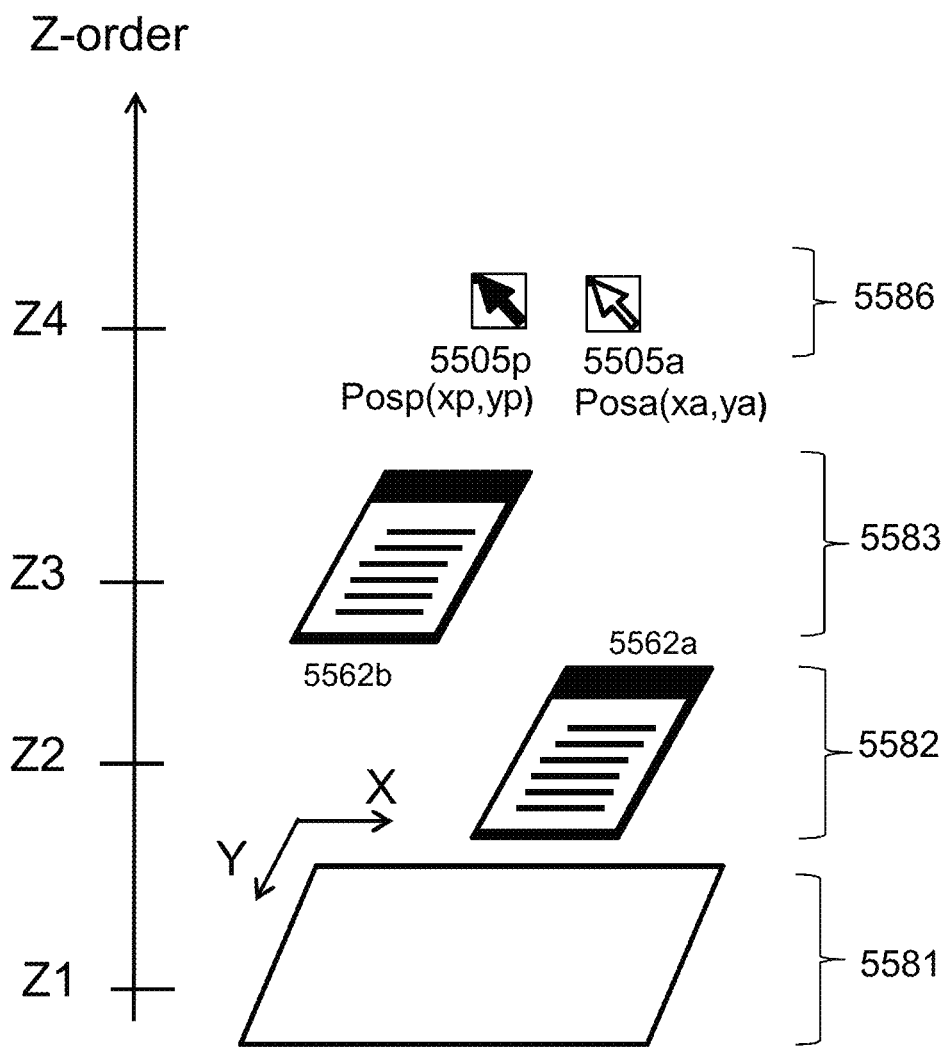
FIG. 55(c) is a schematic representation of a so called "Z-order" of windows or image planes and a "cursor plane" as can be used in the computer system of FIG. 55(a).

FIG. 55(c) is a schematic representation of a so-called "Z-order" of windows or image planes and a "cursor plane" 5586 as can be used in the computer system 5500 of FIG. 55(a, b).

In the example, there is a lower area 5581, also called "desktop" or "desktop window" which is at height Z1. At height Z2, there is a window 5582 that corresponds to a first application 5562a, e.g. a text editor. At height Z3, there is a second window 5583 that corresponds to a second application 5562b, e.g. a PDF viewer. At height Z4, is the so-called "cursor plane" which in this example contains two separate bitmaps, one for the first mouse cursor 5505a (herein also called "active mouse cursor"), and one for the second mouse cursor 5505p (herein also called "passive mouse cursor"). These names are intended to make it easier to describe the invention. The active and passive mouse cursor can be located anywhere on the screen, e.g. left or right, or on different screens.

Of course, the representation of FIG. 55(c) is only an example, and many variants are possible. Thus, for example there may be more than two or less than two user applications running in the computer device, and/or windows 5582 and 5583 may overlap. It is also possible to place the two mouse cursor units 5505a, 5505p in separate cursor planes.

Figure 55D:
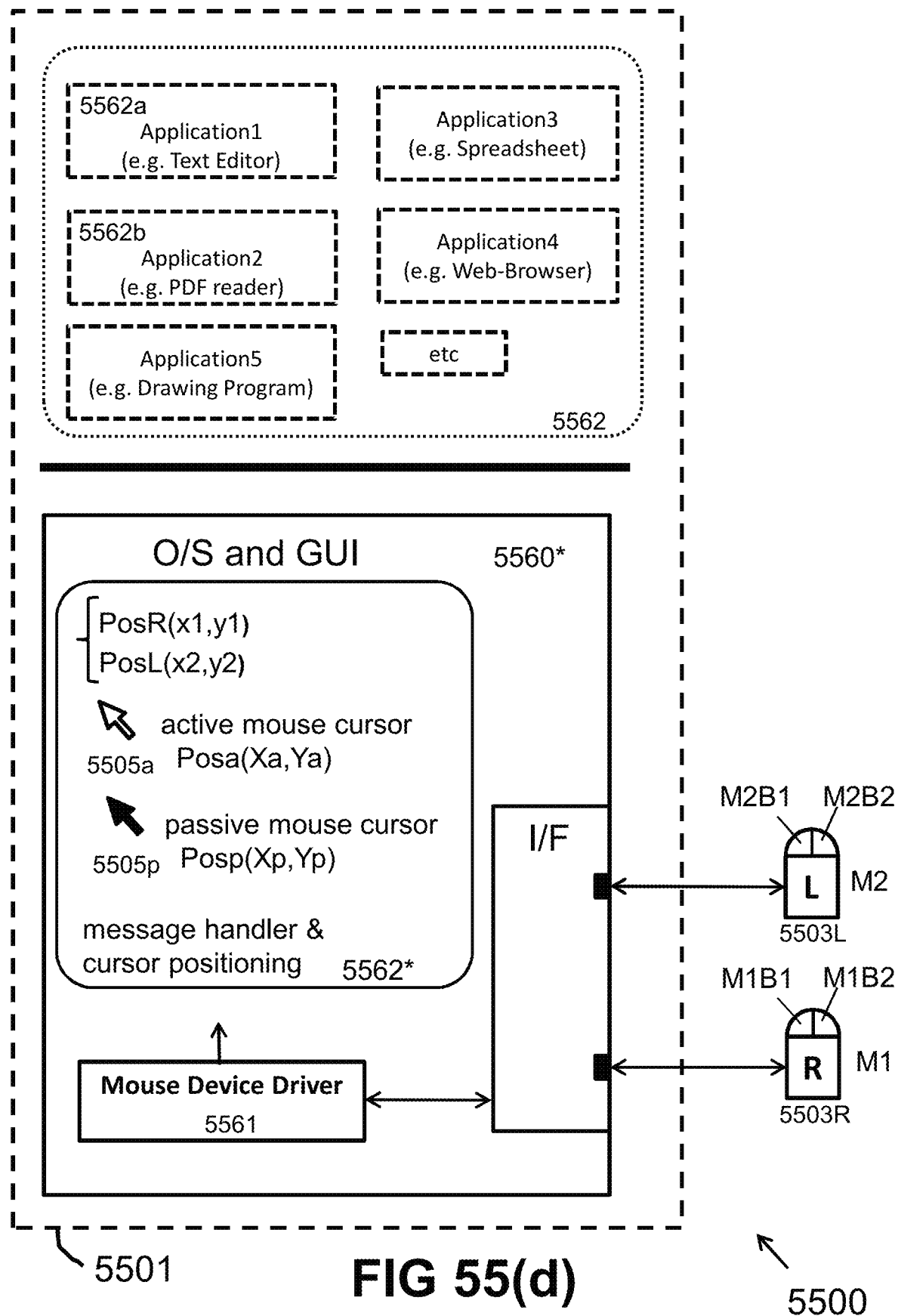
FIG. 55(d) shows a simplified high-level block diagram of hardware and software components situated in the computer system of FIG. 55(a), the computer system comprising a computer device with a special operating system according to an embodiment of the present invention, which O/S (inherently) supports two classical pointer devices.

FIG. 55(d) shows a simplified high-level block diagram of hardware and software components located within the computer system of FIG. 55(a,b), wherein the computer system 5500 comprises a computer device 5501 with a special operating system 5560* providing two mouse cursor 5505a, 5505p, which can be moved separately by two pointer devices 5503R, 5503L.

These pointer devices can be classical pointer devices, e.g. a mouse, a touchpad, a trackball, a stylus, etc. In a preferred version, the two pointer devices are HID-compatible mice M1, M2, each with at least two or exactly two push buttons (M1B1, M1B2) and (M2B1, M2B2), and preferably also at least one or exactly one scroll wheel (not shown).

In the example of FIG. 55(d), the two mice M1, M2 are directly connected to the computer, e.g. via a respective USB port, but that is not necessary, and the two mice can also be connected to the computer via a classical hub (not shown, but see FIG. 12, for example).

Unlike the block diagram of FIG. 5(f), FIG. 11, FIG. 12, FIG. 23a, FIG. 24, FIG. 25, FIG. 45 and FIG. 46, the block diagram of FIG. 54 does not have a special overlay application, but the two mouse cursors are provided by the operating system itself. Although of course many implementations are possible, this embodiment boils down to the operating system comprising one or more software modules or routine(s) performing the same or similar functions of the abovementioned "message handler" 5352 and the "repositioning routine" 5353 of FIG. 53, for example. In FIG. 54, this is represented by one module 5562* called "message handler and cursor positioning" It maintains the first position PosR with coordinates (x1,y1) corresponding to movements of the first pointer device 5503R, and the second position PosL with coordinates (x2,y2) corresponding to movements of the second pointer device 5503L, by means of the respective movement messages. These messages can be delivered, for example, via a USB port, via a hardware abstraction layer (HAL), via one or more mouse-device-drivers 5561, etc.

Figure 56:
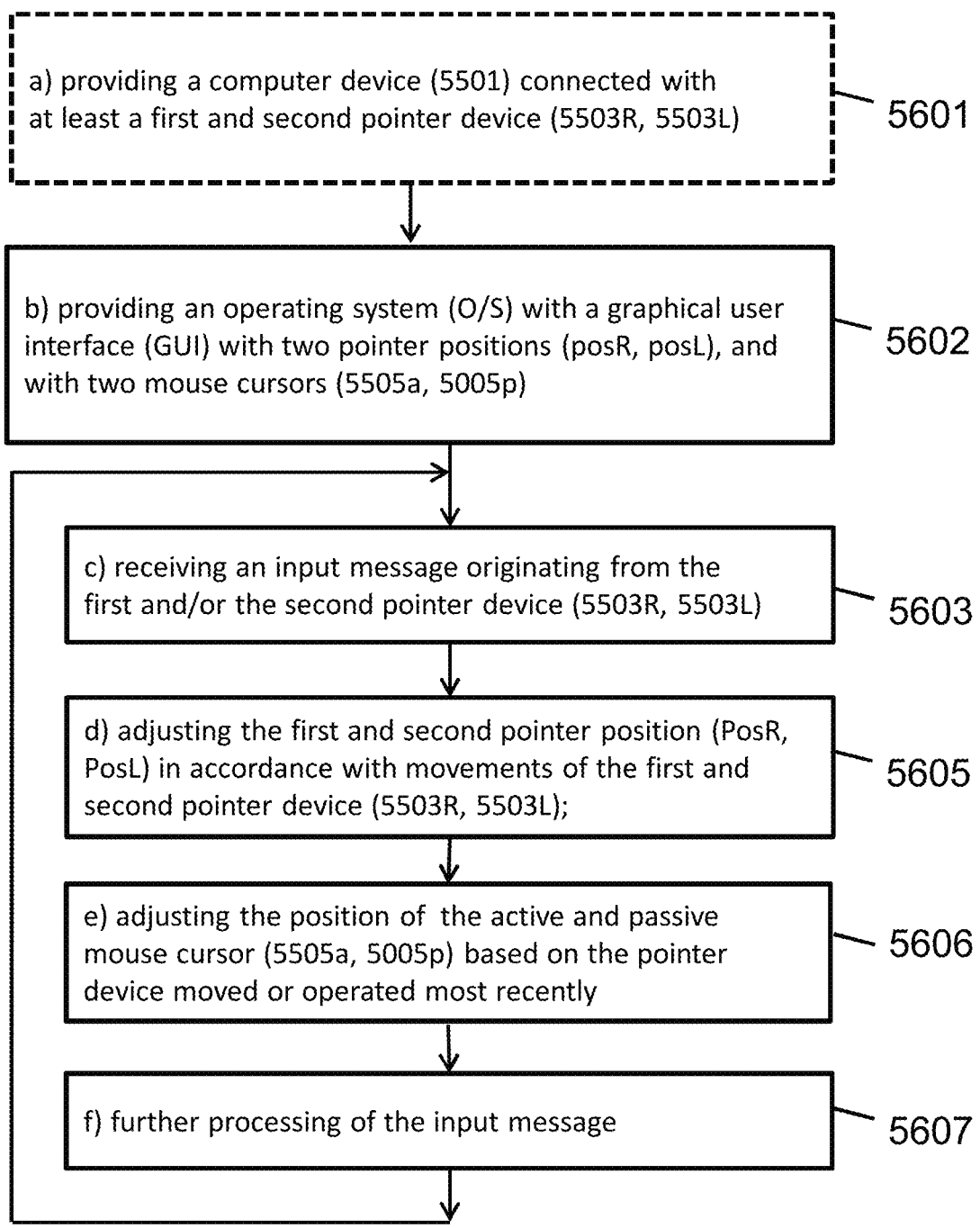

FIG. 56 shows a high-level flow diagram of an exemplary computer-implemented 5600 method which can be performed by the special operating system 5560*, e.g. by the exemplary "message handler and cursor positioning" 5562* shown in FIG. 55(d).

The method 5600 shown in FIG. 56 comprises the following steps:
    b) providing 5602 an operating system 5560* with a graphical user interface, with a first and a second pointer position PosR (x1,y1), PosL (x2, y2), and with a first mouse cursor 5505a (also called the active mouse cursor) and a second mouse cursor 5505p (also called the passive mouse cursor);

c) receiving 5603 an input message from the first and/or second pointer device 5503R, 5503L;

d) adjusting the first and second positions (PosR, PosL) in accordance with movements of the first and second pointer device (5503R, 5503L);

e) adjusting the position Posa of the active mouse cursor 5505a and the position Posp of the passive mouse cursor 5005p based on which pointer device 5503R, 5503L was last moved or operated;

f) further processing of the input message, e.g. by transmitting or not transmitting a command or event to an underlying visual component or application.

It is noted that step d) does not, but step e) does depend on the mentioned LeftH, RightH, TwoH mode]. (In the example of FIG. 56, the TWOH mode is used in step e).

Figure 57A:
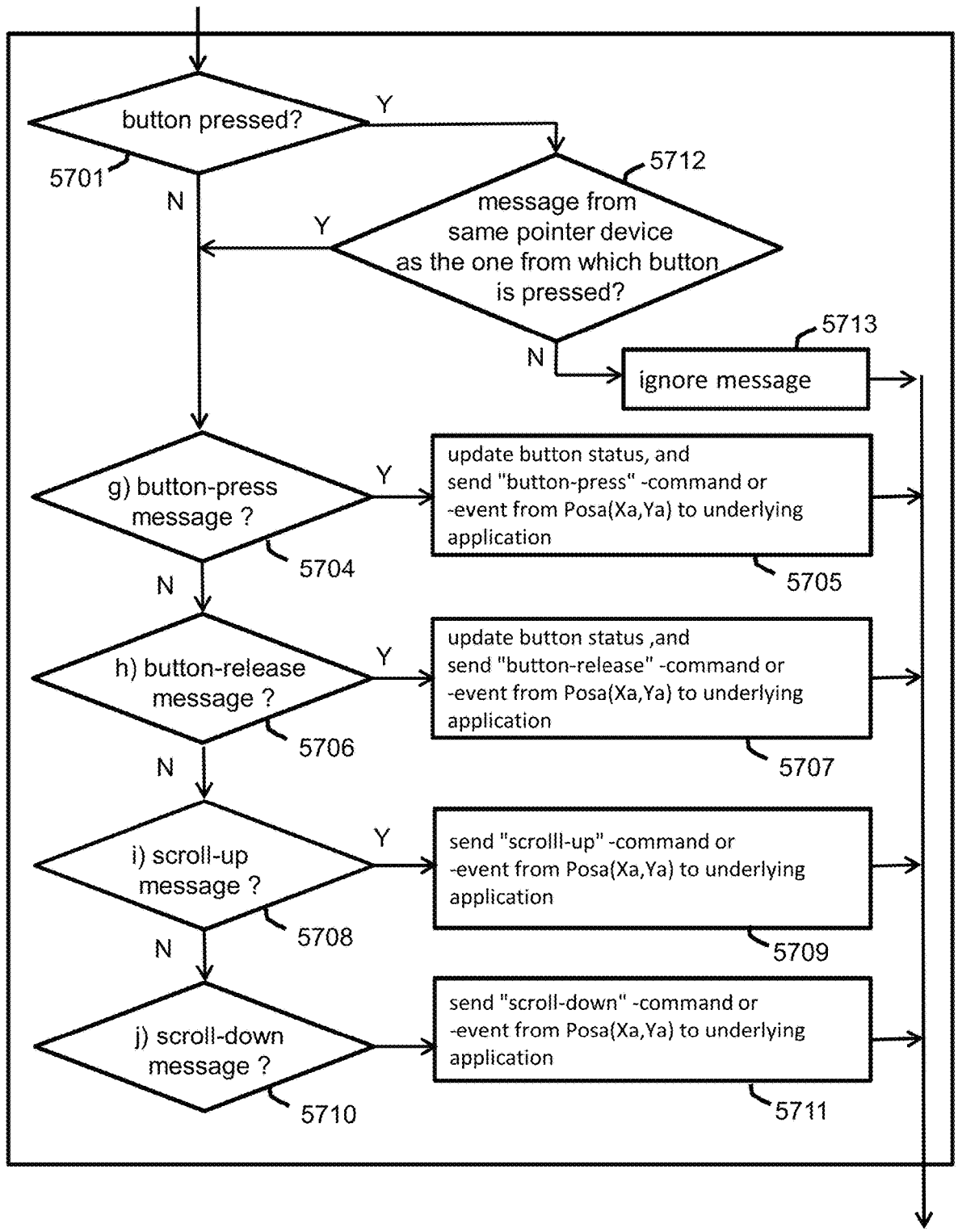
FIG. 57a shows in more detail how the last step of the method of FIG. 56 could look like, for example.

FIG. 57a shows in more detail what the processing of the input message (step 5607) could look like. In the method of FIG. 57a, the method further comprises maintaining the status of one or more or all of the buttons of the pointer device (e.g. pressed or not pressed), and taking this into account when handling subsequent messages.

In step 5701 it is checked whether a button is pressed. The state of the buttons M1B1, M1B2, M2B1, M2B2 of the first and second pointer devices M1, M2 can be maintained by means of four bits, for example, or maintained by means of four boolean variables, or by means of a counter that keeps track of whether at least one button is pressed, as described above.

If a message is received and a button is pressed (Y), then in step 5712 it is checked whether the incoming message originates from the same pointer device as the pointer device of which the button is pressed. And if the result of this test is true (Y), then continuation takes place at step 5704; and if the result of this test is false (N), then the message is ignored (step 5713) and optionally an error message is displayed.

If in step 5701 it was determined that no button is pressed, the method continues with step 5704.

In step 5704 it is checked whether the received message is a button-pressed message, and if so, then the button-pressed message in step 5705 is treated as a "button-pressed command", e.g. by transmitting a "button-pressed event" to the component or application located at position PosL or PosR depending on which pointer device was pressed, and the status of the buttons is updated;

in step 5706 it is checked whether the received message is a button-released message, and if so, then the button-released message in step 5707 is treated as a "button-released command", e.g. by transmitting a "button-released event" to the component or application located at position PosR or PosL depending on which pointer device was pressed, and the status of the buttons is updated;

in step 5708 it is checked whether the received message is a scroll-up message, and if so, then the scroll-up message in step 5709 is treated as a 'scroll-up command', e.g. by transmitting a "scroll-up event" to the component or application located under PosR or PosL depending on which pointer device the message originated;

otherwise (thus not a scroll-up message), in step 5710 it is checked whether the received message is a scroll-down message, and if so, then the scroll-down message in step 5711 is treated as a "scroll-down command", e.g. by transmitting a "scroll-down event" to the component or application located under PosR or PosL depending on which pointer device the message originated from.

Of course, many variations are possible. For example, the order of the tests can be changed, and/or the messages can be processed in a different way, e.g. by function calls, etc.

In the method of FIG. 57a, when a button of one pointer device is pressed, other messages are ignored, but messages originating from the same pointer device are processed.

In a variant of this method (not shown), movement messages are processed further (this is "dragging"), and a button-released message, but other messages are blocked, in particular a scroll message or a button-pressed message related to another button of the same pointer device, according to scenario (i) to (iv) of Table 1.

Figure 57B:
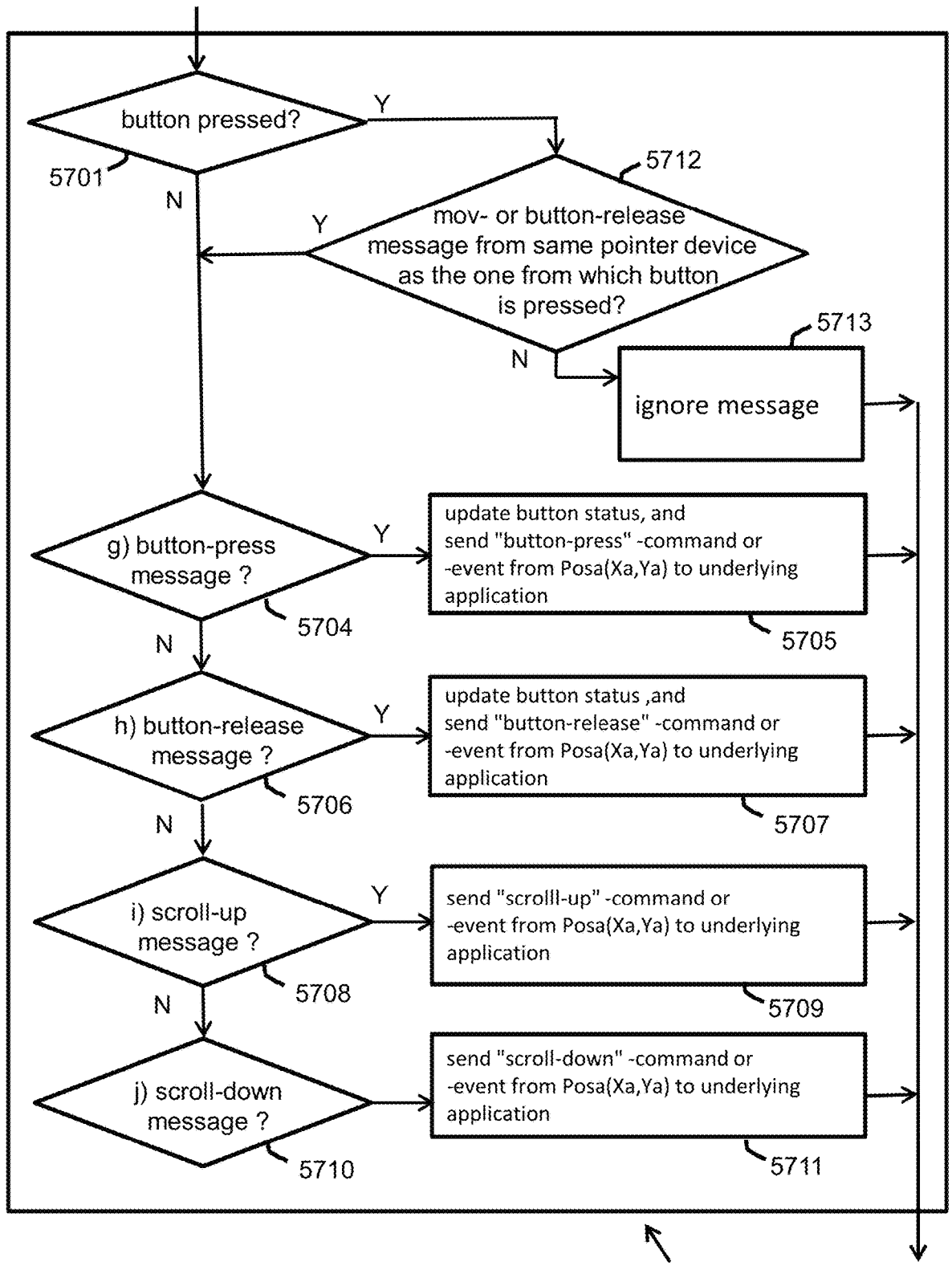

FIG. 57b shows a variant of the method of FIG. 57a, wherein in step 5712 it is checked whether the message is a movement message or a button-released message from the same pointer device as the one of which a button is pressed, and if so, the message will be further processed in steps 5704 to 5711 as above, and if not, the message is ignored in step 5713, and an optional error message is displayed, e.g. in the form of a bitmap.

In another or further variant of this method (not shown), a message from another pointer device, when a button is already pressed is not merely ignored, but in step 5713 it is tracked or recorded that a button-pressed message was ignored, and in step 5707 an additional test is performed to check whether the corresponding button-pressed message was ignored, and if so, then the button-released message is also ignored. In that way it can be prevented that a button-released command or event is transmitted to a component or application which was not preceded by a button-pressed command.

The methods described above attempt to keep the operating system behavior as backwards compatible as possible, so that a majority of the existing applications will continue to run without problems, without any changes to the application.

But the inventors came to the idea that it should be technically possible to offer additional functionality which goes beyond what is currently possible with existing operating systems.

It should be technically possible (at least from an application point of view) to provide an operating system that allows selecting text with the right-hand mouse in a first application (e.g. in a text editor on the right-hand side of the screen), and simultaneously scrolling in a PDF document viewer with the left-hand mouse (or vice versa). This is currently not possible with an operating system that has only one mouse cursor, because the mouse cursor would have to move from one application to another to scroll, but such movement is not possible when selecting text, or when dragging an object, see scenario (v) and (vi) of Table 1. However, such functionality can be provided in an improved operating system, because there is in principle no reason why the text application (on the right-hand side of the screen) should know that scrolling is taking place in another application (e.g. on the left-hand side of the screen, or on another screen), especially when this happens with another mouse cursor.

Figure 58:
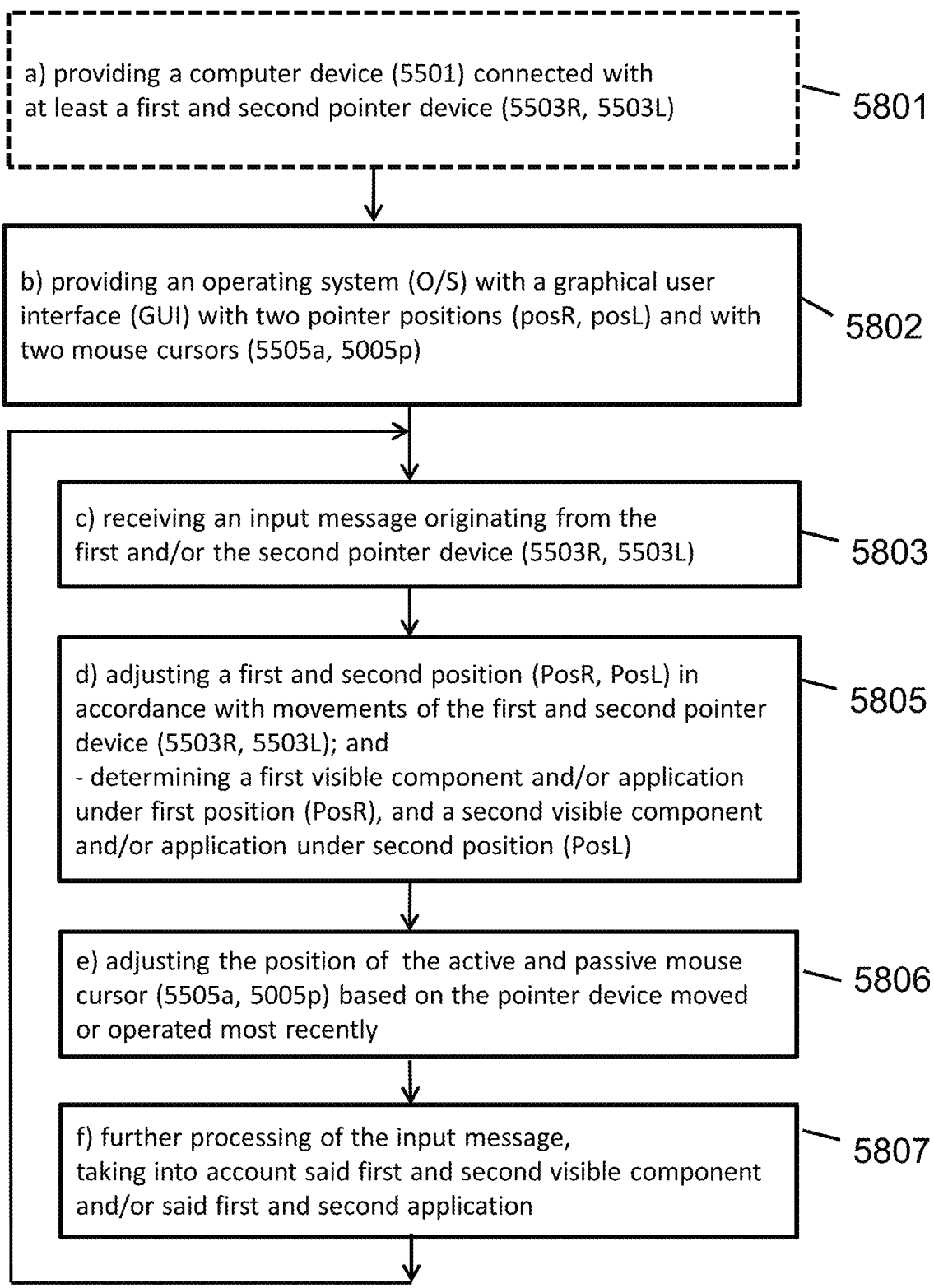
FIG. 58 shows a variant of the method of FIG. 56 as can be performed by an enhanced operating system, according to an embodiment of the present invention.
Figure 59A:
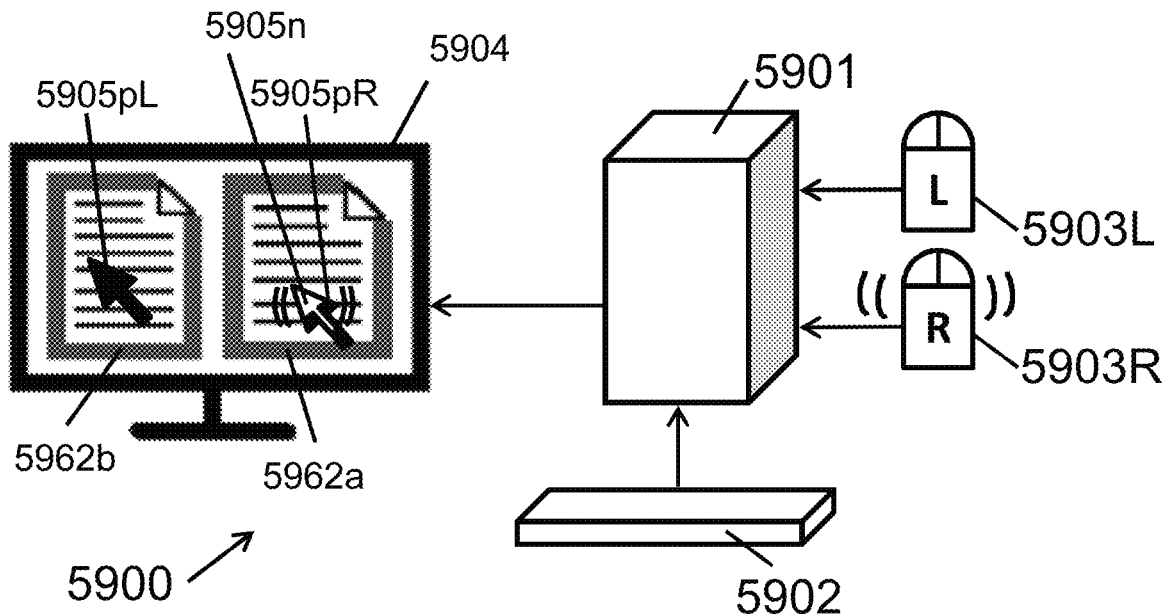
FIGS. 59(a) and 59(b) shows a variant of the computer system of FIGS. 55(a) to 55(d), according to an embodiment of the present invention.
Figure 59B:
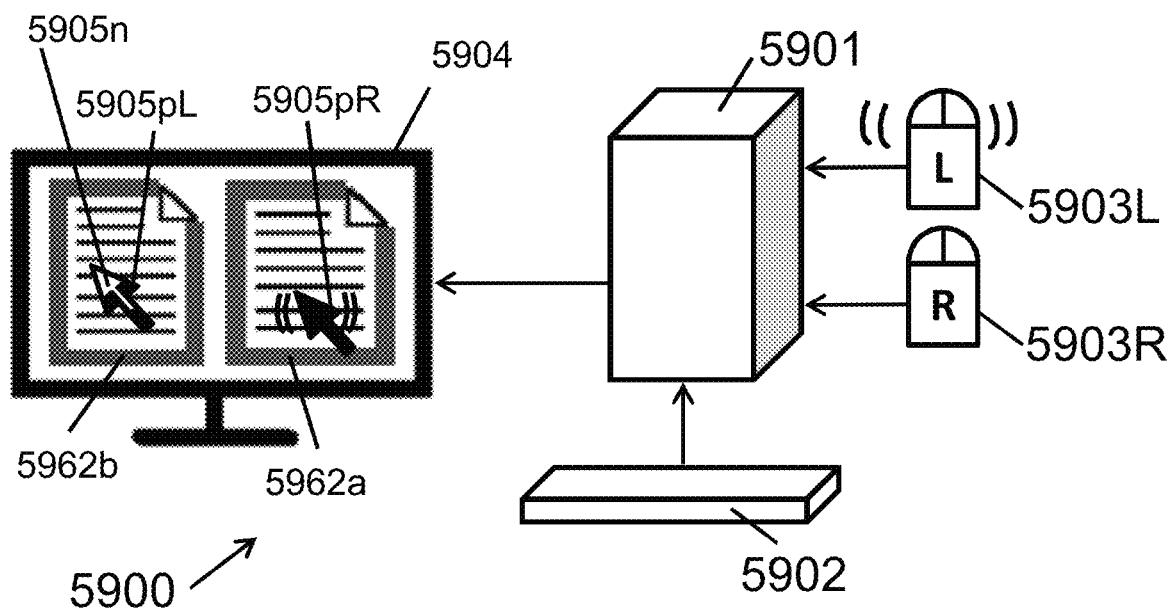

FIG. 58 shows a flow diagram of a method 5800 which can be executed by such an operating system. This method 5800 can be seen as a variant of the method 5600 of FIG. 56, the main differences being:

that in step 5805 it is further determined which (e.g. visual) component(s) or application (windows) are located at the first and second pointer position PosR, poL;

that the processing of the message in step 5807 takes into account which (e.g. visual) component(s) or application(s) are below the first and second pointer position PosR, PosL.

In an exemplary embodiment, the operating system checks whether the first pointer position PosR and the second pointer position PosL are above a same visual component and/or above a same application window, and the further processing of the input message in step 5607 takes this into account.

In a specific embodiment, if the two mouse cursors are above a same visual component or above a same application window, an error message is displayed in at least one of the following cases:
upon receipt of a button-pressed message originating from the first pointer device (5503R) if a button (M2B1, M2B2) of the second pointer device (5503L) is already pressed;
upon receipt of a button-pressed message originating from the second pointer device (5503L) if a button (M1B1, M1B2) of the first pointer device (5503R) is already pressed;
upon receipt of a scroll-up or scroll-down message from the first pointer device (5503R) if a button (M2B1, M2B2) of the second pointer device (5503L) is already pressed;
upon receipt of a scroll-up or scroll-down message from the second pointer device (5503L) if a button (M1B1, M1B2) of the first pointer device (5503R) is already pressed.

Preferably, in these cases no corresponding command or event is transmitted to the underlying visual component or application, so the component or application does not need to know that a button or scroll wheel of another pointer device has been operated. For that application it seems as if the operating system has only one pointer device.

In a further or other embodiment, if the first and second mouse cursor (5505a, 5505p) are above different visual components or application windows:
upon receipt of a scroll-up message from the first pointer device (5503R), a scroll-up command or event is transmitted to the underlying component or application (e.g. from the first pointer position) even if a button (M2B1, M2B2) of the second pointer device (5503L) is already pressed;
upon receipt of a scroll-down message from the second pointer device (5503L), a scroll-down command or event is transmitted to the underlying component or application (e.g. from the second pointer device position) even if a button (M1B1, M1B2) of the first pointer device (5503R) is already pressed.

In this embodiment, simultaneous dragging with one mouse and scrolling with the other mouse is thus indeed allowed, provided that the first mouse cursor and the second mouse cursor are located above different visual components or above different applications, as shown in Table 2.

TABLE 2 simultaneous actions with first and second pointer devices in an enhanced O/S

| | First pointer device | Second pointer device | Allowed? |
|---|---|---|---|
| (i) | move | move | yes |
| (ii) | move | scroll | yes |
| (iii) | scroll | scroll | yes |
| (iv) | click, drag | move | yes |
| (v) | click, drag | scroll | no, if above same component or application; yes, if above different components or applications |

TABLE 2-continued simultaneous actions with first and second pointer devices in an enhanced O/S

| | First pointer device | Second pointer device | Allowed? |
|---|---|---|---|
| (vi) | click, drag | click, drag | no, if above same component or application; yes, if above different components or applications |

FIG. 58a and FIG. 58b show a computer system 5800 which is a variant of the computer system 5500 of FIG. 55a and FIG. 55b. The main difference is that the computer system 5800 of FIG. 58 comprises an operating system that provides three visible objects 5905pL, 5905R, 5905n that move selectively along with one of the pointer devices. In the example of FIG. 58, the three visible objects comprise two bitmaps with a black arrow and one bitmap with a white arrow, the white arrow lying above the black arrows. In the two-handed mode TwoH, the two black arrows 5905L, 5905R follow movements of the pointer devices M1, M2 at all times. These bitmaps are therefore substantially located at the above indicated positions posR, posL (also called first and second position). The bitmap with the white cursor is the native mouse cursor, and in the two-handed mode TwoH it jumps from one position to the other, depending on which pointer device was last moved or operated. The two objects can also be called "mouse pointers", but to distinguish them from the native mouse cursor they may be better called "passive mouse pointers".

An advantage of this embodiment with three visible and movable objects or mouse pointers or mouse cursors is that the user sees the two pointer positions (in the example above: the black arrows) at all times, and also clearly sees where the "native mouse cursor" is located. He will therefore see that the native mouse cursor does not jump when, for example, the left-hand button M1B1 of the right-hand mouse is pressed, for example when dragging with the right-hand mouse, and will automatically understand that it is apparently not allowed to simultaneously click with the left-hand mouse. An error message may also be displayed (as explained above), but this is not strictly necessary.

But of course the invention is not limited to three bitmaps including the native mouse cursor, which can change shape depending on the underlying component or application, and two bitmaps each with a black arrow, but of course a bitmap with a blue or red arrow can also be shown, or an object with a different shape, e.g. a hand, and it is also possible that these two bitmaps also change shape depending on the underlying component or application.

In one embodiment, the native mouse cursor and the two other bitmaps are opaque, but these two other bitmaps may also be semi-transparent.

But of course other representation methods are also possible.

Finally, although individual characteristics have been explained in various drawings and in various embodiments of the present invention, it is possible that characteristics of various embodiments are combined, as would be logical for the person skilled in the art upon reading this document.

Although the present invention is explained for systems which have only two pointer devices, the present invention will also work with more than two pointer devices connected to the same computer, for example with three pointer devices.

The invention claimed is:

1. A computer-implemented method for supporting two pointer devices in a computer device to which a first pointer device and a second pointer device are connected, and which runs an operating system with a graphical user interface, the operating system providing a native mouse cursor, the method comprising the steps of:
- b) allowing or configuring the operating system with the graphical user interface to provide said native mouse cursor as a visible object;
- d) providing a message handler for processing raw input messages, and configuring the operating system to transmit raw input messages originating from the first and the second pointer device to this message handler;
- e) maintaining and/or modifying a first position in accordance with movements of the first pointer device, and maintaining and/or modifying a second position in accordance with movements of the second pointer device, said second position being distinct from said first position;
- f) adjusting a position of the native mouse cursor in accordance with movements of the first or the second pointer device, whichever was moved or operated most recently, such that the native mouse cursor may jump from one of said first position or said second position to the other based on whichever of the first or the second pointer device was moved or operated most recently;
- g) detecting whether the raw input messages form or comprise a movement sequence according to a predetermined format, and upon detection of such a movement sequence:
  - determining which pointer device caused this movement sequence; and
  - moving the native mouse cursor to the maintained or adjusted position associated with the pointer device which caused the movement sequence; and
  - sending at least one command selected from the group consisting of a button-pressed command, a button-released command, a scroll-up command and a scroll-down command to the operating system in accordance with the detected movement sequence.

2. A computer-implemented method according to claim 1, further comprising the step of:
a) providing a graphical overlay window.

3. A computer-implemented method according to claim 2, where in step a) the graphical overlay window is provided as a substantially screen-filling window comprising fully transparent pixels;
and/or where the method further comprises the step of:
c) configuring the graphical overlay window in click-through mode.

4. A computer-implemented method according to claim 2, where in step a) the graphical overlay window is provided comprising at least one visible object;
and where step f) further comprises adjusting a position of that visible object to the other position of the first and second position than the position taken by the native mouse cursor.

5. A computer-implemented method according to claim 2, wherein in step a) the graphical overlay window is provided comprising at least a first visible object and a second visible object;
and wherein step f) further comprises adjusting a position of the first visible object based on the first position, and adjusting a position of the second visible object based on the second position.

6. A computer-implemented method according to claim 1, wherein each of the movement sequences comprises a series of two to twenty movements, or a series of three to ten movements.

7. A computer-implemented method according to claim 1, wherein a cumulative displacement of the movement sequences is a null movement.

8. A computer-implemented method according to claim 1, wherein each of the movement sequences comprises a null movement as last movement.

9. A computer-implemented method according to claim 1, wherein step e) comprises: adjusting the first position and the second position based on the raw input messages.

10. A computer-implemented method for supporting two pointer devices in a computer device to which a first pointer device and a second pointer device are connected, and which runs an operating system with a graphical user interface, the operating system providing a native mouse cursor, the method comprising the steps of:
- b) allowing or configuring the operating system with the graphical user interface to provide said native mouse cursor as a visible object;
- d) providing a message handler for processing raw input messages, and configuring the operating system to transmit raw input messages originating from the first and the second pointer device to this message handler;
- e) maintaining and/or modifying a first pointer position in accordance with movements of the first pointer device, and maintaining and/or modifying a second pointer position in accordance with movements of the second pointer device, said second position being distinct from said first position;
- f) adjusting a position of the native mouse cursor in accordance with movements of the first or the second pointer device, whichever was moved or operated most recently, such that the native mouse cursor may jump from one of said first position or said second position to the other based on whichever of the first or the second pointer device was moved or operated most recently.

11. A computer-implemented method according to claim 10,
further comprising: a) providing a graphical overlay window comprising a second visible object;
and where step f) further comprises adjusting a position of the second visible object to the other position of the first and second position than the position taken by the native mouse cursor.

12. A computer-implemented method according to claim 11,
further comprising: c) configuring the graphical overlay window in click-through mode.

13. A computer-implemented method according to claim 10,
further comprising: a) providing a graphical overlay window comprising at least a second visible object and a third visible object;
and wherein step f) further comprises adjusting a position of the second visible object based on the first position, and adjusting a position of the third visible object based on the second position.

14. A computer-implemented method according to claim 13, further comprising: c) configuring the graphical overlay window in click-through mode.

\* \* \* \* \*